US011290923B2

(12) United States Patent
Akdeniz et al.

(10) Patent No.: US 11,290,923 B2
(45) Date of Patent: Mar. 29, 2022

(54) HANDOVER-RELATED TECHNOLOGY, APPARATUSES, AND METHODS

(71) Applicant: Intel Corporation, Santa Clara, CA (US)

(72) Inventors: Mustafa Akdeniz, San Jose, CA (US); Dave A. Cavalcanti, Portland, OR (US); Thorsten Clevorn, Munich (DE); Brent Elliott, Hillsboro, OR (US); Jeffrey R. Foerster, Portland, OR (US); Mikhail T. Galeev, Portland, OR (US); Benjamin Grewell, Portland, OR (US); Nageen Himayat, Fremont, CA (US); Shadi Iskander, Ergolding (DE); Udayan Mukherjee, Portland, OR (US); Harry G. Skinner, Beaverton, OR (US); Susruth Sudhakaran, Beaverton, OR (US); Candy Yiu, Portland, OR (US); Chetan Hiremath, Portland, OR (US); Neelam Chandwani, Portland, OR (US); Jesus Martinez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/648,756

(22) PCT Filed: Jun. 28, 2018

(86) PCT No.: PCT/US2018/039939
§ 371 (c)(1),
(2) Date: Mar. 19, 2020

(87) PCT Pub. No.: WO2019/133049
PCT Pub. Date: Jul. 4, 2019

(65) Prior Publication Data
US 2020/0252838 A1    Aug. 6, 2020

Related U.S. Application Data

(60) Provisional application No. 62/612,358, filed on Dec. 30, 2017.

(51) Int. Cl.
*H04W 36/00* (2009.01)
*H04W 4/70* (2018.01)
(Continued)

(52) U.S. Cl.
CPC ....... *H04W 36/0009* (2018.08); *H04L 5/0055* (2013.01); *H04W 4/70* (2018.02);
(Continued)

(58) Field of Classification Search
CPC ......... H04W 36/0009; H04W 36/0016; H04W 64/006; H04W 24/10; H04W 72/1242;
(Continued)

(56) References Cited

U.S. PATENT DOCUMENTS

2015/0181481 A1\* 6/2015 Masini .............. H04W 36/0085
455/436
2015/0237569 A1    8/2015 Jalali
(Continued)

FOREIGN PATENT DOCUMENTS

| CN | 106982410 A | 7/2017 |
|---|---|---|
| CN | 111527769 | 8/2020 |

(Continued)

OTHER PUBLICATIONS

"International Application Serial No. PCT/US2018/039939, International Search Report dated Dec. 13, 2018", 5 pgs.
(Continued)

*Primary Examiner* — Hashim S Bhatti
(74) *Attorney, Agent, or Firm* — Schwegman Lundberg & Woessner, P.A.

(57) ABSTRACT

An apparatus of a wireless device, such as a user equipment (UE), can include processing circuitry configured to perform one or more of the handover-related techniques disclosed herein. For example, when associated with moving with a plurality of mobile devices from coverage of a first cell to a second cell, the processing circuitry can detect the second cell. One or more parameters of the second cell can be measured. The one or more parameters can be communicated to one or more other mobile devices of the plurality of mobile devices.

18 Claims, 78 Drawing Sheets

(51) Int. Cl.
*H04W 76/11* (2018.01)
*H04L 5/00* (2006.01)
*H04W 64/00* (2009.01)
*H04W 24/10* (2009.01)
*H04W 72/12* (2009.01)

(52) U.S. Cl.
CPC ....... *H04W 24/10* (2013.01); *H04W 36/0016* (2013.01); *H04W 36/0061* (2013.01); *H04W 36/0085* (2018.08); *H04W 64/006* (2013.01); *H04W 72/1242* (2013.01); *H04W 76/11* (2018.02)

(58) Field of Classification Search
CPC ... H04W 4/70; H04W 76/11; H04W 36/0085; H04W 36/0061; H04W 36/32; H04W 36/30; H04L 5/0055; H04B 7/18504
See application file for complete search history.

(56) References Cited

U.S. PATENT DOCUMENTS

| | | | |
|---|---|---|---|
| 2015/0296426 A1* | 10/2015 | Mildh | H04W 36/0085 455/436 |
| 2016/0233989 A1 | 8/2016 | Belghoul et al. | |
| 2017/0188391 A1 | 6/2017 | Rajagopal | |
| 2018/0262887 A1* | 9/2018 | Futaki | H04W 48/10 |
| 2019/0082359 A1* | 3/2019 | Wei | H04W 36/0061 |
| 2020/0092685 A1* | 3/2020 | Fehrenbach | H04B 7/2606 |

FOREIGN PATENT DOCUMENTS

| | | |
|---|---|---|
| JP | 2017220956 | 12/2017 |
| WO | WO-2015161083 A1 | 10/2015 |
| WO | WO-2016012437 A1 | 1/2016 |
| WO | WO-2016190793 A1 | 12/2016 |
| WO | WO-2017091011 A1 | 6/2017 |
| WO | WO-2019133049 A1 | 7/2019 |

OTHER PUBLICATIONS

"International Application Serial No. PCT/US2018/039939, Invitation to Pay Add'l Fees and Partial Search Report dated Oct. 12, 2018", 7 pgs.
"International Application Serial No. PCT/US2018/039939, Written Opinion dated Dec. 13, 2018", 5 pgs.
"International Application Serial No. PCT US2018 039939, International Preliminary Report on Patentability dated Jul. 9, 2020", 7 pgs.
"Indian Application Serial No. 202047010125, First Examination Report dated Jun. 29, 2021", 5 pgs.
"Korean Application Serial No. 10-2020-7014640, Voluntary Amendment filed Jun. 28, 2021", with English claims, 28 pgs.
"European Application Serial No. 18897625.2, Extended European Search Report dated Sep. 3, 2021", 9 pgs.
ZTE, "Discusssion on NR operation in unlicensed spectrum", 3GPP Draft; RI-1701619-8.1.10 Discussion on MR Operation in Unlicensed Spectrum,3RD Generation Partnership Project (3GPP), Mobile Competence Centre ; 650, Route Deslucioles ; F-06921 SOPHIA-ANTIP0vol. RAN WG1, No. Athens, [Online] Retrieved from the Internet :URL:http: www.3gpp.org ftp Meetings 3GPPSYNC RANI Docs, (Feb. 12, 2017).
"Korean Application Serial No. 10-2020-7014640, Notice of Preliminary Rejection dated Feb. 16, 2022", w/ English translation, 12 pgs.

* cited by examiner

HANDOVER-RELATED TECHNOLOGY, APPARATUSES, AND METHODS

CROSS-REFERENCE TO RELATED APPLICATION

This application is a U.S. National Stage Filing under 35 U.S.C. 371 from International Application No. PCT/US2018/039939, filed on Jun. 28, 2018, which application claims benefit of priority to U.S. Provisional Patent Application Ser. No. 62/612,358, filed on Dec. 30, 2017, and entitled "HANDOVER-RELATED TECHNOLOGY, APPARATUSES, AND METHODS." Each of which are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including new radio (NR) networks. Other aspects pertain to techniques, methods and apparatuses for performing handover in wireless networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

The use of networked UEs using 3GPP LTE systems has increased in areas of home and work life. Fifth generation (5G) wireless systems are forthcoming and are expected to enable even greater speed, connectivity, and usability. Next generation 5G networks are expected to increase throughput, coverage, and robustness. As current cellular network frequency is saturated, high frequencies, such as millimeter wave (mmWave) frequency, can be beneficial due to their high bandwidth.

The explosive wireless traffic growth leads to a need of rate improvement. With mature physical layer techniques, further improvement in the spectral efficiency may be marginal. On the other hand, the scarcity of licensed spectrum in low frequency bands results in a deficit in the data rate boost. Thus, there are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments. Further enhancements in the operation of LTE systems in the licensed as well as unlicensed spectrum can be important in future releases and 5G systems, including improvements to handover operations to increase throughput and efficiency.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1A:
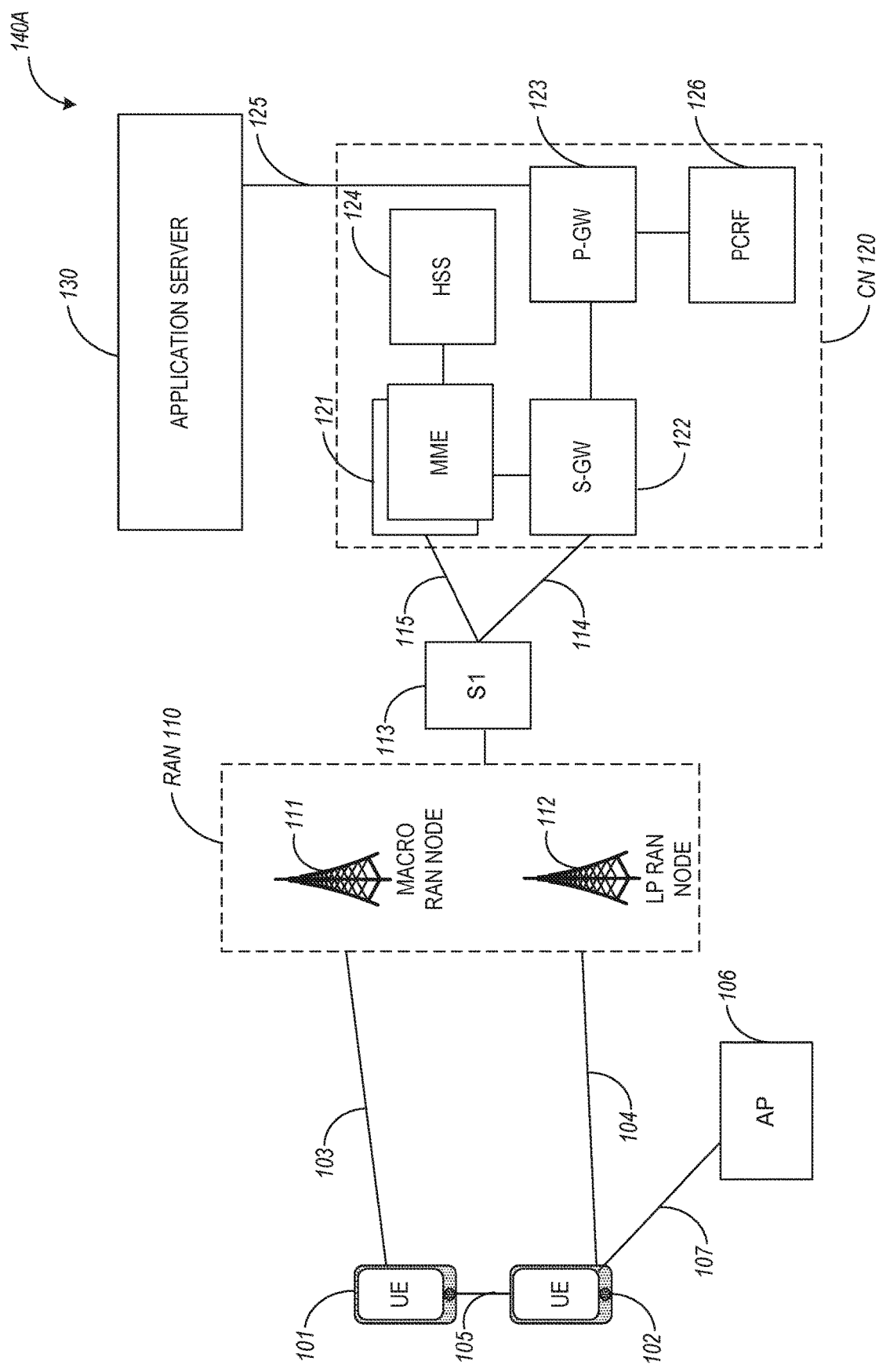
FIG. 1A illustrates an architecture of a network in accordance with some aspects.

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UM TS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTSTerrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Imp roved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.1 lad, IEEE 802.1 lay, and the like), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (12V) communication technologies, 3GPP cellular V2X, DSRC (Dedicated Short Range Communications) communication systems such as Intelligent-Transport-Systems and others.

Aspects described herein can be used in the context of any spectrum management scheme including for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

In some aspects, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UM T S) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UM TS) protocol, a 3GPP Long Term Evolution (LTE) protocol, a fifth generation (5G) protocol, a New Radio (NR) protocol, and the like.

In some aspects, RAN 110 can include NG RAN or NG Core RAN. The NG RAN 110 can include various functions, such as, for example, an access and mobility management function (AMF), a session management function (SMF), a user plane function (UPF), a policy control function (PCF), a unified data management (UDM) function, and a network function (NF) repository function (NRF). The AMF can be used to manage access control and mobility, and can also include network slice selection functionality. The SM F can be configured to set up and manage various sessions according to a network policy. The UPF can be deployed in one or more configurations according to a desired service type. The PCF can be configured to provide a policy framework using network slicing mobility management, and roaming (similar to PCRF in a 4G communication system). The UDM can be configured to store subscriber profiles and data (similar to an HSS in a 4G communication system). Various aspects of NG RAN and NG Core are discussed herein in reference to FIG. 1B, FIG. 1C, FIG. 1D, and FIG. 1E.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including but not limited to, radio network controller (RNC) functions such as radio bearer management, uplink and downlink dynamic radio resource management and data packet scheduling and mobility management. In an example, any of the nodes 111 and/or 112 can be a new generation node-B (gNB), an evolved node-B (eNB) or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1E). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging and some policy enforcement.

The P-GW 123 may terminate a SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this aspect, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

In an example, any of the nodes 111 or 112 can be configured to communicate to the UEs 101/102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101/102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, LTE-based communications can use a fixed transmission time interval (TTI) length of 1 ms with 12-14 symbols, or a smaller TTI can also be used (e.g., in NR-based communications). The transmission of a request, grant, or data can be achieved by using one or more subframes with a TTI. In this regard, the TTI length can impact both the time for transmitting over the air as well as the processing time at transmitters and receivers.

Figure 1B:
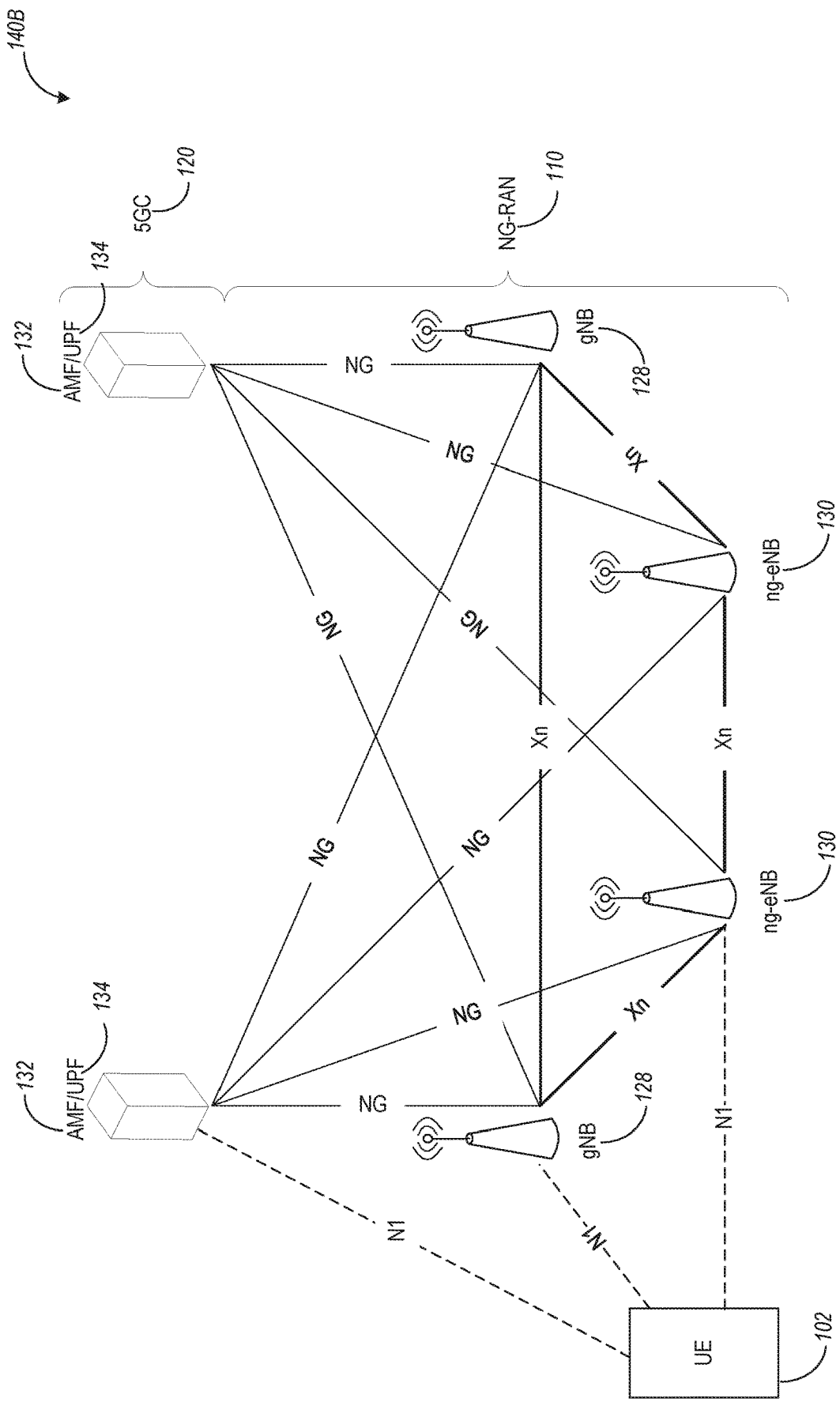
FIG. 1B is a simplified diagram of an overall next generation (NG) system architecture in accordance with some aspects.

FIG. 1B is a simplified diagram of a next generation (NG) system architecture in accordance with some aspects. Referring to FIG. 1B, the NG system architecture 140B includes NG-RAN 110 and a 5G network core (5GC) 120. The NG-RAN 110 can include a plurality of nodes, such as gNBs 128 and ng-eNBs 130. The gNBs 128 and the ng-eNBs 130 can be communicatively coupled to the UE 102 via, e.g., an N1 interface.

The 5GC 120 includes an access and mobility management function (AMF) 132 and/or a user plane function (UPF) 134. The AMF 132 and the UPF 134 can be communicatively coupled to the gNBs 128 and the ng-eNBs 130 via NG interfaces. More specifically, in some aspects, the gNBs 128 and the ng-eNBs 130 can be connected to the AMF 132 by NG-C interfaces, and to the UPF 134 by NG-U interfaces. The gNBs 128 and the ng-eNBs 130 can be coupled to each other via Xn interfaces.

In some aspects, a gNB 128 can include a node providing new radio (NR) user plane and control plane protocol termination towards the UE, and is connected via the NG interface to the 5GC 120. In some aspects, an ng-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the ng-eNBs 130 can be implemented as a base station, a mobile edge server, a small cell, a home eNB, and so forth.

Figure 1C:
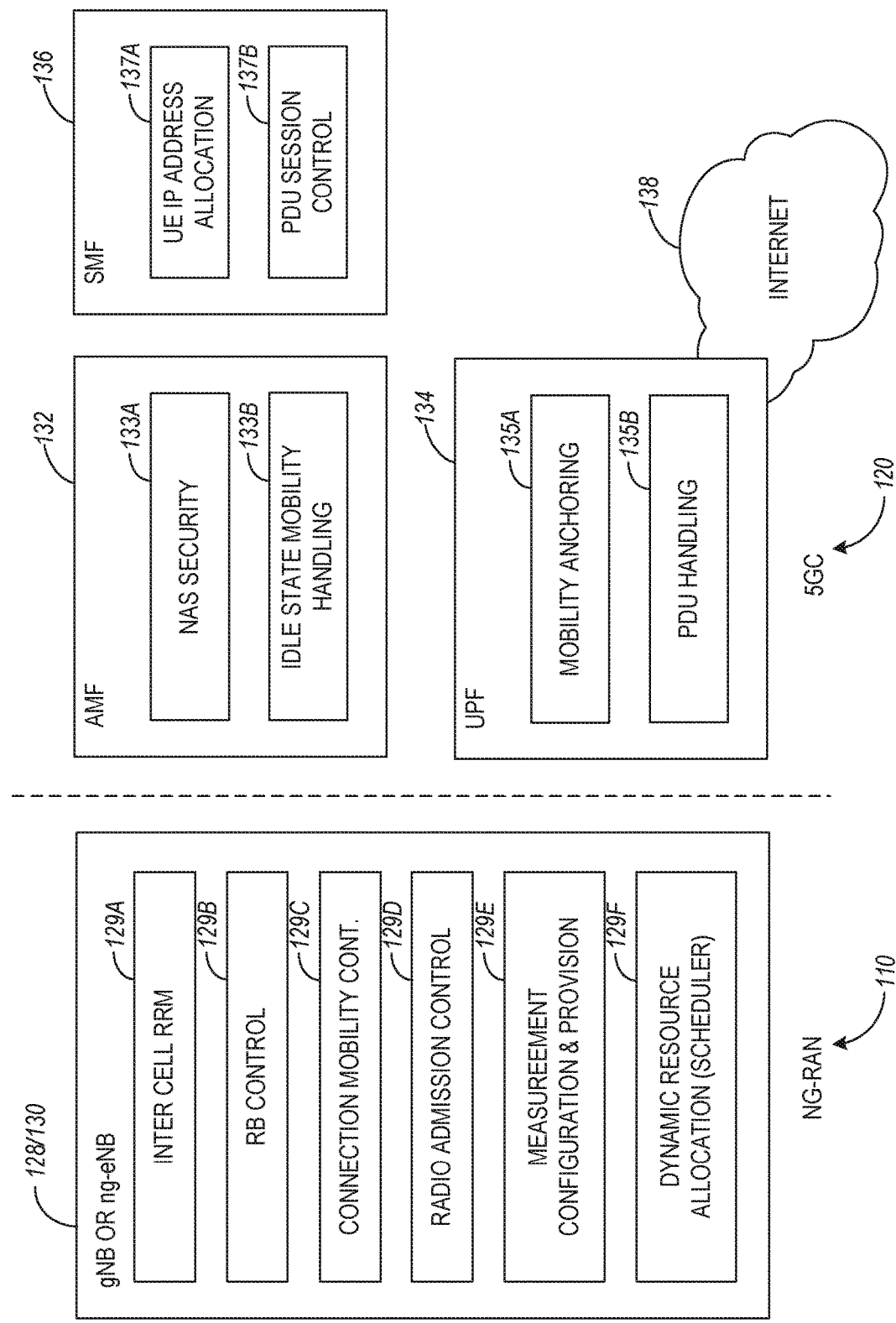
FIG. 1C illustrates a functional split between NG-RAN and 5G Core (5GC) in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the ng-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the ng-eNBs 130 can be configured to host the following functions: functions for Radio Resource Management (e.g., inter-cell radio resource management 129A, radio bearer control 129B, radio admission control 129D, connection mobility control 129C, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing QoS flow management and mapping to data radio bearers; support of UEs in RRC_INACTIVE state; distribution function for non-access stratus (NAS) messages; radio access network sharing dual connectivity; and tight interworking between NR and E-UTRA, to name a few.

In some aspects, the AMF 132 can be configured to host the following functions, for example: NAS signaling termination; NAS signaling security 133A; access stratus (AS) security control; inter core network (CN) node signaling for mobility between 3GPP access networks; idle mode mobility handling 133B, including mobile device, such as a UE, reachability (e.g., control and execution of paging retransmission); registration area management; support of intra-system and inter-system mobility; access authentication; access authorization including check of roaming rights; mobility management control (subscription and policies); support of network slicing and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding packet inspection and user plane part of policy rule enforcement; traffic usage reporting uplink classifier to support routing traffic flows to a data network; branching point to support multi-homed PDU session; QoS handling for user plane, e.g. packet filtering gating UL/DL rate enforcement; uplink traffic verification (SDF to QoS flow mapping); and/or downlink packet buffering and downlink data notification triggering, among other functions.

The Session Management function (SMF) 136 can be configured to hosts the following functions, for example: session management; UE IP address allocation and management 137A; selection and control of UP function; PDU session control 137B, including configuring traffic steering at UPF to route traffic to proper destination; control part of policy enforcement and QoS; and/or downlink data notification, among other functions.

Figure 1D:
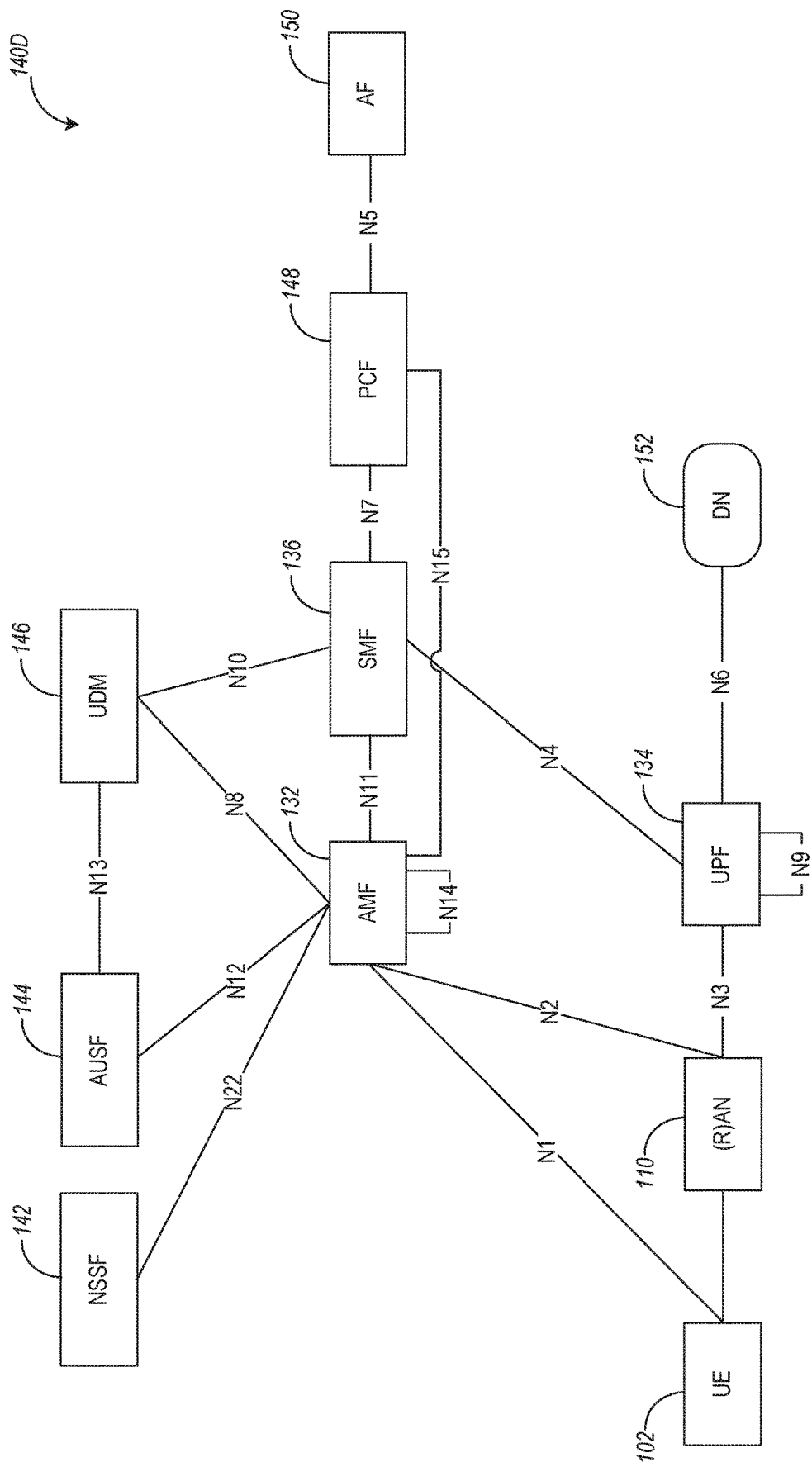
FIG. 1D and FIG. 1E illustrate a non-roaming 5G system architecture in accordance with some aspects.
Figure 1E:
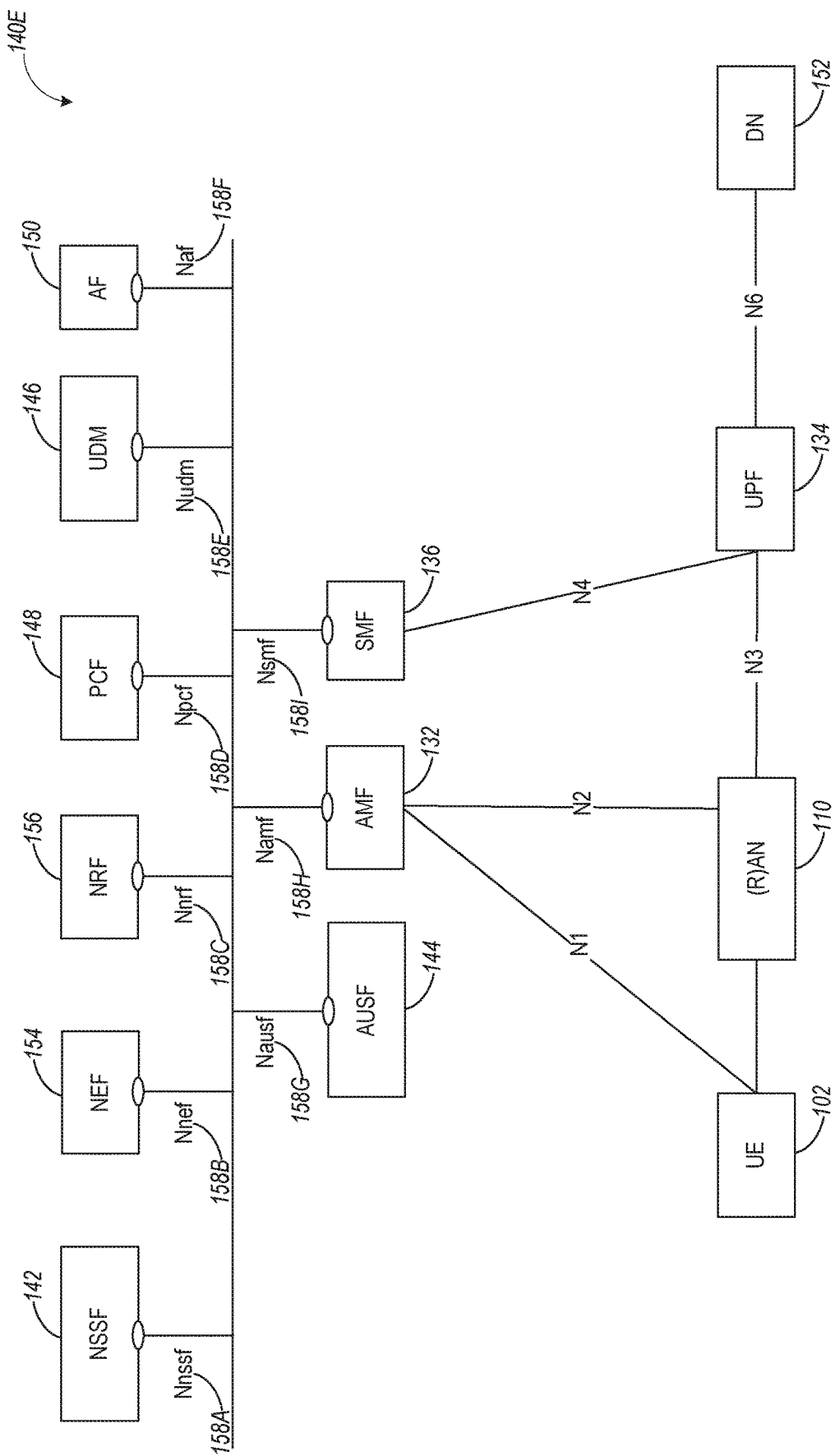

FIG. 1D and FIG. 1E illustrate a non-roaming 5G system architecture in accordance with some aspects. Referring to FIG. 1D, there is illustrated a 5G system architecture 140D in a reference point representation. More specifically, UE 102 can be in communication with RAN 110 as well as one or more other 5GC network entities. The 5GC of system architecture 140D includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM) 146. The UPF 134 can provide a connection to a data network (DN) 152, which can include, for example, operator services, Internet access, or third-party services.

Referring to FIG. 1E, there is illustrated a 5G system architecture 140E and a service-based representation. System architecture 140E can be substantially similar to (or the same as) system architecture 140D. In addition to the network entities illustrated in FIG. 1D, system architecture 140E can also include a network exposure function (NEF) 154 and a network repository function (NRF) 156.

In some aspects, the 5G system architectures can be service-based and interaction between network functions can be represented by corresponding point-to-point reference points Ni (as illustrated in FIG. 1D) or as service-based interfaces (as illustrated in FIG. 1E).

A reference point representation shows that an interaction can exist between corresponding NF services. For example, FIG. 1D illustrates the following reference points: N1 (between the UE and the AMF), N2 (between the RAN and the AMF), N3 (between the RAN and the UPF), N4 (between the SMF and the UPF), N5 (between the PCF and the AF), N6 (between the UPF and the DN), N7 (between the SMF and the PCF), N8 (between the UDM and the AMF), N9 (between two UPFs), N10 (between the UDM and the SMF), N11 (between the AMF and the SM F), N12 (between the AUSF and the AMF), N13 (between the AUSF and the UDM), N14 (between two AMFs), N15 (between the PCF and the AMF in case of a non-roaming scenario, or between the PCF and a visited network and AMF in case of a roaming scenario), N16 (between two SMFs; not illustrated in FIG. 1D), and N22 (between AMF and NSSF). Other reference point representations not shown in FIG. 1D can also be used.

In some aspects, as illustrated in FIG. 1E, service-based representations can be used to represent network functions within the control plane that enable other authorized network functions to access their services. In this regard, 5G system architecture 140E can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1E can also be used.

As used herein, the term circuitry may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 2:
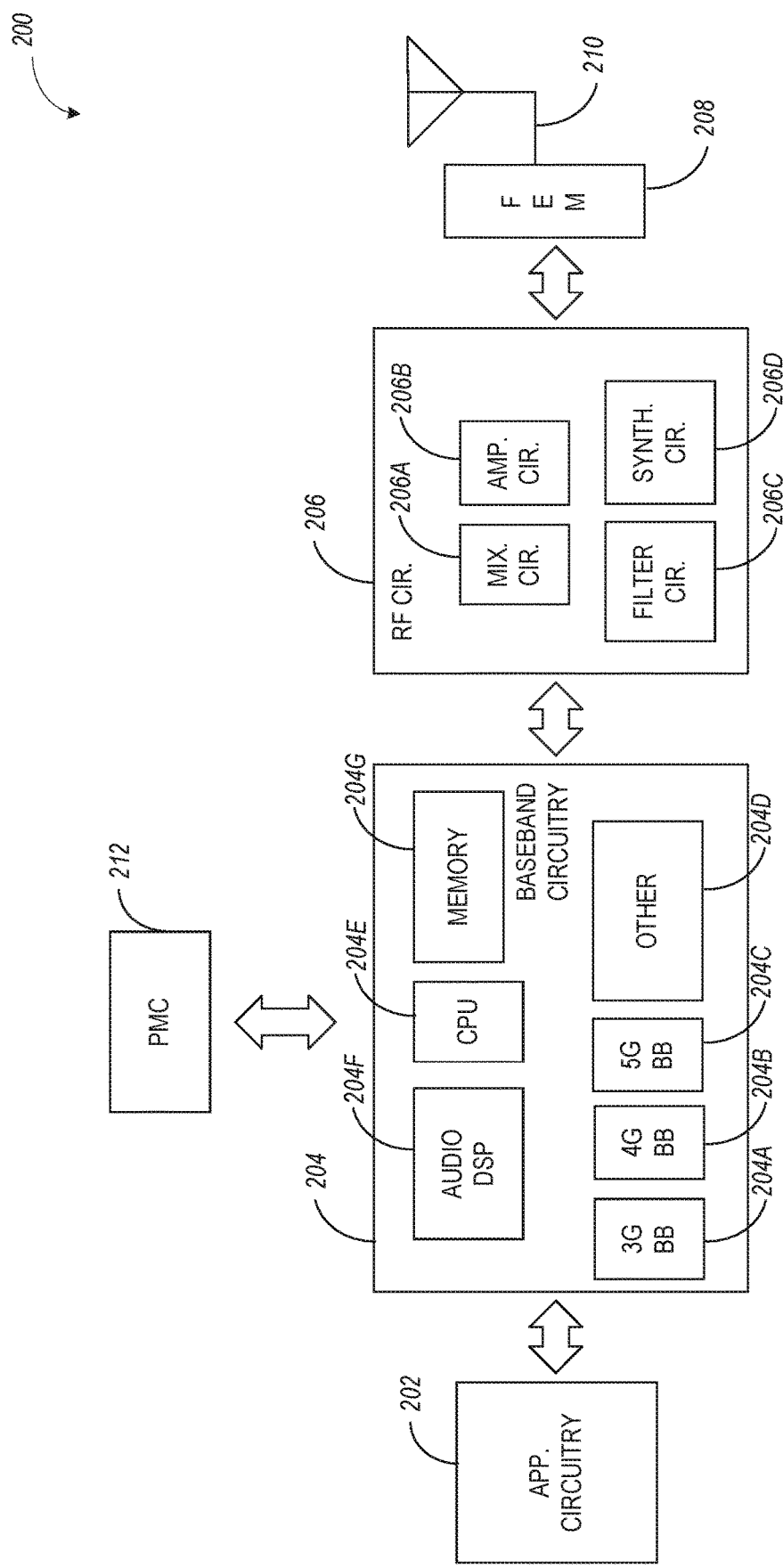
FIG. 2 illustrates example components of a device in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding radio frequency shifting etc. In some aspects, modulation/demodulation circuitry of the baseband circuitry 204 may include Fast-Fourier Transform (FFT), precoding or constellation mapping/demapping functionality. In some aspects, encoding/decoding circuitry of the baseband circuitry 204 may include convolution, tail-biting convolution, turbo, Viterbi, or Low Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry may be suitably combined in a singe chip, a singe chip set, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature downconversion and up conversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct downconversion and direct upconversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer circuitry 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications processor 202 depending on the desired output frequency. In some aspects, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM 208, or in both the RF circuitry 206 and the FEM 208.

In some aspects, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling battery charging and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during to this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
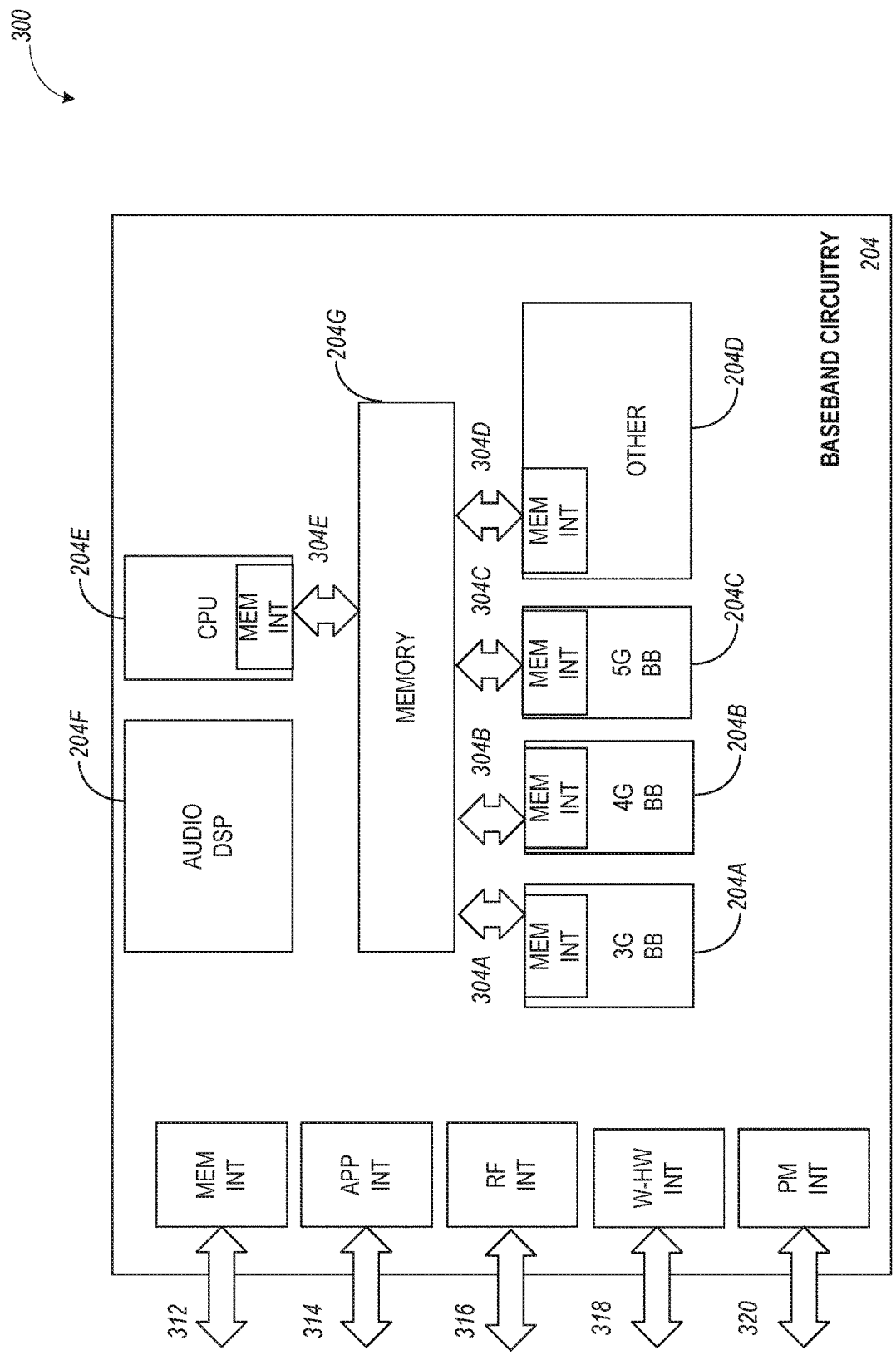
FIG. 3 illustrates example interfaces of baseband circuitry in accordance with some aspects.

FIG. 3 illustrates example interfaces of baseband circuitry in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
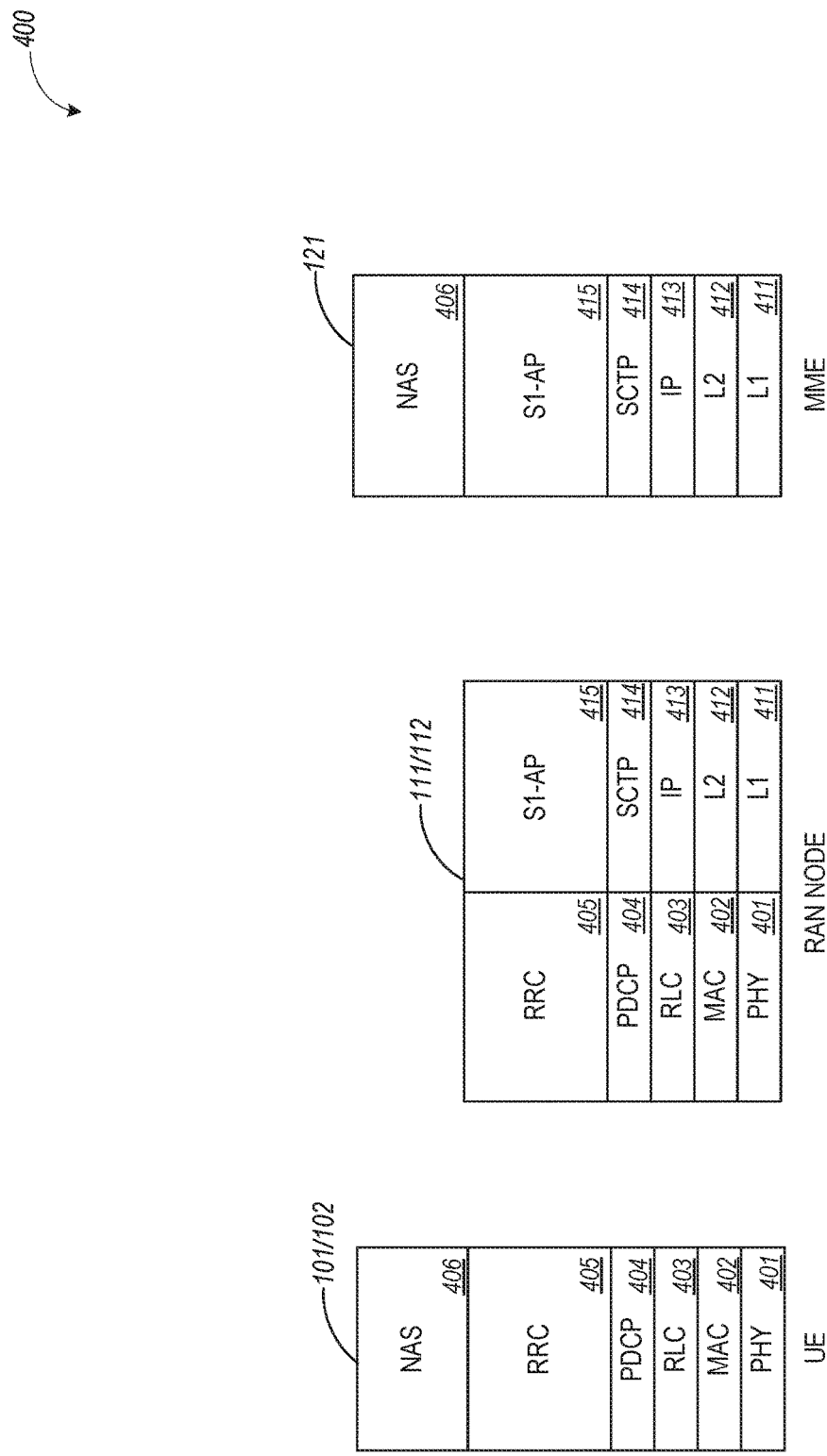
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 101 (or alternatively, the UE 102), the RAN node 111 (or alternatively, the RAN node 112), and the MME 121.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC)

coding/decoding of the transport channels, modulation/demodulation of physical channels, interleaving rate matching mapping on to physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting error correction through hybrid automatic repeat request (HARQ), and logical channel prioritization.

The RLC layer 403 may in some aspects operate in a plurality of modes of operation, including Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also in some aspects execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering deciphering integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging establishment, maintenance and release of an RRC connection between the UE and E-UTRAN (e.g., RRC connection paging RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121 as illustrated in FIG. 4. In aspects, the NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. In certain aspects, the S1-AP layer services may comprise two groups: UE-associated services and non-UE-associated services. These services perform functions including but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (which may alternatively be referred to as the SCTP/IP layer) 414 may ensure reliable delivery of signaling messages between the RAN node 11 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
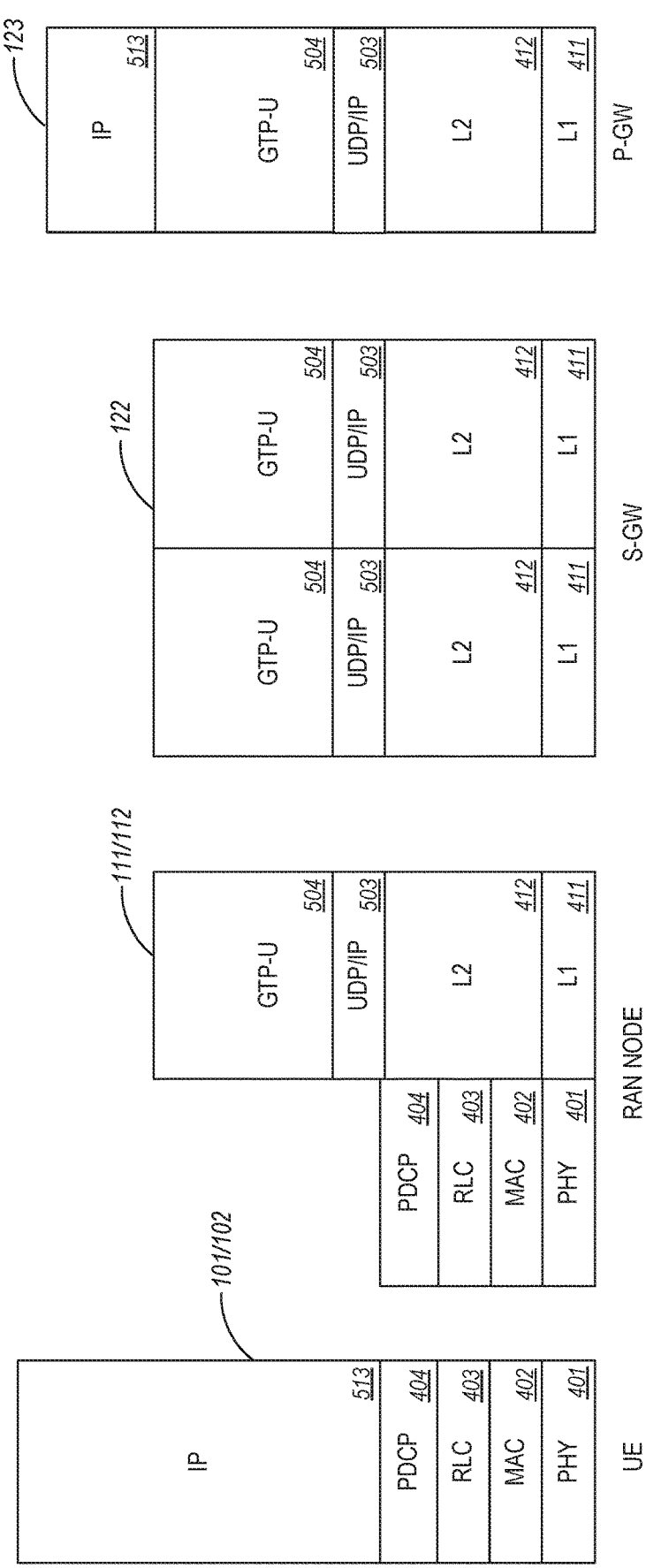
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
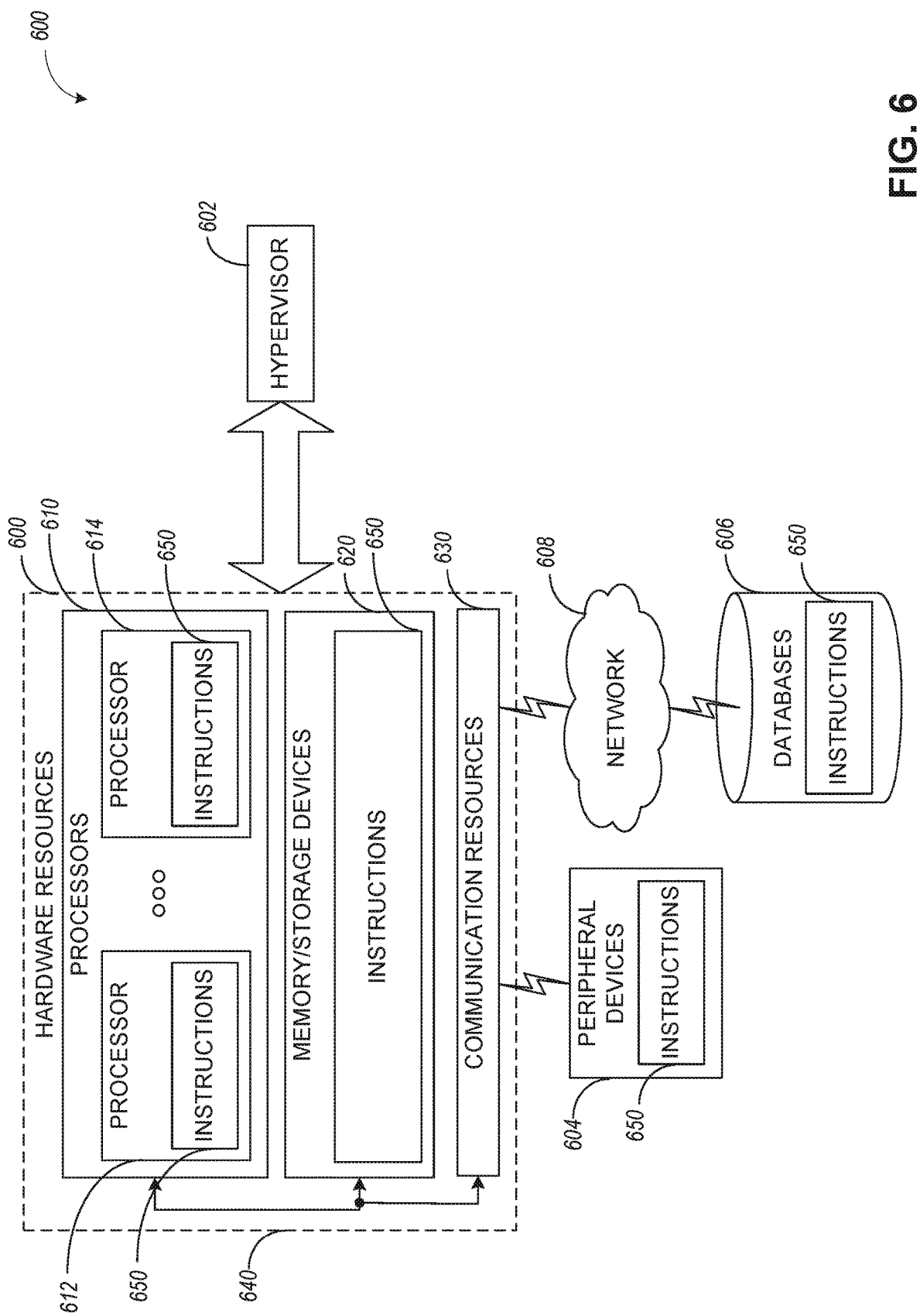
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
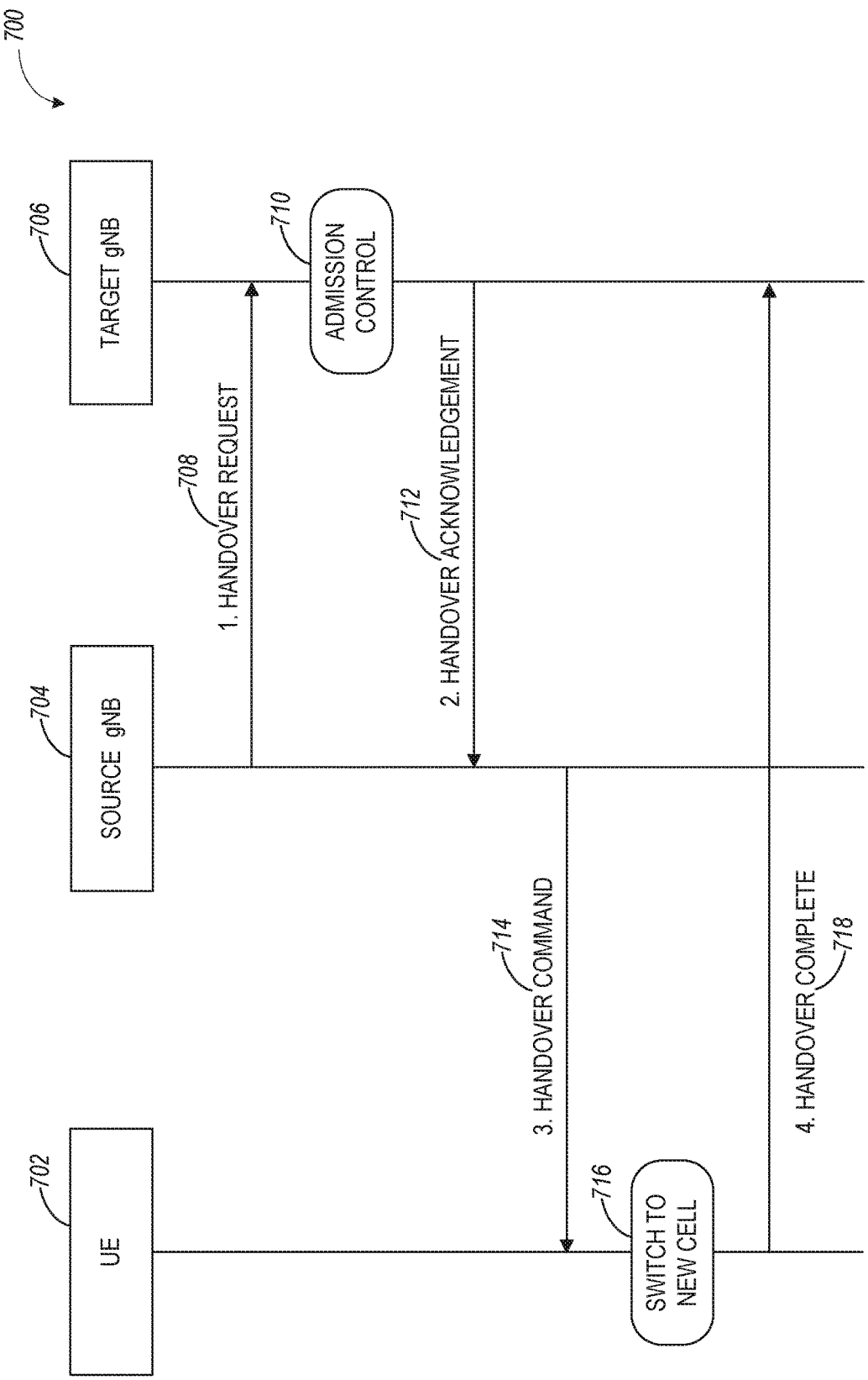
FIG. 7 illustrates an example inter-gNB handover procedure in accordance with some aspects.

FIG. 7 illustrates an example Node-B handover procedure in accordance with some aspects. Referring to FIG. 7, the example communication sequence 700 can take place between a UE 702, a source gNB 704, and a target gNB 706. Prior to initiating a handover (HO), the source gNB 704 can communicate measurement procedure configurations (not illustrated in FIG. 7) to the UE 702, to configure the UE measurement procedures. For example, the configurations can include radio resource control (RRC) configuration parameters used during beam selection, beam consolidation, filtering and/or the like. In response, the UE 702 can communicate a measurement report (not illustrated in FIG. 7) to the source gNB 704. In some aspects, the measurement report can include one or more measurements for beamforming such as a cell beamforming measurement and/or one or more individual beam measurements based on an SS burst set received at the UE 702. The measurement report can further include radio resource management information.

Consequently, the source gNB 704 can make a decision to handover the UE to the target gNB 706. At 708, the source gNB 704 can communicate a HO request to the target gNB 706, to initiate the HO. At 710, the target gNB 706 can perform admission control and can provide radio resource control (RRC) configuration as part of the handover request acknowledgment at 712. In some aspects, the handover request acknowledgment at 712 can include a transparent container to be sent to the UE as an RRC message in order to perform the handover.

At 714, the source gNB 704 can provide the RRC configuration to the UE 702 in a handover command 714. In some aspects, the handover command message can include cell ID information as well as additional information that can be used by the UE to access the target gNB 1106 without reading system information. In some aspects, the handover command message can further include information that can be used for contention-based and contention-free random access. At 716, the UE 702 can move the RRC connection and switch to the new cell associated with the target gNB 706. At 718, a handover complete message can be communicated to the target gNB 706.

Figure 8:
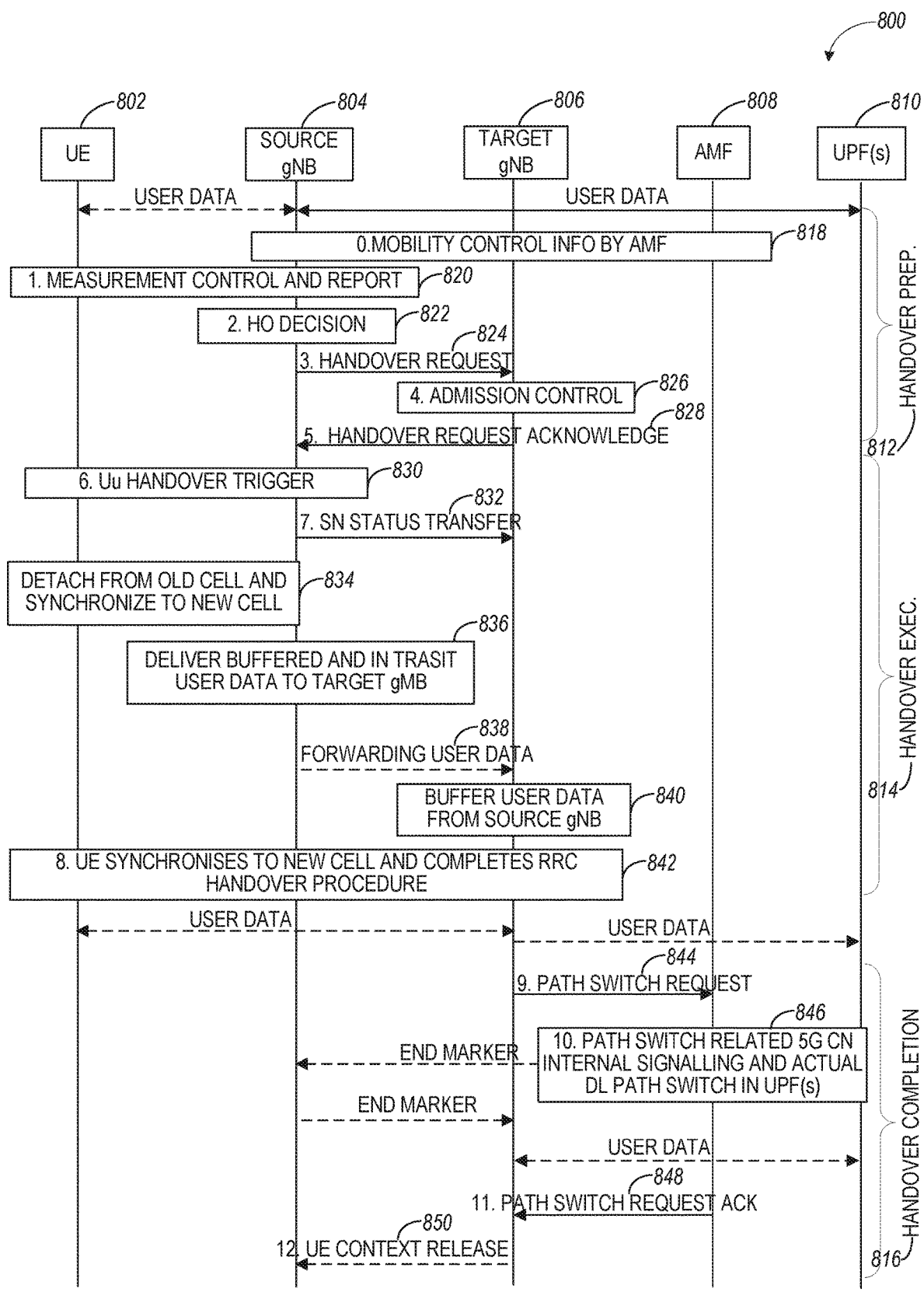
FIG. 8 illustrates an example intra-AMF/UPF handover procedure in accordance with some aspects.

FIG. 8 illustrates an example intra-AMF/UPF handover procedure in accordance with some aspects. Referring to FIG. 8, the handover communication sequence 800, can take place between a UE 802, a source gNB 804, a target gNB 806, an AMF 808, and at least one UPF 810. In some aspects, the handover communication sequence 800 represents intra-NR RAN handover, where the handover preparation phase 812 and the handover execution phase 814 is performed without involvement of the 5GC (i.e., preparation messages are directly exchanged between the gNBs). Additionally, the release of the resources at the source gNB during the handover completion face 816 is triggered by the target gNB 806.

At 818, roaming and access restrictions can be provided by the AMF 808 and can be included in a UE context within the source gNB 804. The UE context within the source gNB can include information regarding roaming and access restrictions provided at 818, either at connection establishment or at the last tracking area (TA) update.

At 820, the source gNB 804 can configure the UE measurement procedures according to the roaming and access restriction information and, e.g., the available multiple frequency band information. Measurements provided by the source gNB 804 may assist the function controlling the UE's connection mobility. In response, a measurement report can be triggered and sent by the UE 802 to the source gNB 804.

At 822, the source gNB 704 can make a decision based on the measurement report and radio resource management (RRM) information from the UE 802 to hand off the UE. At 824, the source gNB 804 can issue a handover (HO) request message to the target gNB 806, passing information to prepare the HO at the target side (e.g., UE X2 signaling context reference at source eNB, UE S1 EPC signaling context reference, target cell ID, $K_{gNB*}$, RRC context including the cell radio network temporary identifier (C-RNTI) of the UE 802 in the source gNB 804, RRM-configuration including UE inactive time, basic AS-configuration including antenna Info and DL Carrier Frequency (subject to RAN1 feedback), the UE capabilities for different RATs, and can include the UE reported measurement information including beam-related information if available. In instances in which CA is configured, the RRM configuration can include the list of best cells on each frequency for which measurement information is available.

At 826, admission control may be performed by the target gNB 806 dependent on the received QoS information to increase the likelihood of a successful HO, if the resources can be granted by target gNB 806. The target gNB 806 can configure the granted resources according to the received QoS information and can reserve a C-RNTI. The AS-configuration to be used in the target cell can either be specified independently (e.g., as an "establishment") or as a delta compared to the AS-configuration used in the source cell (e.g., as a "reconfiguration").

At 828, the target gNB 806 can prepare a HO with L1/L2, and can send the handover request acknowledge message to the source gNB 804. The handover request acknowledge message can include a transparent container to be sent to the UE 802 as an RRC message to perform the handover. The container can include a new C-RNTI, target gNB security algorithm identifiers for the selected security algorithms, may include a dedicated RACH preamble, and other parameters such as access parameters, SIBs, etc. If RACH-less HO is configured, the container may include timing adjustment indication and an uplink grant. If an uplink grant is not included, the UE 802 can be configured to monitor PDCCH of the target gNB 806 to receive an uplink grant. The handover request acknowledge message may also include RNL/TNL information for the forwarding tunnels. In some instances, in which Make-Before-Break HO is not configured, as soon as the source gNB 804 receives the handover request acknowledge, or as soon as the transmission of the handover command is initiated in the downlink, data forwarding may be initiated.

At 830, the source gNB 804 can trigger the Uu handover and can send a handover command message to the UE 802. The handover command message carries the information used to access the target cell, which according to some aspects includes at least the target cell ID, the new C-RNTI, the target gNB security algorithm identifiers for the selected security algorithms, and can include a set of dedicated RACH resources, the association between RACH resources and SS blocks, the association between RACH resources and UE-specific CSI-RS configuration(s), common RACH resources, and target gNB SIBs, etc.

At 832, the source gNB 804 communicates an SN STATUS TRANSFER message to the target gNB 806 to convey the uplink PDCP SN receiver status and the downlink PDCP SN transmitter status of E-RABs for which PDCP status preservation applies (e.g., for RLC AM). The uplink PDCP SN receiver status can include at least the PDCP SN of the first missing uplink SDU and may include a bit map of the receive status of the out-of-sequence uplink SDUs that the UE retransmits in the target cell, if there are any such SDUs. The downlink PDCP SN transmitter status can indicate the next PDCP SN that the target eNB assigns to new SDUs, not having a PDCP SN yet. In some aspects, the source eNB may omit sending this message if none of the E-RABs of the UE shall be treated with PDCP status preservation.

At 834, the UE 802 can detach from the old cell associated with the source gNB 804 and can synchronize to the new cell associated with the target gNB 806. At 836, the source gNB 804 can deliver buffered and in-transit packets to the target gNB 836. At 838, user data can be forwarded from the source gNB 804 to the target gNB 806. At 840, the target gNB 806 can buffer the user data received from the source gNB 804.

At 842, the UE 802 can, according to some aspects, perform synchronization to the target gNB 806 and accesses the target cell, via RACH (if RACH-less HO is not configured), following a contention-free procedure if a dedicated RACH preamble was indicated in the mobility ControlInformation message (or another type of message) at 818, or following a contention-based procedure if no dedicated preamble was indicated, or via PUSCH if RACH-less HO is configured.

At 844, the target gNB 806 sends a PATH SWITCH REQUEST message to the AMF 808 to trigger the 5GC to switch the DL data path towards the target gNB 806 and to establish an NG-C interface instance towards the target gNB 806. At 846, the 5GC switches the DL data path towards the target gNB 806. At 848, the AMF 808 confirms the PATH SWITCH REQUEST message with the PATH SWITCH REQUEST ACKNOWLEDGE message.

At 850, by sending the UE CONTEXT RELEASE message, the target gNB 806 informs the source gNB 804 about the success of handover and triggers the release of resources by the source gNB 804. The target gNB 806 can be configured to send this message after the PATH SWITCH REQUEST ACKNOWLEDGE message is received from the AMF 808. Upon reception of the UE CONTEXT RELEASE message, the source gNB 804 can release radio and C-plane related resources associated to the UE context so that ongoing data forwarding may continue.

As mobile devices, such as UEs, have become ubiquitous, situations in which a significant number of UEs simultaneously cross from a first cell to a second cell have also developed. For example, cars on a busy highway (with the end-user's mobiles and/or the car's own mobiles), people in a train, drones in a swarm formation, robots in a factory, and even people just walking in large groups along some path are examples of situations in which a large number of UEs can simultaneously, or near-simultaneously, cross from one cell into another cell.

In some aspects, data connections and/or voice connections for each mobile device or UE can robustly be transferred or handed-over from the one cell to the other cell (e.g., during one or more handover-related operations described in connection with FIG. 7 and FIG. 8). In instances when a large number of UEs simultaneously (or near-simultaneously) can benefit from handover assistance (e.g., to perform one or more of the handover-related operations described in connection with FIG. 7 and FIG. 8), a network infrastructure can experience deterioration, such as data speed reduction, dropped connections, and the like. In accordance with some aspects, techniques described herein can be used to improve handover performance (e.g., in instances in which handover-related operations take place in connection with multiple UEs, such as swarms of UEs).

Figure 9:
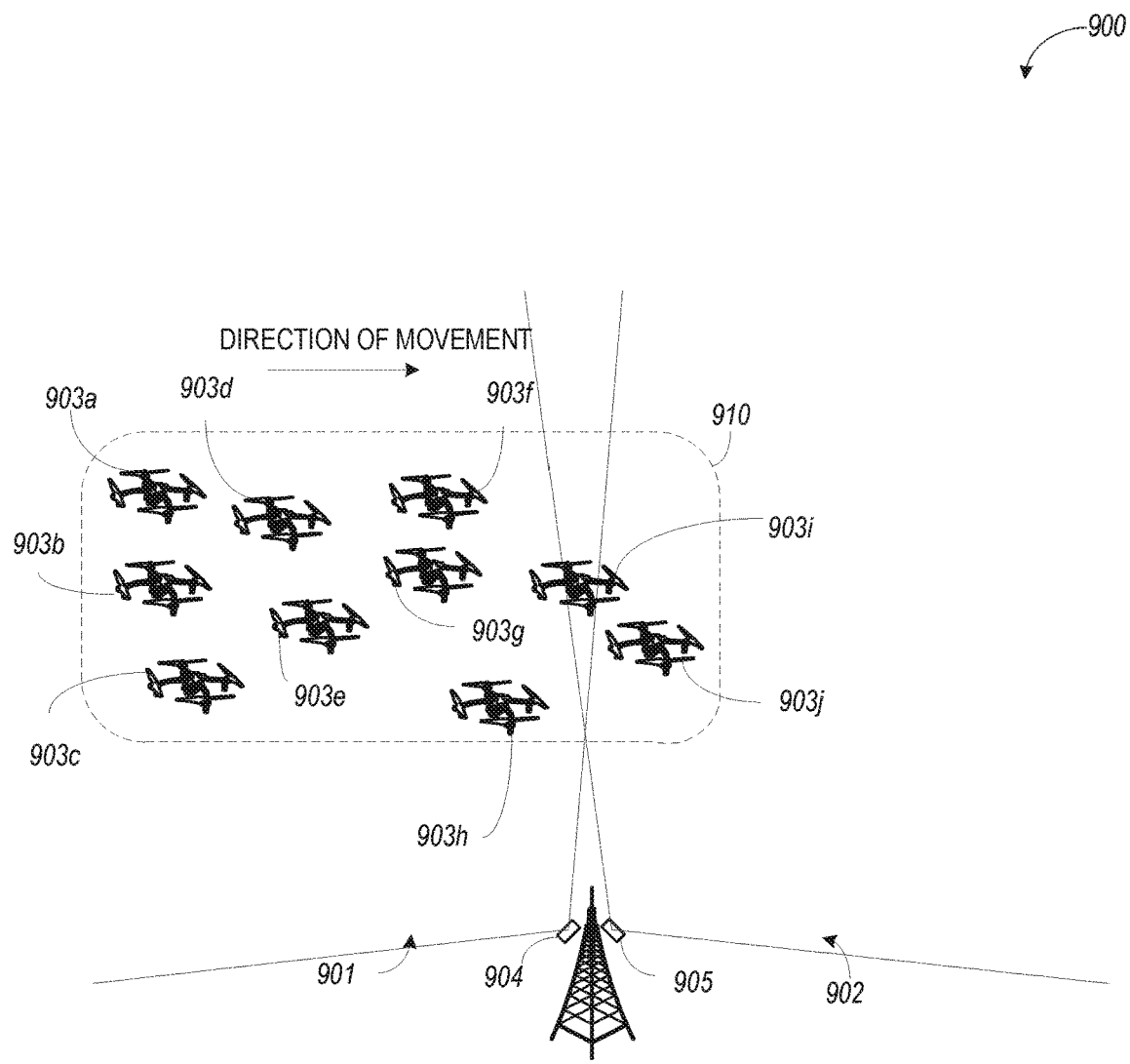
FIG. 9 illustrates generally an example of a swarm of UEs moving with a similar direction and speed in the presence of a first cell and a second cell, in accordance with some aspects.

FIG. 9 illustrates generally an example of a swarm 910 of UEs 903a-903j (collectively, 903x) moving with a similar direction and speed in the presence of a first cell 901 and a second cell 902. The first and second cells (901 and 902) can each include a cell controller (not shown). The cell controller for the first cell 901 may or may not be co-located with the cell controller of the second cell 902. In certain aspects, the swarm 910 can be connected and each UE 903x can be cognizant of the other UEs in the swarm 910 for example, via device-to-device (D2D) communications and discovery.

In certain aspects, the swarm 910 can include edge devices 903a-903f and 903h-903j, and inner device 903g The edge devices 903a-903f and 903h-903j can define a physical periphery of the swarm 910. The edge devices 903a-903f and 903h-903j can further include one or more leading-edge devices 903j. Leading edge devices 903j generally first measure signal changes associated with a cell boundary and whether the boundary is associated with the first cell 901 serving the swarm 910 or the second cell 902, into which the swarm 910 is moving In certain aspects, example devices, or UEs, positioned on a leading edge of the swarm 910 can communication cell measurements associated with a cell boundary to the rest of the swarm 910 (e.g., an inner device 903g). In certain aspects, cell measurements can be communicated to the rest of the swarm 910 via the cell infrastructure, such as a cell controller or first base station 904. In some aspects, cell measurements of a leading-edge device 903j can be communicated to the swarm 910 via a D2D communication protocol or another type of wireless protocol.

As used herein, the term "physical extent" associated with a swarm refers to one or more edges of a swarm beyond which, communication devices are not considered part of the swarm. In some aspects, the physical extent can be associated with swarm edges that extend within a specific distance boundary from each other. In some aspects, the physical extent can be associated with a boundary beyond which devices lose connection with other devices within the swarm, or beyond which signal characteristics deteriorate beyond a threshold value (e.g., signal strength falls below a threshold value).

In some aspects, the leading-edge device(s) 903j can, when providing measurement information, also provide swarm information. The swarm information can be provided to, for example, the first base station 904 or cell controller or to the other devices within the swarm 910. In some aspects, communication between the first base station 904 and other devices of the swarm 910 can also include swarm information. In some aspects, the swarm information can include an indication of whether the receiving device belongs to a swarm 910. The swarm information can also include information that identifies the swarm 910, to which the receiving device belongs. As the leading-edge device 903j measures a new cell, the first base station 904, as well as the other swarm members, can begin to prepare for handover such that any pre-processing by the base station 904 can be initiated before a time critical period during handover of one or more of the swarm devices 903x. As used herein, the term "hop" (or "hops") indicates propagation of information from one (originating) device in the swarm to another (receiving) device (or devices) in the swarm and, optionally, to one or more other intermediate device (or devices) in the swarm (i.e., devices located between the originating and receiving device).

Referring again to FIG. 9, the swarm 910 of mobile devices 903x can move through the network. The mobile devices 903x of the swarm 910 can cross boundaries between first cell 901 and the second cell 902. The leading edge device 903j moving in the indicated direction of movement, can detect the second cell 902 first. When the leading edge device 903j detects the second cell 902 and/or when it recognizes that a handover to the second cell 902 is needed, it can send measurement information about the second cell 902 (e.g. cell ID, frequency, timing etc.) to the other devices 903x of the swarm 910. This communication exchange can take place via a communication link inside the swarm 910 (e.g., a D2D link). As the measurement information can be kept local to the swarm 910, it will not tend to generate significant interference for devices outside the swarm 910. Depending on the range of the D2D communication links, the measurement information can propagate through a large swarm via several hops, if desired. When, for example, the propagation of the measurement information is faster than the movement of the swarm, the measurement information can assist the other devices of the swarm to prepare for the hand-over.

In certain aspects, a second edge device may encounter the second cell so close in time to when the first edge device discovers the second cell that the measurement information generated by the first edge device, the first measurement information, is not received by the second edge device before the second edge device also discovers the second cell. If the first measurement information from the first edge device is received at the second edge device after the second edge device detects the second cell but before the second device broadcasts second measurement information of the second cell, the second device can skip sharing the second measurement information. In some aspects, instead of sharing the second measurement information, the second edge device can share the first measurement information. In situations in which the second edge device sends the second measurement information, the second edge device can skip sharing the first measurement information to avoid sending measurement information of the second cell twice within a relatively short timeframe. In some aspects, the skip sharing decision can be made at the second edge device, or alternatively, at multiple devices (e.g., a base station, the first edge device, and/or the second edge device).

In some aspects, the first edge device 903j can request a handover from the first cell 901 to the second cell 902. Typically, although not exclusively, a request for handover can be executed by a device by providing measurement information that indicates that a second cell is providing a stronger signal to the device than a first cell currently, or potentially capable of, handling a connection of the device. In addition to sending the handover measurement information or handover request to the cell controller or first base station 904 of the first cell 901, the first edge device 903j can send swarm information to the first base station 904. The swarm information can indicate the first edge device 903j is part of a swarm 910, the number of devices in the swarm 910, approximate physical size of the swarm 910, speed of the swarm 910 or combinations thereof.

In some aspects, the first base station 904 can inform the second base station 905, or the cell controller of the second cell 902, that the first edge device 903j is coming and that the first edge device 903j is coming to the second cell 902 as part of a swarm 910. Informing the second base station 905 about the incoming swarm 910 can allow the second base station 905 to prepare and allocate resources, for example, by some load balancing or handing over devices at other cell boundaries to adjacent cells. In some aspects, the second cell 902 can adjust its beams to improve coverage around the leading edge device 903j so as to have better efficiency or reception for the incoming swarm devices 903x.

Figure 10A:
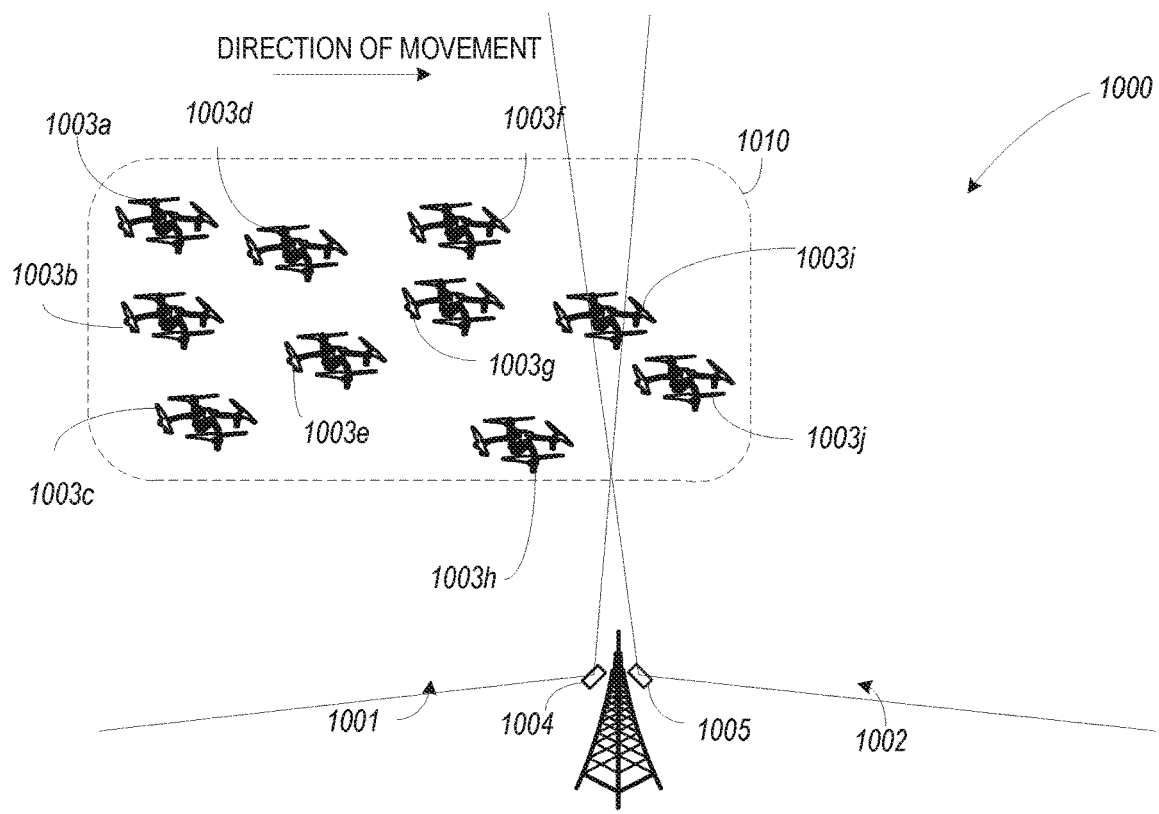
FIG. 10A and FIG. 10B illustrate generally an example system for improved cell handover of a swarm of mobile devices, in accordance with some aspects.
Figure 10B:
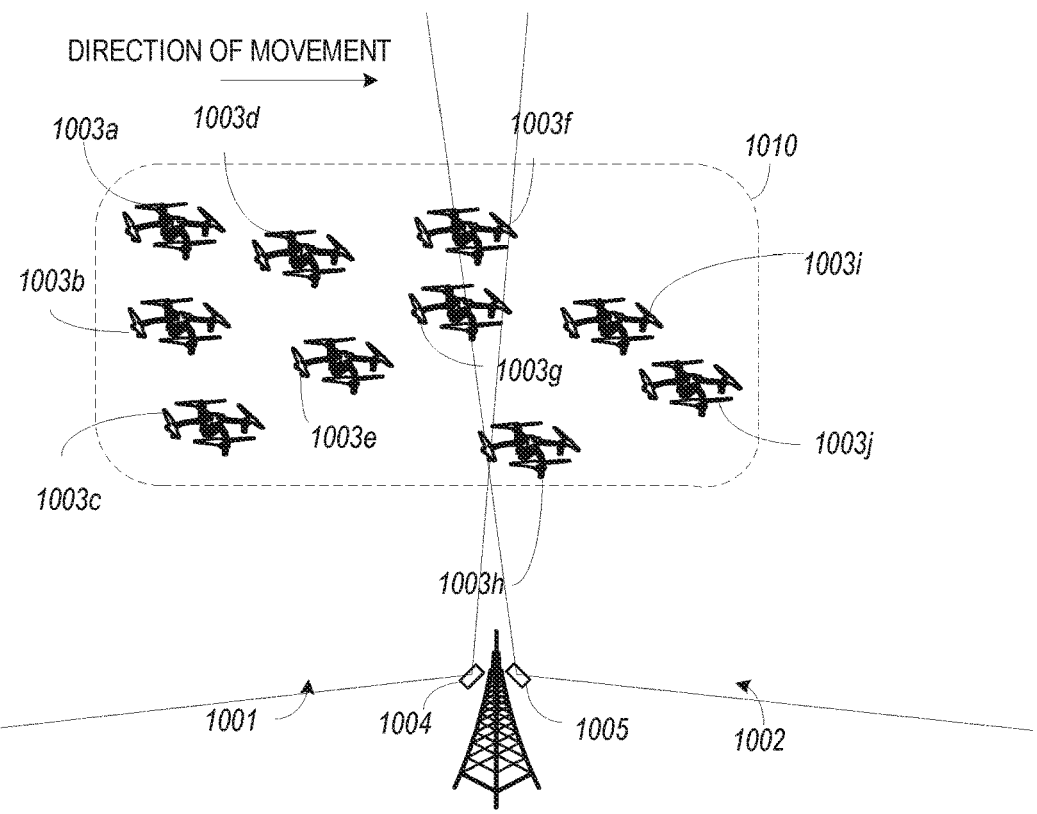

FIG. 10A and FIG. 10B illustrate generally an example system 1000 for improved cell handover of a swarm 1010 of mobile devices 1003a-1003j (collectively 1003x). The system can include a first cell 1001, a first cell controller or a first base station 1004, a second cell 1002, a second cell controller or a second base station 1005, and a swarm 1010 of mobile devices 1003x or UEs. The plurality of mobile devices 1003x can include edge devices and, if the swarm 1003 is large enough, inner devices (e.g., 1003g). According to some aspects, the devices 1003x of the swarm 1010 can know their position within the swarm 1010, for example, by using global positioning data, D2D wireless signal analysis, or combinations thereof. In some aspects, an inner device 1003g can save power by not performing cell signal measurements and can rely on measurement information provided by an edge device of the swarm 1010 (e.g., device 1003j). As the swarm 1010 passes through a cell boundary, as in FIG. 10B, the inner devices adjacent the cell boundary can enable measurements to complete their respective handover.

Figure 11:
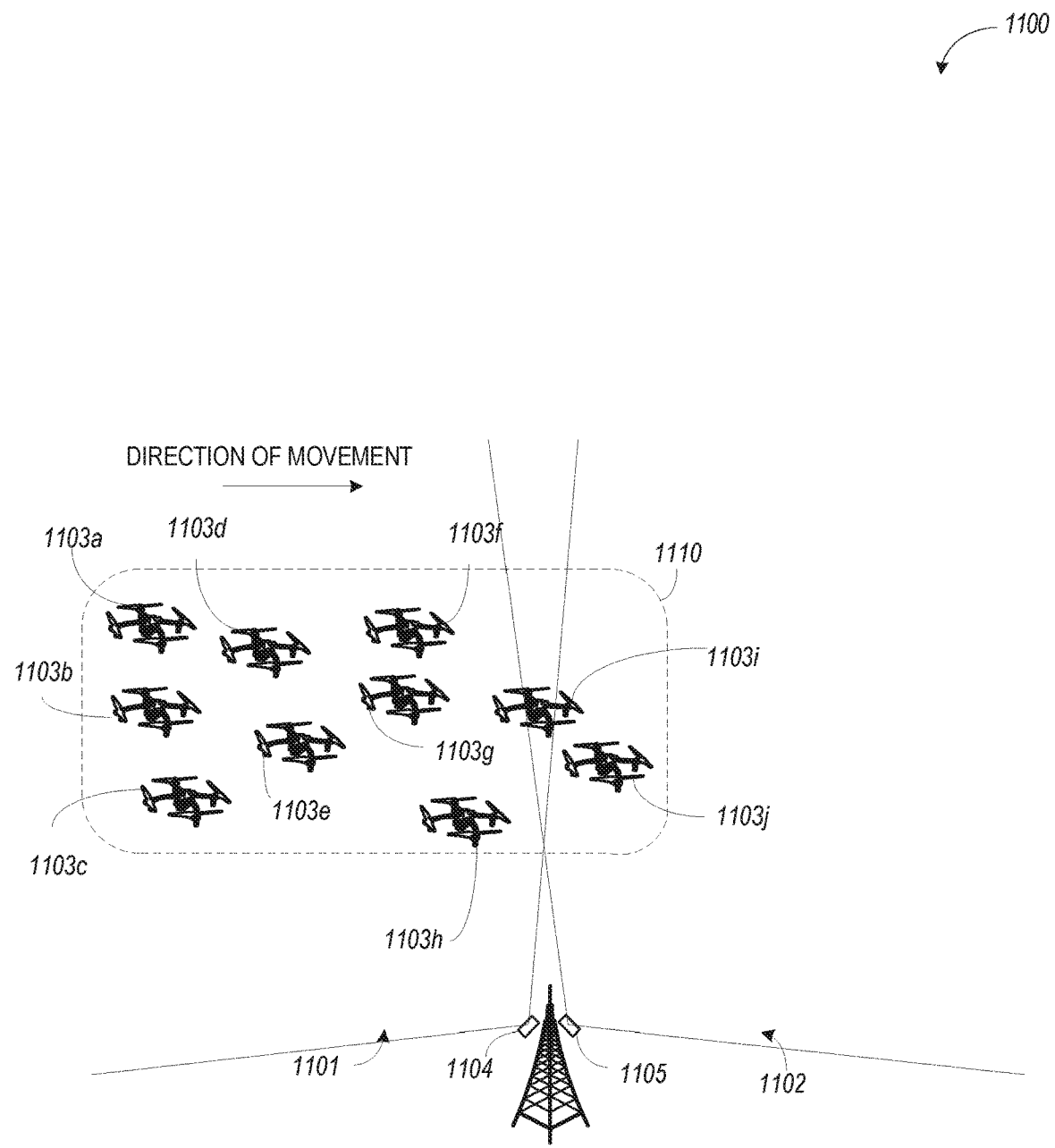
FIG. 11 illustrates generally an example system for improved cell handover of a swarm of mobile devices, in accordance with some aspects.

FIG. 11 illustrates generally an example system 1100 for improved cell handover of a swarm 1110 of mobile devices 1103a-1103j (collectively 1103x). The system 1100 can include a first cell 1101, a first cell controller or a first base station 1104, a second cell 1102, a second cell controller or a second base station 1105, and a swarm 1110 of mobile devices 1103x or UEs. A leading-edge device (e.g., 1103j) can provide a handover request to the base station 1104 of the first cell 1101 when a signal strength of the second cell 1102 is stronger than the signal strength of the first cell 1101. The handover request can include information identifying the swarm 1110, for example, a swarm identifier. In some aspects, the handover request can be or can include measurement information of the leading-edge device 1103j indicating the signal of the second cell 1102 becoming as strong as or stronger than the signal of the first cell 1101.

In some aspects, in response to the swarm identifier received with the handover request, the base station 1104 of the first cell 1101 can command or request that the other devices of the swarm 1110 to specifically measure the second cell 1102 in preparation for an anticipated handover to the second cell 1102. In some aspects, the command or request from the first base station 1104 can be transmitted individually to each device in the swarm 1110. In some examples, the first base station 1104 can provide a multi-cast/broadcast including the swarm identifier. The swarm identifier can be used by other devices of the swarm 1110 connected to the first cell 1101 to determine if the command or request should be processed or not. In certain circumstances, e.g., in the instances of a large swarm, using a multi-cast/broadcast mechanism can reduce wireless traffic compared to providing individual transmission to each swarm device.

Figure 12:
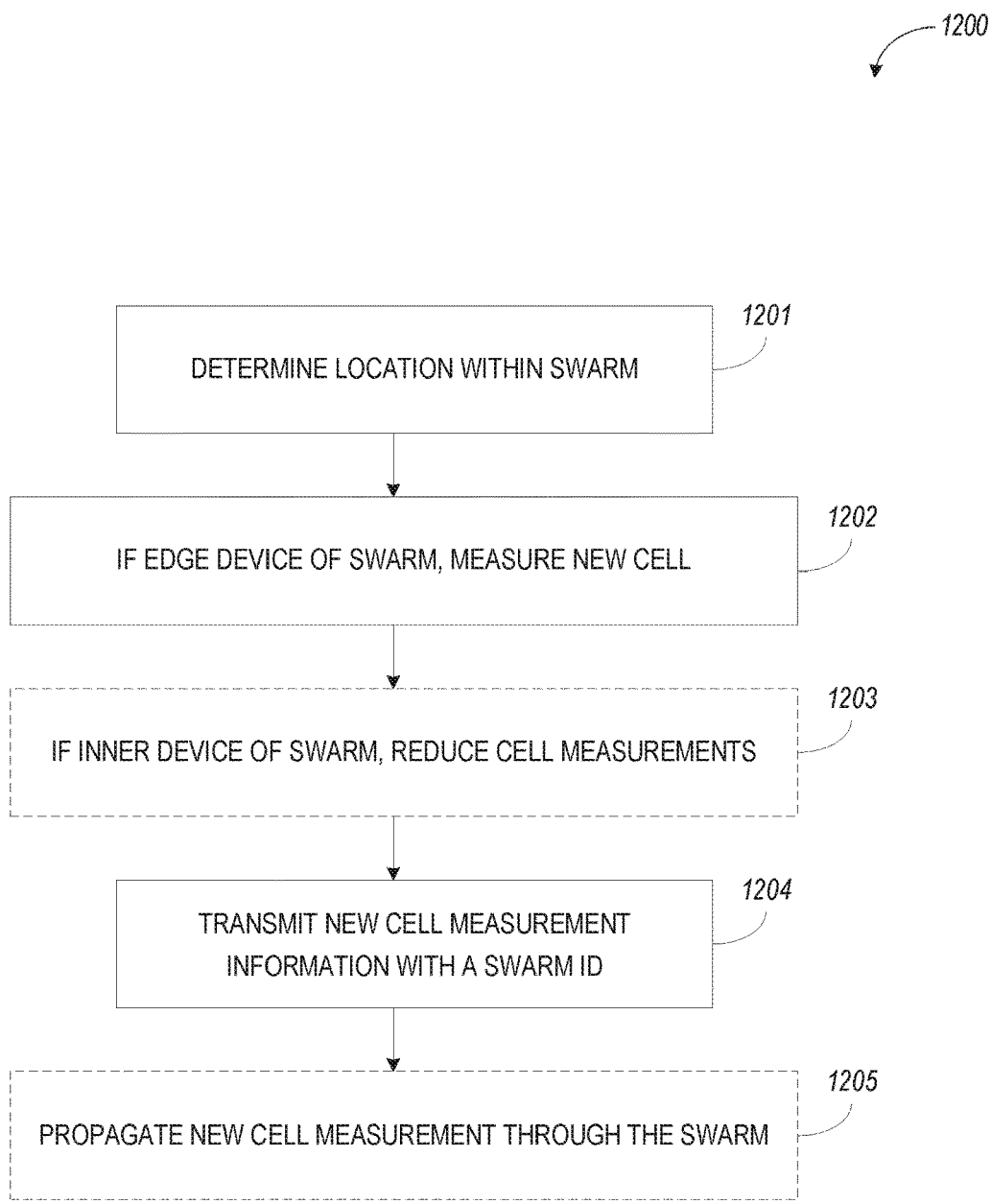
FIG. 12 illustrates generally a flowchart of an example method of performing a cell handover for a UE of a swarm, in accordance with some aspects.

FIG. 12 illustrates generally a flowchart of an example method 1200 of performing a cell handover for a UE of a swarm. At 1201, a particular UE of the swarm can determine a position of the particular UE with respect to other UEs of the swarm. In some aspects, the UE can use GPS data of itself and one or more other nearby UEs. In some aspects, the particular UE can use ranging algorithms associated with one or more radios of the particular UE. Once relative position of the particular UE is determined with respect to the other UE's of the swarm, the particular UE can determine if the particular UE is an edge device of the swarm or an internal device of the swarm. For example, based on the GPS data of itself and surrounding UEs, the particular UE can determine where the particular UE is located in relation to other UEs and whether the particular UE is at an edge of a swarm (i.e., no other UEs located in a Northern direction, for a top edge UE, and so forth). Location information can also be shared among the UEs to assist in location determination of multiple UEs, and/or UE location information can be received (e.g., periodically or upon request) from one or more base stations communicatively coupled to the particular UE.

In some aspects, if the particular UE identifies itself as an edge device of the swarm, it can use trajectory information, cell coverage information, signal strength, or combinations thereof to determine if it is currently a leading edge device of the swarm. Edge devices form the physical periphery of the swarm and can have a potential for first detecting a cell boundary. A leading edge device of the swarm is one that has a strong potential to encounter a cell boundary before other devices of the swarm.

At 1202, if the particular UE identifies as an edge device of the swarm, or a leading edge device of the swarm, the UE can continue to measure for, or can increase a frequency of measurement for, a new cell. At 1203, if the particular UE identifies as an inner device of the swarm, or as an edge device but not a current leading edge device, the device can reduce or cease making signal measurement to conserve energy. At 1204, an edge device, or a leading edge device, can transmit information about newly detected cells using a swarm identification (ID). In some examples, the new cell information can be transmitted to the network via the serving base station. In some aspects, the leading edge device can use one or more radios to transmit the new cell information. Such radios can include, but are not limited to, an 802.11 radio, an 802.15 radio, a WiFi radio, a 3PPG D2D compatible radio, a V2X compatible radio, or combinations thereof. At 1205, the new cell measurement can be further propagated throughout the swarm.

In some aspects, when a swarm of mobile devices reaches a cell boundary and all the mobile devices perform a handover to the next cell, problems can occur. For example, the sudden addition of many new mobile devices can put a sudden high burden on the target cell. If the swarm moves fast and passes close by the cell tower associated with both cells, a current cell and a target cell, a crossing cell (Xcell) scenario may take place for many devices.

According to some aspects, Xcell can refer to a scenario when a device is trying to do a handover very close to the cell tower of the current cell and the target cell (e.g., within a predetermined distance from the cell tower). In some aspects, Xcell can refer to the device itself that is trying to do a handover very close to the cell tower of the current cell and the target cell. The coverage areas of the two cells may hardly overlap. Thus, the handover can be difficult and may need to happen very fast if the device is moving In some aspects, all the mobile devices do the handover individually, not using their a priori information that they move together in a swarm and will all experience roughly the same handover scenario. In some aspects, the swarm can include mobile devices or UEs in the form of modems, phones, vehicles, robots, drones, etc.

Figure 13:
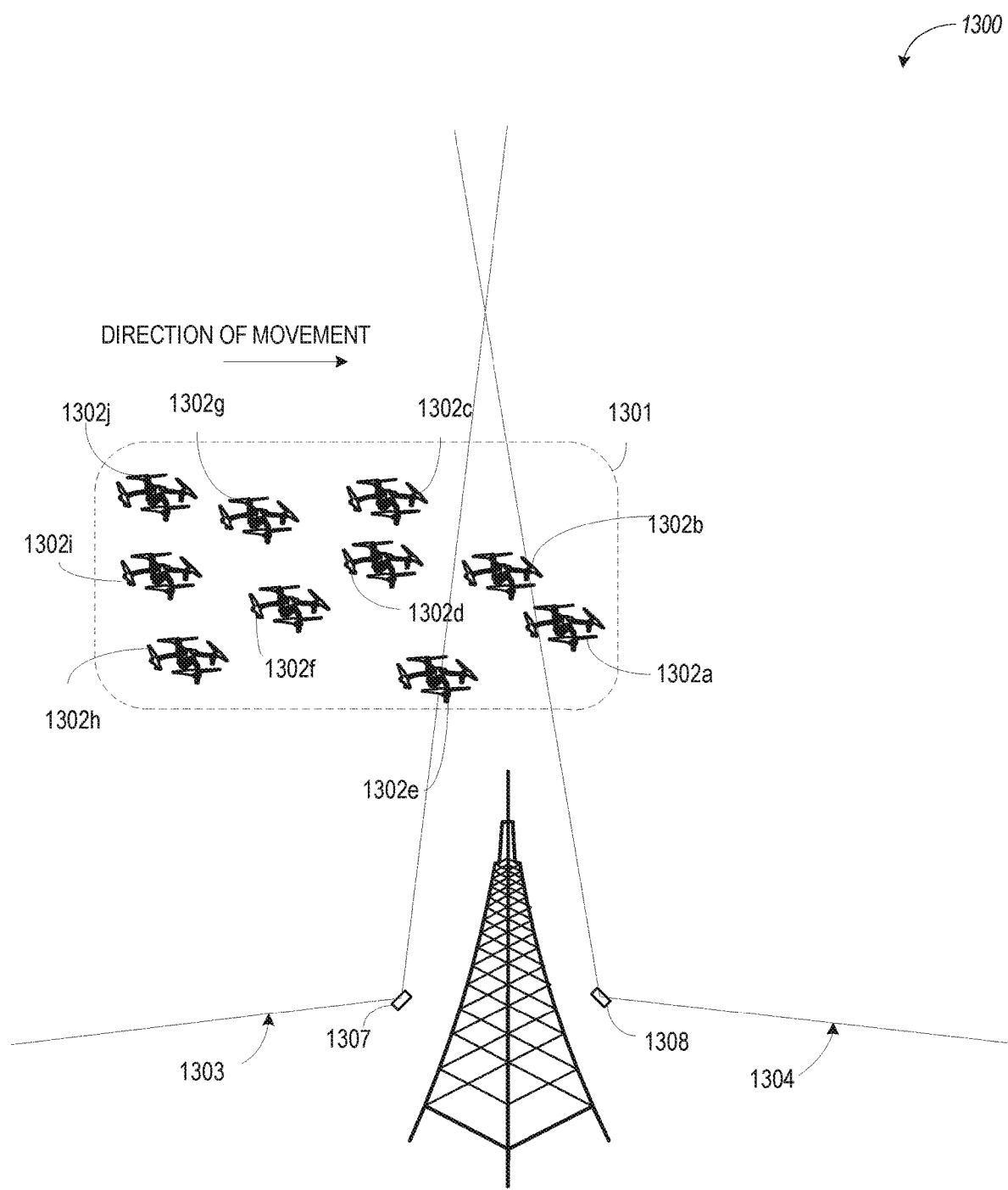
FIG. 13 illustrates generally a system for handing over a swarm of mobile devices, in accordance with some aspects.

FIG. 13 illustrates generally a system 1300 for handing over a swarm of mobile devices. The system 1300 can include a swarm 1301 of mobile devices such as UEs 1302a-1302j (collectively 1302x), a first cell system, and a second cell system. The first and second cell systems can each include, respectively, a cell 1303, 1304 and a base station 1307, 1308 or cell controller. Each cell 1303, 1304 can include a boundary within which the base station 1307, 1308 can provide and maintain wireless connections with a UE. Each UE of the swarm 1301 can be discovered by at least one other member of the swarm 1301, and can maintain membership in the swarm 1301 by proximity to one or more other members 1302x of the swarm 1301. Although swarms can be stationary, the illustrated swarm 1301 includes UEs 1302x that share a similar trajectory in both speed and direction. In the illustrated system of FIG. 13, the swarm 1301 of mobile devices is moving at a relative high speed and very near the infrastructure 1306 including antennas for both the first cell 1303 and the second cell 1304.

Figure 14A:
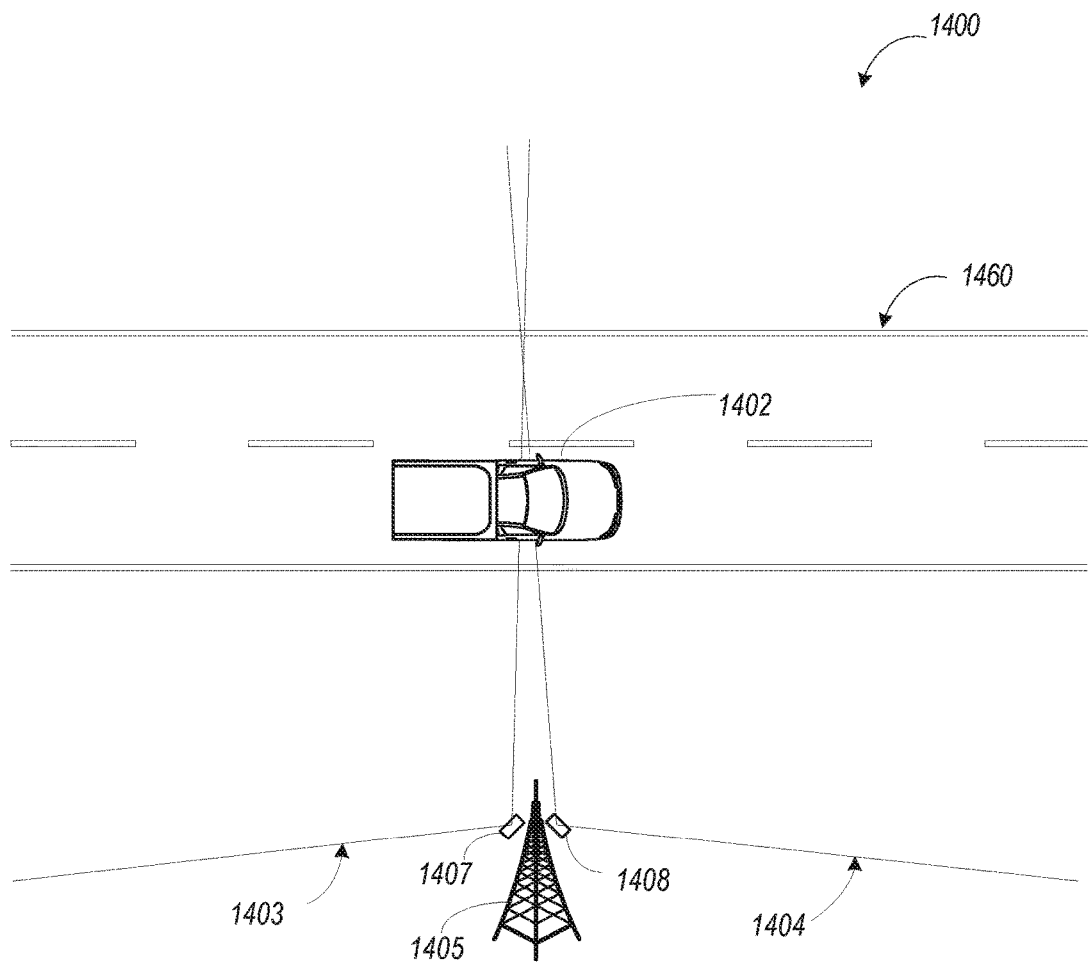
FIGS. 14A to 14C illustrate generally a system and the timing associated with a crossing cell (Xcell) handover of a device that is moving across cell boundaries, in accordance with some aspects.
Figure 14B:
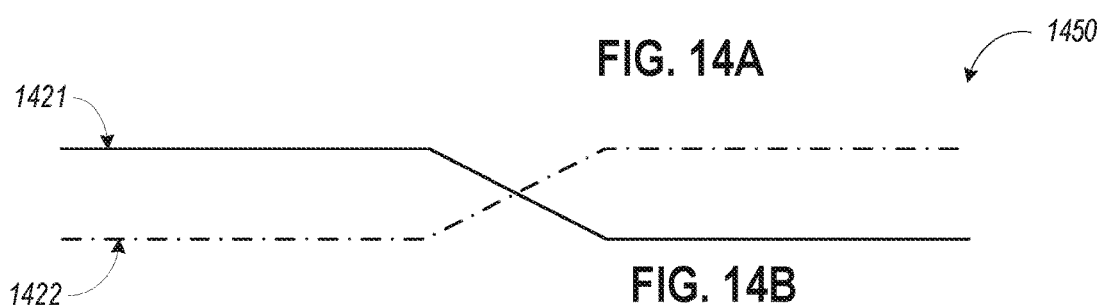
Figure 14C:
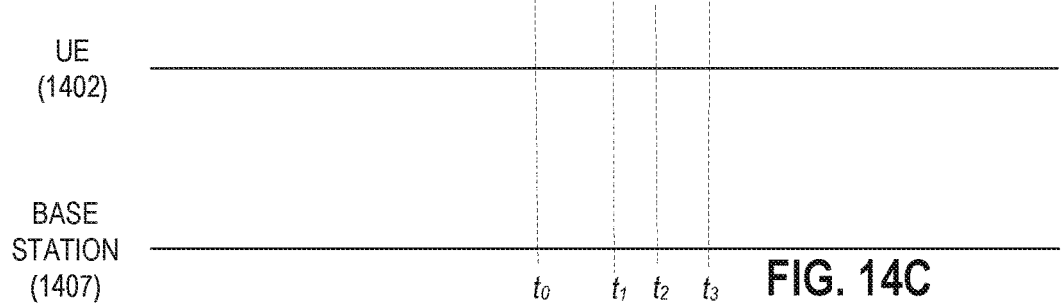

An Xcell handover presents unique challenges. One challenge is the timing FIGS. 14A to 14C illustrate generally a system 1400 and the timing 1450 associated with an Xcell handover of a device that is moving across cell boundaries near the infrastructure holding the antennas for the serving cell, or first cell 1403, and the target cell, or second cell 1404. FIG. 14A illustrates generally a physical relationship of an example scenario. In the illustrated scenario, the system 1400 can include a single mobile device or UE 1402, a first cell system 1403, 1407, and a second cell system 1404, 1408. In certain examples, the single mobile device 1402 can be a member of a swarm. The first and second cell systems can include a cell 1403, 1404 and a base station 1407, 1408 or cell controller. Each cell 1403, 1404 can include a boundary within which the base station 1407, 1408 can provide and maintain wireless connections with one or more mobile devices including the UE 1402. In this particular scenario, the UE 1402, as well as the swarm it may belong to, can be moving at a high speed, for example, along a highway 1460, from left to right.

FIG. 14B illustrates generally the signal strength 1421, 1422 of each cell 1403, 1404 of the system 1400 along a line of travel of the mobile device 1402. Even though reference 1402 in FIG. 14A is illustrated as a vehicle, the term "mobile device 1402" refers to a communication device implemented as part of the vehicle or a communication device that is not implemented as part of the vehicle but is located within the vehicle. The signal strength of each cell can diminish quite quickly near each cell's respective boundary, and especially near a cell tower or antenna of one or more of the cells 1403, 1404. For example, the signal strength 1421 of the first cell 1403 can diminish quite quickly as one moves from left to right. The signal strength 1422 of the second cell 1404 can diminish quite quickly as one moves from right to left. Because the mobile device 1402 is close to the network infrastructure 1405, the first and second cells 1403, 1404 can overlap. In some aspects, the first and second cells 1403, 1404 do not overlap significantly.

FIG. 14C illustrates generally, for the mobile device 1402 moving from left to right, an overlay of handover command communications. At time t0, the mobile device 1402 may begin to measure the second cell 1404. At time t1, the mobile device 1402 can measure and recognize that the signal 1422 of the second cell 1404 is better than the signal 1421 of the first cell 1403. At time t2, after processing and recognizing the relative strengths of the signals 1421, 1422 of the first and second cells 1403, 1404, the mobile device 1402 can provide the measurements to the first base station 1407 and request handover to the second cell 1404. At time t3, after the base station 1407 of the first cell 1403 processes the measurement and handover request information and any other handover processing the first base station 1407 can provide a handover command 1431 to the mobile device 1402.

In general, according to some aspects, the intervals between t1 and t2, and between t2 and t3 are relatively fixed for a given mobile device and a given cell controller. As illustrated in the scenario of FIGS. 14A-14C, if the mobile device 1402 is moving too fast and too close to the cellular infrastructure 1405, one or more of the communications exchanged between the mobile device 1402 and the first base station 1407 may not be completed before the mobile device 1402 leaves the coverage area of the first cell 1403. Without receiving the handover command (at time t3), the connections between the mobile device 1402 and the network can terminate.

Figure 15:
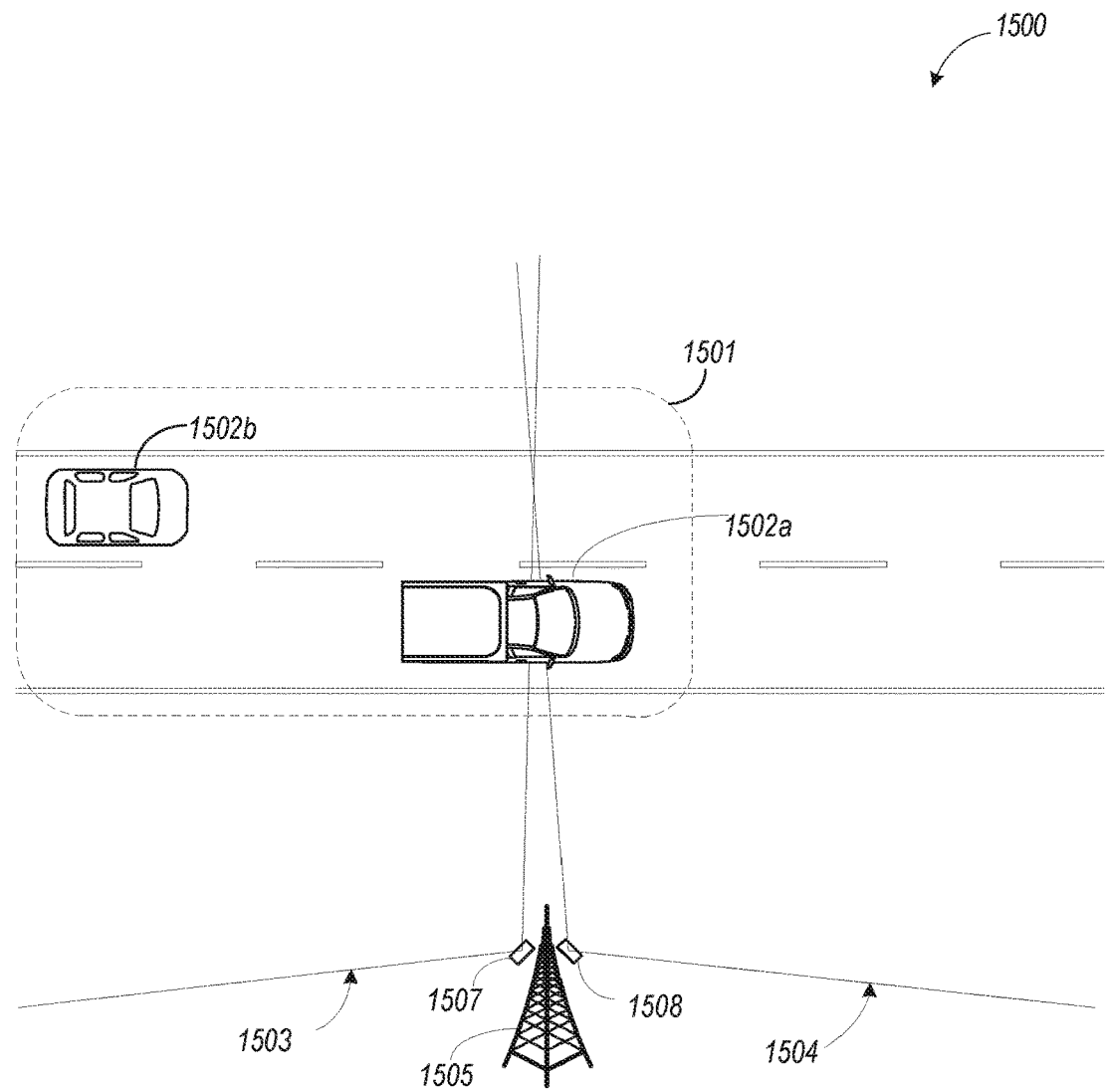
FIG. 15 illustrates generally an example system configured to deal with a fast moving swarm in an Xcell scenario, in accordance with some aspects.

FIG. 15 illustrates generally an example system 1500 configured to accommodate a fast moving swarm 1501 in an Xcell scenario. The system 1500 can include a swarm 1501 of mobile devices such as UEs 1502x (e.g., 1502a, 1502b), a first cell system, and a second cell system. The first and second cell system can include a cell 1503, 1504 and a base station 1507, 1508 or cell controller. Each cell 1503, 1504 can include a boundary within which the base station 1507, 1508 can provide and maintain wireless connections with a UE. Each UE of the swarm 1501 can be discovered by at least one other member of the swarm 1501 and can maintain membership in the swarm 1501 by proximity to one or more other members of the swarm 1501. The particular example of FIG. 15 shows two mobile devices 1502a, 1502b of the swarm 1501. In some aspects, the swarm may have additional mobile devices.

In general, as discussed above, for a device in a fast moving swarm (e.g., moving at a speed that is above a pre-determined threshold speed) that crosses a cell boundary near network infrastructure 1505 containing the cell transceiver, a connection of the device can be lost between the time the device recognizes a cell handover opportunity and the time the handover can be completed. In certain aspects, swarm-enabled devices 1502x can use a D2D network of the swarm 1501 to assist in completing handovers of one or more of the mobile devices in the swarm 1501. For example, as the swarm 1501 approaches the cell boundary for the first cell 1503, a first edge mobile device of the swarm (e.g., 1502a) can detect the second cell 1504. Soon after, the first edge device 1502a can communicate a handover request via a measurement report showing the strength of the second cell 1504 being above a first threshold, or climbing and the strength of the first cell 1503 below a threshold, or falling. However, before the first base station 1507 can process the crossover request and provide a handover command to the first edge device 1502a, situations can arise in which the first edge device 1502a moves out of range of the first cell 1503 either before receiving the handover request or before acknowledging a received handover request. In certain examples, one or more of the other mobile devices (e.g., 1502b) still within the first cell 1503 can recognize the situation either by monitoring the control communication between the base station 1507 of the first cell 1503 and the first edge device 1502a, by monitoring status information of the swarm 1501 via the D2D network, or combinations thereof. Upon recognizing the situation and receiving the handover command for the first edge device 1502a from the base station 1507, the one or more other mobile devices 1502b of the swarm 1501 can relay the handover command to the first edge device 1502a via the D2D network of the swarm 1501.

In certain aspects, a mobile device (e.g., 1502a) of the swarm 1501 that has initiated a handover request can become aware that a handover communication did not reach the base station 1507 of the first cell 1503. Such awareness can be manifested by the mobile device 1502a not receiving an acknowledgement (ACK) in response to a transmission to the base station 1507. In certain examples, the mobile device can use the D2D network of the swarm 1501 to have one or more of the members of the swarm 1501 within the coverage of the first cell 1503 relay subsequent communications between the base station 1507 and the mobile device 1502a until the handover is complete.

In certain examples, a mobile device that has experienced or can recognize a fast Xcell handover issue, such as a leading edge device 1502a, can use the D2D network of the swarm 1501 to distribute handover information such as a suggested location for other mobile devices of the swarm 1501 to request a handover. The suggested location in such aspects can be one that allows the handover to complete without relying on other devices of the swarm 1501 to relay communications between the base station 1507 of the first cell 1503.

Figure 16A:
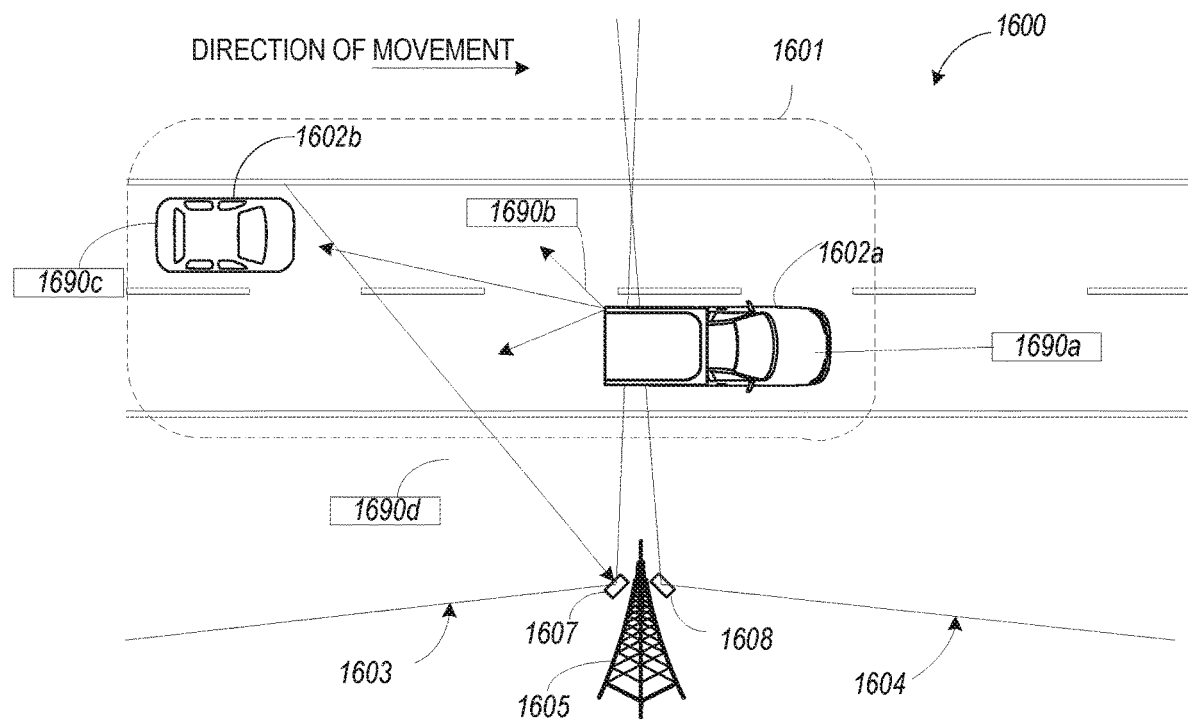
FIGS. 16A and 16B illustrate generally a scenario where an example method can prevent a loss of service during a fast Xcell event for a swarm, in accordance with some aspects.
Figure 16B:
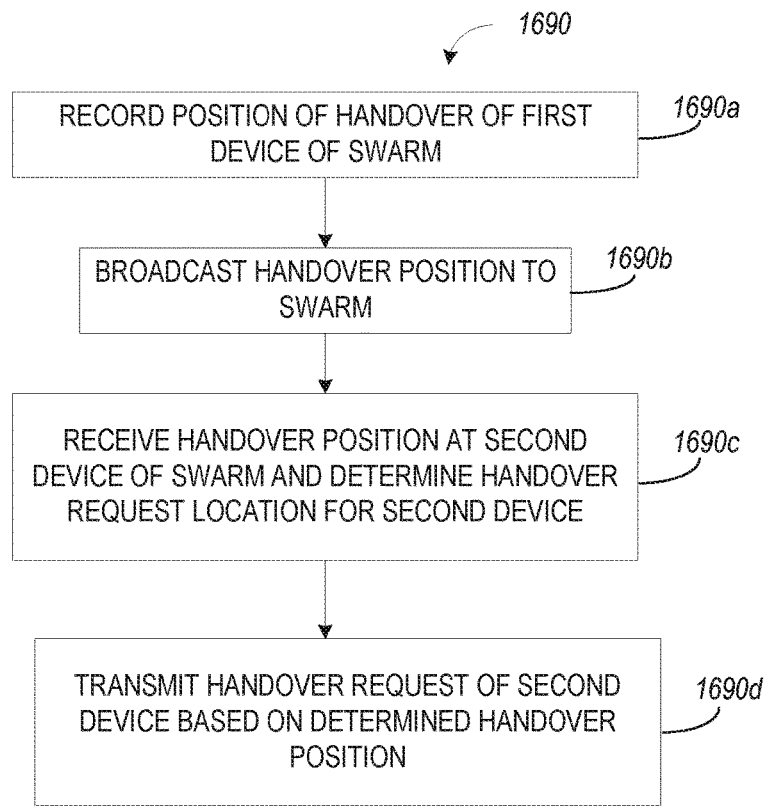

FIGS. 16A and 16B illustrate generally a scenario 1600 in which an example method 1690 can prevent a loss of service during a fast Xcell event for a swarm 1601. The scenario 1600 includes a swarm 1601 of devices 1602x (e.g., 1602a and 1602b), a first cell system and as second cell system. Each of the first and second cell systems can include a base station 1607, 1608 or cell controller, respectively, and a cell 1603, 1604, or cell coverage area. Two devices 1602a, 1602b of the swarm 1601 are shown in FIG. 16A, but it is understood that the swarm 1601 can have additional devices. The swarm 1601 is moving across the boundary of the first cell 1603 into the second cell 1604 near the network infrastructure 1605 supporting at least one of the first cell antenna or the second cell antenna.

In some aspects, scenario 1600 can occur along a highway with a swarm of vehicles and passengers, a crowded street with a swarm of vehicles, passengers or pedestrians, along a transportation thoroughfare with a swarm of passengers riding a train or bus, or combinations thereof (where the vehicles, passengers or pedestrians are in possession of one or more UEs). The swarm 1601 includes a leading edge device 1602a that completes a handover. During the handover, whether completed with or without messages being relayed by other members of the swarm 1601, the leading edge device 1602a records (at 1690a) coordinates of the handover. Such coordinates can include global positioning (GPS) coordinates of the handover request, reception of the handover command, reception or transmission of acknowledgements related to the handover or a combination thereof. The leading edge device 1601 can broadcast (at 1690b) one or more of the GPS coordinates as well as other information such as speed and heading information, or measurement information, via a D2D connection of the swarm 1601 to the other members of the swarm 1601. The leading edge device 1602a may perform these functionalities for each handover or for a subset of handovers that experience some difficulty such as, for example, relying on handover messages being relayed by other members of the swarm. Relying on handover messages being relayed by other members of the swarm would reduce power consumption and interference in the swarm 1601, according to some aspects.

Other members of the swarm, such as, for example, a second swarm device 1602b can receive (at 1690c) the handover GPS position information from the leading edge device and can develop (at 1690c) a plan for its own handover to avoid or mitigate potential Xcell handover issues as discussed above. In certain examples, the second swarm device 1602b can use the position information and measurement information of the leading edge device 1602a, roundtrip delay of previous communications, its own speed and heading information, or combinations thereof to determine (at 1690c) a location at which to send a handover request so as to avoid losing service of the first cell before the handover is triggered. The determination (at 1690c) of the location can include determining approximately where signal levels of the first and second cells cross. In certain aspects, the determined location for transmitting the handover request can result in the handover completing just beyond where the signal strength of the second cell becomes better than the signal strength of the first cell. In certain aspects, if the second device is behind several layers of leading edge devices of the swarm, the second device can use information from multiple other members of the swarm to determine a location at which to transmit the handover command to avoid handover issues. In certain aspects, the handover request can include indicators to notify the base station that the handover request is location based rather than time triggered or signal level triggered. As the second device 1602b arrives at the determined location, the second device 1602b can transmit (at 1690d) a handover request.

Figure 17:
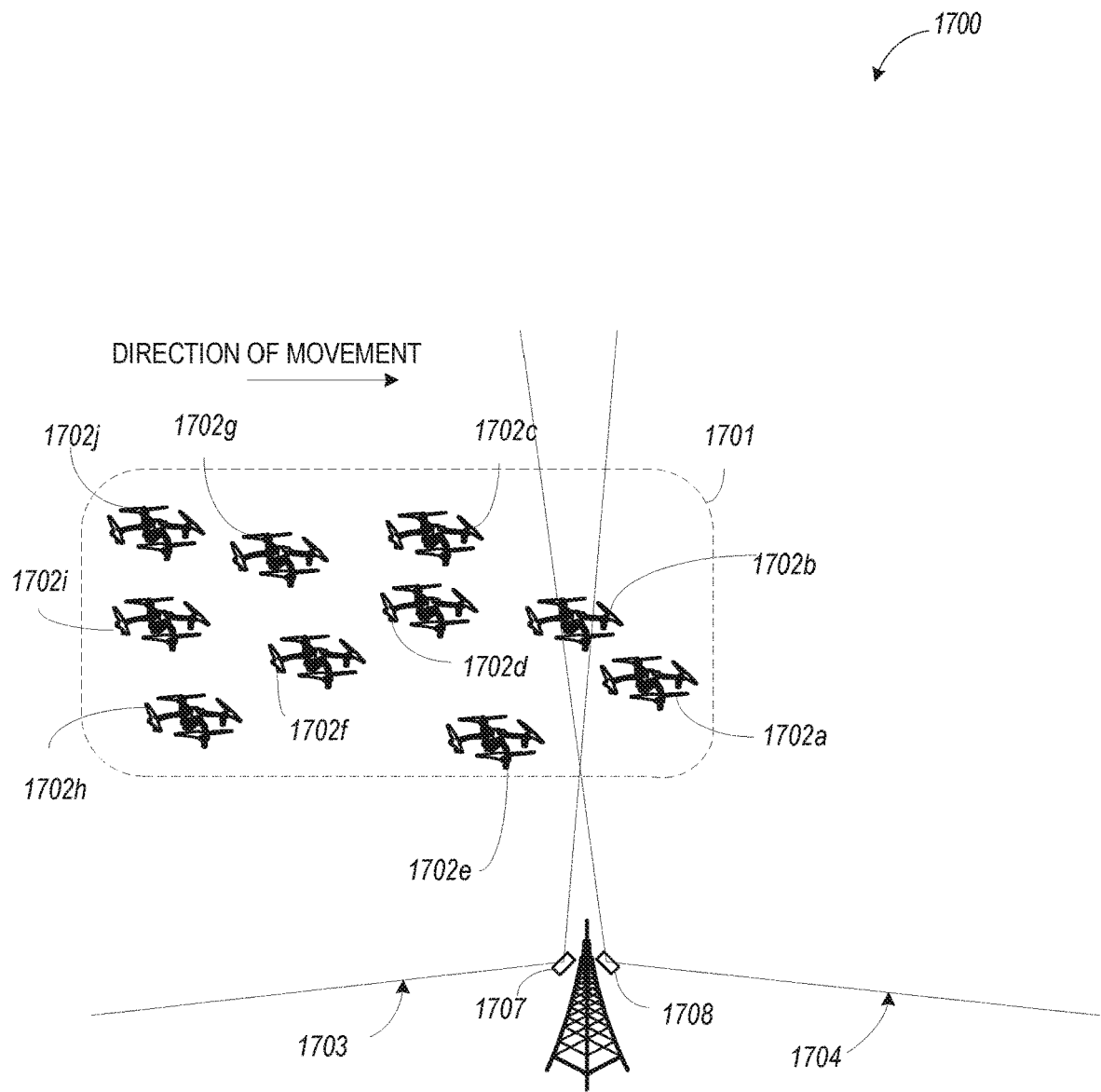
FIG. 17 illustrates generally a system for handing over a swarm of mobile devices from a first cell to a second cell, in accordance with some aspects.

FIG. 17 illustrates generally a system 1700 for handing over a swarm 1701 of mobile devices 1702a-1702j (collectively 1702x) from a first cell 1703 to a second cell 1704. The system 1700 can include the swarm 1701 of mobile devices 1702x such as UEs, a first cell system, and a second cell system. The first and second cell systems can each respectively include a cell 1703, 1704, or cell coverage area, and a base station 1707, 1708 or cell controller. Each cell 1703, 1704 can include a boundary within which the base station 1707, 1708 can provide and maintain wireless connections with one or more UEs.

In some aspects, each UE of the swarm 1701 can be discovered by at least one other member of the swarm 1701 and can maintain membership in the swarm 1701 by proximity to one or more other members of the swarm 1701. Although swarms can be stationary, the illustrated swarm 1701 includes UEs 1702x that share a similar trajectory in both speed and direction.

FIG. 17 illustrates a moment in time as members 1702x of the swarm 1701 are traversing boundaries of the first and second cells 1703, 1704, and more specifically, traversing out of the first cell 1703 and into the second cell 1704. In some aspects, each UE 1702x of the swarm 1701 individually transmits a handover request (e.g. measurement report) to the base station 1707 of the first cell 1703 and receive a confirmation or acknowledgement of the handover request from the base station 1707 of the first cell 1703 as part of the handover process. The base station 1707 of the first cell 1703 coordinates the handover of each UE with the base station 1708 of the second cell 1704. With a large number of UEs, such as with a swarm, the handover process can overwhelm the first base station, the second base station or both the first base station and the second base station. In certain aspects, a leading edge UE (e.g. 1702a) of the swarm 1701 can first detect the second cell 1704 and can provide a handover request as can happen in a conventional system. However, in addition to the conventional handover request, the leading-edge UE 1702a of the swarm 1701 can also provide a swarm ID to the first base station 1707.

In certain aspects, as UEs of the swarm 1701 interact with the base station 1707 of the first cell 1703, the base station 1707 can allocate a register and can store information about the swarm 1701 within the register, including but not limited to, a swarm ID, IDs of one or more UE members of the swarm, one or more member UE location information, or combinations thereof. In some aspects, as the first base station 1707 receives handover requests from one or more of the leading-edge devices of the swarm 1701, the first base station 1707 can begin to plan and process handovers of other members of the swarm 1701 such that the handovers do not overwhelm either the first base station 1707 or the second base station 1708. For example, upon receiving a handover request from a leading-edge device of the swarm 1701, the base station 1707 of the first cell 1703 can begin to plan handover locations for other members of the swarm 1701. Such planning can be based on location information stored in the register and associated with a swarm ID.

In some aspects, swarm related information may be stored only in one or more of the mobile members of the swarm 1701. Upon detecting the second cell 1704, a member of the swarm 1701 can provide the swarm information to the base station 1707 of the first cell 1703 along with the handover request. In some aspects, the swarm information may reside only in a master device of the swarm 1701. If the member of the swarm that detects the second cell 1704 and an imminent handover event is not a master device of the swarm 1701, the swarm information can be received from the master device, for example, via a peer-to-peer connection, before providing the handover request. As discussed above, the base station 1707 of the first cell 1703 can then use the swarm information to prepare for handover of the other members of the swarm 1701.

In some aspects, the swarm 1701 can evolve and new devices can become leading-edge devices, or an edge-device in general. Such changes can occur as a result of small differences in speed or direction between members of the swarm 1701, a change in average speed or direction of the swarm 1701, or combinations thereof. Member devices at the periphery of the swarm (i.e., edge devices), once identified by the master device, can receive updates of the swarm information from a master device of the swarm at more frequent intervals compared to non-edge devices. In some examples, leading edge devices, devices having the most probability of detecting a new cell, can receive updates of the swarm information from a master device of the swarm at more frequent intervals compared to other edge devices in the swarm 1701. In some examples, as a device becomes an edge-device, such device can become a master device and can receive or is relayed the current swarm information, and can begin to update the swarm information. Updating the swarm information can include making peer-to-peer inquiries, discovery requests, monitoring base station communications, or combinations thereof.

Based on the handover request and the swarm information, the base station 1707 of the first cell 1703, or a control circuit of the cellular network, can identify optimum locations of each member device of the swarm 1701 to do the handover to the second cell 1704. Information the cell controller or the network control circuit may use to determine each location can include, but is not limited to, cell load of old and target cell 1703, 1704, traffic profile of the swarm 1701, movement parameters (speed, direction) of the swarm 1701, size of the swarm 1701 (area and number of devices), measurement reported by different devices from the swarm 1701, or combinations thereof. For a large swarm, in certain aspects, the network control circuit or the base station 1707 of the first cell 1703, can treat the large swarm as two smaller swarms for a period of time, assigning each part to a different cell.

Figure 18:
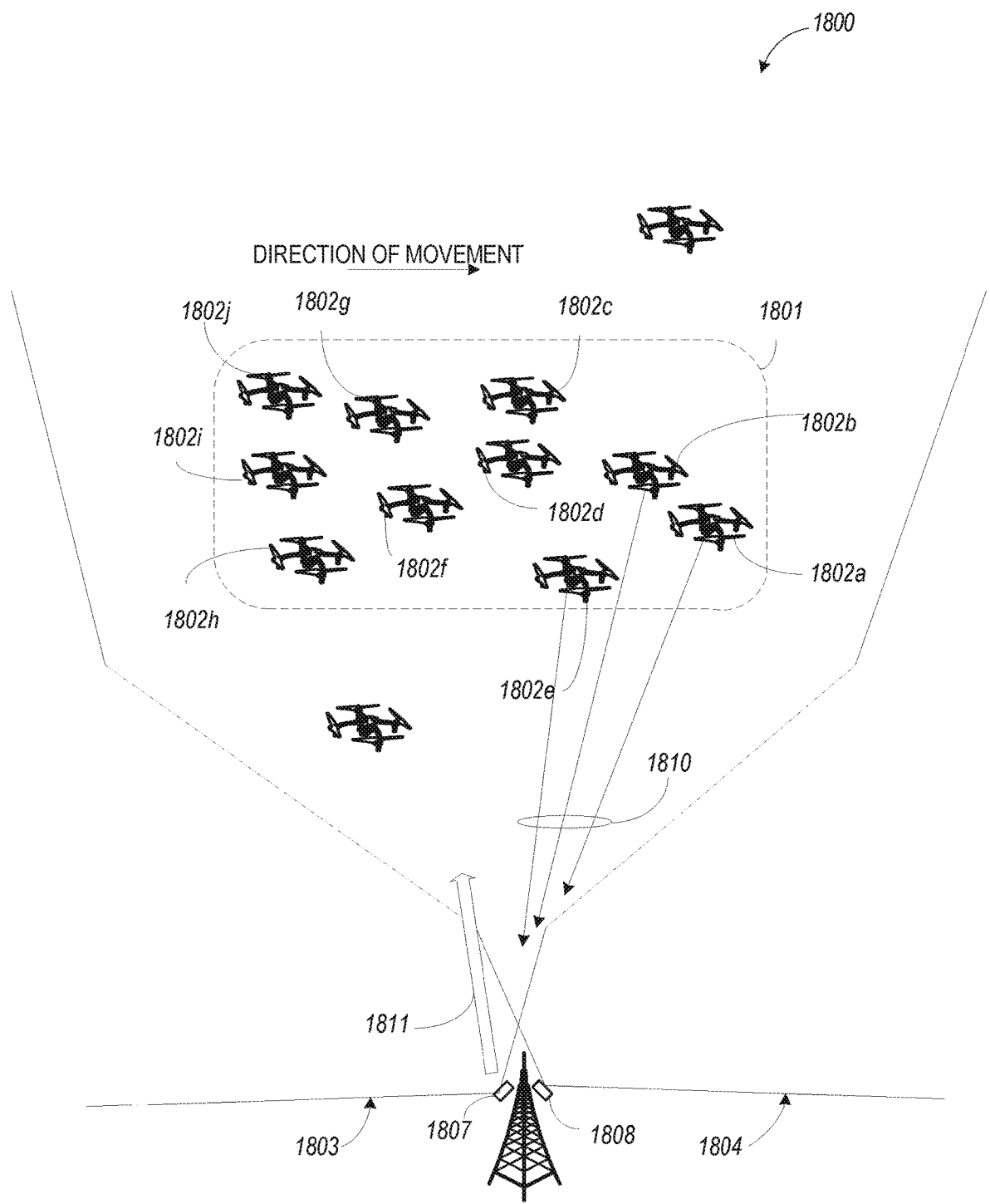
FIG. 18 illustrates generally an example system in which a swarm of mobile devices is located within an overlap region between a first cell and a second cell, in accordance with some aspects.

FIG. 18 illustrates generally an example system 1800 where a swarm 1801 of mobile devices is located within an overlap region between a first cell and a second cell. The system can include the first cell 1803, a first base station 1807 supporting connections in the first cell 1803, the second cell 1804, a second base station 1808 supporting connections in the second cell 1804, and a number of UEs 1802*a*-1802*j* (collectively 1802*x*) or mobile devices. Some of the UEs 1802*x* have discovered each other and have formed a swarm 1801.

In some aspects, the swarm 1801 can include one or more UEs that share a similar speed and direction and are adjacent to one or more other swarm members. Adjacency can be limited to a range of a peer-to-peer commination protocol including a limited number of hops. In the situation generally illustrated in FIG. 18, the swarm 1801 of devices is situated completely in the overlap area of the first cell 1803 and the second cell 1804. Upon receiving one or more handover requests 1810, the base station 1807 of the first cell 1803 can broadcast a single group/swarm handover command 1811 to the swarm devices 1802*x*, instead of single handover commands to the individual devices. The group command 1811 can include the swarm ID as an identifier so the devices 1802*x* of the swarm 1801 can recognize whether the device should process and respond to the command. Providing a single general command to the swarm 1801 can reduce network load significantly. Additionally, a common point in time for the handover of all devices in the swarm 1801 can ensure that all devices of swarm 1801 are connected to the same cell, which can be beneficial for any cell-specific settings of the devices in the swarm 1801. Such cell-specific settings can include, but are not limited to, specific timings for D2D links between the devices.

Figure 19:
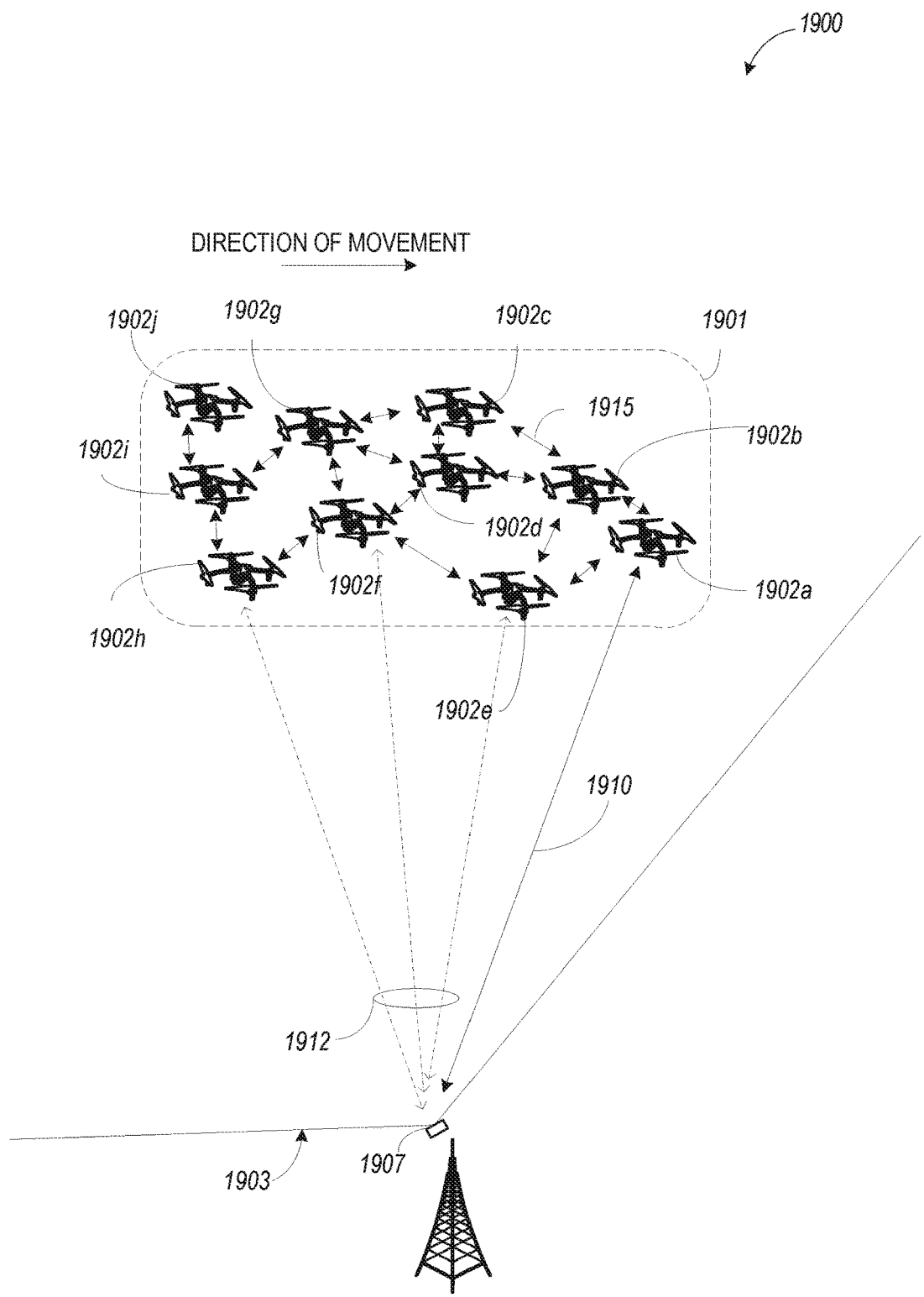
FIG. 19 illustrates generally an example system for handing over a swarm of mobile devices from a first cell to a second cell with reduced control communication traffic, in accordance with some aspects.

FIG. 19 illustrates generally an example system 1900 for handing over a swarm 1901 of mobile devices 1902*a*-1902*j* (collectively 1902*x*) from a first cell 1903 to a second cell (not shown) with reduced control communication traffic. The system 1900 can include the first cell 1903, a first base station 1907 supporting connections in the first cell 1903, and a number of UEs 1902*x* or mobile devices. Some of the UEs 1902*x* can have discovered each other and have formed a swarm 1901. In certain aspects, the swarm 1901 can include UEs 1902*x* that share a similar speed and direction and are adjacent to one or more other swarm members. According to some aspects, adjacency in terms of swarm formation can be expressed as a range of a peer-to-peer communication protocols including a certain number of hops 1915 used to propagate a swarm communication.

In certain aspects, as the swarm 1901 forms, a single device (e.g., 1902*a*) of the swarm 1901 can become a swarm master 1902*a*. Once identified as the swarm master, device 1902*a* can begin to handle control communications 1910 for other member devices of the swarm 1901. Data connections 1912 of swarm members 1902*x* can continue to be handled directly between each device and the base station 1907 in some aspects. Control communications 1910 can include, but are not limited to, cell measurement reports. Consolidating communication of the cell measurement reports can significantly reduce control communication traffic and free up network resources for other time critical tasks such as handling a large number of handovers in a short amount of time.

Figure 20:
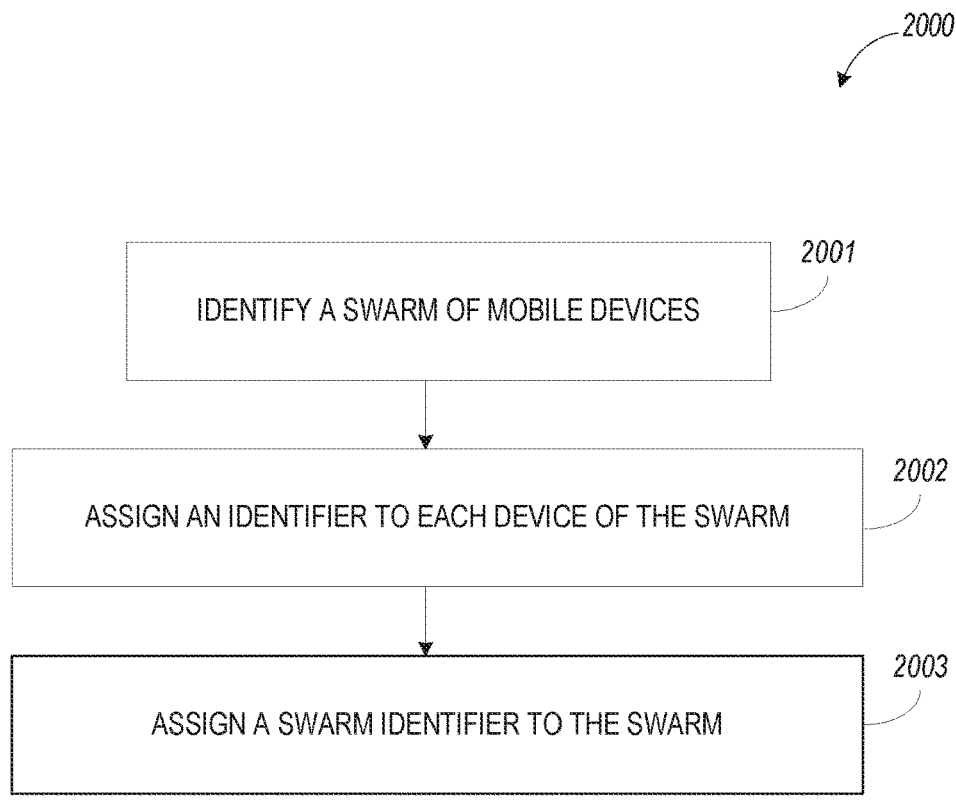
FIG. 20 illustrates generally a flowchart of an example method of operating a base station, in accordance with some aspects.

FIG. 20 illustrates generally a flowchart of an example method 2000 of operating a base station. At 2001, the base station can identify a number of mobile devices as a swarm. The base station can identify members of the swarm by analyzing trajectory information collected from the mobile devices or generated by analyzing communications between the base station and each mobile device. At 2002, the base station can assign each member of the swarm with an identifier and, at 2003, the base station can assign the swarm a swarm identifier. Swarm information that can include the individual identifiers and the swarm identifier can be stored at the base station or at one or more of the member devices of the swarm such as, for example, a master device of the swarm. The swarm information or portions thereof can be provided with control or data communications with the base station. The base station can potentially reduce control traffic by issuing individual control messages where each control message can provide control information to one or multiple members of the swarm. The control messages can be configured using the swarm information. Such use of the swarm information can reduce control traffic of the cell and can free up network resources that can be used to improve service or expand cell capacity.

As a UE crosses from one cell to another, the cellular network, or a component thereof, hands over connections of the UE from one cell to the next. The techniques for planning and managing handovers have improved as cellular technology has improved. However, there still exist situations in which handovers can fail.

Handovers (e.g., as illustrated and discussed in relation to FIG. 7 and FIG. 8) typically occur when a base station of a cell recognizes that a UE client, a UE served by the base station, can establish a better connection with a different cell than the present cell providing service to the UE. The recognition of the handover can be as a result of measurement data provided by the UE. Upon recognition, the base station can coordinate with the controller of the different cell and the connections of the UE can be handed over. In certain aspects, however, even with the many advances in handover technology, if conditions change between the time the base station recognizes the need for a handover and the actual handover, the handover can fail or can be immediately followed by an additional handover back to the serving cell or to a third cell. Condition changes can occur for a number of reasons including, but not limited to, changing signal conditions that render the perceived handover less than ideal, changing signal conditions that delay communication between the UE and base station, message queue delay of the UE, or combinations thereof.

In some aspects, techniques described herein can be used to mitigate failed and short-term handovers and thus provide a better user experience for a mobile communication device user. In certain aspects, a processor of a UE can interrupt transmission of handover related reports upon recognizing conditions that render a report inaccurate. In some aspects, aggregating and recognizing that a report can provide time-critical handover, the processor can prioritize transmission of the report and the report can be placed at the front of a message queue for transmission to the network. In some cases, when a UE has gone out of sync, ~18% will return back in sync within about 800 milliseconds (ms) to about 2000 ms. During such a delay, the radio conditions of the UE can change significantly. Thus, any measurements queued up during the out of sync period may report inaccurate conditions upon the UE returning back in sync. Some UEs generally transmit the queued messages in the order the messages were queued. As a result, if there is a delay in transmitting certain reports, such as, but not limited to, measurement reports, the network can trigger handovers that fail, or handovers, that although successful, are not efficient because the handover quickly results in a second handover.

Figure 21:
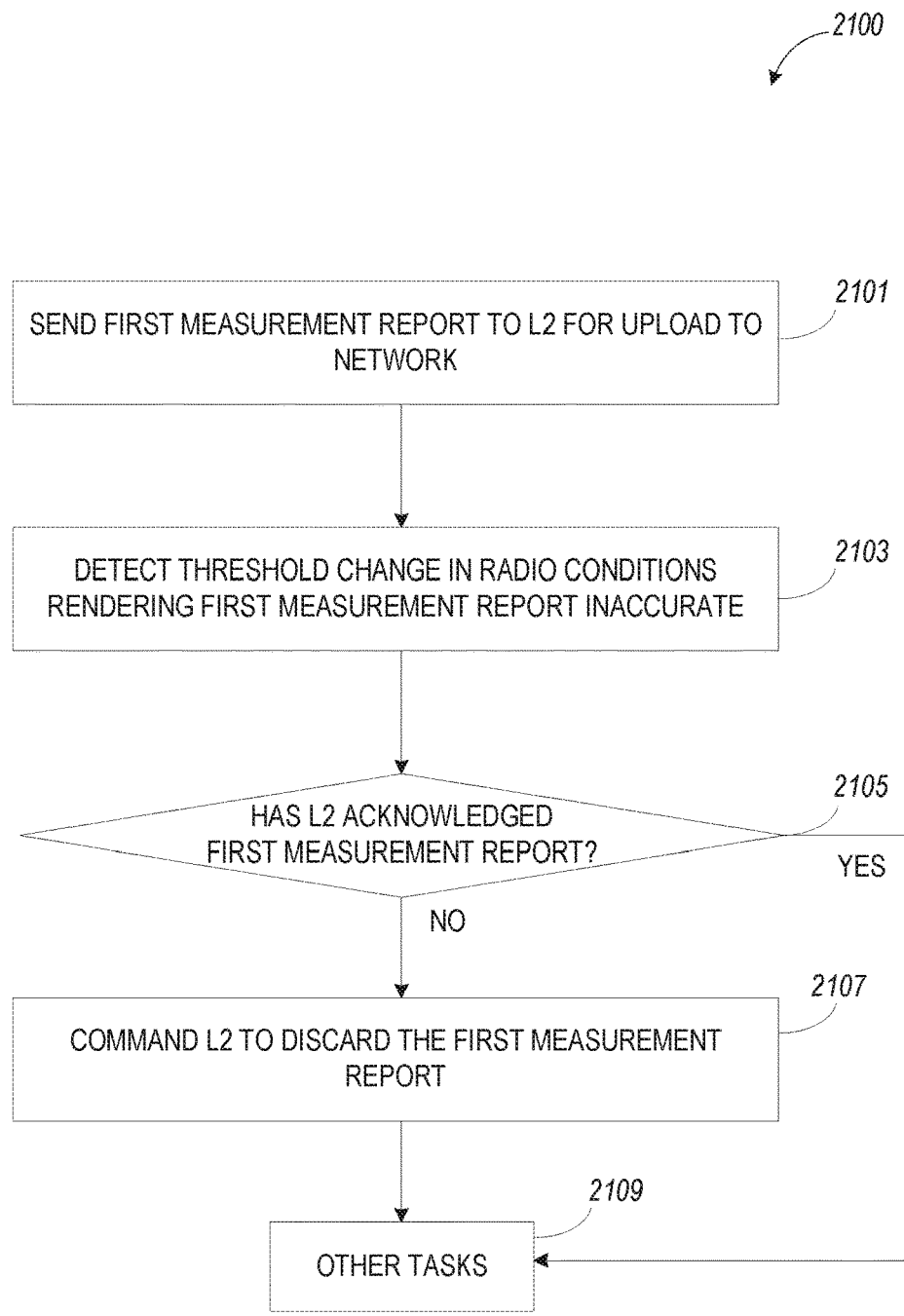
FIG. 21 illustrates generally a flowchart of an example method to avoid failed handovers and unnecessary handovers, in accordance with some aspects.

FIG. 21 illustrates generally a flowchart of an example method to avoid or mitigate failed handovers and unnecessary handovers, in accordance with some aspects. At 2101, a first measurement report satisfies criteria to be transmitted to the network and is sent to L2, such as a datalink layer, for upload transmission. At 2103, radio conditions change rendering the information of the first measurement report inaccurate. At 2105, inputs from L2 are evaluated to determine if L2 acknowledged receipt of the first measurement report. If L2 acknowledged receipt of the first measurement report, the method completes and moves on to other tasks 2109. If L2 has not acknowledged receipt of the first measurement report, at 2107, L2 can be instructed to discard the first measurement report without transmitting the first measurement report.

Figure 22:
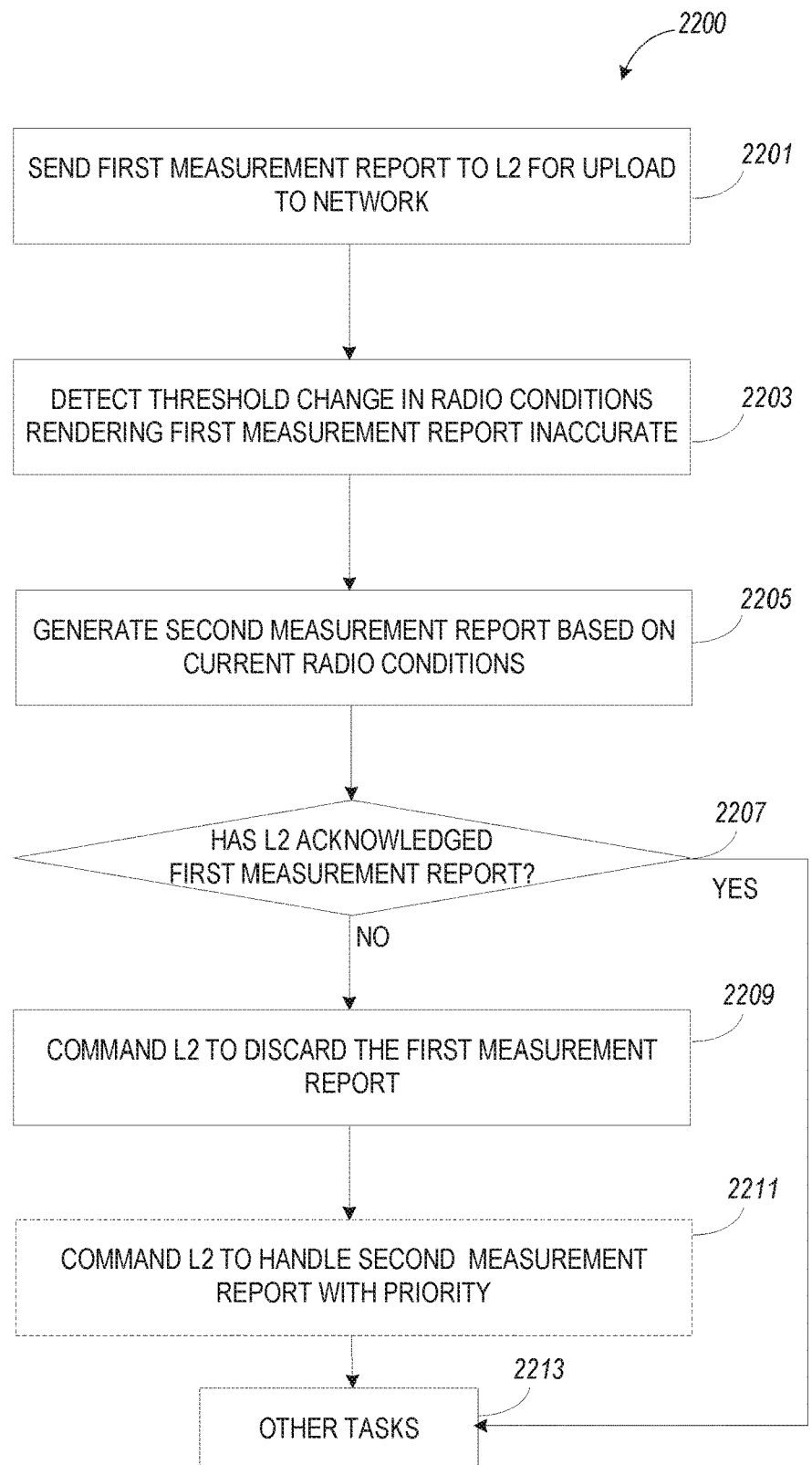
FIG. 22 illustrates generally an alternative or enhanced example method for avoiding handover failures and unnecessary handovers, in accordance with some aspects.

FIG. 22 illustrates generally an alternative or enhanced example method 2200 for avoiding or mitigating handover failures and unnecessary handovers, in accordance with some aspects. At 2201, a first measurement report can satisfy criteria to be transmitted to the network and is sent to L2 for upload transmission. For example, the first measurement report can show that a first non-serving cell is providing a stronger signal than the serving cell. At 2203, radio conditions can change rendering the information of the first measurement report inaccurate. For example, a second measurement report can be generated at 2205 and can show that the signal of the first non-serving cell has deteriorated and that a second non-serving cell is providing a stronger signal than the serving cell. At 2207, inputs from L2 are evaluated to determine if L2 acknowledged receipt of the first measurement report. If L2 acknowledged receipt of the first measurement report, the method completes and moves on to other tasks at 2213. If L2 has not acknowledged receipt of the first measurement report at 2207, L2 can be instructed at 2209 to discard the first measurement report without transmitting the first measurement report. At 2213, L2 can resume processing and transmitting messages in L2's queue. In certain examples, L2 can be instructed at 2211 to prioritize processing of the second measurement report or to move the second measurement report to the top of the queue for immediate processing and upload to the network.

In mmWave technology, communication between a station (e.g., the UEs 101, 102 of FIG. 1A) and other stations or an access point (e.g., the AP 106 of FIG. 1A) may use wireless channels that are highly directionally dependent and which can be susceptible to blockage caused by changes in the surrounding environment. Additionally, the mmWave radio used in devices may change rapidly based upon the orientation of the device handset and, consequently, the orientation of the antenna array. For these and other reasons, mmWave stations may search for other beams for communication (e.g., handovers may be needed as illustrated in FIGS. 7-8, or other corrective actions) upon detecting a decrease in performance or an increase in communication latency. However, in some instances, the orientation of devices that intend to establish mmWave connection, and the direction of antenna array s of those devices, are not known prior to connection of those devices. In order to establish a connection, devices use an omnidirectional antenna configuration and other configurational parameters to offset RF path losses. Once the connection is established, devices use Sector Level Sweep (SLS) to determine the best beam direction and a Beam Refinement Protocol (BRP) to further optimize beam direction. Such protocols can increase signaling overhead and time to establish a connection and to effectively begin communication over that new connection.

In contrast, according to aspects, stations can estimate the best beam direction based upon a position of stations and antenna arrays and communicate this information between stations before the mmWave link is established, in order to reduce time for connection and to reduce signaling overhead. Systems and methods according to various aspects can therefore increase the efficiency of handovers by reducing the time used to form new connections at a target cell, AP, TRP, or other target network elements.

According to certain aspects, out-of-band (OOB) communications facilitate information exchange between nodes (e.g., stations, access points, and other devices) before a mmWave communication link is established. In aspects, OOB communication refers to communication outside of mmWave bands, for example, cellular, WiFi, and other bands. Because much communication can take place OOB, latency and signaling overhead involved in the mmWave link establishment process can be reduced. By using OOB communication, beam searching and the beam tracking algorithms can be implemented and completed more quickly because some preliminary information can be exchanged between nodes beforehand. Handover processes can therefore occur more quickly (e.g., with less latency) and with less overhead. Preliminary information can include information for synchronization of beam search patterns, information regarding the relative positions of antenna arrays, movement information of the devices, and the direction and/or aperture of the beam to be used for mmWave communication once the mmWave link is established.

In other aspects, a prioritized list of available beam forming (BF) or beam adjustment (BA) configurations is created during a periodic sweep and communicated over an OOB or mmWave link to be used for fast re-connection in case of mmWave blockage or other handover-triggering condition. According to certain aspects, a smart beam steering algorithm for fast directional link re-establishment uses knowledge of the previous feasible antenna sector pair to narrow the sector search space and quickly re-steer the transmit and receive beams following mobility-induced link breakage. According to certain aspects, a method for fast directional link re-establishment may use a list of possible alternative beam directions identified in a beam scan prior to mobility-induced link breakage. According to certain aspects, if OOB communication is not available, the systems and methods can default to non-OOB BF/BA algorithms.

User devices of today can typically communicate using multiple technologies, for example, cellular, WiFi, Bluetooth, ZigBee, etc. The mmWave link, e.g., IEEE 802.11ad, IEEE 802.15.3c and similar, provides connectivity for applications demanding a high data throughput (e.g., >300 Megabits-per-second, or Mbs). Because of propagation limitations exhibited by mmWave in certain instances, for example line of sight (LOS) limitations, devices often concurrently use other technologies that do not rely on LOS for communication. Therefore, in order to establish a LOS mmWave connection between nodes, systems according to certain aspects can initiate a non-LOS connection first (e.g., before establishment of the mmWave connection) to exchange information regarding antenna array orientation/broadside direction and other information. Nodes can use this information within a reciprocal node best fit (BF) algorithm to prioritize or reduce the SLS area.

Figure 23:
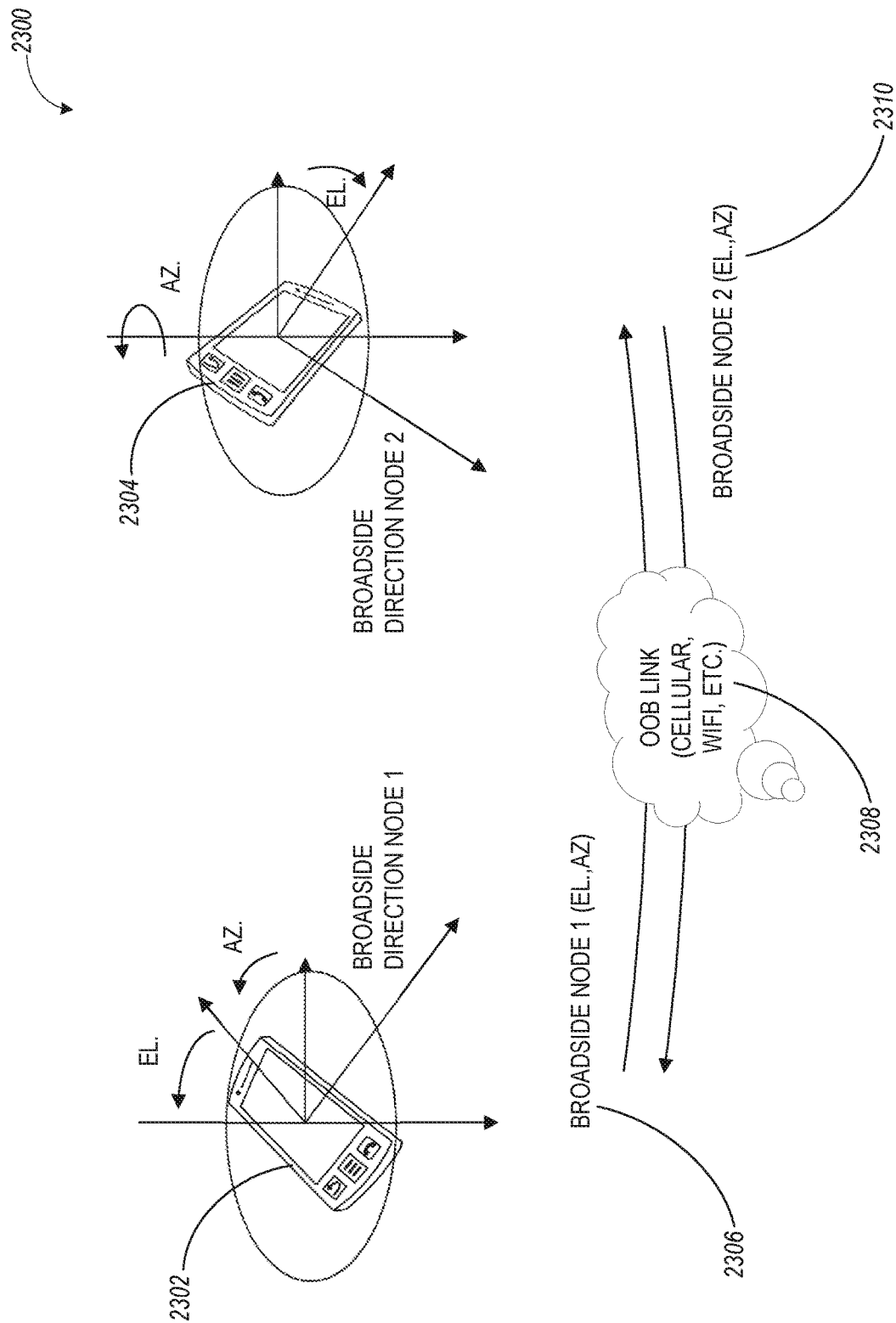
FIG. 23 illustrates communication of azimuth and elevation information between devices, in accordance with some aspects.

FIG. 23 illustrates communication of azimuth and elevation information between device 2302 and device 2304. As shown in FIG. 23, azimuth and elevation information 2306 for antenna arrays of device 2302 is provided over an OOB connection 2308 to device 2304 to track relative position of device 2302 to device 2304. Similarly, azimuth and elevation information 2310 for antenna arrays of device 2304 is provided over the OOB connection 2308 to device 2302. Elevation and azimuth information can be generated using device magnetometers, accelerometers, etc. (not shown in FIG. 23). It will be appreciated that either of device 2302, 2304 can be a stationary device such as an AP, TRP, base station, gNodeB, etc., or a mobile network element implemented on, for example, a vehicle, drone, etc.

Figure 24:
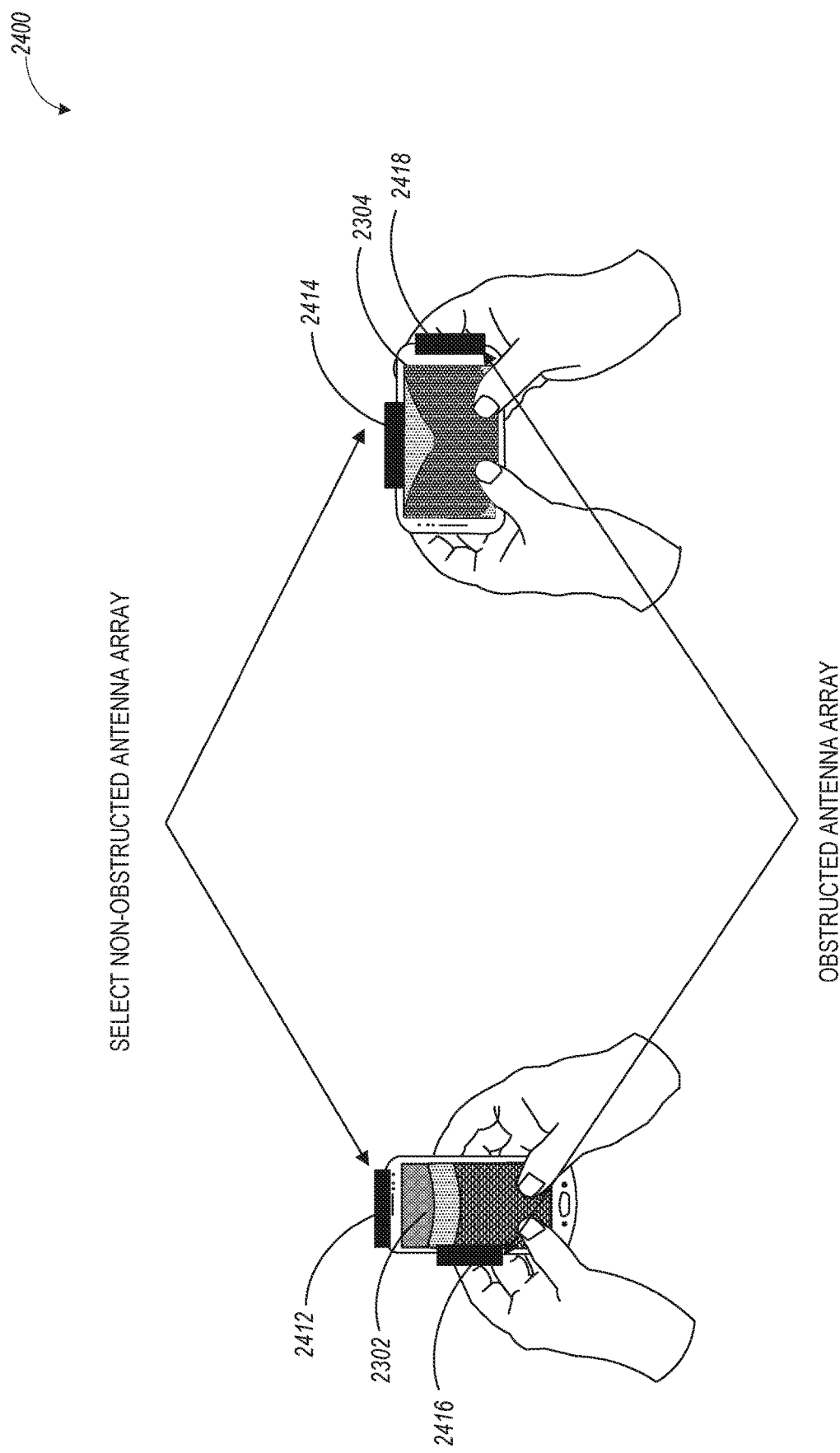
FIG. 24 illustrates example obstructed antenna arrays, in accordance with some aspects.

If the device 2302, 2304 includes more than one antenna array, multiple broadside directions will be calculated and correlated with how a user holds and/or uses the device 2302, 2304 to identify the least obstructed antenna array pair as shown in FIG. 24. For example, antenna arrays 2412 and 2414 can communicate in a less-obstructed manner than antenna array s 2416 and 2418. Multiple sets of elevation and azimuth information can be generated for each antenna array 2412, 2414 and 2416, 2418. A proximity sensor (e.g., a capacitance sensor embedded in the device enclosure) can be used to determine the position of the device 2302, 2304 relative to the user's hands and/or the position of device 2302, 2304 at additional places on the body or on surfaces like a table, deck, etc.

Figure 25:
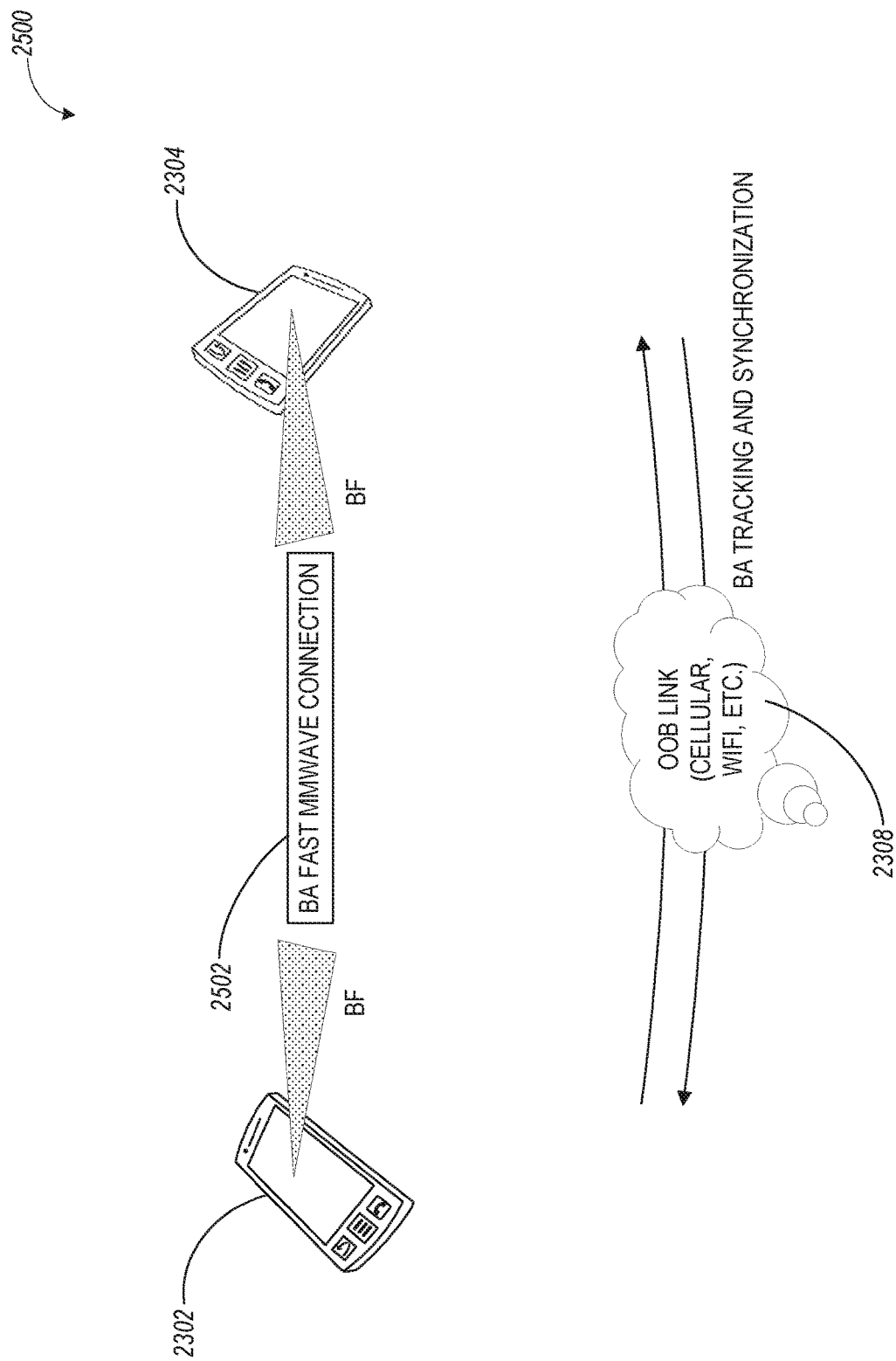
FIG. 25 illustrates beam direction determination, in accordance with some aspects.

After the broadside direction of the preferred antenna array 2412, 2414, 2416, 2418 is determined according to certain aspects, information on the best antenna pair can be exchanged OOB, and a beam direction 2502 can be calculated as seen in FIG. 25 even without using an SLS procedure. BA tracking and synchronization can also proceed OOB.

Figure 26:
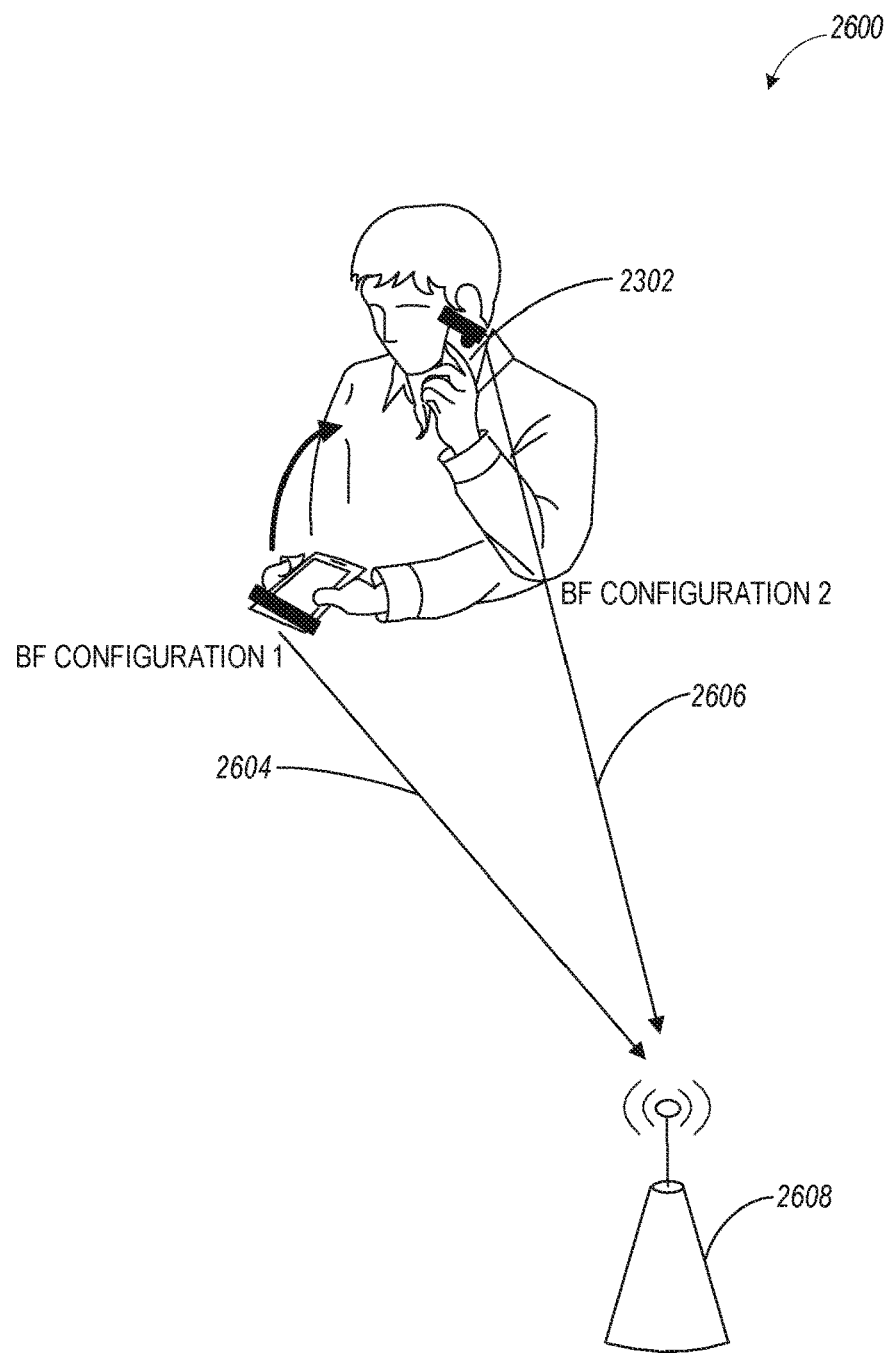
FIG. 26 illustrates monitoring of device orientation, in accordance with some aspects.

If the mmWave connection fails to be established using the calculated and/or most probable beam direction 2502, (e.g. due to blockage), an SLS can be performed to find a better or different beam direction. However, because beam directions can be synchronized in space and time using an OOB communication link, the time to establish the mmWave connection can still be reduced overall. Further, as illustrated in FIG. 26, in some aspects, orientation data of device 2302 can be continuously monitored during the mmWave connection and BF adjustment commands 2604, 2606 can be generated for OOB communication to, for example, a WiFi AP 2608.

Figure 27A:
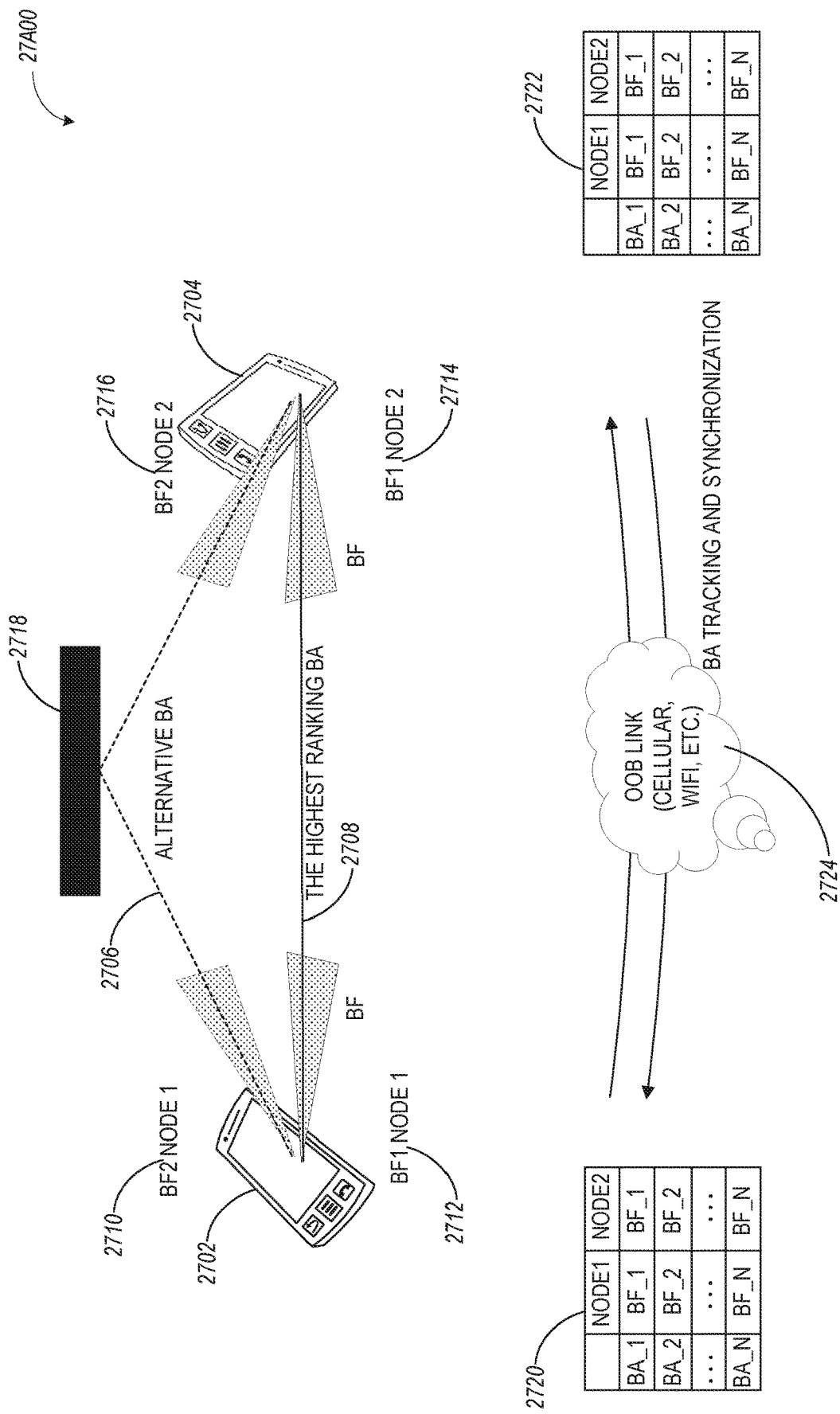
FIG. 27A illustrates how different beam forming (BF) or beam adjustment (BA) configurations can be stored and used within a system, in according with some aspects.

FIG. 27A illustrates how different BF/BA configurations can be stored and used within a system 27A00 according to aspects. In FIG. 27A, devices 2702 and 2704 have at least two BA possibilities 2706 and 2708 for mmWave communication between devices 2702 and 2704. Device 2702 can generate one or more BFs 2710, 2712, and device 2704 can generate one or more BFs 2714, 2716, wherein a BF 2710, 2712, 2714, 2716 in this context refers to beams that can be formed by antennas of respective devices 2702, 2704. As illustrated in the example of FIG. 27A, BA possibility 2706 is obstructed by a stationary object such as wall 2718. BA possibility 2708 is therefore the highest-ranking BA possibility at the given point in time as illustrated in FIG. 27A. Blocking objects can also be mobile, for example a blocking object can include a vehicle or group of vehicles. Additionally, devices can be stationary while blocking objects are mobile, or both the devices and the blocking objects can be mobile. To minimize the effect of path blocking due to moving objects, stationary objects, etc., according to some aspects, systems can perform a periodic survey and/or sweep of possible beam direction pairs. The output of this operation can be a list 2720, 2722 of BF/BA configurations that could be used for the mmWave link at a given time. The lists 2720, 2722 can be exchanged by devices 2702, 2704 using an OOB link 2724. Such a list can be sorted based on criteria, including for example, maximum signal to noise ratio (SNR) criteria, error vector magnitude (EVM) criteria, or other criteria. A BF/BA pair that has the best values for a criterion or group of criteria can be used for the current configuration, and the list can be stored in local memory for the devices 2702, 2704, or in a central memory location (e.g., at a base station, AP, gNodeB, MME, etc.), according to some aspects.

Figure 27B:
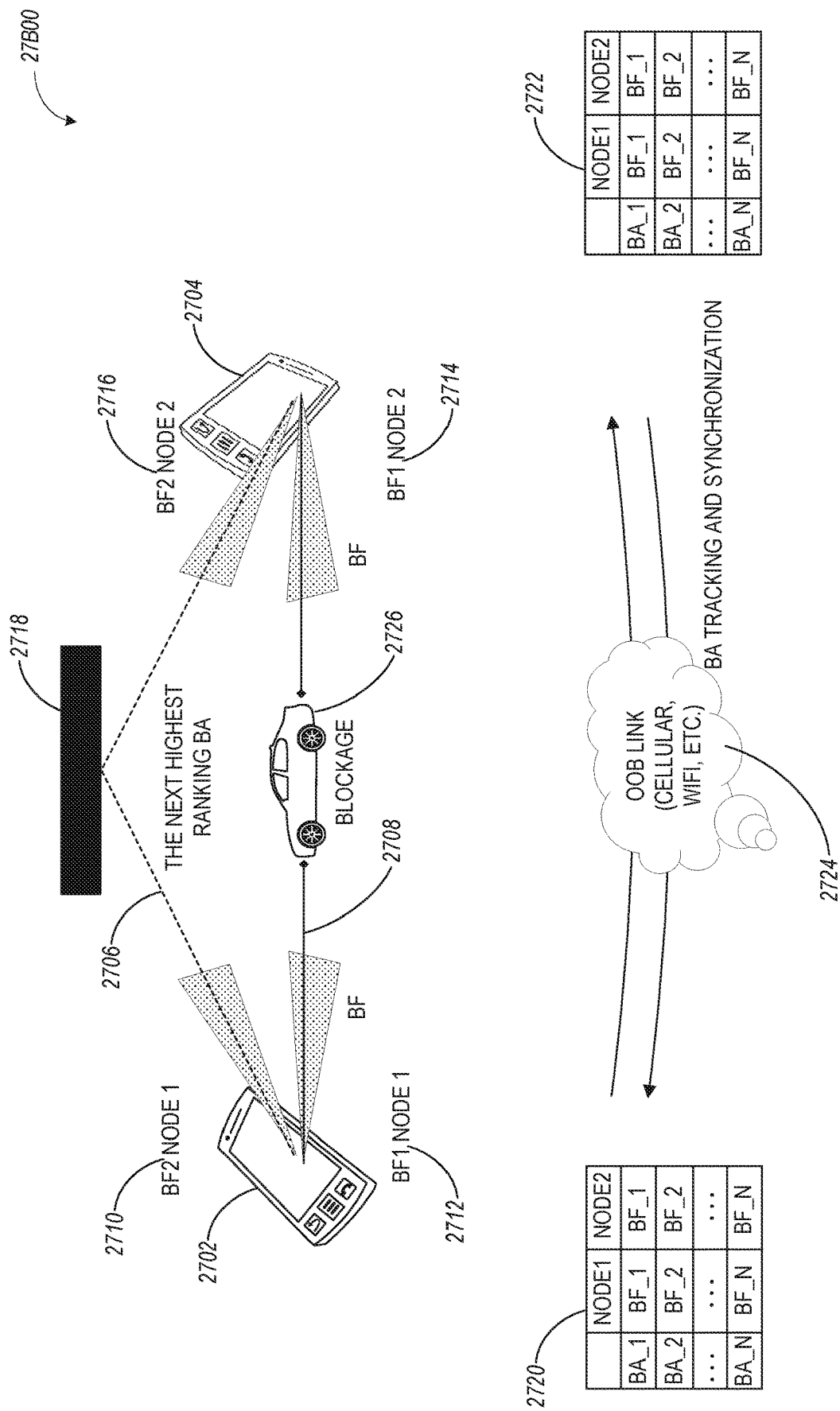
FIG. 27B illustrates a communication link blockage, in accordance with some aspects.

FIG. 27B illustrates a new blockage 2726 that may occur in a system 27B00. In the event of the mmWave link being dropped and/or degraded below a configurable threshold, the next configuration from the list 2720, 2722 can be deployed in the attempt to re-establish connection, and a handover can be performed to establish communications using the next configuration from the list 2720, 2722. According to some aspects, adoption of the next configuration from the list 2720, 2722 can be performed instead of, for example, implementing SLS tore-establish connection. If none of the BF/BA configurations from the list are suitable to re-establish the connection/improve link performance, a new search and/or SLS can be performed in order to create a new list. According to some aspects, the OOB link 2724 does not need to be active all the time; during normal operation, the antenna array positioning or BF/BA configuration lists 2720, 2722 can be communicated over a mmWave link as well. The OOB link 2724 may be re-activated in the event of loss of the mmWave link, according to some aspects.

Figure 28:
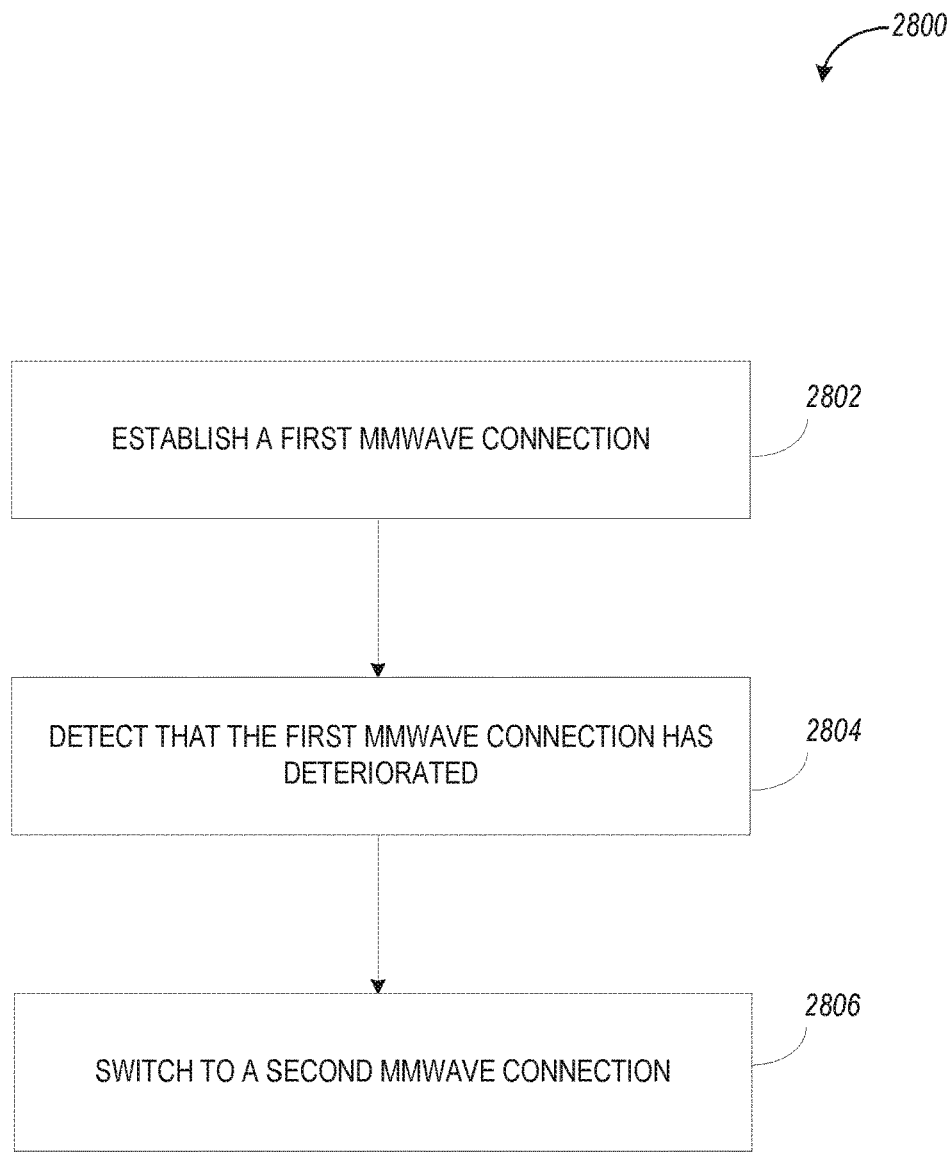
FIG. 28 illustrates generally a flowchart of an example method for performing a handover from a first millimeter-Wave (mmWave) connection to a second mmWave connection, in accordance with some aspects.

FIG. 28 illustrates generally a flowchart of an example method 2800 for performing a handover from a first milli-meter-Wave (mmWave) connection to a second mmWave connection. According to some aspects, operations of the method 2800 can be performed by a user device (e.g., UE, station, node, etc.) or by a network device (e.g., AP, base station, gNodeB, etc.) At 2802, the first mmWave connection is established between a first device and a second device. In aspects, the first mmWave connection can be established by exchanging antenna information, using other than mmWave communication, between the first device and the second device, and calculating a beam direction for the first mmWave connection based on the antenna information. In aspects, the first mmWave connection can be established by exchanging beam information using WiFi. In aspects, the first mmWave connection can be established by exchanging beam information using cellular communication. In aspects, the beam information includes antenna information for the first device and the second device. In aspects, the antenna information includes antenna orientation information. In aspects, the antenna orientation information can be obtained based on an input from a position sensor (e.g., accelerometer, magnetometer, etc.) or a proximity sensor.

In some aspects, method 2800 can include providing beam search pattern information using a communication type other than mmWave communication, prior to establishment of the first mmWave connection. In some aspects, method 2800 can include storing a list that includes identification information for beams that are eligible to be used for mmWave connections between the first device and the second device. In some aspects, the list is sorted based on signal quality measurements for the beams. In some aspects, method 2800 can include updating a sort order of the list responsive to receiving signal quality measurements. In some aspects, the signal quality measurements are received over a connection other than a mmWave connection, while in other aspects, the signal quality measurements are received over a mmWave connection. Method 2800 continues with operation 2804, detecting that the first mmWave connection has deteriorated below a quality threshold based on information received using a communication type other than mmWave communication. Method 2800 continues with operation 2806, switching to the second mmWave connection responsive to the detecting.

In wireless architectures, such as the architectures illustrated in FIGS. 1A-1E, the number and type of stations (e.g., the UEs 101 and 102, and the eNBs 111, 112, 128, and 130 of FIGS. 1A-1B) or access points (e.g., the AP 106 of FIG. 1A) may change as handover-related operation take place (e.g., the handover-related operations illustrated in reference to FIGS. 7-8). The wireless architecture's throughput and overall efficiency can be further improved when communication resources (e.g., frequency band and channel selection) are allocated optimally, leading to optimal utilization of fixed and mobile stations and access points. In some aspects, optimal allocation can refer to resource allocation meeting a pre-defined threshold or benchmark.

As used herein, the term "resource" or "communication resource" or "spectrum resource" includes one or more of, e.g., a frequency band, one or more communication channels within a frequency band, a spatial resource, a communication protocol, and/or the like.

Figure 29:
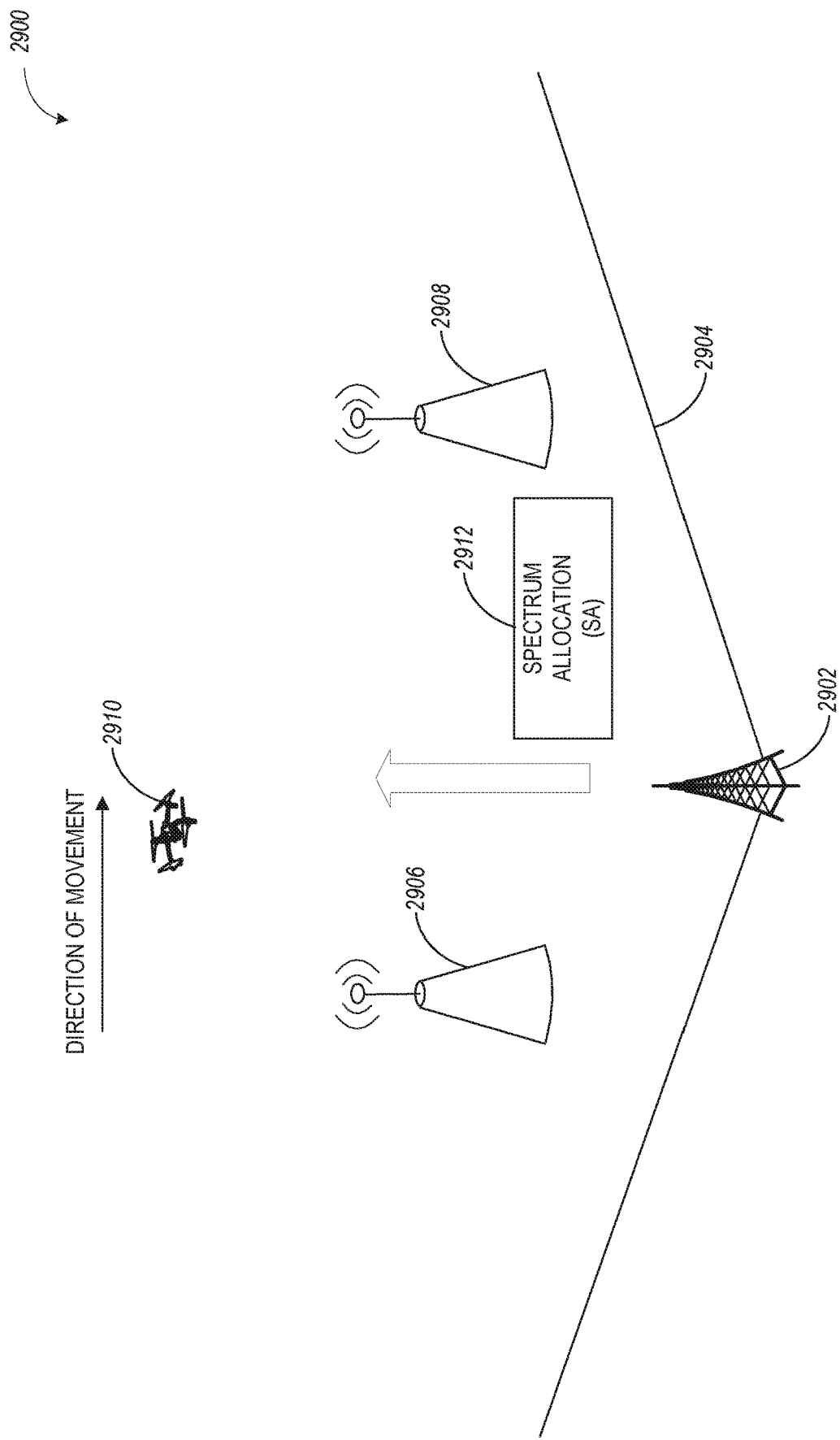
FIG. 29 illustrates reservation-based resource allocation in a wireless architecture, in accordance with some aspects.

FIG. 29 illustrates reservation-based resource allocation in a wireless architecture, in accordance with some aspects. Referring to FIG. 29, there is illustrated a wireless architecture 2900 including stationary wireless devices 2906 and 2908 within a cell 2904 of a base station 2902. The wireless devices 2906 and 2908 can be, for example, UEs, access points, radio heads, or other type of wireless devices configured to communicate using one or more communication protocols.

In some aspects, a mobile wireless device 2910 (e.g., a drone) can enter the cell 2904 of the base station 2902, which can take place after a handover procedure, such as the handover procedure illustrated in reference to FIG. 7, FIG. 8 or another type of handover procedure.

Figure 31:
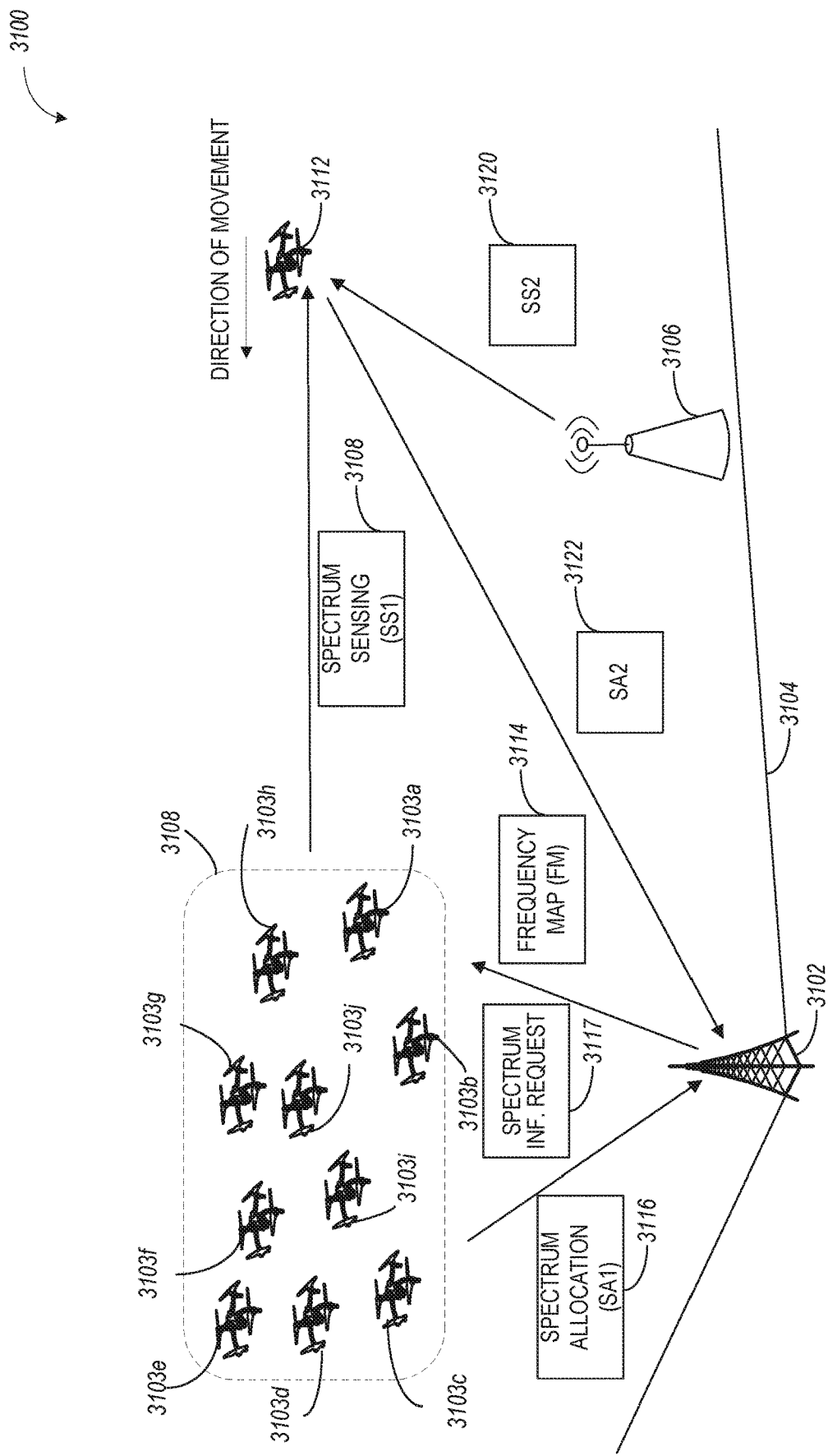
FIG. 31 illustrates cognitive and autonomous allocation of spectral resources in a wireless architecture, in accordance with some aspects.

In some aspects, the base station 2902 can maintain a frequency map (e.g., 3114 as illustrated in FIG. 31) associated with the wireless architecture 2900. More specifically, the frequency map can include, for example, currently available communication resources within the cell 2904, currently occupied communication resources, identification of stationary and/or mobile devices associated with the wireless architecture 2900, movement patterns of mobile devices within the cell 2904, transmit power used by stationary and/or mobile devices within the cell 2904, drone swarm identifiers including one or more identifiers of a drone leader within the drone swarm, and so forth. In some aspects, the frequency map can be updated dynamically, as wireless devices enter or leave the cell 2904.

When the mobile wireless device 2910 enters the cell 2904, the base station 2902 can detect the presence of the mobile device 2910, and can allocate spectrum resources for the device 2910, and can communicate the spectrum allocation 2912 to device 2910. In some aspects, the base station 2902 can determine the spectrum allocation 2912 based on, for example, device type associated with device 2910, transmit power requirements, proximity to other stationary devices within the cell, estimated movement patterns, and similar characteristics. In some aspects, spectrum allocation 2912 can be reserved spectrum allocation for a specific device (e.g., associated with identification information of device 2910), a specific device type (e.g., associated with a type of device, such as a UE, an access point, or other device), a mobile device that enters the cell 2904 at a specific location, specific time, using a specific predefined movement pattern, transmitting at a certain transmit power, and/or other criteria.

Figure 30:
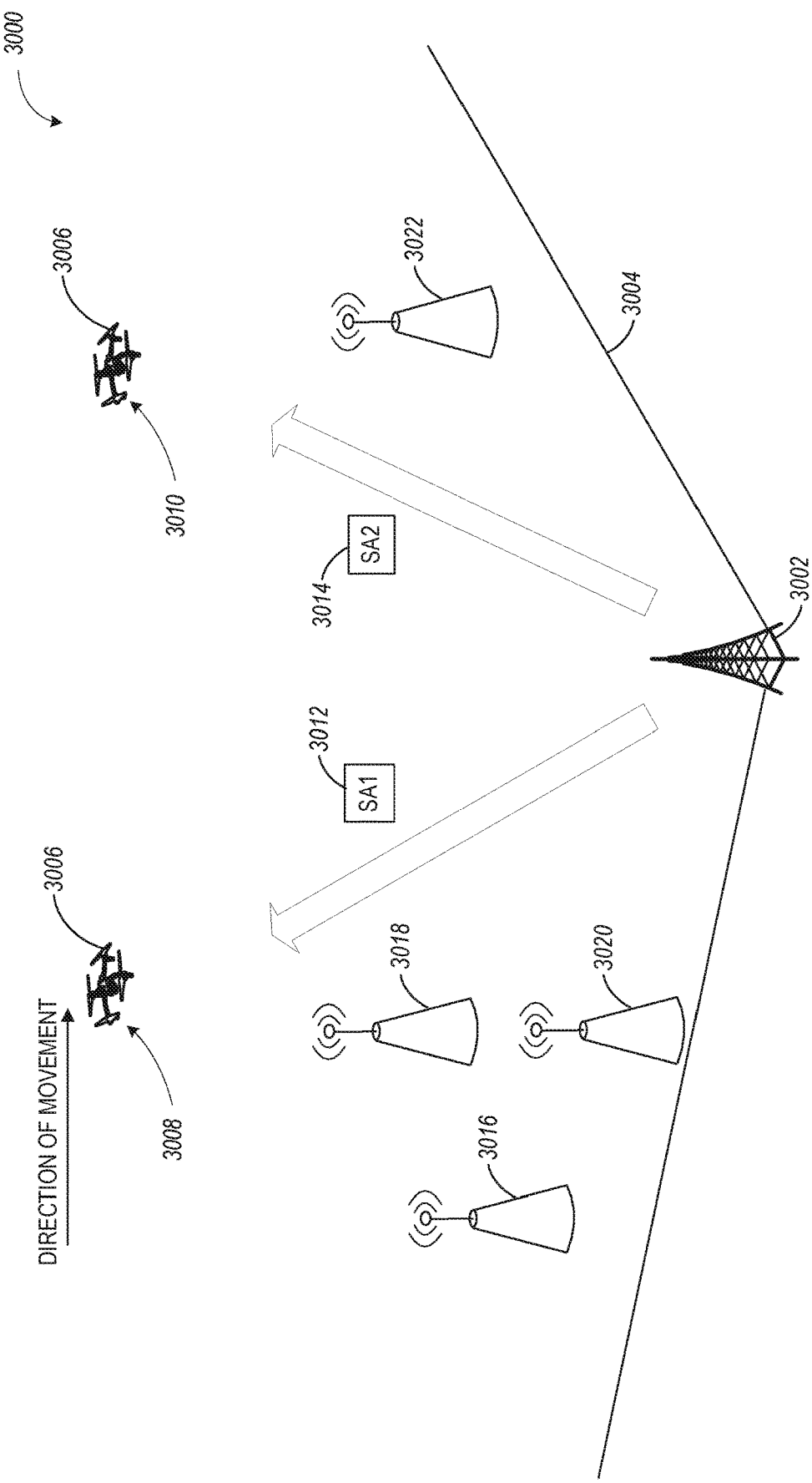
FIG. 30 illustrates dynamic allocation of spectral resources in a wireless architecture, in accordance with some aspects.

FIG. 30 illustrates dynamic allocation of spectral resources in a wireless architecture, in accordance with some aspects. Referring to FIG. 30, there is illustrated a wireless architecture 3000 including stationary wireless devices 3016, 3018, 3020, and 3022 within a cell 3004 of a base station 3002. The wireless devices 3016-3022 can be, for example, UEs, access points, radio heads, or other type of wireless devices configured to communicate using one or more communication protocols.

In some aspects, a mobile wireless device 3006 (e.g., a drone) can enter the cell 3004 of the base station 3002 at location 3008, moving in a direction as indicated in FIG. 30. The base station 3002 can detect that the mobile device 3006 enters the cell 3004 at location 3008, and can communicate spectrum allocation 3012 to device 3006. Spectrum allocation 3012 can be based on one or more of, for example, location 3008 of mobile device 3006, proximity to fixed stations 3016-3022, spectrum availability as indicated by a frequency map, spectrum requirements as indicated by device 3006, prior spectrum reservation for device 3006, and/or other characteristics or criteria.

As device 3006 moves to location 3010, spectrum allocation can be updated by the base station 3002. More specifically, base station 3002 can update the initial spectrum allocation 3012 and generate a new spectrum allocation 3014 for communication to device 3006 at location 3010. According to aspects, such spectrum allocation update can be performed dynamically for moving devices within the cell 3004, at a predetermined time interval, or upon reaching a predetermined location within the cell 3004. The spectrum allocation update can also be triggered by a changing frequency map caused by new devices entering the cell 3004 or existing devices leaving the cell 3004.

In some aspects, spectrum allocation update can be triggered by changing spectrum requirements associated with fixed stations within the cell 3004. For example, when mobile device 3006 is closer to station 3022 at location 3010, the station 3022 can have different spectral requirements than stations 3016-3020 which are near the initial location 3008 of devices 3006. Therefore, as device 3006 moves from location 3008 to location 3010, spectrum allocations for device 3006 can be dynamically updated and communicated to device 3006. In some aspects, spectrum allocations can also include a specific time (e.g., time window or starting time) when the indicated spectrum can be used.

FIG. 31 illustrates cognitive and autonomous allocation of spectral resources in a wireless architecture, in accordance with some aspects. Referring to FIG. 31, there is illustrated a wireless architecture 3100 including a stationary wireless device 3106, a swarm 3108 of mobile wireless devices 3103a-3103j (collectively, 3103x), and a single mobile wireless device 3112 within a cell 3104 of a base station 3102. The wireless devices 3106, 3103x and 3112 can be, for example, UEs, access points, radio heads, or other type of wireless devices configured to communicate using one or more communication protocols. Additionally, the wireless devices 3103x and 3112 can be movable devices, such as, for example, drones.

In certain aspects, the swarm 3108 can be connected and each UE 3103x can be cognizant of the other UEs in the swarm 3108 via, for example, device-to-device (D2D) communications and discovery. In certain aspects, the swarm 3108 can include edge devices (e.g., 3103a-3103h) and inner devices (e.g., 3103i-3103j). The edge devices can define a physical periphery of the swarm 3108. The edge devices 3103a-3103h can further include at least one leading edge device (or a swarm leader) 3103a. In certain aspects, a swarm leader 3103a can be configured to generally first measure signal changes associated with a cell boundary, perform signal sensing and signal measurement associated with one or more existing devices within a current cell, communicate with the base station 3102 in connection with spectrum sensing measurements, spectrum allocation requests, spectrum allocation determinations, and other information. In some aspects, the swarm leader 3103a can further communicate spectrum related information received from the base station 3102 to devices within the swarm 3108. For example, information available to the swarm leader 3103a can be communicated to other devices within the swarm 3108 via a D2D communication protocol or another type of wireless protocol.

In some aspects, one or more of the devices within the wireless architecture 3100 can autonomously sense the wireless spectrum and allocate or request spectrum resources based at least on the sensed spectrum. For example, mobile wireless device 3112, upon entering cell 3104 of base station 3102, can sense the wireless spectrum and acquire spectrum sensing data 3108 and 3120. For example, spectrum sensing data 3108 can indicate one or more frequencies used by devices within the swarm 3108, frequency channels used, signal transmit power, and other information. Similarly, spectrum sensing data 3120 can be indicative of communication spectrum used by stationary device 3106. Based on the spectrum sensing data 3108 and 3120, device 3112 can autonomously determine a desired spectrum allocation 3122, which can be communicated to base station 3102. Base station 3102 can then update a frequency map (e.g., 3114) based on the indicated desired spectrum allocation 3122. For example, the spectrum allocation 3122 can indicate a desired operating frequency, frequency channel, spatial resource, and other characteristics determined by the wireless device 3112. In some aspects, the base station 3102 can communicate a modified spectrum allocation back to device 3112, based on currently available spectrum, proximity of device 3112 to other stationary or moving devices within the cell 3104, or other factors.

In some aspects, cognitive spectrum allocation can be performed within the wireless architecture 3100. More specifically, cognitive spectrum allocation can be performed (e.g., by a dedicated server or a base station) based on sensed network conditions, such as spectrum usage, device density, device transmit power, bandwidth requirements of individual devices within the wireless architecture 3100, and other information. In reference to FIG. 31, when swarm 3108 enters cell 3104, a spectrum information request 3117 can be communicated (e.g., by the drone leader 3103a) to the base station 3102. In response to the spectrum information request 3117, the base station 3102 can communicate the frequency map 3114 to one or more devices within the swarm 3108 (e.g., the drone leader 3103a). Based on information within the frequency map 3114 (e.g., available spectrum within the wireless architecture 3100), the drone leader 3103a can select spectrum for use by one or more devices within the swarm 3108. A spectrum allocation 3116 indicating the selected spectrum can then be communicated to the base station 3102, and can be used by the base station 3102 for updating the current frequency map 3114. In this regard, cognitive spectrum allocation can be performed by autonomous spectrum allocation by individual devices within the wireless architecture 3100.

In some aspects, cognitive spectrum allocation can be performed by the base station 3102 or by another dedicated server within the architecture 3100. For example, base station 3102 can acquire spectrum sensing data from existing devices within the cell 3104, and generate (or update) the frequency map 3114. Upon entry of a new device within the cell 3104, the base station 3102 can allocate spectrum for the new device based on the current frequency map. When a communication device leaves the cell 3104, the base station 3102 can update the frequency map 3114 and can adjust the spectrum allocation for one or more remaining devices within the cell 3104. In this case, corresponding spectrum allocation messages can be communicated to individual devices or swarms within the cell 3104.

Figure 32:
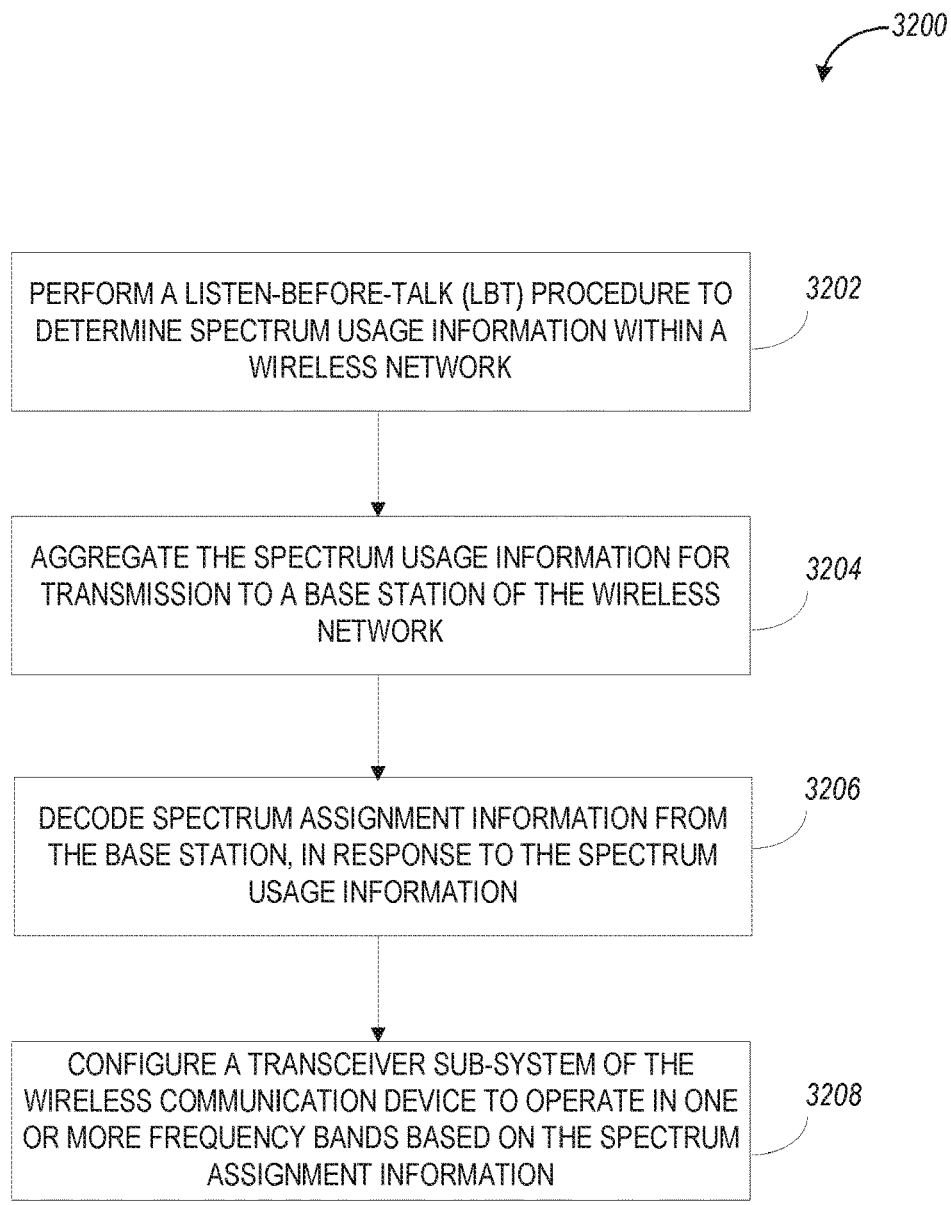
FIG. 32 and FIG. 33 illustrate flow diagrams of example methods for resource allocation, in accordance with some aspects.
Figure 33:
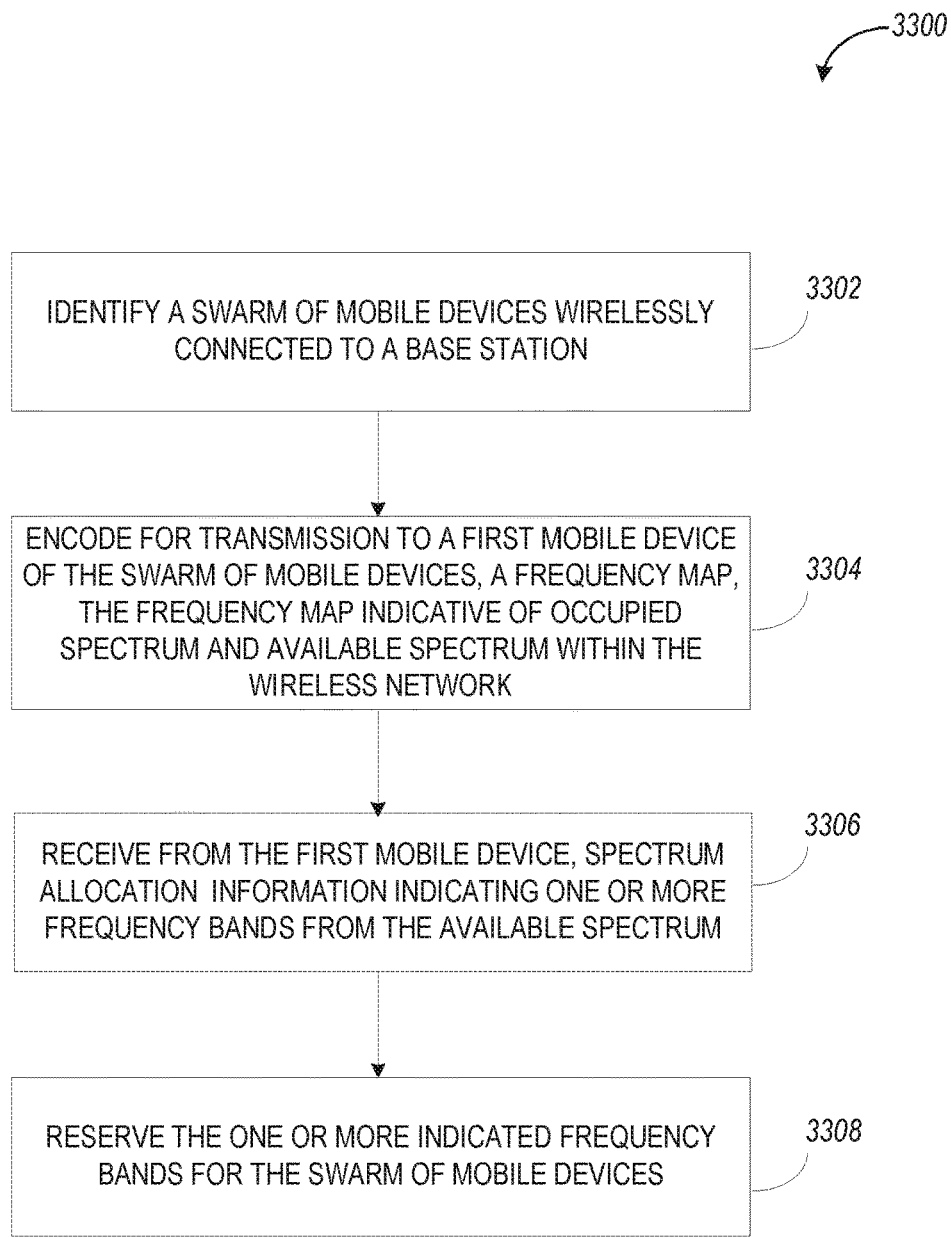

FIG. 32 and FIG. 33 illustrate flow diagrams of example methods for resource allocation, in accordance with some aspects. Referring to FIG. 32, the example method 3200 may start at operation 3202, when a listen-before-talk (LBT) procedure (or another type of spectrum sensing procedure) can be performed by a wireless device to determine spectrum usage information within a wireless network. For example, and in reference to FIG. 31, upon entering the cell 3104, communication device 3112 can obtain spectrum sensing information 3108 and 3120 associated with spectrum usage by other devices within the cell 3104.

At operation 3204, the spectrum usage information can be aggregated for transmission to a base station of the wireless network. For example, device 3112 can aggregate the spectrum sensing information 3108 and 3120 and can transmit the aggregated spectrum sensing data to the base station 3102 for assessment. At operation 3206, spectrum assignment information can be received from the base station, in response to the spectrum usage information. For example, the base station 3102 can make a determination and allocate spectrum to the device 3112, based on the spectrum sensing data received from device 3112. At operation 3208, transceiver subsystem of the wireless communication device can be configured to operate in one or more frequency bands based on the spectrum assignment information. For example, wireless device 3112 can configure its transceiver subsystem to operate in one or more frequency bands indicated by the spectrum allocation received from the base station 3102.

Referring to FIG. 33, the example method 3300 can start at operation 3302, according to which a swarm of mobile devices wirelessly connected to a base station can be identified. For example, and in reference to FIG. 31, the base station 3102 can identify swarm devices 3103x associated with swarm 3108, after the swarm 3108 has entered cell 3104. At operation 3304, a frequency map can be encoded for transmission to a first mobile device of the swarm. For example, frequency map 3114, which indicates occupied and available spectrum within the wireless architecture 3100, can be communicated to the swarm leader 3103a after the swarm 3108 has entered the cell 3104.

According to aspects, at operation 3306, spectrum allocation information can be received from the first mobile device, indicating one or more frequency bands from the available spectrum. For example, after the base station 3102 has communicated the frequency map 3114 to the swarm leader 3103a, the base station 3102 can receive spectrum allocation 3116 from the swarm leader 3103a. The spectrum allocation information 3116 can indicate one or more frequency bands selected by the swarm leader 3103a for use by mobile devices within the swarm 3108 to communicate within the wireless architecture 3100. At operation 3308, the one or more indicated frequency bands can be reserved for the swarm of mobile devices. For example, after the base station 3102 receives the spectrum allocation 3116, the base station 3102 can reserve the indicated spectrum within the spectrum allocation 3116, and may update the current frequency map 3114 based on the spectrum allocation 3116.

In handover scenarios (e.g., as described in reference to FIGS. 7-8), it is desirable that connections, data or voice connections, for each mobile device or UE are robustly transferred or handed-over from the one cell to the other cell. Since a large number of UEs simultaneously or near-simultaneously employing handover assistance can overwhelm a cell infrastructure, one or more of the following techniques can be used to initiate handover of a UE or a swarm of UEs from one cell to another.

In certain aspects, an example method can account for measurement information available at either the network or a UE to determine when to trigger a handover. In some aspects, the measurement information can be combined with location or trajectory information of the UE to determine when to trigger a handover. In some aspects, the network can use the combined information to trigger the handover. In some aspect, the UE can use the combined information to trigger the handover.

In certain aspects, a network side circuit such as a base station or a mobility management entity (MME) can store or maintain map information. The map information can include locations of UEs within particular cells of the network. The maps can be constructed using learning or using crowd sourcing information. In some aspects, UEs can report their position to the network to assist in generating the map information. In some aspects, UE reported location information can be used to augment crowdsourced information. In some aspects, UE reported location information can be used to predict or reduce errors in crowd-sourced information. In certain aspects, the map information can be used for cell or beam association. Map information can be shared with other UEs as well as with other base stations and network side components or circuits.

In certain aspects, a UE or a base station can use the map information to trigger a handover. Location information may also be combined with measurement reports and past map information to trigger a handover. The UE may trigger a handover based on a planned trajectory. Similarly, dual radio UEs may trigger or de-activate "dual-connectivity" modes based on location or trajectory. In some aspects, a handover can be triggered in certain situations when the map information also includes blocker information about structures or locations that appear to block a cell signal.

Figure 34:
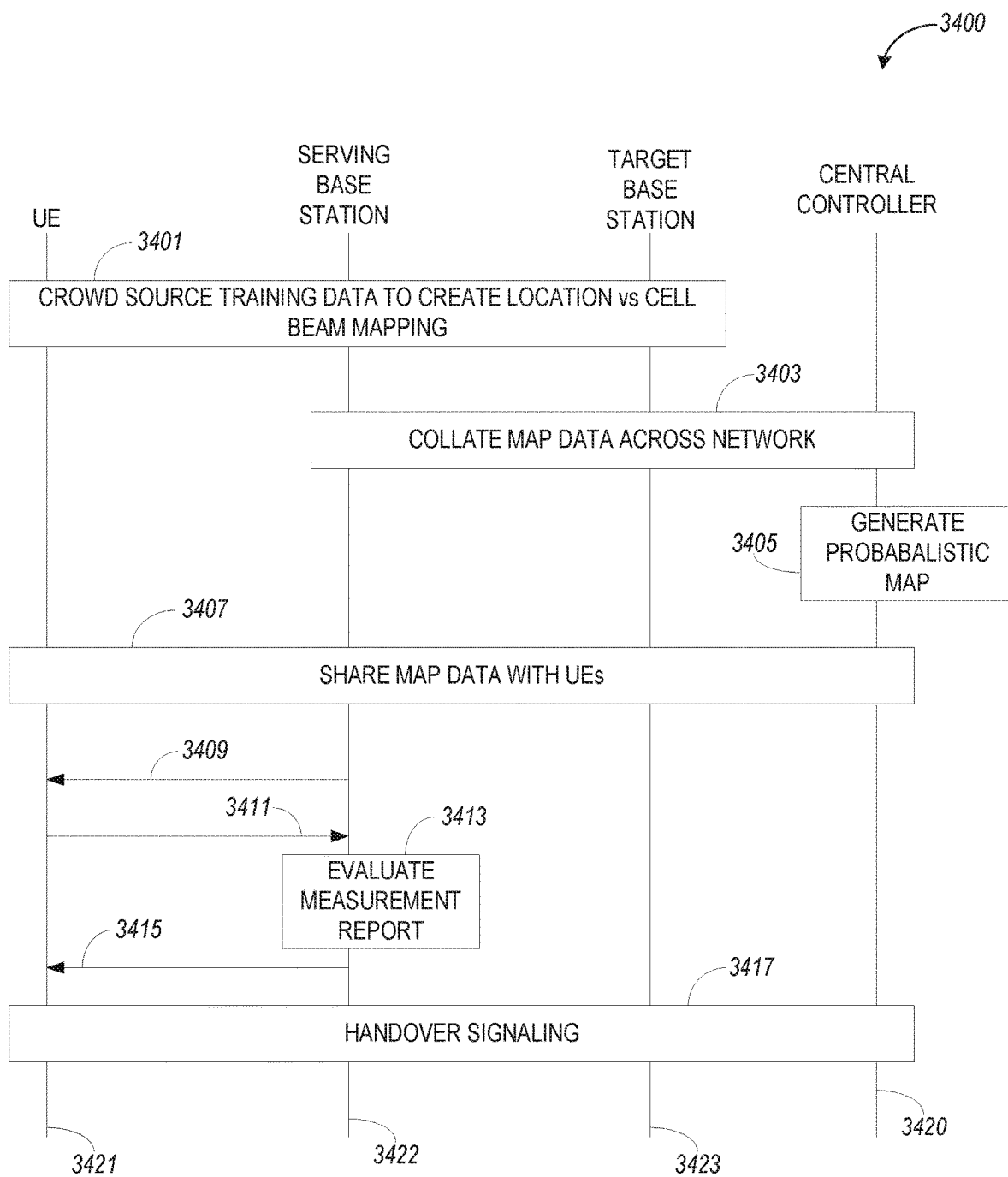
FIG. 34 illustrates generally signaling of an example method for combining measurement and location information for triggering a handover, in accordance with some aspects.

The UE or the network can determine trajectory information. For example, the UE can use global positioning data to determine the trajectory of the UE. In an aspect, the base station can determine a UE trajectory using measurement reports and the map information. In some aspects, a UE can own the handover triggering such that the UE triggers based on a location-based trigger and a measurement trigger. In such an example, the UE can send a handover command instead of sending one or more measurement reports. FIG. 34 illustrates generally signaling of an example method 3400 for combining measurement and location information for triggering a handover. At 3401, training data can be crowd sourced for the purpose of creating a location versus cell beam mapping. At 3403, the training data can be collated across the network. Such collation can allow the data to be shared, as well as, allow various network components to filter the training data such that remote training data does not influence local mapping according to some aspects. At 3405, the map information can be used to generate a probabilistic map of location versus cell beam association. In some aspects, a central network controller 120 can generate the mapping information.

At 3407, the probabilistic map, the mapping data, or combinations thereof can be shared with a UE 3421 of a serving base station 3422. At 3409, the serving base station 3422 can provide configuration information to UE 3421 for measurement reports and can provide location-based triggers for handovers. In certain aspects, the location based triggers can be based on historical handover locations within the serving cell. The configuration reports can combine aspects of the probabilistic map with the location triggers to evaluate whether a measurement or handover threshold has been satisfied. At 3411, the UE 3421 can provide measurement reports in accordance with the configuration information to the serving cell. At 3413, the serving base station 3422 can evaluate the measurement report received from the UE 3421 against the serving base station's location triggers and probabilistic map, as well as, available resources. In instance during which the measurement report satisfies a handover threshold to a target base station 3423, at 3415, the serving base station 3422 can provide the UE 3421 with a handover command. At 3417, upon acknowledgement of the handover command, the UE 3421, the serving base station 3422, and the target base station 3423 can commence a handover sequence and associated handover signaling.

Figure 35:
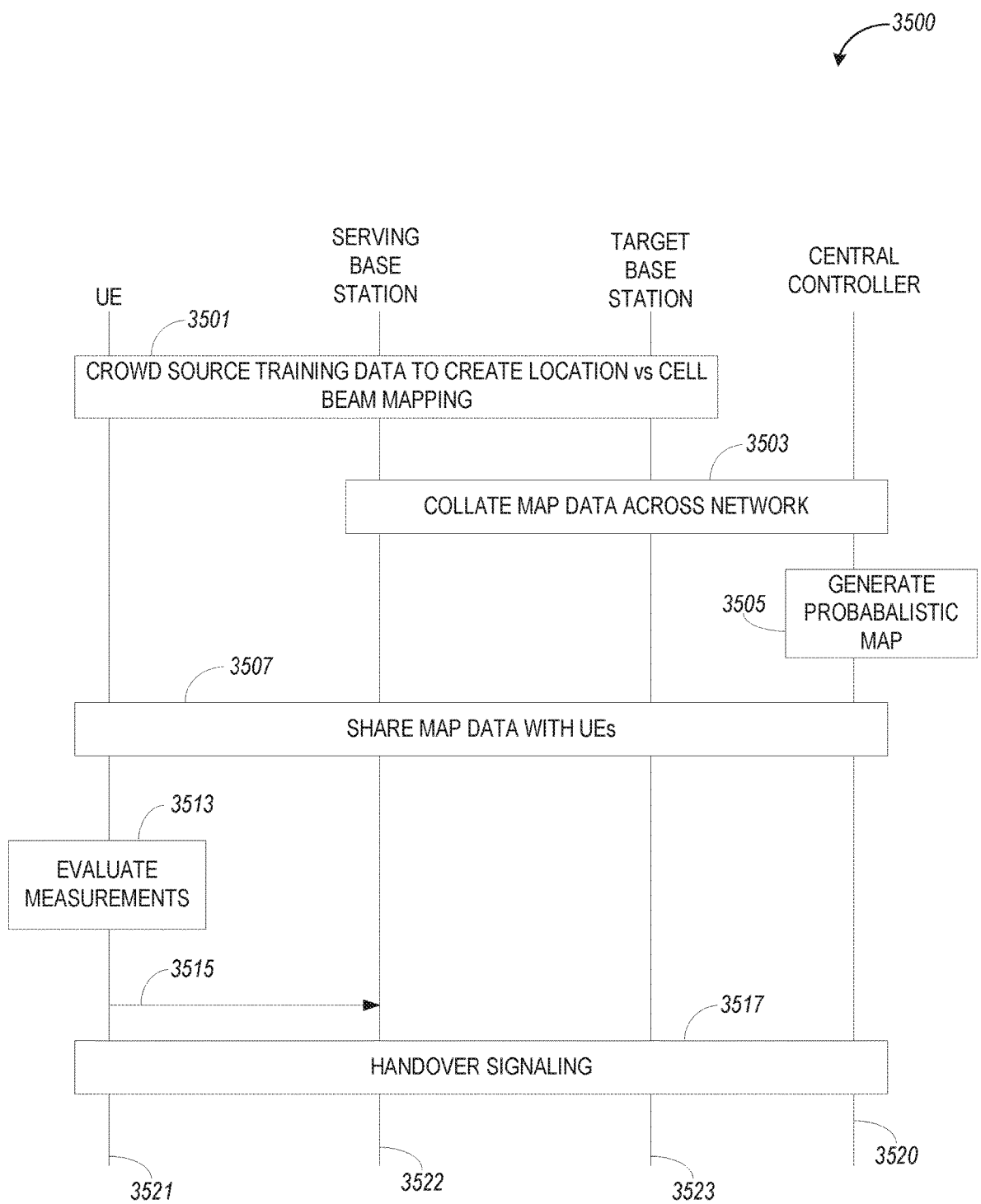
FIG. 35 illustrates generally signaling of an example method for combining measurement and location information for triggering a handover initiated by a UE, in accordance with some aspects.

FIG. 35 illustrates generally signaling of an example method 3500 for combining measurement and location information for triggering a handover initiated by a UE. At 3501, training data can be crowd sourced for the purpose of creating a location versus cell beam mapping. At 3503, the training data can be collated across the network. Such collation can allow the data to be shared, as well as, allow various network components to filter the training data such that remote training data does not influence local mapping. At 3505, the map information can be used to generate a probabilistic map of location versus cell beam association. In some aspects, a central network controller 120 can generate the mapping information.

At 3507, the probabilistic map, the mapping data, or combinations thereof can be shared with a UE 3521 of a serving base station 3522. At 3513, the UE 3521 can evaluate measurement data, probabilistic map information, and, optionally, location triggers to determine if a handover threshold has been satisfied. At 3515, the UE 3521 can provide the serving base station 3522 with a handover command. At 3517, upon acknowledgement of the handover command, the UE 3521, the serving base station 3522, and the target base station 3523 can commence a handover sequence and associated handover signaling.

Figure 36:
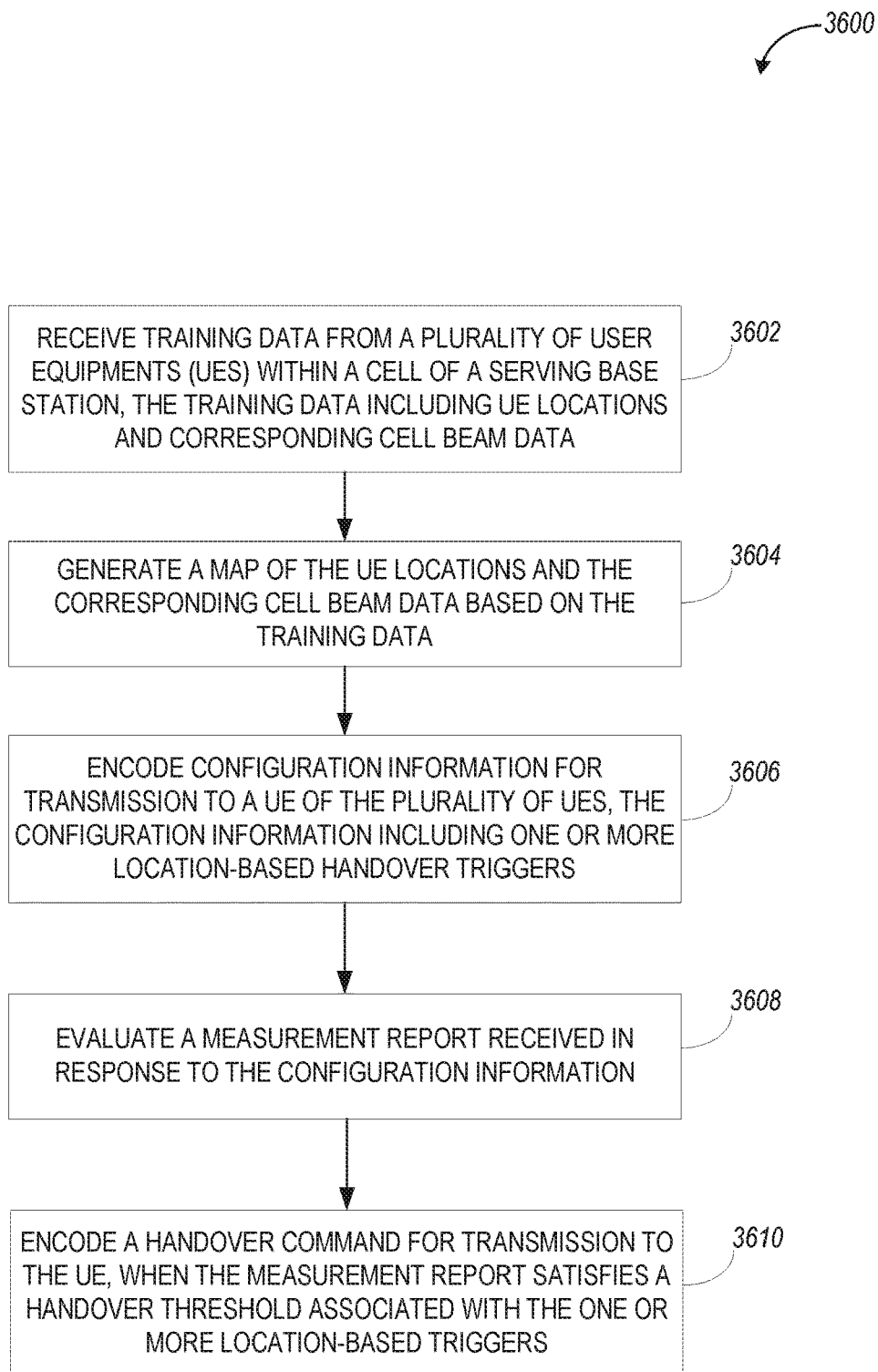
FIG. 36 illustrates an example method for performing handover using location-based triggers, in accordance with some aspects.

FIG. 36 illustrates an example method for performing handover using location-based triggers, in accordance with some aspects. Referring to FIG. 34 and FIG. 36, the example method 3600 can start at 3602, when training data can be received from a plurality of user equipments (UEs) within a cell of a serving base station (e.g., 3422). In some aspects, the training data can include UE locations and corresponding cell beam data used by one or more of the UEs when at the UE locations. At 3604, a map of the UE locations and the corresponding cell beam data can be generated based on the training data. For example, such map can be generated by the central controller 3420. In some aspects, the central controller 3420 can be part of the serving base station 3422 or the target base station 3423. At 3606, configuration information can be encoded (e.g., by the serving base station 3422) for transmission to a UE of the plurality of UEs. In some aspects, the configuration information can include one or more location-based handover triggers. In some aspects, each of the triggers can be associated with a geographic location or other location (e.g., on the generated probabilistic map at 3405) of a UE, and can be used for initiating a handover when the UE is at the specific location associated with the trigger. At 3608, a measurement report received in response to the configuration information can be evaluated (e.g., at 3413). At 3610, a handover command can be encoded for transmission to the UE (e.g., at 3415), when the measurement report satisfies a handover threshold associated with the one or more location-based triggers.

Figure 37:
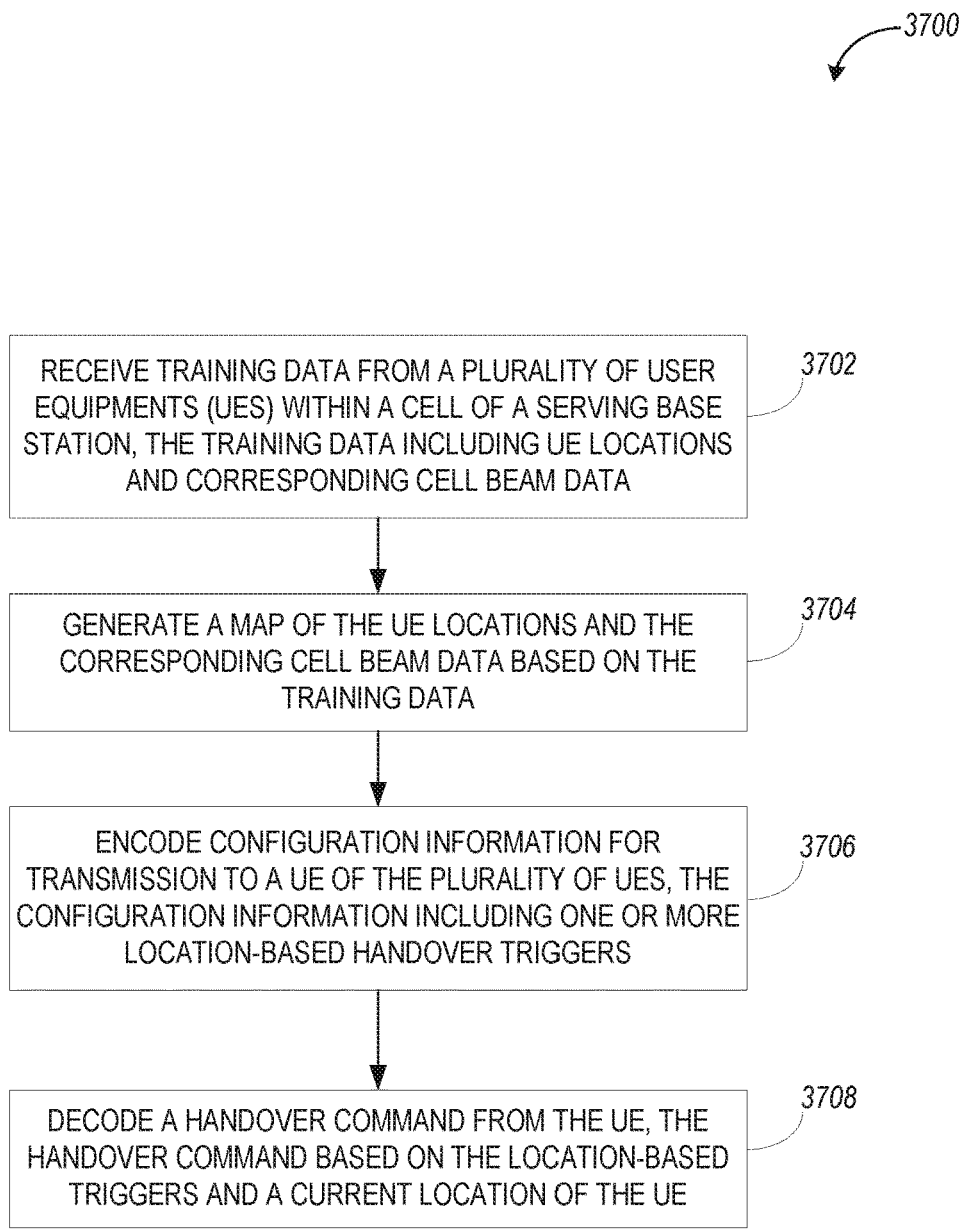
FIG. 37 illustrates an example method for performing handover using location-based triggers, in accordance with some aspects.

FIG. 37 illustrates an example method for performing handover using location-based triggers, in accordance with some aspects. Referring to FIG. 35 and FIG. 37, the example method 3700 can start at 3702, when training data is received (e.g., at 3501) from a plurality of user equipments (UEs) within a cell of a serving base station. In some aspects, the training data includes UE locations and corresponding cell beam data (i.e., beam information including beamforming data). AT 3704, a map of the UE locations and the corresponding cell beam data can be generated based on the training data (e.g., at 3503 and 3505 in FIG. 35). At 3706, configuration information can be encoded for transmission to a UE of the plurality of UEs, the configuration information including one or more location-based handover triggers. At 3708, a handover command can be decoded from the UE (e.g., at 3515). In some aspects, the handover command can be based on the location-based triggers and a current location of the UE. For example, when the UE determines that a current UE location is the same as (or within a predetermined threshold distance) of a location indicated by the location-based trigger, the UE can generate and communicate the handover command (e.g., at 3515) to the serving base station 3522.

In some aspects, UEs can connect with other UEs via a cellular network for long periods of times and over many sessions without a connection being unexpectedly terminated due to lack of a signal. However, such unexpected terminations do still happen. As described herein, various techniques can be used (e.g., in connection with mobile base stations, or eNBs) to enhance coverage of a cell-based wireless network and improve connectivity, e.g., during handover procedures, such as illustrated in connection with FIGS. 7-8.

In certain aspects, source and target base stations can coordinate movement to reduce interference observed at the UE. In some aspects, source and target base stations can move to improve signal to noise ratio (SNR) at different stages of handover of one or more UEs from the source base station to the target base station. In some aspects, the mobile base stations can be part of a vehicle such as a car, bus, plane, drone, robot, boat, or other device. For example, during handover, the signal-to-noise ratio (SNR) between a UE and the serving base station (or eNB) can be declining and the SNR to the target base station (or eNB) can be improving Signaling overhead may be high during a handover. If SNR declines significantly during handover, the handover may fail. The failure condition and low-SNR condition can be especially observable at a cell edge, or when there is a mobile or stationary blocker between or near a signal path of the UE and the source base station. According to certain aspects of the present disclosure, the source and/or target base stations can coordinate movements during handover to prevent handover failure or even to prevent a handover event. The coordinated movements can also help prevent interference.

In certain aspects, a movement algorithm for one or more mobile base stations can be formulated via a learning algorithm, such as enforcement learning. The learning algorithm can determine threshold conditions for adjusting a position of a mobile base station to assist cell coverage or to assist handover events. In some aspects, the learning algorithm can be based on the algorithms provided below with respect to FIGS. 39-51.

Figure 38:
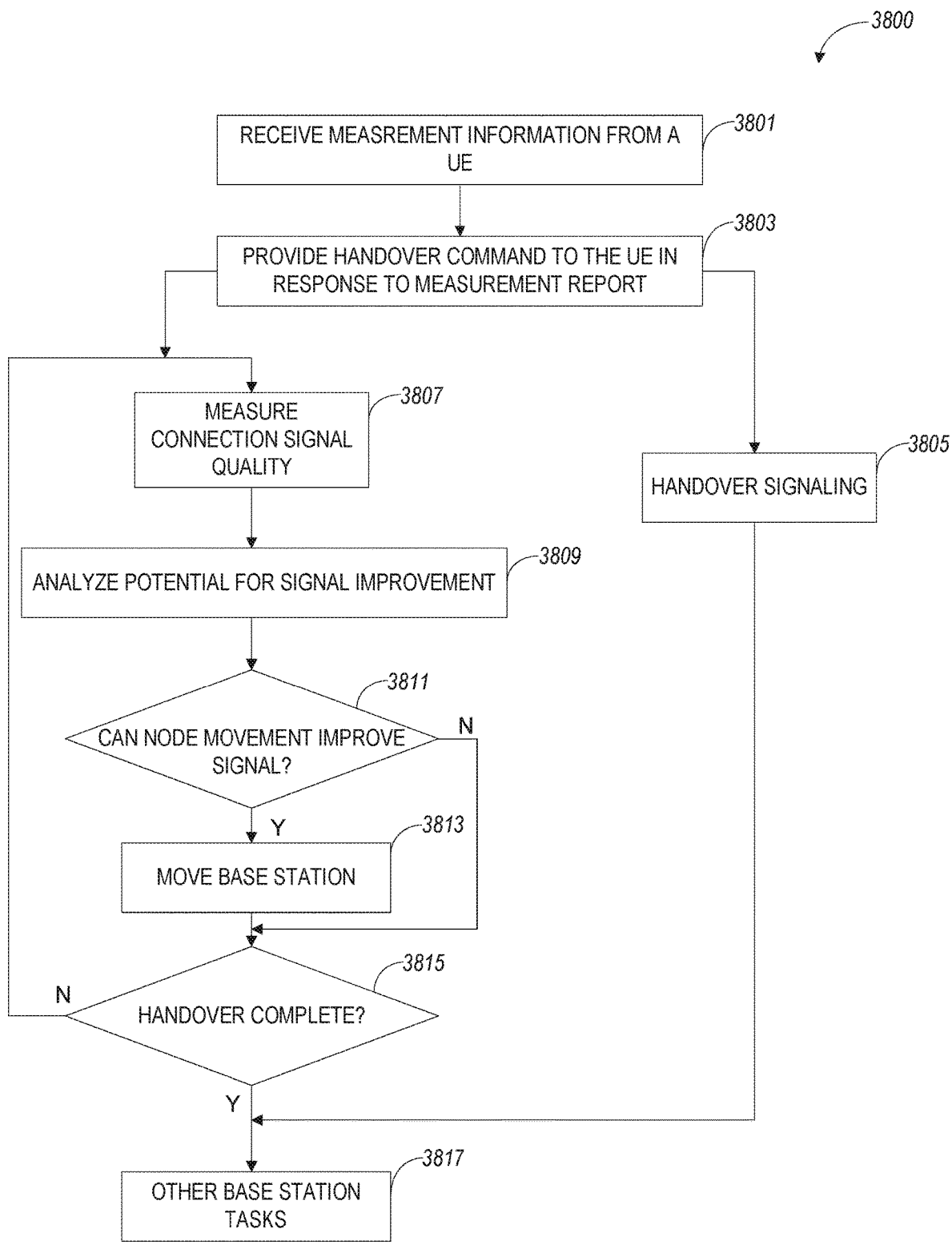
FIG. 38 illustrates graphically an example method of adjusting a mobile base station to assist a handover event, in accordance with some aspects.

FIG. 38 illustrates graphically an example method 3800 of adjusting a mobile base station to assist a handover event. At 3801, a mobile base station can receive measurement information from a UE the mobile base station is serving. At 3803, the mobile base station, after analyzing the measurement report and determining the UE can be better served by a different base station, can issue a handover command to the UE. At 3805, the mobile base station can execute the handover using signaling between the mobile base station, the UE, and the new base station. At 3807, simultaneously with executing the handover signaling 3805, the base station can monitor signal quality of the connection between the UE and the mobile base station, between the UE and the new base station, or combinations thereof. At 3809, the mobile base station can analyze the signal quality and estimate signal quality if the mobile base station changes a speed, trajectory, or location of the mobile base station. The analysis can rely one or more data sets the mobile base station has accumulated or can access. Such data sets can include signal mapping information, blocker information, probability of signal outage information, allowable movement range of the mobile base station, or combinations thereof. At 3811, if the analysis indicates a change in speed, position or trajectory of the serving base station, or serving base station node can improve signal quality during the handover, at 3813, the mobile base station can move, or change speed, trajectory, or position, to improve the signal quality. At 3811, if the analysis does not indicate the movement of the serving bases station can improve signal quality, or a change of position, trajectory, or speed of the mobile base station has been initiated, the method continues. At 3815, the handover sequence is monitored to determine if the handover has completed. If not, the monitoring of the connection signal quality is repeated at 3807. If the handover is complete, the method 3800 moves on to other mobile base station tasks at 3817.

In some aspects, a mobile base station can also monitor a backhaul connection during handover and can move according to a change in speed, position or trajectory, assisting in improving signal quality of the backhaul connection. In certain aspects, the target base station can be a mobile base station and can also monitor quality of various signals for the purpose of determining whether a change in speed, trajectory or position of the target mobile base station can improve the quality of one or more of connections using the signal and, if so, make the appropriate change within the constraints of the allowable range of positions of the target mobile base station.

Many radio access networks deploy their cells as stationary entities. Examples include base stations deployed at fixed locations throughout a mobile broadband coverage area and access points placed at a fixed location in a residential or commercial are. Given their fixed locations, these cells may not be able to move to dynamically respond to the positioning of their served terminal devices. While various types of aerial cells (such as cell-equipped drones) have been proposed, these aerial cells have not been fully developed and have not been commercially deployed.

A set of moving cells providing sensing access, and/or backhaul services may improve or optimize their positioning within a coverage area. As described herein, there are various applicable use cases for this trajectory control for outer and backhaul moving cells. Without limitation, these use cases can include scenarios in which a set of backhaul moving cells cooperates with a central trajectory controller to optimize their trajectories to serve devices that are not controlled by the central controller, and scenarios in which a set of backhaul moving cells and a set of outer moving cells (providing sensing or access) cooperate with each other and with a central controller to optimize their trajectories. According to various aspects described herein, trajectory algorithms for the moving cells and central trajectory controller can be used to determine optimized trajectories for the moving cells. The moving cells can be any type of mobile cell, including for example, aerial and terrestrial.

Figure 39:
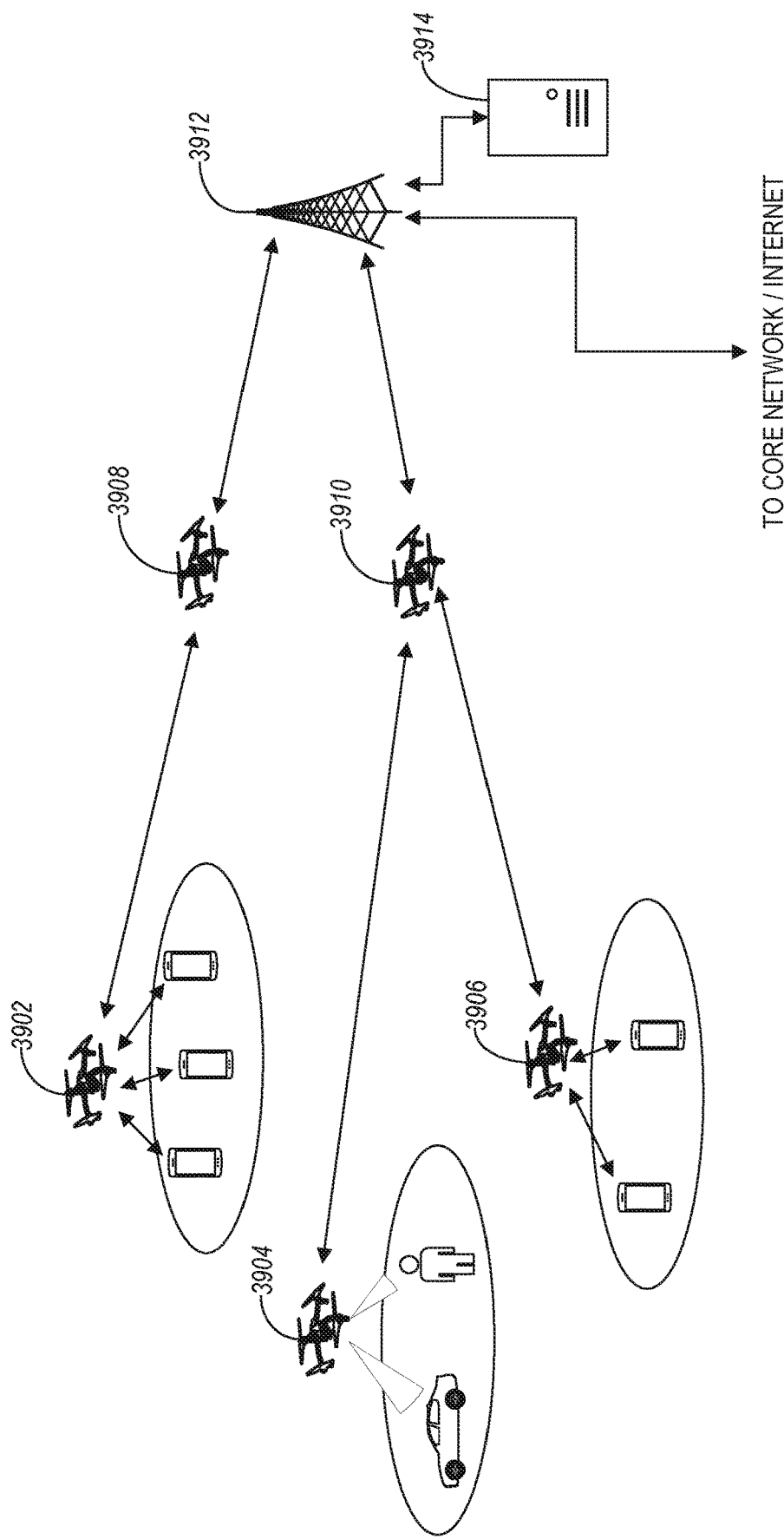
FIG. 39 shows an exemplary network diagram according to some aspects.

FIG. 39 shows an exemplary network diagram according to some aspects. As shown in FIG. 39, a set of outer moving cells 3902-3906 may be configured to perform an outer task for their respective target areas. The outer task can be sensing in which the outer moving cells 3902-3906 perform sensing with local sensors (e.g., audio, video, image, position, radar, light, environmental, or any other type of sensing component) to obtain sensing data for their respective target areas. Additionally, or alternatively, the outer task can be access, in which outer moving cells 3902-3906 provide fronthaul access to terminal devices (as shown in FIG. 39) located in their respective target areas. In some aspects, each of the moving cells 3902-3906 may perform the same outer task, while in other aspects some of moving cells 3902-3906 may perform different outer tasks (e.g., some perform sensing while others perform access). The number of outer moving cells illustrated in FIG. 39 is exemplary and is scalable to any quantity.

The outer moving cells 3902-3906 may generate uplink data for transmission back to the network. In the case of sensing outer moving cells, the sensing outer moving cells may generate sensing data that is sent back to a server for storage and/or processing (e.g., to evaluate and interpret the sensing data, such as for surveillance/monitoring control of moving vehicles, or other analytics). In the case of access outer moving cells, their respectively served terminal devices may generate communication data (e.g., control and user data) that is sent back to the radio access, core, and/or external data networks. This sensing and communication data may be the uplink data.

As shown in FIG. 39, outer moving cells 3902-3906 may use backhaul moving cells 3908 and 3910 for backhaul. Accordingly, outer moving cells 3902-3906 may transmit their uplink data to backhaul moving cells 3908 and 3910. Backhaul moving cells 3908 and 3910 may then receive this uplink data, and transmit the uplink data to network access node 3912 (e.g., may relay the uplink data to network access node 3912, which can include any type of relaying scheme including those with decoding and error correction). Network access node 3912 may then use and/or route the uplink data as appropriate. For example, network access node 3912 may locally use uplink communication data related to access stratum control data (e.g., at its protocol stack), route uplink communication data related to non-access stratum control data to core network control nodes, and route sensing data and uplink communication data through the core network on the path towards its destination (e.g., a cloud server for processing sensing data, or an external data network associated with user data). The number of backhaul moving cells illustrated in FIG. 39 is exemplary and is scalable to any quantity.

The positioning of outer moving cells 3902-3906 and backhaul moving cells 3908 and 3910 may impact communication and/or sensing performance. For example, when performing sensing or access, outer moving cells 3902-3906 may each have target areas to perform sensing on or to provide access to (where their respective target areas can be geographically fixed or dynamic). Outer moving cells 3902-3906 may therefore not be completely free to move to any location, as they may be expected to stay at a position that allows them to effectively serve their respective target areas. However, in some cases the optimal position to serve the target area may not be the optimal position to transmit uplink data to backhaul moving cells 3908-3910. This can occur, for example, when the line-of-sight (LOS) path from the optimal serving position to backhaul moving cells 3908 and 3910 is blocked by some object, or when the optimal serving position is far from backhaul moving cells 3908 and 3910.

Backhaul moving cells 3908 and 3910 may experience similar positioning issues. For example, as shown in FIG. 39, backhaul moving cell 3910 may provide backhaul to outer moving cells 3904 and 3906. As outer moving cells 3904 and 3906 serve different target areas, they may be located in different positions. The optimal backhaul position for backhaul moving cell 3910 to serve outer moving cell 3904, however, is unlikely to be the same as the optimal backhaul position for backhaul moving cell 3910 to serve outer moving cell 3906. Furthermore, even though backhaul moving cell 3910 may be able to obtain better reception performance from outer moving cells 3904 and 3906 when positioned closer to them, this positioning may mean that backhaul moving cell 3910 is located far from network access node 3912. The relaying transmission from backhaul moving cell 3910 to network access node 3912 may therefore not be as beneficial with this positioning as with other positioning.

According to certain aspects, as shown in FIG. 39, central trajectory controller 3914 may also be deployed as part of the network architecture. In some aspects central trajectory controller 3914 may be deployed as part of network access node 3912. In other aspects, central trajectory controller 3914 may be deployed separately but proximate to network access node 3912, such as in a Mobile Edge Computing (MEC) platform. In other aspects, central trajectory controller 3914 may be deployed as a server in the core network, or as a server in an external data network (e.g., part of the Internet or cloud). Although shown as a single component of FIG. 39, in some aspects central trajectory controller 3914 may be deployed as multiple separate physical components that are logically interconnected with each other to form a virtualized central trajectory controller.

Central trajectory controller 3914 may be configured to determine trajectories (e.g., fixed position or dynamic movement path) for outer moving cells 3902-3906 and backhaul moving cells 3908 and 3910. Outer moving cells 3902-3906 and backhaul moving cells 3908 and 3910 may cooperate in this trajectory determination to locally optimize their trajectories. As used herein, the term "optimize" refers to attempting to move towards an optimal value. As further described below, the underlying logic of this trajectory determination can be embodied in trajectory algorithms, according to which central trajectory controller 3914 may execute a central trajectory algorithm, outer moving cells 3902-3906 may execute an outer trajectory algorithm, and backhaul moving cells 3908-3910 may execute a backhaul trajectory algorithm. These trajectory algorithms can determine trajectories for outer moving cells 3902-3906 and backhaul moving cells 3908-3910 may therefore be based on multiple factors, such as the current locations of outer moving cells 3902-3906 and their respective target areas, the current locations of backhaul moving cells 3908 and 3910 and their respective target areas, the location of network access node 3912, and the channel conditions and transmit capabilities of the involved devices. The comprehensive logic of these trajectory algorithms is described below and by the figures.

FIGS. 40-44 show exemplary internal configurations of outer moving cells 3902-3906, backhaul moving cells 3908 and 3910, and central trajectory controller 3914 according to some aspects. With initial reference to FIG. 40, outer moving cells 3902-3906 may include antenna system 4002, radio transceiver 4004, baseband subsystem 4006 (including physical layer processor 4008 and protocol controller 4010), trajectory platform 4012, and movement system 4022. According to some aspects, antenna system 4002, radio transceiver 4004, and baseband subsystem 4006 may be configured in a similar or same manner as antennas 210, radio transceiver or RF circuitry 206, and baseband circuitry 204 as shown and described for the device 200 in FIG. 2. Antenna system 4002, radio transceiver 4004, and baseband subsystem 4006 may therefore, according to certain aspects, be configured to perform radio communications to and from outer moving cells 3902-3906, which can include wirelessly communicating with other moving cells, terminal devices, and network access nodes.

Figure 40:
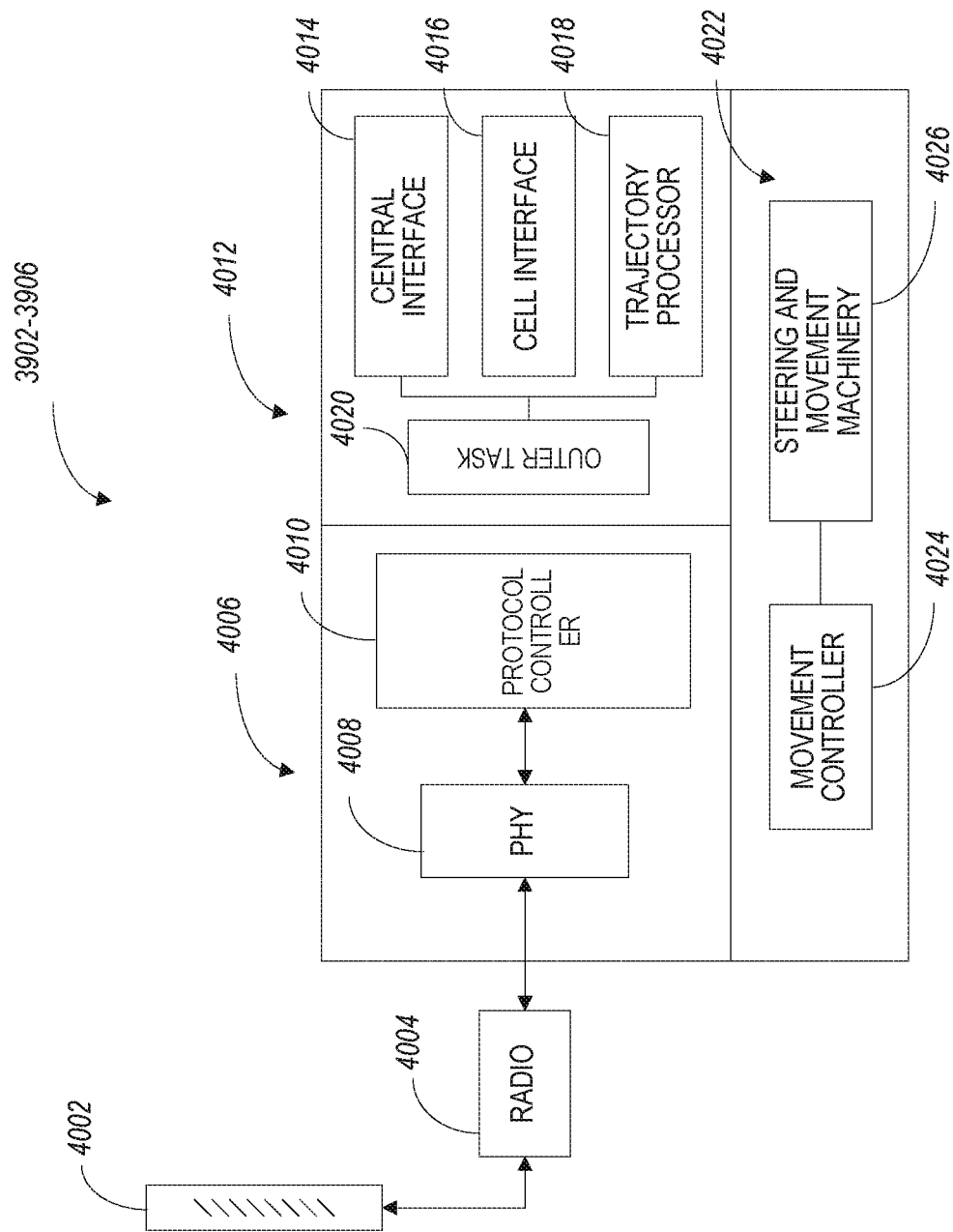
FIGS. 40-44 show exemplary internal configurations of outer moving cells, backhaul moving cells, and central trajectory controller according to some aspects.

Trajectory platform 4012 may be responsible for determining the trajectories of outer moving cells 3902-3906, including communicating with other moving cells and central trajectory controller 3914 to obtain input data and executing an outer trajectory algorithm on the input data to obtain trajectories for outer moving cells 3902-3906. As shown in FIG. 40, trajectory platform 4012 may include central interface 4014, cell interface 4016, trajectory processor 4018, and outer task engine 4020. In some aspects, central interface 4014 and cell interface 4016 may each be application-layer processors that are configured to transmit and receive data (on logical software-level connections) with central trajectory processor 3914 and other moving cells, respectively. For example, when transmitting data to central trajectory controller 3914, central interface 4014 may be configured to generate packets from the data (e.g., according to a predefined format used by central interface 4014 and its peer interface at central trajectory controller 3914) and provide the packets to the protocol stack running at protocol controller 4010. Protocol controller 4010 and physical layer processor 4008 may then process the packets according to the protocol stack and physical layer protocols and transmit the data as wireless radio signals via radio transceiver 4004 and antenna system 4002. When receiving data from central trajectory controller 3914, antenna system 4002 and radio transceiver 4004 may receive the data in the form of wireless radio signals, and provide corresponding baseband data to baseband modem. Physical layer processor 4008 and protocol controller 4010 may then process the baseband data to recover packets transmitted by the peer interface at central trajectory controller 3914, which protocol controller 4010 may provide to central interface 4014. Cell interface 4016 may similarly transmit data to a peer interface at other moving cells.

Trajectory processor 4018 may be a special-purpose processor configured to execute an outer trajectory algorithm that determines the trajectory for outer moving cells 3902-3906. As used herein, trajectories can refer to, for example, static positions, sequences of static positions (e.g., a time-stamped sequence of static positions), or paths or contours. Trajectory processor 4018 may be configured to retrieve executable instructions defining the outer trajectory algorithm from a memory (not expressly shown in FIG. 40) and to execute these instructions. Trajectory processor 4018 may be configured to execute the outer trajectory algorithm on input data to determine updated trajectories for outer moving cells 3902-3906. The logic of this outer trajectory algorithm is described herein both below and visually by the drawings.

Outer task engine 4020 may be configured to perform the outer task for outer moving cells 3902-3906. In some aspects according to which outer moving cells 3902-3906 are configured to perform sensing outer task engine 4020 may include one or more sensors. These sensors can be, without limitation, audio, video, image, position, radar, light, environmental, or another type of sensor. Outer task engine 4020 may also include at least one processor configured to provide sensing data obtained from the sensors to baseband subsystem 4006 for transmission. In some aspects according to which outer moving cells 3902-3906 are configured to provide access to terminal devices, outer task engine 4020 may include one or more processors configured to transmit, receive, and relay data from the terminal devices (via baseband subsystem 4006, which may handle the protocol stack and physical layer communication functionality).

While FIG. 40 shows outer task engine 4020 as part of trajectory platform 4012, in some aspects outer task engine 4020 may be included as part of baseband subsystem 4006.

Movement system 4022 may be responsible for controlling and executing movement of outer moving cells 3902-3906, according to some aspects. As shown in FIG. 40, movement system 4022 may include movement controller 4024 and steering and movement machinery 4026. Movement controller 4024 may be configured to control the overall movement of outer moving cells 3902-3906 (e.g., through execution of a movement control algorithm), and may provide control signals to steering and movement machinery 4026 that specify the movement. In some aspects, movement controller 4024 may be autonomous, and therefore may be configured to execute an autonomous movement control algorithm according to which movement controller 4024 directs movement of outer moving cells 3902-3906 without primary human/operator control. Steering and movement machinery 4026 may then execute the movement specified in the control signals. In some aspects according to which outer moving cells 3902-3906 are terrestrial vehicles, steering and movement machinery 4026 may include wheels and axles, an engine, a transmission, brakes, a steering wheel, associated electrical circuitry and wiring and any other components used in the driving of an automobile or other land-based vehicle. In some aspects according to which outer moving cells 3902-3906 are aerial vehicles (e.g., drones), steering and movement machinery 4026 may include one or more of rotors, propellers, jet engines, wings, rudders or wing flaps, air brakes, a yoke or cyclic, associated electrical circuitry and wiring and any other components used in the flying of an aerial vehicle. In some aspects where outer moving cells 3902-3906 are aquatic or sub-aquatic vehicles, steering and movement machinery 4026 may include any one or more of rudders, engines, propellers, a steering wheel, associated electrical circuitry and wiring and any other components used in the steering or movement of an aquatic vehicle.

Figure 41:
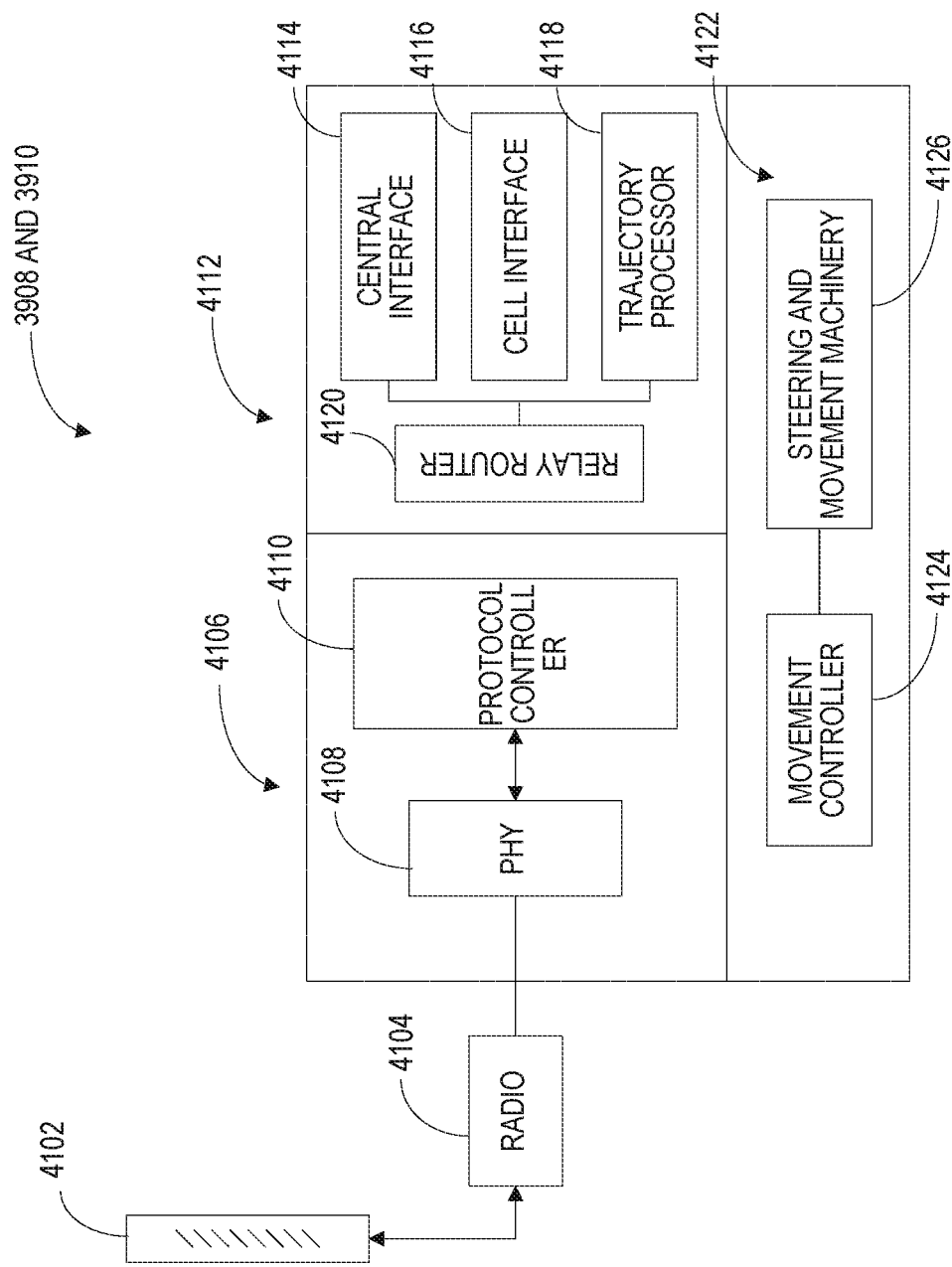

FIG. 41 shows an exemplary internal configuration of backhaul moving cells 3908 and 3910 according to some aspects. As shown in FIG. 41, backhaul moving cells 3908 and 3910 may include components similar to those of outer moving cells 3902-3906. Antenna system 4102, radio transceiver 4104, baseband subsystem 4106, central interface 4114, cell interface 4116, movement controller 4124, and steering and movement machinery 4126 may be respectively configured in the manner of antenna system 4002, radio transceiver 4004, baseband subsystem 4006, central interface 4014, cell interface 4016, movement controller 4024, and steering and movement machinery 4026 as shown and described for FIG. 40.

In contrast to trajectory processor 4018 of outer moving cells 3902-3906, trajectory processor 4118 may be configured to execute a backhaul trajectory algorithm that controls the trajectory of backhaul moving cells 3908 and 3910, according to certain aspects. This backhaul trajectory algorithm is described herein and visually by the figures.

As shown in FIG. 41, backhaul moving cells 3908 and 3910 may also include relay router 4120. As described above, backhaul moving cells 3908 and 3910 may be configured to provide backhaul services to outer moving cells 3902-3906, which can include receiving uplink data from outer moving cells 3902-3906 and relaying the up link data to the radio access network (e.g., to network access node 3912). Relay router 4120 may be configured to handle this relaying functionality, and may interact with cell interface 4116 to identify the uplink data for relaying and subsequently transmitting the uplink data to the radio access network via baseband subsystem 4106. Although shown as part of trajectory platform 4112 in FIG. 41, in some aspects relay router 4120 may also be part (e.g., fully or partially) of baseband subsystem 4106.

Figure 42:
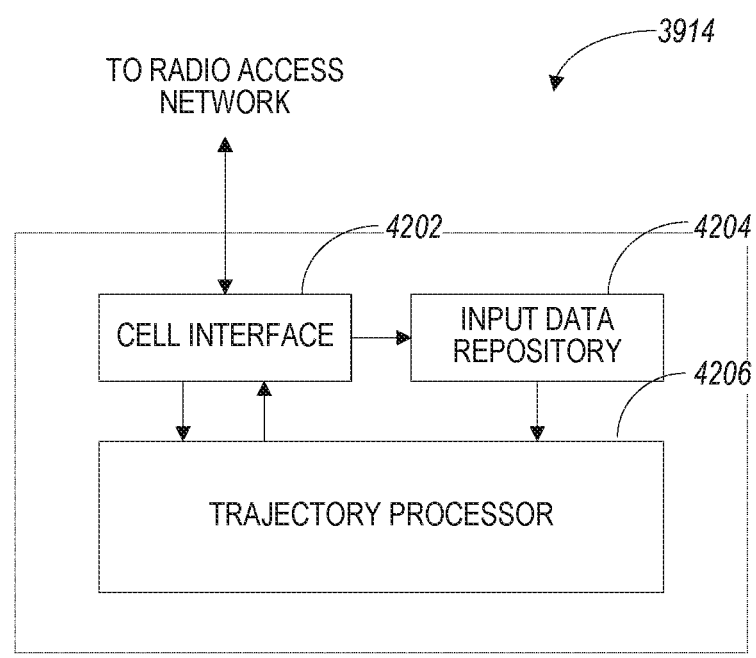

FIG. 42 shows an exemplary internal configuration of central trajectory controller 3914 according to some aspects. As shown in FIG. 42, central trajectory controller 3914 may include cell interface 4202, input data repository 4204, and trajectory processor 4206. In some aspects, cell interface 4202 may be an application-layer processor configured to transmit and receive data (e.g., on logical software-level connections) with its peer central interfaces 4014 and 4114 in outer moving cells 3902-3906 and backhaul moving cells 3908 and 3910. Cell interface 4202 may therefore send packets on the interface shown in FIG. 42, which may pass through an Internet backhaul, core network, and/or radio access network (depending on the deployment location of central trajectory controller 3914). The radio access network (e.g., network access node 3912) can transmit the packets as wireless radio signals. Outer moving cells 3902-3906 and backhaul moving cells 3908 and 3910 may be configured to receive and process the wireless radio signals to recover the data packets at their peer central interfaces 4014 and 4114.

Input data repository 4204 may be a server-type component including a controller and a memory, according to some aspects. Input data repository 4204 may be configured to collect input data for input to a central trajectory algorithm executed by trajectory processor 4206. The central trajectory algorithm may be configured to determine coarse trajectories for outer moving cells 3902-3906 and backhaul moving cells 3908 and 3910. These coarse trajectories may be the high-level, planned trajectories provided by central trajectory controller 3914. Outer moving cells 3902-3906 and backhaul moving cells 3908 and 3910 may refine these coarse trajectories using their outer and backhaul trajectory algorithms to obtain updated trajectories. In some aspects, the central trajectory algorithm may also be configured to determine initial routings for outer moving cells 3902-3906 and backhaul moving cells 3908 and 3910. These initial routings may specify the backhaul path between outer moving cells 3902-3906 and the radio access network via backhaul moving cells 3908 and 3910; or in other words, the initial routings can specify to which of backhaul moving cells 3908 and 3910 the outer moving cells 3902-3906 should transmit their uplink data. This central trajectory algorithm is described herein in prose and visually by the figures.

Figure 43:
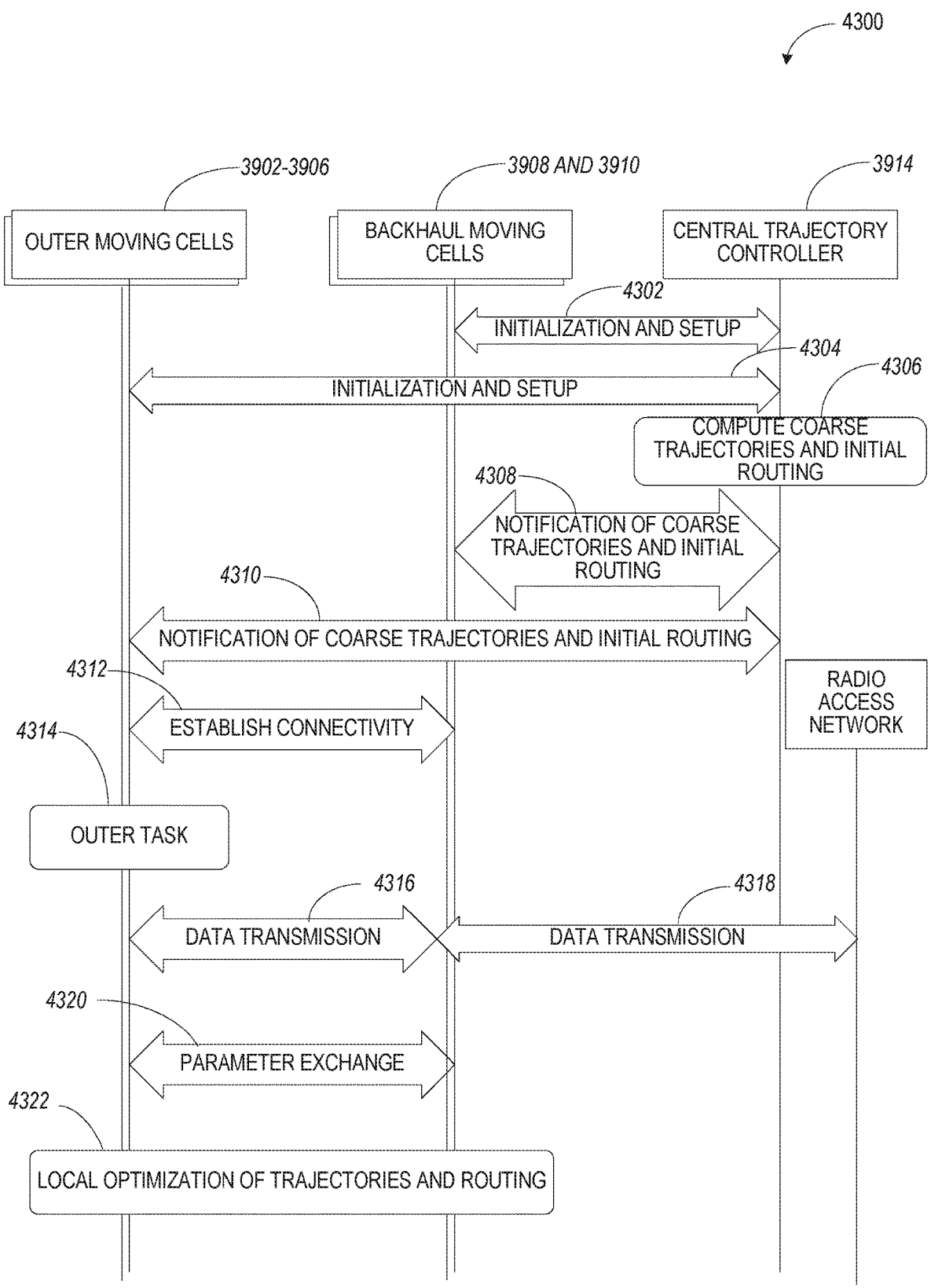

FIG. 43 shows an exemplary message sequence chart 4300 according to some aspects of signaling flow and operation involved in trajectory control for outer and backhaul moving cells. As shown in FIG. 43, outer moving cells 3902-3906, backhaul moving cells 3908 and 3910, and central trajectory controller 3914 may be involved in the trajectory control for outer and backhaul moving cells. Central trajectory controller 3914 may first perform initialization and setup with backhaul moving cells 3908 and 3910 and outer moving cells 3902-3906 in stages 4302 and 4304, respectively. For example, in stage 4302, cell interface 4202 of central trajectory controller 3914 may exchange signaling (according to a predefined initialization and setup procedure) with the central interfaces 4114 of backhaul moving cells 3908 and 3910. Cell interface 4202 may therefore establish signaling connections with backhaul moving cells 3908 and 3910.

Likewise, at 4304, cell interface 4202 of central trajectory controller 3914 may exchange signaling (according to a predefined initialization and setup procedure) with the central interfaces 4014 of outer moving cells 3902-3906, and may therefore establish signaling connections with backhaul moving cells 3902-3906. As previously discussed regarding FIG. 39, central trajectory controller 3914 may interface with network access node 3912 (e.g., as part of network access node 3912, as an edge computing component, as part of the core network behind network access node 3912, or from an external network location), and may exchange this signaling with central interfaces 4014 and 4114 over data bearers that use the radio access network provided by network access node 3912. Further references to communication between cell interface 4202 and central interfaces 4014 and 4114 refer to data exchange over such data bearers.

In addition to establishing signaling connections with outer moving cells 3902-3906 and backhaul moving cells 3908 and 3910 in stages 4302 and 4304, central trajectory controller 3914 may also obtain input data for computing coarse trajectories and initial routings as part of the initialization and setup with outer moving cells 3902-3906 and backhaul moving cells 3908 and 3910. For example, as part of stages 4302 and 4304, central interfaces 4014 and 4114 may send input data including data rate requirements (e.g., for sending sensing data or access data from served terminal devices) of outer moving cells 3902-3906, the positions (e.g., geographical locations) of outer moving cells 3902-3906 and backhaul moving cells 3908 and 3910, the target areas assigned to outer moving cells 3902-3906 (e.g., for sensing or access), recent radio measurements obtained by outer moving cells 3902-3906 and backhaul moving cells 3908-3910 (e.g., obtained by their respective baseband subsystems 4006 and 4106), and/or details about the radio capabilities of outer moving cells 3902-3906 and backhaul moving cells 3908-3910 (e.g., transmit power capabilities, effective operation range, etc.). Cell interface 4202 of central trajectory controller 3914 may receive this input data and provide it to input data repository 4204, which may store the input data for subsequent use by trajectory processor 4206. In some aspects, cell interface 4202 may also be configured to communicate with network access node 3912, and may, for example, receive input data such as radio measurements by network access node 3912 (e.g., of signals transmitted by outer moving cells 3902-3906 and backhaul moving cells 3908-3910).

Central trajectory controller 3914 may be configured to use this input data for the central trajectory algorithm executed by trajectory processor 4206. In some aspects, the central trajectory algorithm may also use, as input data, a statistical model of the radio environment between outer moving cells 3902-3906, backhaul moving cells 3908 and 3910, and the radio access network (e.g., network access node 3912 optionally in addition to one or more additional network access nodes). Statistical models of varying complexity can be used. For example, in some aspects the statistical model can be a propagation model that evaluates the distance between devices and their current radio conditions to estimate the channel conditions between the devices (e.g., that models the radio environment based on the distance between devices and their current radio conditions). In other aspects, the statistical model can be based on a radio map (e.g., a radio environment map (REM)) that indicates channel conditions over a mapped area. This type of statistical model can use more advanced geographic data to model the radio environment over geographic areas having different propagation characteristics.

Figure 44:
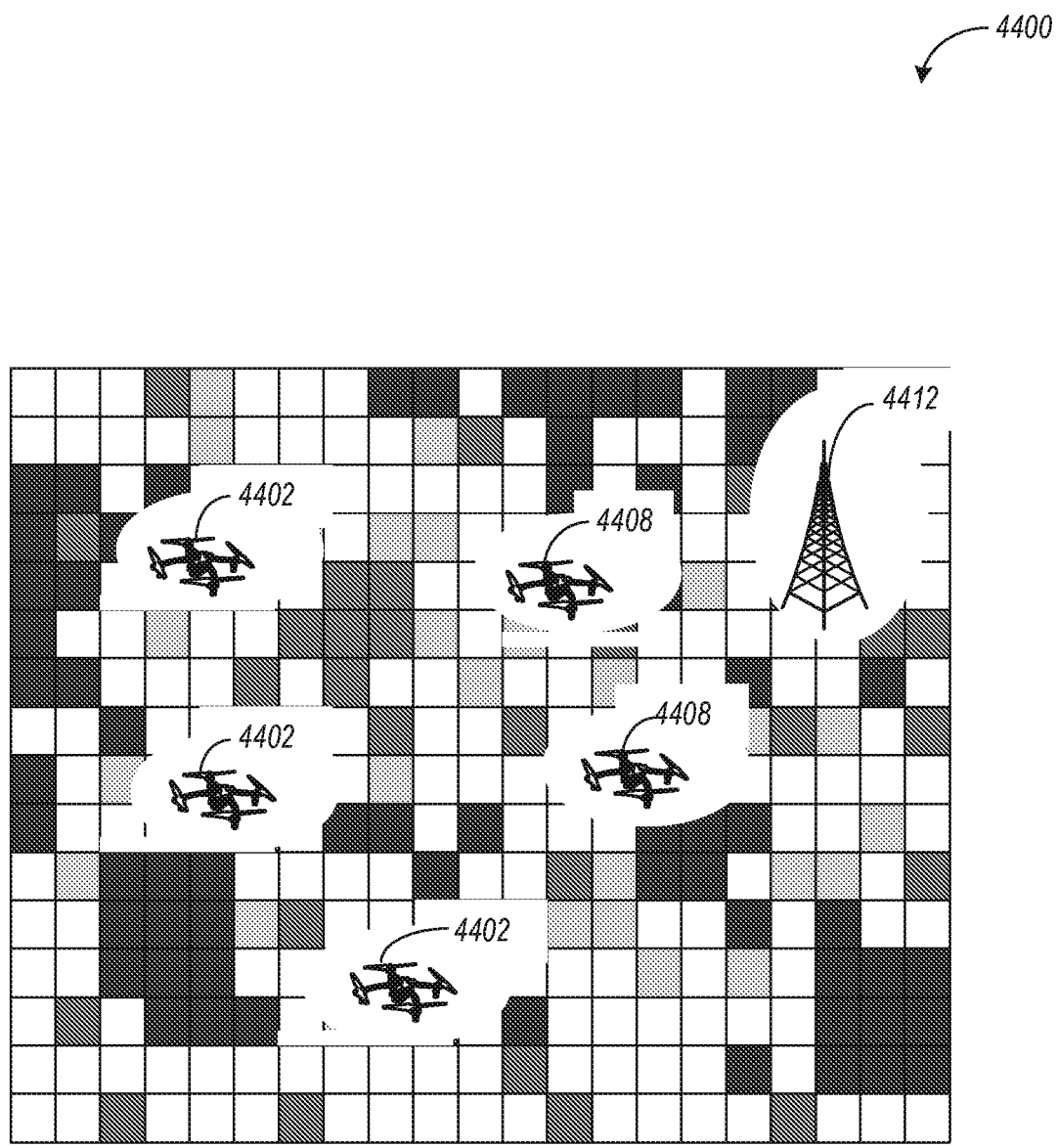

FIG. 44 shows a basic example illustrating the concept of a radio map according to some aspects. Radio map 4400 shown in FIG. 44 assigns a channel condition rating to each of a plurality of geographic units, in which lighter-colored geographic units indicate more favorable channel conditions (estimated) than darker-colored geographic units. The color/pattern of the geographic units can indicate, for example, estimated path loss of radio signals traveling through the geographic unit, in which each color can be assigned a specific path loss value (e.g., in decibels or a similar metric). The configuration of radio map 4400 is exemplary. Accordingly, other radio maps using uniform and non-uniform grids with different types of geographic unit shapes and sizes can likewise be used without limitation. While radio map 4400 depicts a single radio parameter (as indicated by the coloring/patterning of the geographic units), this is also exemplary, and radio maps can be applied that assign multiple radio parameters to the geographic units.

Input data repository 4204 may store the underlying radio map data for such a radio map. In some aspects, input data repository 4204 may download part or all of this radio map data from a remote location, such as a remote server that stores radio map data (e.g., a REM server). In some aspects, input data repository 4204 may generate part or all of the radio map data locally (e.g., based on the input data provided by outer moving cells 3902-3906, backhaul moving cells 3908 and 3910, and the radio access network).

In some aspects, input data repository 4204 may update the radio map data based on the input data provided in stages 4302 and 4304 by outer moving cells 3902-3906, backhaul moving cells 3908 and 3910, and the radio access network. For example, input data repository 4204 may be configured to match radio measurements (e.g., of the input data) with the corresponding positions of the device that made the measurement. Input data repository 4204 may then update the radio parameters in the geographic unit of the radio map in which the position is located based on the radio measurement. In this manner, this type of updating may adapt the radio map data based on actual measurements provided by devices in the radio environment.

The input data obtained by input data repository 4204 can include the input data provided by outer moving cells 3902-3906 and backhaul moving cells 3908 and 3910 as well as other input data related to the statistical model of the radio environment (e.g., for basic propagation models or radio map data). After obtaining this input data, central trajectory controller 3914 may compute the coarse trajectories and initial routings for outer moving cells 3902-3906 and backhaul moving cells 3908 and 3910 in stage 4306. For example, input data repository 4204 may provide the input data to trajectory processor 4206, which may then execute the central trajectory algorithm using the input data as input.

As described above, the outputs of the central trajectory algorithm may be coarse trajectories (e.g., static positions, sequences of static positions, or paths or contours) that central trajectory controller 3914 assigns to outer moving cells 3902-3906 and backhaul moving cells 3908 and 3910. The outputs can also include initial routings that govern the flow of data between outer moving cells 3902-3906, backhaul moving cells 3908 and 3910, and the radio access network. In some aspects, the central trajectory algorithm may be configured to compute these coarse trajectories and initial routings to optimize an optimization criteria according to the statistical model. As described above, the statistical model may provide a probabilistic characterization of the radio environment between outer moving cells 3902-3906, backhaul moving cells 3908 and 3910, and the radio access network. Accordingly, the central trajectory algorithm may evaluate the statistical model to estimate the radio environment over a range of possible coarse trajectories and/or routings, and may determine coarse trajectories and/or initial routings that optimize an optimization criteria related to the radio environment. The optimization criteria may be considered a radio link optimization criteria, according to some aspects.

For example, in some aspects the optimization criteria may be a supported data rate (e.g., a data rate supported by a radio access connection). In this example, outer moving cells 3902-3906 may have minimum data rate requirements. Outer moving cells 3902-3906 may be generating uplink data related to sensing (e.g., sensing data generated by outer moving cells 3902-3906) or related to access (e.g., uplink data generated by the terminal devices served by outer moving cells 3902-3906), and this uplink data may have a certain minimum data rate that is capable of supporting transmission of this sensing data. Accordingly, the central trajectory algorithm may therefore determine coarse trajectories and initial routings in stage 4306 that increase (e.g., maximize) a function of the supported data rate using the statistical model to approximate the data rate. This optimization or maximization can use any type of optimization algorithm, such as gradient descent (used herein to collectively refer to both gradient descent and ascent) or another optimization algorithm that incrementally 'steps' over different possible coarse trajectories and/or initial routings to find a coarse trajectory or initial routing that increases (e.g., maximizes) the supported data rate. The function of the supported data rate may therefore be a statistical expression that outputs an estimated supported data rate based on input of different parameters to the function of the supported data rate. In some aspects, the central trajectory algorithm may maximize the overall supported data rate of each backhaul relaying path outgoing from outer moving cells 3902-3906 (e.g., an aggregate across all backhaul relaying paths from outer moving cells 3902-3906 to the radio access network). In other aspects the central trajectory algorithm may maximize the probability that each backhaul relaying path outgoing from outer moving cells 3902-3906 has a supported data rate above a predefined data rate threshold.

Additionally, or alternatively, in some aspects the optimization criteria may be a link quality metric. The link quality metric can be signal strength, signal quality, signal-to-noise ratio (SNR or another related metric such as signal-to-interference-plus-noise ratio (SINR)), error rate (e.g., bit error rate (BER), block error rate (BLER), packet error rate (PER), or any other type of error rate), distance between communication devices, estimated path loss between communication devices, or any other type of link quality metric. The central trajectory algorithm can similarly be configured to determine coarse trajectories and/or initial routings for outer moving cells 3902-3906 and backhaul moving cells 3908 and 3910 by optimizing a link quality metric as the optimization criteria. For example, the central trajectory algorithm can increase (e.g., maximize) a function of the link quality metric using the statistical model to approximate the link quality metric. The function can be a function of the link quality metric itself (e.g., an aggregate over the backhaul relaying paths) or a function of the probability that the link quality metric is above a link quality metric threshold (e.g., a probability that each backhaul relaying path has a link quality metric above the link quality metric threshold).

Although the above examples identify individual optimization criteria, in some aspects the central trajectory algorithm may be configured to evaluate multiple optimization criteria simultaneously. For example, a weighted combination of the individual functions of the optimization criteria can be defined and subsequently used as the function to be maximized with the optimization algorithm.

As indicated above, the central trajectory algorithm may be configured to use the statistical model of the radio environment to approximate the function of the optimization criteria. For example, in cases in which the statistical model is a basic propagation model, the central trajectory algorithm may be configured to approximate the optimization criteria using the basic propagation model, such as by using a supported data rate function that is dependent on the relative distances between outer moving cells 3902-3906, backhaul moving cells 3908 and 3910, and the radio access network (in scenarios in which, for example, closer relative positions may yield higher supported data rates than far relative positions). The central trajectory algorithm may then attempt to find trajectories for outer moving cells 3902-3906 and backhaul moving cells 3908 and 3910 that increase this supported data rate function (e.g., according to gradient descent or another optimization algorithm). As there are multiple moving cells, this may include determining individual trajectories for outer moving cells 3902-3906 and backhaul moving cells 3908 and 3910, such that the individual trajectories (when executed together) increase the supported data rate function.

In cases in which the statistical model is based on radio map data, the central trajectory algorithm may be configured to approximate the optimization criteria using a propagation model that also depends on the radio parameters for the geographic units of the radio map, according to some aspects. The supported data rate function can therefore be dependent on the relative distances between outer moving cells 3902-3906, backhaul moving cells 3908 and 3910, and the radio access network as well as the radio parameters of the geographic units of the radio map that fall between their respective positions. The central trajectory algorithm can then likewise attempt to find trajectories for outer moving cells 3902-3906 and backhaul moving cells 3908 and 3910 that maximize this supported data rate function. As indicated above, this can include determining individual trajectories for outer moving cells 3902-3906 and backhaul moving cells 3908 and 3910 that when executed together maximize the supported data rate function.

In some aspects, the function of the optimization criteria may also depend on the routing and some routings may yield higher approximated optimization criteria than others. For example, with reference to the exemplary context of FIG. 39, outer moving cell 3902 may be able to achieve a higher supported data rate for its uplink data when using backhaul moving cell 3908 for backhaul than compared to backhaul moving cell 3910. Additionally, or alternatively, backhaul moving cells 3908 and 3910 may be able to provide backhaul relaying paths with higher supported data rates when they relay the uplink data to a particular network access node of the radio access network. As part of stage 4306, the central trajectory algorithm may therefore also treat the routings as adjustable parameters that can be used to increase the function of the optimization criteria. The central trajectory algorithm can therefore determine initial routings in stage 4306, which can include selecting to which backhaul moving cells 3908 and 3910 the forward moving cells 3902-3906 can transmit their uplink data and/or selecting to which network access node the backhaul moving cells 3908 and 3910 can relay this uplink data.

In some aspects, the central trajectory algorithm may also consider constraint parameters when determining the coarse trajectories and initial routings. For example, target areas assigned to outer moving cells 3902-3906 may act as constraints, according to which outer moving cells 3902-3906 are expected to perform their assigned outer tasks (sensing or routing) in certain target areas. Accordingly, in some cases the coarse trajectories assigned to outer moving cells 3902-3906 may be constrained to being within or near the target areas (e.g., to be proximate enough to the target area to perform the assigned outer task with outer task engine 4020). When attempting to increase the function of the optimization criteria, the central trajectory algorithm may therefore consider (e.g., exclusively) coarse trajectories of outer moving cells 3902-3906 that are constrained by their respectively assigned target areas. In some aspects, backhaul moving cells 3908 and 3910 may also have geographical constraints that the central trajectory algorithm may consider when determining the coarse trajectories.

In some aspects, the central trajectory algorithm may determine the target areas for outer moving cells 3902-3906 as part of the coarse trajectory determination. For example, the central trajectory algorithm may identify an overall target area (e.g., as reported by outer moving cells 3902-3906 as input data) that defines the overall geographic area in which the outer moving cells 3902-3906 are assigned to perform their outer tasks. Instead of treating the target area of each outer moving cell as the area to which each individual outer moving cell is assigned, the central trajectory algorithm may determine coarse trajectories for outer moving cells that increase the optimization criteria while also covering the overall target area, according to some aspects.

After determining the coarse trajectories and initial routings in stage 4306, central trajectory controller 3914 may send the coarse trajectories and initial routings to backhaul moving cells 3908 and 3910 and outer moving cells 3902-3906 in stages 4308 and 4310, respectively. For example, trajectory processor 4206 may provide the coarse trajectories and initial routing to cell interface 4202, which may then send the coarse trajectories and initial routings to its peer central interfaces 4014 and 4114 at outer moving cells 3902-3906 and backhaul moving cells 3908 and 3910. In some aspects, cell interface 4202 may identify the coarse trajectory and initial routing individually assigned to each of outer moving cells 3902-3906 and backhaul moving cells 3908 and 3910, and may then transmit the coarse trajectory and initial routing to each moving cell to the corresponding central interface 4014 or 4114 of the moving cells.

Backhaul moving cells 3908 and 3910 and outer moving cells 3902-3906 may then receive the coarse trajectories and initial routings at central interfaces 4014 and 4114, respectively. As shown in FIG. 43, backhaul moving cells 3908 and 3910 may then establish connectivity with outer moving cells 3902-3906 in stage 4312. For example, backhaul moving cells 3908 and 3910 may set up a backhaul relaying path with outer moving cells 3902-3906 that outer moving cells 3902-3906 can use to transmit and receive data with the radio access network (including network access node 3912). This can include, for example, setting up a fronthaul link between outer moving cells 3902-3906 and backhaul moving cells 3908 and 3910 and setting up a backhaul link between backhaul moving cells 3908 and 3910 and the radio access network (although in some aspects the backhaul links may already be established).

In some aspects, backhaul moving cells 3908 and 3910 and outer moving cells 3902-3906 may execute stage 4312 at their cell interfaces 4016 and 4116. For example, with reference to outer moving cell 3902, its central interface 4014 may receive the coarse trajectory and initial routing assigned to outer moving cell 3902 in stage 4310. Central interface 4014 of outer moving cell 3902 may then provide the coarse trajectory to trajectory processor 4018 and the initial routing to cell interface 4016. The initial routing may specify that outer moving cell 3902 is assigned to use one of backhaul moving cells 3908 and 3910, such as backhaul moving cell 3908. Accordingly, cell interface 4016 of outer moving cell 3902 may identify that it is assigned to establish a backhaul relaying path to the radio access network via backhaul moving cell 3908. Cell interface 4016 of outer moving cell 3902 may therefore establish connectivity with cell interface 4116 of backhaul moving cell 3908, such as by exchanging wireless signaling (e.g., via baseband subsystem 4006 of outer moving cell 3902 and baseband subsystem 4106 of backhaul moving cell 3908) with each other that establishes a fronthaul link between outer moving cell 3902 and backhaul moving cell 3908. Outer moving cells 3902-3906 may similarly establish connectivity with the backhaul moving cells assigned to them by their respective initial routings.

In some aspects, the central trajectory algorithm may determine coarse trajectories but not initial routings. Accordingly, outer moving cells 3902-3906 and backhaul moving cells 3908 and 3910 may be configured to determine the routing (e.g., to determine backhaul relaying paths). For example, the cell interfaces 4014 of outer moving cells 3902-3906 may perform a discovery process to identify nearby backhaul moving cells, and may then select a backhaul moving cell to use as a backhaul relaying path. These routings may in such aspects be the initial routings. Outer moving cells 3902-3906 and backhaul moving cells 3908 and 3910 may then establish connectivity with each other according to these initial routings.

After establishing connectivity, outer moving cells 3902-3906 may perform their outer tasks while moving according to their respectively assigned coarse trajectories in stage 4314. For example, with exemplary reference to outer moving cell 3902, trajectory processor 4018 may provide the coarse trajectory to movement controller 4024. Movement controller 4024 may then provide control signals to steering and movement machinery 4026 that direct steering and movement machinery 4026 to move outer moving cell 3902 according to its coarse trajectory. If configured to perform sensing as its outer task, one or more sensors (not explicitly shown in FIG. 40) of outer task engine 4020 may obtain sensing data. If configured to perform access as its outer task, outer task engine 4020 may use baseband subsystem 4006 to wirelessly provide radio access to terminal devices in the coverage area of outer moving cell 3902, according to some aspects.

As described above, the coarse trajectories in some aspects may be static positions, sequences of static positions, or a paths or contours. If the coarse trajectory is a static position, movement controller 4024 may control steering and movement machinery 4026 to position outer moving cell 3902 at the static position and to remain at the static position. If the coarse trajectory is a sequence of static positions, movement controller 4024 may control steering and movement machinery 4026 to sequentially move outer moving cell 3902 to each of the sequence of static positions. The sequence of static positions can be time-stamped, and movement controller 4024 may control steering and movement machinery 4026 to move outer moving cell 3902 to each of the sequence of static positions at the according to the time stamps. If the coarse trajectory is a path or contour, movement controller 4024 may control steering and movement machinery 4026 to move outer moving cell 3902 along the path or contour.

As shown in FIG. 43, outer moving cells 3902-3906 and backhaul moving cells 3908 and 3910 may perform data transmission in stages 4316 and 4318. For example, outer moving cells 3902-3906 (e.g., at their respective cell interfaces 4016) may transmit uplink data from the outer task on their respective fronthaul links to backhaul moving cells 3908 and 3910 as assigned by the initial routings. Backhaul moving cells 3908 and 3910 may then receive the uplink data at their respective cell interfaces 4116. Relay routers 4120 may then identify the uplink data received at the cell interfaces 4116 and transmit the uplink data to the radio access network on the backhaul link via the baseband subsystems 4106. In some aspects, fronthaul moving cells 3902-3906 may also use the backhaul relaying paths for downlink data transmission. Accordingly, backhaul moving cells 3908 and 3910 may receive downlink data addressed to outer moving cells 3902-3906 from the radio access network at their baseband subsystems 4106. Relay routers 4120 may identify this downlink data and provide it to the cell interfaces 4116, which may then transmit the downlink data (via baseband subsystem 4106) on the fronthaul link to outer moving cells 3902-3906.

Similar to outer moving cells 3902-3906, backhaul moving cells 3908 and 3910 may move according to their assigned coarse trajectories during stages 4316*a* and 4316*b*. Accordingly, with exemplary reference to backhaul moving cell 3908, trajectory processor 4118 (after receiving the coarse trajectory from central interface 4114) may specify the coarse trajectory to movement controller 4124. Movement controller 4124 may then direct steering and movement machinery 4126 to move backhaul moving cell 3908 according to the coarse trajectory, according to some aspects.

These coarse trajectories and initial routings determined by central trajectory controller 3914 can be viewed as a high-level plan that forms the initial basis of the trajectories and routing of outer moving cells 3902-3906 and backhaul moving cells 3908 and 3910, according to certain aspects. Accordingly, in some aspects outer moving cells 3902-3906 and backhaul moving cells 3908 and 3910 may perform local optimization of the trajectories and routing. As shown in FIG. 43, outer moving cells 3902-3906 and backhaul moving cells 3908 and 3910 may perform parameter exchange in stage 4320, such as by using their cell interfaces 4016 and 4116 to exchange parameters over the signaling connections. These parameters may be related to the local input data used as input by trajectory processors 4018 and 4118 of outer moving cells 3902-3906 and backhaul moving cells 3908 and 3910 for their outer and backhaul trajectory algorithms, respectively. For example, the parameters can include information similar to the input data, such as, for example, data rate requirements of the moving cells, the positions of the moving cells, the target areas assigned to the moving cells, recent radio measurements obtained by the moving cells, and/or details about the radio capabilities of the moving cells. The parameters can also include the coarse trajectories assigned to the moving cells by the central trajectory algorithm. In some aspects, outer moving cells 3902-3906 and backhaul moving cells 3908 and 3910 may also receive parameters from other locations, such as, for example, from the radio access network (e.g., network access node 3912).

According to some aspects, after obtaining the parameters, cell interfaces 4016 and 4116 may provide the parameters to trajectory processors 4018 and 4118. With exemplary reference to trajectory processor 4018 of outer moving cell 3902, trajectory processor 4018 may use the parameters as local input data for the outer trajectory algorithm. In some aspects, trajectory processor 4018 may also use other information such as, for example, the local input data, such as radio measurements performed by baseband subsystem 4006 as well as its current coarse trajectory assigned by central trajectory controller 3914. Trajectory processor 4018 may then perform local optimization of its trajectory and routing in stage 4322 by executing the outer trajectory algorithm in stage 4320. Likewise, with exemplary reference to trajectory processor 4118 of backhaul moving cell 3908, trajectory processor 4118 may use the parameters as local input data for the backhaul trajectory algorithm. Trajectory processor 4118 may then perform local optimization of its trajectory and routing by executing the backhaul trajectory algorithm min stage 4320.

The outer and backhaul trajectory algorithms executed by outer moving cells 3902-3906 and backhaul moving cells 3908 and 3910 may be similar to the central trajectory algorithm executed by central trajectory controller 3914. For example, in some aspects, the outer and backhaul trajectory algorithms may also function by determining trajectories and/or routing that optimize (e.g., maximize) an optimization criteria. In some aspects, the optimization criteria used by the outer and backhaul trajectory algorithms may be the same as the optimization criteria used by the central trajectory algorithm. In some aspects, the outer and backhaul trajectory algorithms may similarly use a statistical model of the radio environment to approximate the optimization criteria, such as, for example, a basic propagation model or a propagation model based on a radio map.

For example, in some aspects, the outer and backhaul trajectory algorithms may determine an updated trajectory and/or updated routing for the moving cell executing the trajectory algorithm that increases the optimization criteria (e.g., by incrementally stepping parameters to guide a function of the optimization criteria toward a maximum value). Accordingly, in contrast to the central trajectory algorithm, which concurrently determines coarse trajectories and/or initial routings for multiple moving cells, the outer and backhaul trajectory algorithms may separately focus on the individual moving cell executing the trajectory algorithm.

In some aspects, trajectory processors 4018 and 4118 of the moving cells may execute stage 4320 in an alternating manner. For example, dual-phased optimization can be used, in which outer moving cells 3902-3906 and backhaul moving cells 3908 and 3910 may alternate between optimizing the trajectories of outer moving cells 3902-3906 and the trajectories of backhaul moving cells 3908-3910. In this example, the trajectory processors 4018 of outer moving cells 3902-3906 may be configured to execute the outer trajectory algorithm using their current trajectory (e.g., the coarse trajectory), current routing and relevant parameters from stage 4318 as the local input data for the outer trajectory algorithm. The outer trajectory algorithm may be configured to, using this local input data, determine an update to its current trajectory that steps the function of the optimization criteria toward a maximum value (e.g., by some incremental step). As described above with respect to the central trajectory algorithm, this can be done using gradient descent or another optimization algorithm. The outer trajectory algorithm can also determine an updated routing (e.g., if the updated trajectory would lead to a better routing for the optimization criteria).

According to certain aspects, each of outer moving cells 3902-3906 may determine a respective updated trajectory and/or updated routing. Then, outer moving cells 3902-3906 may perform another round of parameter exchange by sending the updated trajectories and/or routing to backhaul moving cells 3908 and 3910. Backhaul moving cells 3908 and 3910 may then use these updated trajectories and/or routing in addition to any other relevant parameters, as local input data for the backhaul trajectory algorithm. Trajectory processors 4116 of backhaul moving cells 3908 and 3910 may therefore execute the backhaul trajectory algorithm using this local input data to determine updated trajectories for backhaul moving cells 3908 and 3910. For example, as the trajectories of outer moving cells 3902-3906 change to the updated trajectories, the backhaul trajectory algorithm may be configured to determine updated trajectories for backhaul moving cells 3908 and 3910 that increase (e.g., maximize) the optimization criteria given the updated trajectories of outer moving cells 3902-3906. The backhaul trajectory algorithm may also be configured to change the routings, e.g., to change the updated routings determined by outer moving cells 3902-3910 to new updated routings that optimize the updated trajectories of backhaul moving cells 3908 and 3910.

After backhaul moving cells 3908 and 3910 have determined their own updated trajectories and/or updated routings, backhaul moving cells 3908 and 3910 may perform another round of parameter exchange and send their updated trajectories and/or updated routing to outer moving cells 3902-3906, according to some aspects. Outer moving cells 3902-3906 may then again execute the outer trajectory algorithm using the set updated trajectories and/or updated routing from backhaul moving cells 3908 and 3910 to determine new updated trajectories and/or routings that increase the optimization criteria. In accordance with some aspects, this dual-phased optimization may continue to repeat over time. In some aspects, an aggregate metric across both outer and backhaul can be used to steer the trajectories away from diverging in one direction. In some aspects, central trajectory controller 3914 may periodically re-execute the central trajectory algorithm and provide new coarse trajectories and/or new initial routings to outer moving cells 3902-3906 and backhaul moving cells 3908 and 3910. This can constitute, in some aspects, a type of periodic reorganization, in which central trajectory controller 3914 periodically reorganizes outer moving cells 3902-3906 and backhaul moving cells 3908 and 3910 in a centralized manner.

The local optimization is not limited to such dual-phased optimization approaches. In some aspects, outer moving cells 3902-3906 and backhaul moving cells 3908 and 3910 may execute their trajectory algorithms to update their trajectories and/or routing in an alternating or round-robin fashion, for example, one of outer moving cells 3902-3906 and backhaul moving cells 3908 and 3910 at a time. In some aspects, one of outer moving cells 3902-3906, referred to as a master outer moving cell, may assume the responsibility of determining updated trajectories and/or routing for one or more (or all) of the rest of outer moving cells 3902-3906. Accordingly, similarly to the central trajectory algorithm that concurrently evaluates trajectories for multiple outer moving cells, the master outer moving cell may execute an outer trajectory algorithm that concurrently determines updated trajectories and/or updated routings for multiple outer moving cells (e.g., by determining updated trajectories that maximize the optimization criteria). The master outer moving cell may then transmit the updated trajectories and/or routings to the other outer moving cells, which may then move according to the updated trajectories. This can similarly be applied for backhaul moving cells, in which one of backhaul moving cells 3908 or 3910 may assume the role of master backhaul moving cell and determine updated trajectories and/or updated routings for multiple (or all) backhaul moving cells.

In some cases, the use of local optimization may lead to better performance. For example, as described above, outer moving cells 3902-3906 and backhaul moving cells 3908 and 3910 may be configured to exchange parameters prior to and between rounds of local optimization. These parameters can include current radio measurements, which can be more accurate indicators of the radio environment than the basic propagation model and/or radio maps used by central trajectory controller 3914. Accordingly, in some aspects, the local optimization may be based on a more accurate reflection of the actual radio environment, and may therefore lead to better optimization criteria (e.g., better values of the metric being used as the optimization criteria) in practice.

Furthermore, in some aspects the use of local optimization may result in a more advantageous division of processing. For example, in some aspects, outer moving cells 3902-3906 and backhaul moving cells 3908 and 3910 may not be able to support the same processing power as a server-type component such as central trajectory controller 3914. Accordingly, depending on their design constraints, it may not be feasible in certain aspects for outer moving cells 3902-3906 and backhaul moving cells 3908 and 3910 to execute a full trajectory algorithm to locally determine their trajectories in the first instance. The use of local optimization may enable central trajectory controller 3914 to determine a high-level plan for trajectories while also allowing outer moving cells 3902-3906 and backhaul moving cells 3908 and 3910 to make local adjustments as appropriate (e.g., that constitute mere adjustments as compared to determining new trajectories from the start).

Additionally, in some aspects outer moving cells 3902-3906 and backhaul moving cells 3908 and 3910 may be able to adjust their trajectories with a lower latency than would occur if central trajectory controller 3914 had full control over their trajectories (e.g., without any local optimization). For example, outer moving cells 3902-3906 and backhaul moving cells 3908 and 3910 can be configured to make local adjustments to their trajectories (e.g., based on their radio measurements and other parameter exchange) without having to first send data back to central trajectory controller 3914 and subsequently waiting to receive a response.

Figure 45:
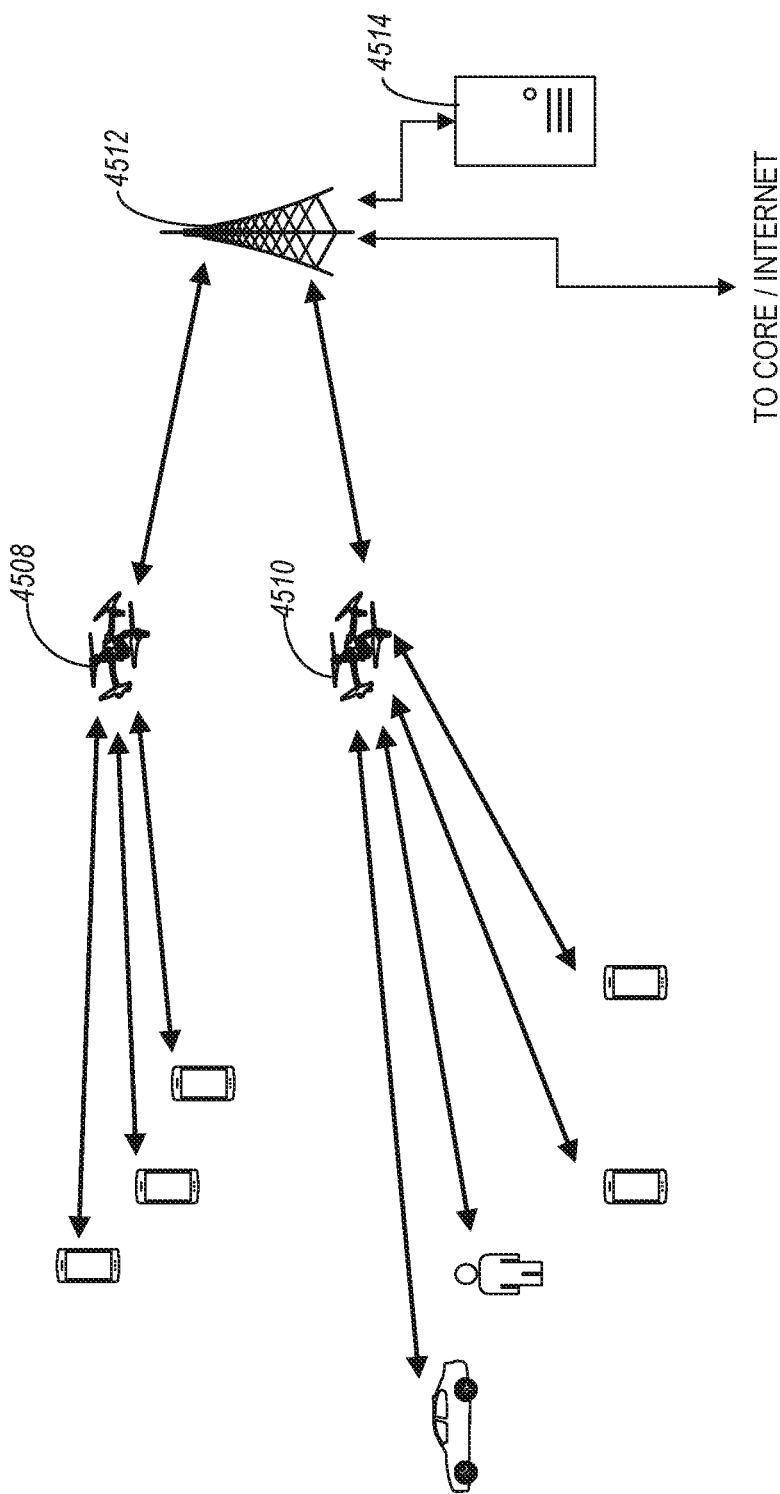
FIG. 45 shows an example communication infrastructure where backhaul moving cells may provide backhaul to various terminal devices, in accordance with some aspects.

In the exemplary context of FIG. 43, the central trajectory algorithm may exert positioning control over both outer moving cells 3902-3906 and backhaul moving cells 3908 and 3910. According to some aspects, the central trajectory controller 3914 exerts control over backhaul moving cells 3908 and 3910 but not outer moving cells 3902-3906. According to other aspects, backhaul moving cells 3908 and 3910 are present without any outer moving cells. FIG. 45 shows one such example according to some aspects, where backhaul moving cells 4508 and 4510 may provide backhaul to various terminal devices of the base station 4512 (which is communicatively coupled to the central trajectory controller 4514).

Figure 46:
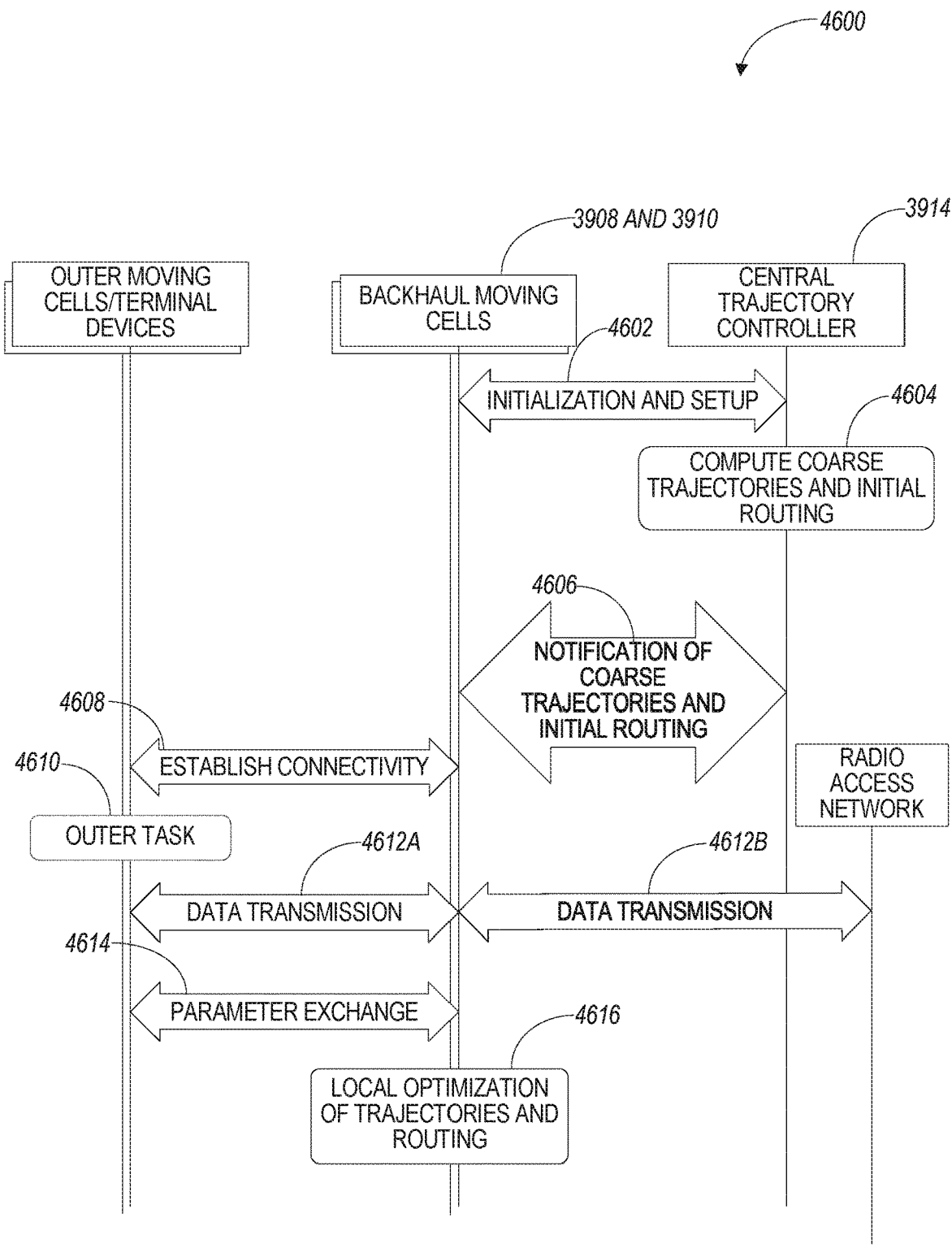
FIG. 46 shows exemplary message sequence chart according to some aspects.

In these exemplary cases, and according to some aspects, central trajectory controller 4514 (or 3914) may be able to provide coarse trajectories and/or routing to backhaul moving cells 4508 and 4510, but not to any outer moving cells or terminal devices (e.g., to the extent that they are not under the positional control of central trajectory controller 4514). FIG. 46 shows exemplary message sequence chart 4600 according to some aspects, which relates to such cases. As shown in FIG. 46, central trajectory controller 3914 and backhaul moving cells 3908 and 3910 may first perform initialization and setup in stage 4602 (e.g., in the same or similar manner as stage 4302). Central trajectory controller 3914 may then compute coarse trajectories and initial routing using the input data and central trajectory algorithm in stage 4604.

There may be various differences in the trajectory algorithm for the setting of FIG. 46 due to the fact that backhaul moving cells 3908 and 3910 provide backhaul to served devices (e.g., outer moving cells and/or terminal devices) that are not under positional control of central trajectory controller 3914. In the above-described context of FIG. 43, central trajectory controller 3914 could evaluate the optimization criteria using specific positions of outer moving cells 3902-3906 (e.g., approximate the supported data rate or link quality metric given specific locations of outer moving cells 3902-3906 using the statistical model of the radio environment). However, in the context of FIG. 46, the central trajectory algorithm may not be able to assume specific positions of the served devices, and may instead use statistical estimations of their positions according to some aspects.

For example, in some aspects, the central trajectory algorithm may use the concept of a virtual node to statistically estimate the position of the served devices. For example, in some aspects input data repository 4204 of central trajectory controller 3914 may be configured to collect statistical density information about the served terminal devices. In some cases, the statistical density information can be statistical geographic density information, such as, for example, basic information such as the reported positions of served devices and/or more complex information such as a heat map indicating a density of served devices over time. In some cases, the statistical density information can additionally or alternatively include statistical traffic density information, which indicates the geographic density of data traffic. For example, if there are only a few served terminal devices in a given area but these served devices are generating considerable data traffic, the statistical traffic density information can indicate the increased data traffic in this area (whereas strictly geographic density information would indicate only that there are a few served terminal devices). This statistical density information can be reported to central trajectory controller 3914 by backhaul moving cells 3908 and 3910 (e.g., based on their own radio measurements or position reporting), from the radio access network, and/or from external network locations, according to some aspects.

Accordingly, in some aspects when executing the central trajectory algorithm in stage 4604, trajectory processor 4206 may use this statistical density information as input data. In some aspects, the central trajectory algorithm may utilize a similar optimization algorithm as described above for stage 4306. For example, this can include applying gradient descent (or another optimization algorithm) to determine coarse trajectories and/or routing for backhaul moving cells 3908 and 3910 that increase (e.g., maximize) an optimization criteria, in which the optimization criteria is represented by a function based on the statistical model of the radio environment. However, in contrast to the case of FIG. 43, the central trajectory algorithm may not have specific locations of the served devices, and may instead use the statistical density information to characterize virtual served devices, according to some aspects. For example, the central trajectory algorithm can approximate the positions of the virtual served devices using the statistical density information (e.g., the expected position of virtual served devices), and then use these positions when determining coarse trajectories and/or initial routings for backhaul moving cells 3908 and 3910. As the served devices are not under the positional control of central trajectory controller 3914 according to some aspects, the central trajectory algorithm may only determine coarse trajectories and/or initial routing for backhaul moving cells 3908 and 3910 (where the initial routings assign backhaul moving cells 3908 and 3910 to provide backhaul for certain of the served devices). Similar to the case of FIG. 43, the optimization criteria can be, for example, supported data rate and/or link quality metric (including aggregate values and probabilities that the optimization criteria is above a predefined threshold for each backhaul relaying path).

After determining the coarse trajectories and/or initial routing in stag 4604, central trajectory controller 3914 may send the coarse trajectories and/or initial routing to backhaul moving cells 3908 and 3910 (e.g., using signaling connections between cell interface 4202 of central trajectory controller 3914 and its peer central interfaces 4114 of backhaul moving cells 3908 and 3910). Backhaul moving cells 3908 and 3910 may then establish connectivity with the served devices in stage 4608 (e.g., using the initial routing provided by central trajectory controller 3914, or by determining their own initial routings). If the served devices are outer moving cells, the served devices may perform an outer task in stage 4610. The served devices may then transmit uplink data to backhaul moving cells 3908 and 3910 using the fronthaul link in stage 4612a, and backhaul moving cells 3908 and 3910 may transmit the uplink data to the radio access network in stage 4612b. Stages 4612a and 4612b can also include transmission and relaying of downlink data from the radio access network to the served devices via the backhaul relaying path provided by backhaul moving cells 3908 and 3910. Backhaul moving cells 3908 and 3910 may move according to their respectively assigned coarse trajectories during stages 4612a and 4612b, according to some aspects.

Similar to the case of FIG. 43, the coarse trajectories and/or initial routings provided by central trajectory controller 3914 may form a high-level plan that can be locally optimized. Accordingly, as shown in FIG. 46, backhaul moving cells 3908 and 3910 may perform parameter exchange with the served devices in stage 4614. In some aspects, the served devices may provide position reports to backhaul moving cells 3908 and 3910 in stage 4614, which backhaul moving cells can use to update the statistical density information of the served devices. This updated statistical density information may be part of the local input data for the backhaul trajectory algorithm. The parameter exchange that forms the local input data can include any of data rate requirements of the served devices, the positions of the served devices, the target areas assigned to the served devices, recent radio measurements obtained by the served devices, and/or details about the radio capabilities of the served devices.

Backhaul moving cells 3908 and 3910 may then perform local optimization of the trajectories and/or routing in stage 4616 by executing the backhaul trajectory algorithm on the local input data. As there is no counterpart outer trajectory algorithm running concurrently according to some aspects, the backhaul trajectory algorithm may not use dual-phased optimization according to some aspects. The backhaul trajectory algorithm may calculate updated trajectories and/or updated routings based on the local input data. After determining the updated trajectories and/or updated routings, backhaul moving cells 3908 and 3910 may move according to the updated trajectories and/or perform backhaul relaying according to the updated routings. In some aspects, backhaul moving cells 3908 and 3910 may repeat stages 4612a-4616 over time, and may thus repeatedly execute the backhaul trajectory algorithm using new local input data to update the trajectories and/or routings. As the local input data may reflect the actual radio environment, in some cases the local optimization can improve performance.

One or more additional extensions to the above-described systems may be employed. In some aspects, one or more of outer moving cells 3902-3906 and backhaul moving cells 3908 and 3910 may be configured to support multiple simultaneous radio links. Accordingly, instead of only using a single radio link for the fronthaul or backhaul link, one or more of the moving cells may be configured to transmit and/or receive using multiple radio links according to some aspects. In such cases, central trajectory controller 3914 may have prior knowledge of the multi-link capabilities of the moving cells. The central trajectory algorithm may therefore use channel statistics representing the aggregate capacity across the multiple links when determining the coarse trajectories and/or initial routings. For example, if the data rate of a first available link of a moving cell is $R_1$ and the data rate of a second available link of the moving cell is $R_2$, the central trajectory algorithm may determine that the data rate of both links together is $R_1+R_2$ (e.g., treated independently, thus making the aggregate capacity additive). Similarly, if the moving cells support mmWave, the central trajectory algorithm can model the multiple beams from mmWave as multiple isolated links (e.g., by generating multiple antenna beams with mmWave antenna array s).

In some aspects, the backhaul routing paths may introduce redundancy using multiple links. For example, outer moving cells 3902-3906 or the served devices may use multiple backhaul routing paths (e.g., with different fronthaul links and/or backhaul links), and may transmit the same data redundantly over the multiple backhaul routing paths. This could be done as packet-level redundancy.

In some aspects, outer moving cells 3902-3906 and/or backhaul moving cells 3908 and 3910 may use transmission or reception cooperation to improve radio performance. For example, the central trajectory algorithm may designate a duster of outer moving cells or backhaul moving cells to cooperate as a single group, and can then determine coarse trajectories for the cluster to support transmit and/or receive diversity. The central trajectory algorithm can then treat the cluster as a composite node (e.g., using an effective rate representation). Once the central trajectory algorithm determines the coarse trajectory of the cluster, the moving cells in the cluster can use their outer or backhaul trajectory algorithms to adjust their trajectories so that the effective centroid location of the cluster remains constant.

In some aspects, the central, outer, and backhaul trajectory algorithms may use features described in J. Stephens et. al. "Concurrent control of mobility and communication in multi-robot system," (IEEE Transactions on Robotics, October 2017), J. L. Ny et. al, "Adaptive communication constrained deployment of unmanned aerial vehicle," (IEEE JSAC, 2012), M. Zavlanos et. al. "Network integrity in mobile robotic network," (IEEE Trans. On Automatic Control, 2013), and/or J. Fink et. al., Motion planning for robust wireless networking" (IEEE Conference On Robotics & Automation, 2012).

Figure 47:
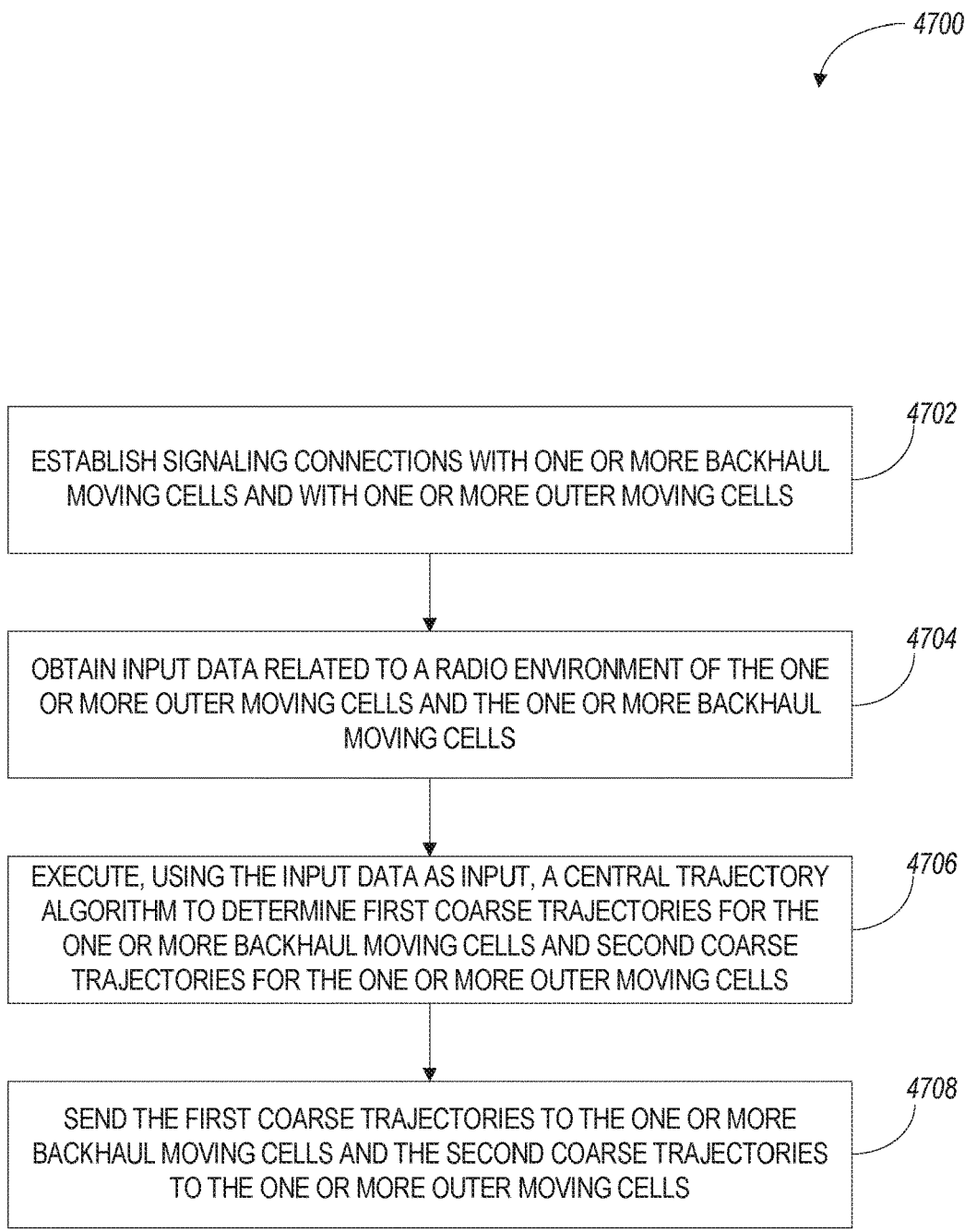
FIG. 47 shows exemplary method for managing trajectories for moving cells, in accordance with some aspects.

FIG. 47 shows exemplary method 4700 for managing trajectories for moving cells according to some aspects. As shown in FIG. 47, method 4700 includes establishing signaling connections with one more backhaul moving cells and with one or more outer moving cells (4702), obtaining input data related to a radio environment of the one or more outer moving cells and the one or more backhaul moving cells (4704), executing using the input data as input, a central trajectory algorithm to determine first coarse trajectories for the one or more backhaul moving cells and second coarse trajectories for the one or more outer moving cells (4706), and sending the first coarse trajectories to the one or more backhaul moving cells and the second coarse trajectories to the one or more outer moving cells (4708).

Figure 48:
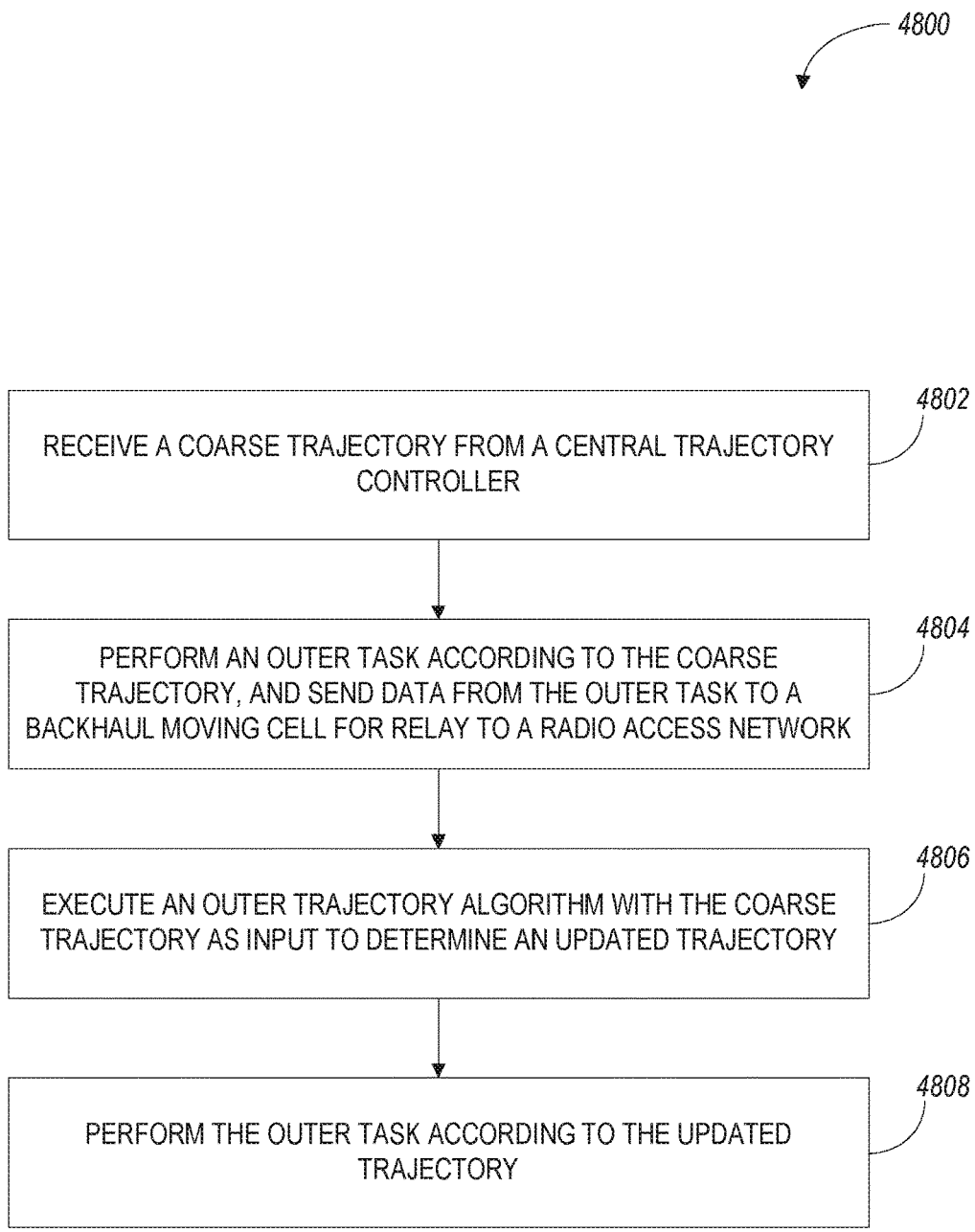
FIG. 48 shows exemplary method for operating an outer moving cell, in accordance with some aspects.

FIG. 48 shows exemplary method 4800 for operating an outer moving cell according to some aspects. As shown in FIG. 48, method 4800 includes receiving a coarse trajectory from a central trajectory controller (4802), performing an outer task according to the coarse trajectory, and sending data from the outer task to a backhaul moving cell for relay to a radio access network (4804), executing an outer trajectory algorithm with the coarse trajectory as input to determine an updated trajectory (4806), and performing the outer task according to the updated trajectory (4808).

Figure 49:
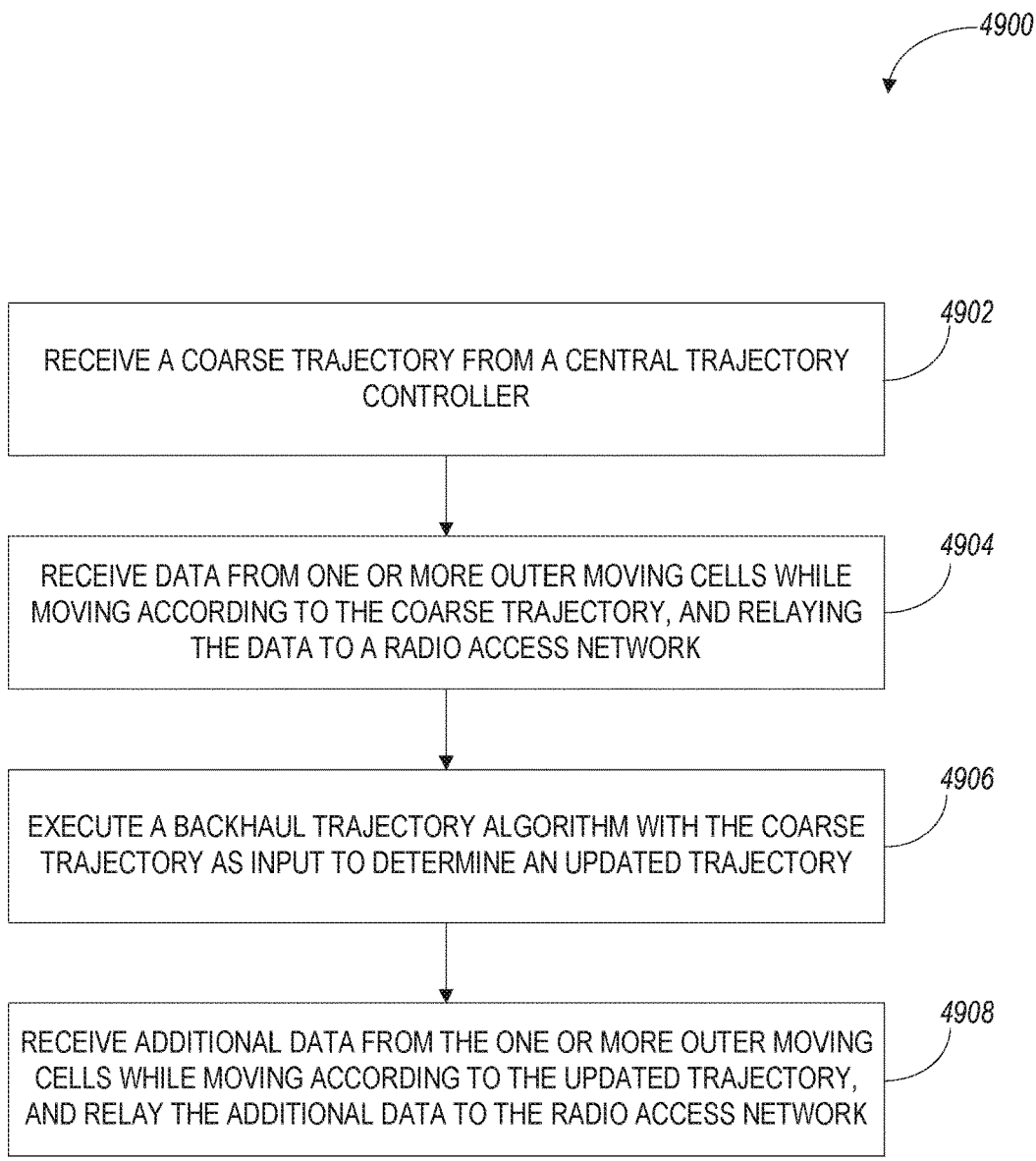
FIG. 49 shows exemplary method for operating a backhaul moving cell, in accordance with some aspects.

FIG. 49 shows exemplary method 4900 for operating a backhaul moving cell according to some aspects. As shown in FIG. 49, method 4900 includes receiving a coarse trajectory from a central trajectory controller (4902), receiving data from one or more outer moving cells while moving according to the coarse trajectory, and relaying the data to a radio access network (4904), executing a backhaul trajectory algorithm with the coarse trajectory as input to determine an updated trajectory (4906), and receiving additional data from the one or more outer moving cells while moving according to the updated trajectory, and relaying the additional data to the radio access network (4908).

Figure 50:
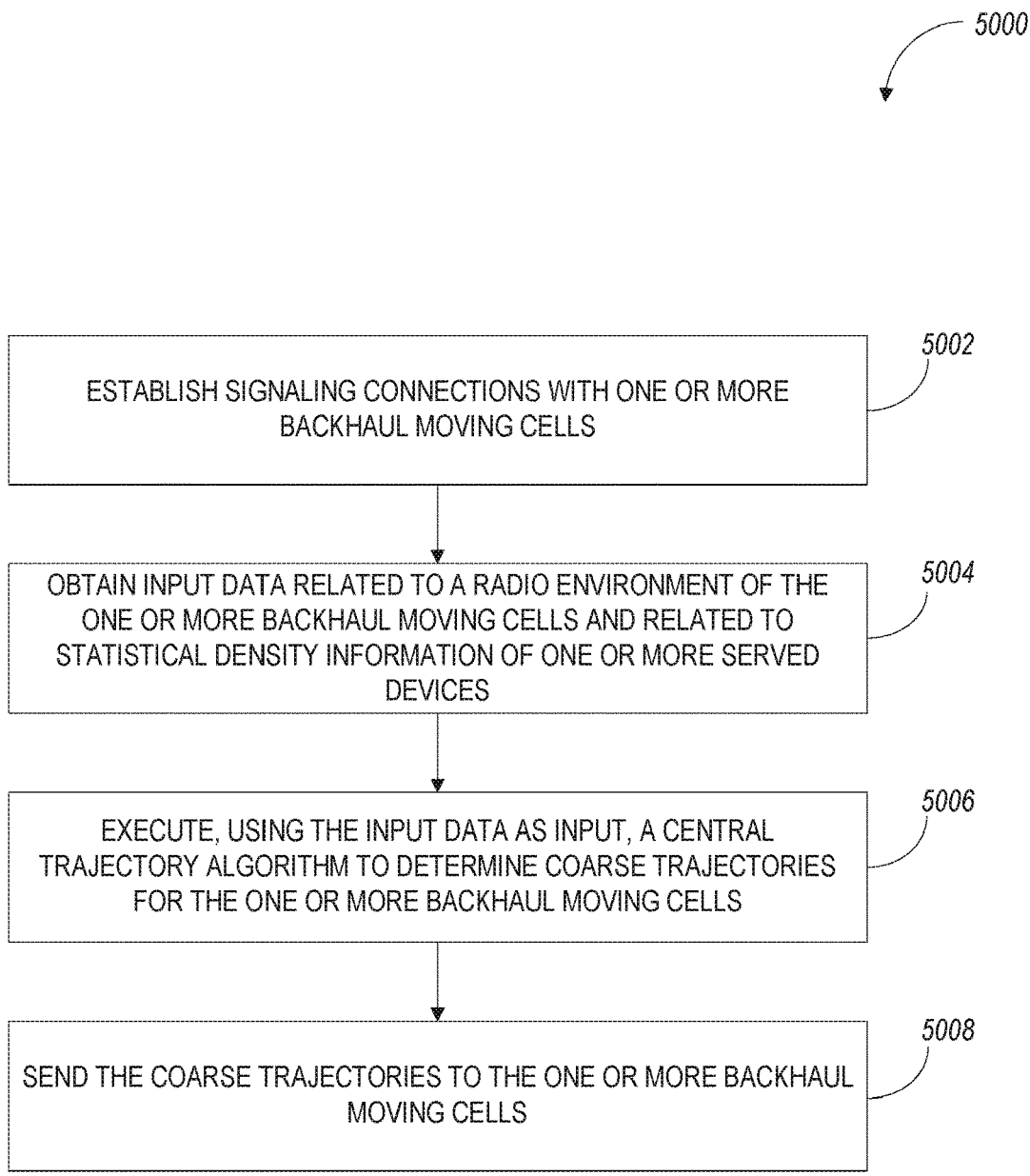
FIG. 50 shows exemplary method for managing trajectories for moving cells, in accordance with some aspects.

FIG. 50 shows exemplary method 5000 for managing trajectories for moving cells according to some aspects. As shown in FIG. 50, method 5000 includes establishing signaling connections with one or more backhaul moving cells (5002), obtaining input data related to a radio environment of the one or more backhaul moving cells and related to statistical density information of one or more served devices (5004), executing using the input data as input, a central trajectory algorithm to determine coarse trajectories for the one or more backhaul moving cells (5006), and sending the coarse trajectories to the one or more backhaul moving cells (5008).

Figure 51:
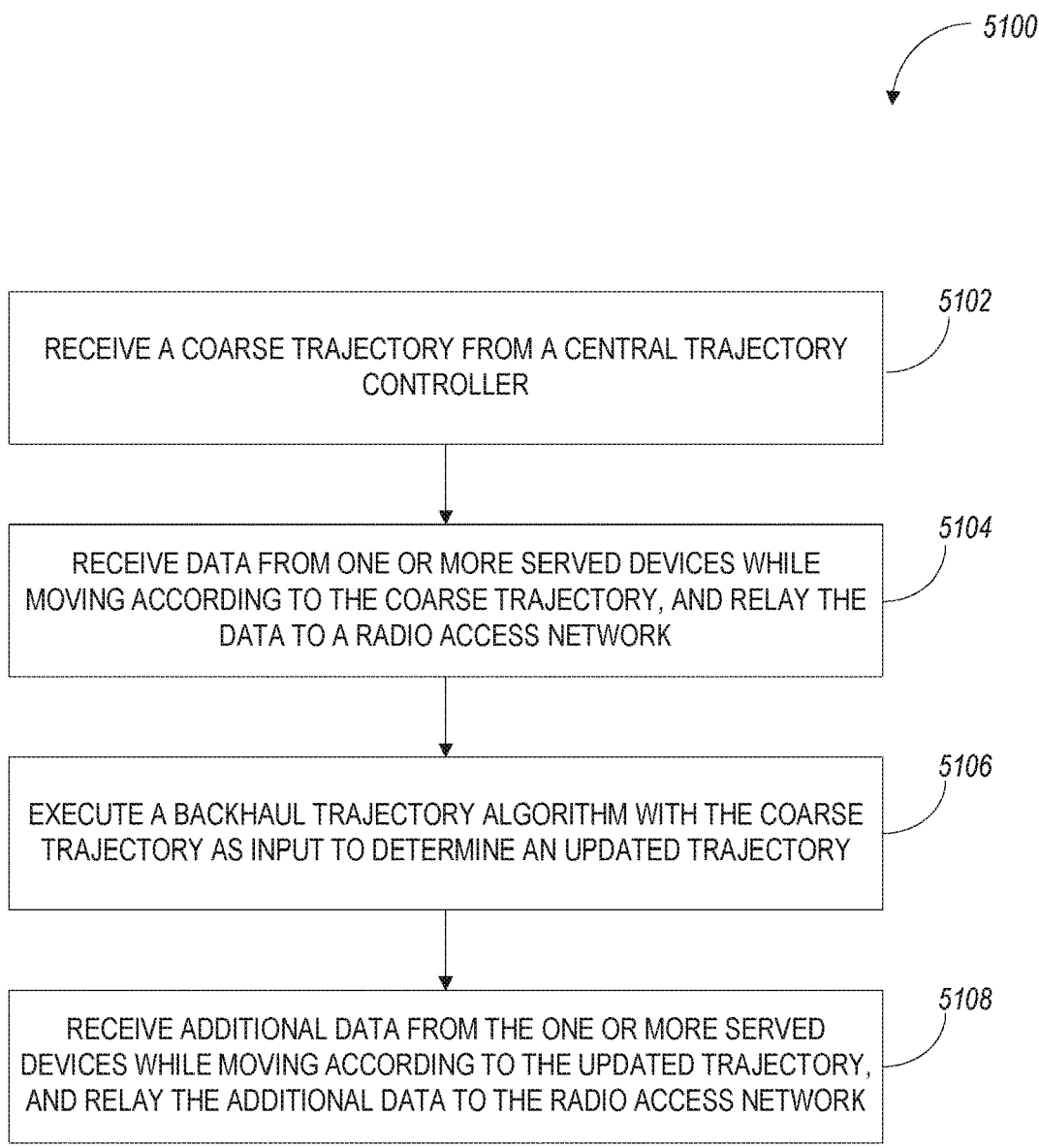
FIG. 51 shows exemplary method for operating a backhaul moving cell, in accordance with some aspects.

FIG. 51 shows exemplary method 5100 for operating a backhaul moving cell according to some aspects. As shown in FIG. 51, method 5100 includes receiving a coarse trajectory from a central trajectory controller (5102), receiving data from one or more served devices while moving according to the coarse trajectory, and relaying the data to a radio access network (5104), executing a backhaul trajectory algorithm with the coarse trajectory as input to determine an updated trajectory (5106), and receiving additional data from the one or more served devices while moving according to the updated trajectory, and relaying the additional data to the radio access network (5108).

In some aspects, handover processes (e.g., as described in relation to FIGS. 7-8) can be triggered by a network element (e.g., TRP or gNB) or by a UE. A handover can be triggered by a UE when the UE detects that a beam is no longer useful, or as useful, due to reduction in signal quality caused by, for example, channel blockage in the surrounding environment. During a handover, beam switching is done among beams from different TRPs or gNBs. Handovers may occur more often in high-mobility situations, causing increased signaling overhead that can burden networks and cause increased latency and other deterioration of user experience. According to some aspects, systems and methods can reduce the frequency of handovers. Instead of performing a handover, in some aspects, the UE can perform fast beam switching to another beam of a same TRP or gNB. Signaling is reduced relative to handovers at least because the beam change is done within a single control unit and without inter-TRP or inter-gNB communication, in some aspects. Additionally, data can be transferred from the original beam to the new beam with little or no latency using physical layer control signaling in some aspects.

Beam switching allows the gNB transmit (Tx) beam to change from the previous beam to another beam with low or no spatial correlation, according to some aspects. Beam switching can occur between identified candidate beams. The identified candidate beams can be further refined using beam refinement procedures. In some aspects, a UE (e.g., UE 101, 102, FIG. 1A) can perform measurement of multiple Tx beams of a gNB to identify candidate beams that are available for communication at the gNB. The UE can perform an Rx beam sweep from a set of different beams to formulate a list of candidate beams.

In some aspects, the UE can identify candidate beams during the Rx beam sweep using a search, for example a binary search or a sequential search, or by enlarging the angle from the currently-serving beam to detect other beams of the gNB. In some aspects, the UE can execute sector level sweeps in multiple sessions. For example, the UE can implement a binary search over a wider beam pattern and narrow the beam in subsequent binary searches. The UE can perform beam adjustment, antenna training etc., subsequent to beam switching. The gNB can also perform the same adjustment. Once communication is established, communication can proceed according to the pertinent communication standards.

In some aspects, the UE can store information regarding each of the candidate beams. Candidate beam information can be stored in UE memory. The candidate beam information can include identification information and beam quality information, for example. The candidate beam information can be stored in an ordered list based on beam quality (e.g., signal to noise ratio (SNR)). The list order can be dynamically updated to adapt to system conditions. Some system conditions can include introduction of, or movement of, channel blockages.

In some aspects, a UE 101, 102 may refrain from performing a handover or beam switching when the UE 101, 102 detects that the current serving beam, gNB or TRP is deemed to adequately serve the UE 101, 102. This can further reduce the number of handovers or beam switching. The UE can determine that the currently-serving beam, TRP, or gNB is adequately serving the UE upon measuring a signal strength above a threshold, wherein the threshold can pertain to an SNR or a code rate. Detecting such a condition can further reduce signaling overhead by reducing the overall number of handovers.

Figure 52:
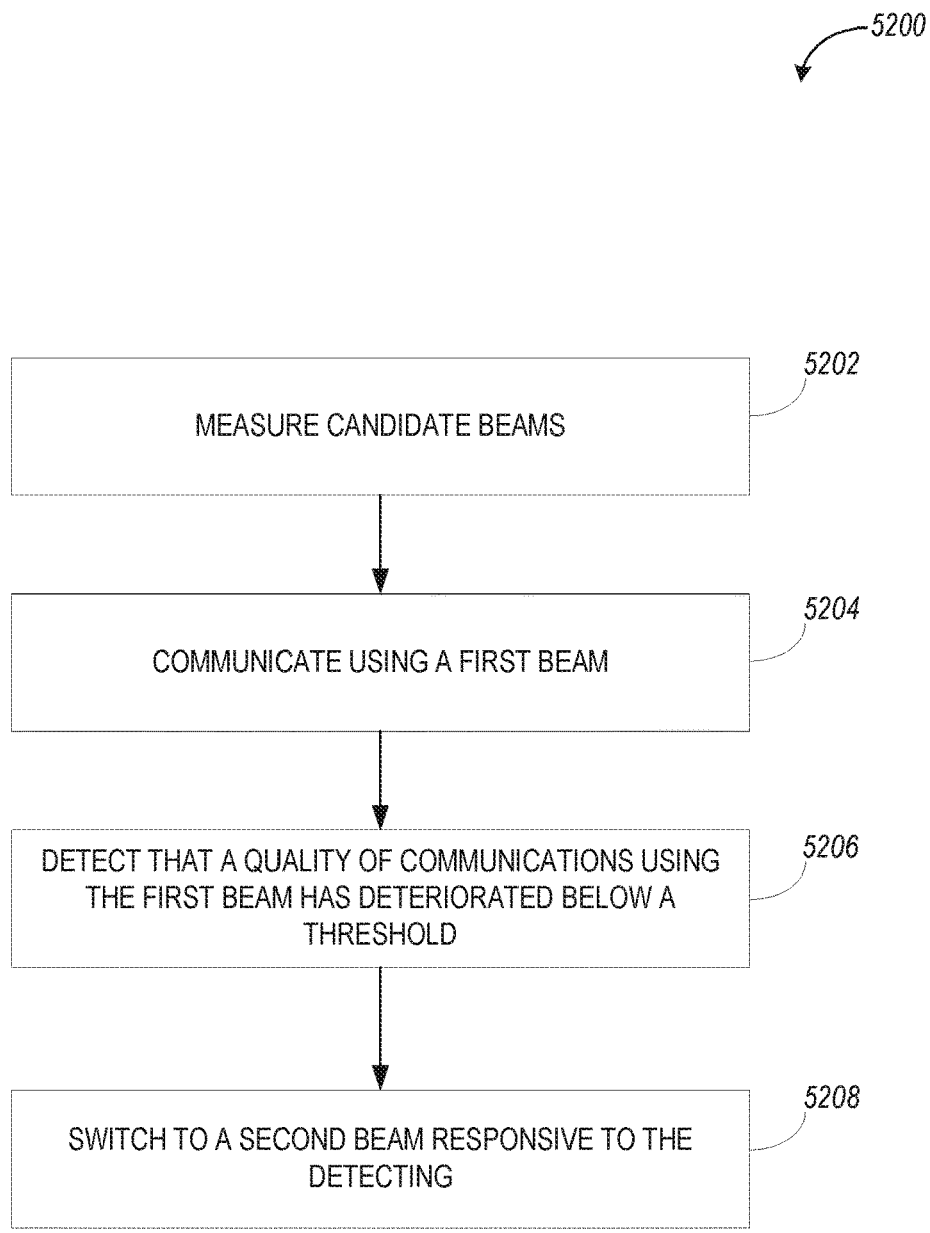
FIG. 52 is a flowchart of an example method for performing handover, in accordance with some aspects.

FIG. 52 is a flowchart of an example method 5200 in accordance with some aspects. The example method 5200 can begin with operation 5202 with a device (e.g., UE 101, 102, FIG. 1A) measuring a number of candidate beams at a network device (e.g., TRP or gNB), wherein the number of candidate beams includes at least the first beam and the second beam. The example method 5200 can continue with operation 5204 with the device communicating with the network device using the first beam. The example method 5200 can continue with operation 5206 with the device detecting that a quality of communications using the first beam has deteriorated below a threshold. The example method 5200 can continue with operation 5208 with the device performing a beam switching process to the second beam responsive to the detecting.

In some aspects, handovers (e.g., as described in connection with FIGS. 7-8) may occur more often in high-mobility situations, causing increased signaling overhead that can burden networks and cause increased latency and other deterioration of user experience. In accordance with some aspects, systems and methods provide increased flexibility in how handovers can be triggered and executed.

In some aspects, a UE can perform beam measurements on cells within a gNB. Each gNB may have multiple cells and each cell may have multiple transmission-reception points (TRPs) and each TRP may have multiple beam-forming modules. The UE can measure the beams knowing that those beams are from the same cell (based on a same cell ID). The UE can then select the top N beams (with respect to quality) and calculate a linear average of quality, wherein the linear average can be represented as the cell level quality. The cell level quality can then be used for a Layer 3 mobility handover event triggering from one cell to another cell. For handover within a cell (e.g., between beams within a cell) handover can occur by beam management, which can happen in the MAC and PHY layer.

In some aspects, the UE can use one or more of at least two signals for beam measurement. The first measurement signal is CSI-RS. The CSI-RS is UE-specific and the network can configure a list of CSI-RS resources to be used by the UE for performing measurements.

The second measurement signal can be referred to as a new radio Synchronization Signal Block (NR SSB) or new radio synchronization signal (NRSS) (e.g., similar to LTE primary synchronization signal (PSS) and secondary synchronization signal (SSS)). The NRSS can be coded orthogonally. In some aspects the synchronization signals can be sent periodically by different cells in a burst set, and each cell can have multiple beams. Each burst set can include L SS blocks. The UE can receive signaling that includes values for the periodicity and the cell ID for each block, among other parameters. Each frequency can have up to two network-configured periodicities. The UE can measure the received burst and transmit a cell beamforming measurement based on the entire received burst set, or the UE can transmit a cell beamforming measurement based on one or more individual measurements from the burst set. According to some aspects, the NRSS is cell-specific, and the NRSS can be used in idle, inactive, or connected-mode UEs.

When the UE performs measurement using one or more of the above-described signals, the network can configure N, where N is the number of best beams, for which the UE is to obtain cell-level quality. The network can configure measurement events to trigger measurement reporting After the measurement, beam management may trigger beam switching within the same cell instead of performing handovers, which can reduce signaling overhead and improve latency. Once the UE has the measurements, in some aspects, the network can configure cell-level event triggering for reporting. The network can trigger the UE to report the best beams to the network, or the best N NRSS beams or Y CSI-RS beams to the network for the network to help identify target cells, according to some aspects.

Systems according to other aspects can make use of dedicated random access channel (RACH) to improve handover speed. Dedicated RACH allows a UE to access the target cell faster. In handover commands, a dedicated preamble can be available in some aspects so that a handed-over UE has a contention-free random access to the target cell. In some aspects, the UE can attempt handover completion using dedicated RACH and then fall back to common RACH if access cannot be completed. In aspects, for the network to know which beams are the best beams, when the UE transmits measurement reports to the source cell, the UE should also transmit identification information identifying the target cell best beam/s. The source cell can forward this information to the target cell and the target cell can therefore allocate dedicated RACH resources to the UE. The source cell can then forward a handover command to the UE.

Figure 53:
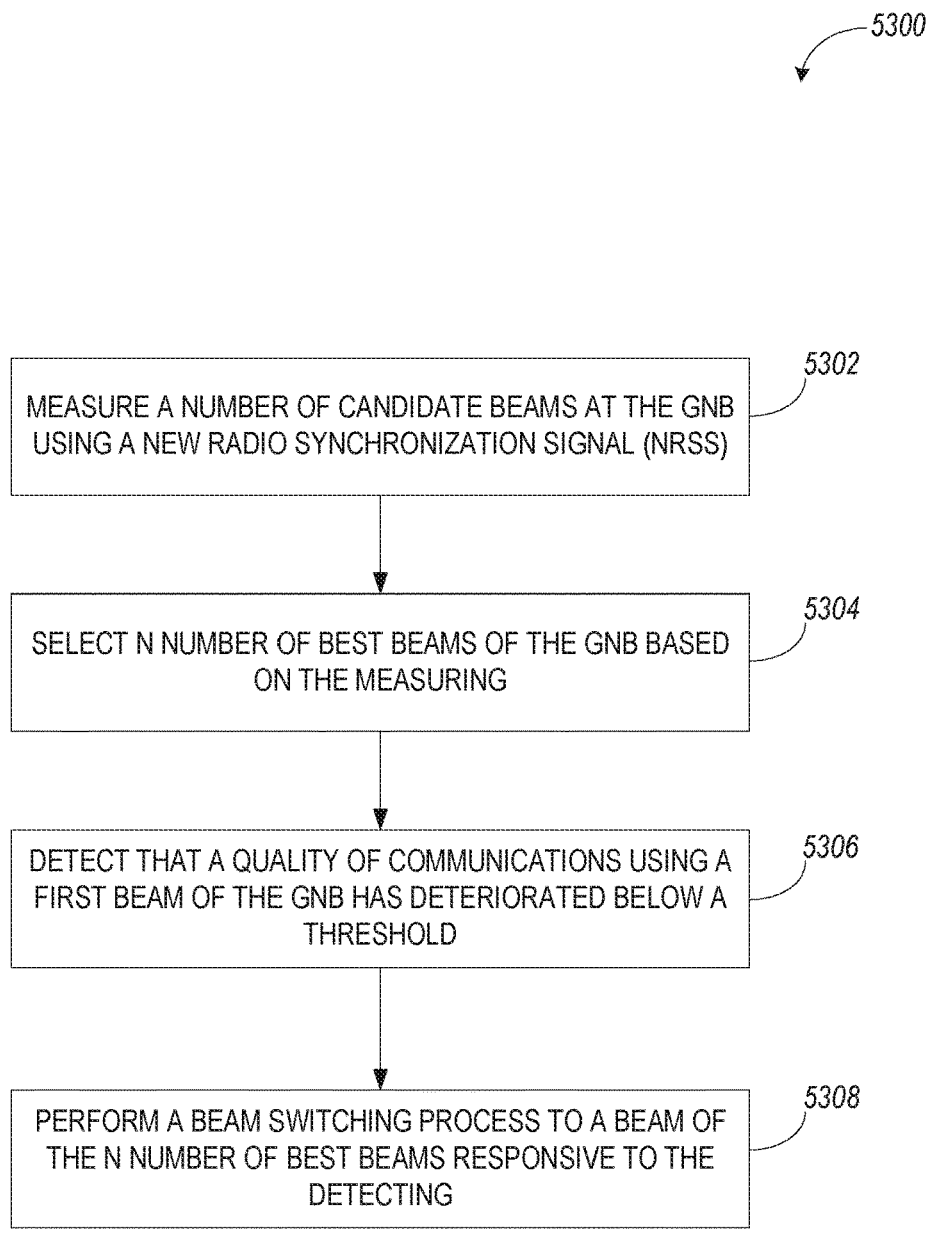
FIG. 53 is a flowchart of an example method for performing handover, in accordance with some aspects.

FIG. 53 is a flowchart of an example method 5300 in accordance with some aspects. The example method 5300 can begin with operation 5302 with a device (e.g., UE 101, 102, FIG. 1A) measuring candidate beams of the gNB using a NRSS. The example method 5300 can continue with operation A04 with the device selecting N number of best beams of the gNB based on the measuring. The example method 5300 can continue with operation 5306 with the device detecting that a quality of communications using a first beam of the gNB has deteriorated below a threshold. The example method 5300 can continue with operation 5308 with the device performing a beam switching process to a beam of the N number of best beams responsive to the detecting. The beam switching process can include beam management procedures, sector level sweep (SLS), etc. Layer 3 mobility handover event triggering from one cell to another cell. For handover within a cell (between beams within a cell) handover can occur by beam management, which will happen in the MAC and PHY layer. The handover process or beam switching process of method 5300 can include using a dedicated RACH to gain access to the target cell or target beam.

As described above, handovers may occur more often in high-mobility situations, causing increased signaling overhead that can burden networks and cause increased latency and other deterioration of user experience. According to some aspects, for gNBs having multiple cells, handovers can be performed between those multiple cells (i.e., intra-gNB handovers) and signaling for handovers can thereby be reduced.

If the source and target cells in a handover belong to the same gNB, the network can configure the UE to not perform certain actions typically performed during handover. For example, these actions can include resetting the packet data convergence protocol (PDCP).

Other operations can also be omitted when the source and target cell belong to the same gNB, according to some aspects. For example, Radio Link Control (RLC) may be configured so as to not be reset. Additionally, the same security keys can be maintained between the source and target. Radio resource control (RRC) signaling can be used for the network to signal the UE not to reset PDCP or RLC, or other protocol stacks, keys, or parameters related to the handover. If UE-based mobility is adopted, the network (using a mobility management entity (MME) or other network element) can inform the UE which cells belong to the same gNB so that when a UE-based handover is triggered, a reset of part of the protocol stack may in some aspects be avoided.

Figure 54:
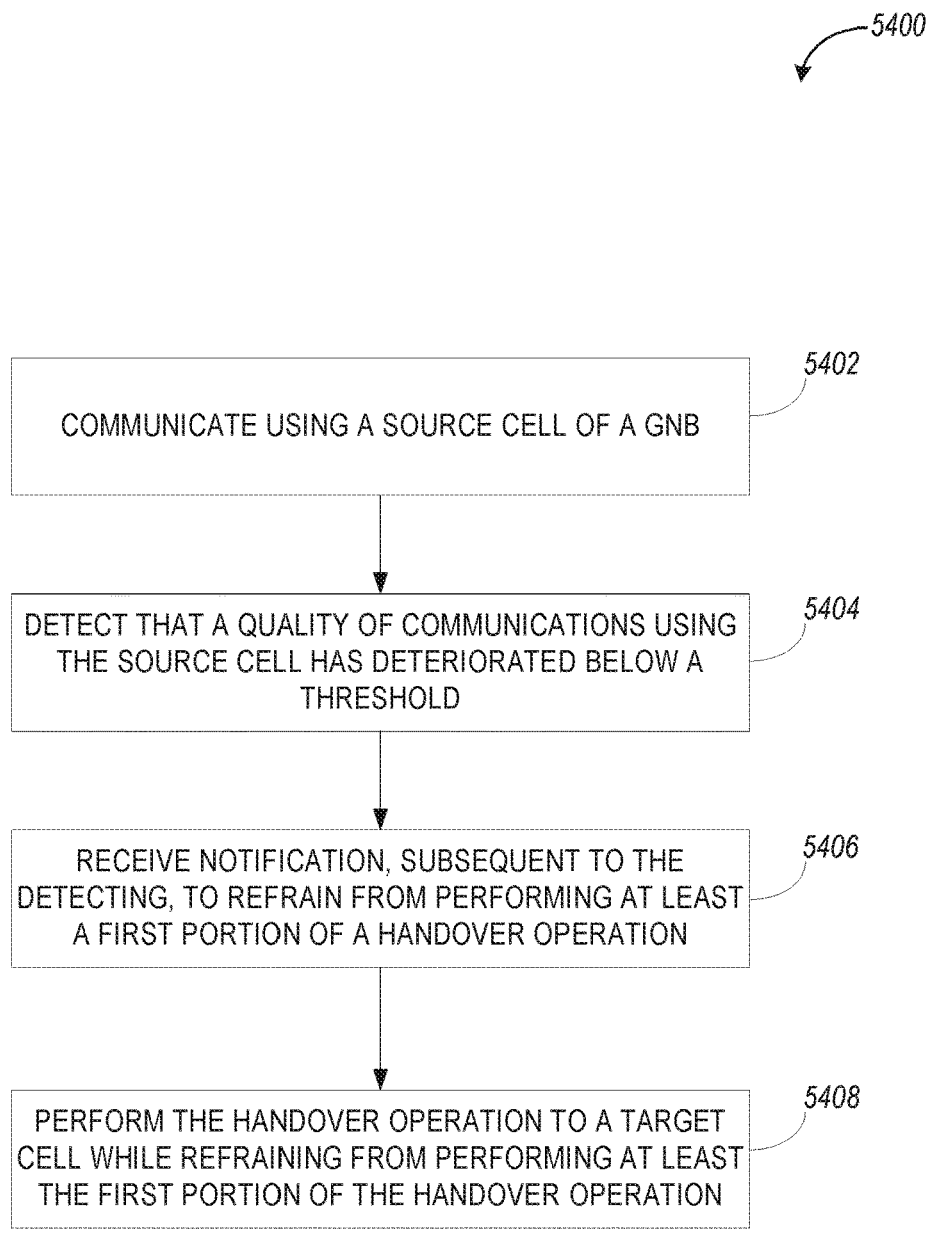
FIG. 54 is a flowchart of an example method for performing handover, in accordance with some aspects.

FIG. 54 is a flowchart of an example method 5400 in accordance with some aspects. The example method 5400 can begin with operation 5402 with a device (e.g., UE 101, 102, FIG. 1A) communicating using a source cell of a gNB. The example method 5400 can continue with operation 5404 with the device detecting that a quality of communications using the source cell has deteriorated below a threshold. The example method 5400 can continue with operation 5406 with the device receiving notification, subsequent to the detecting to refrain from performing at least a first portion of a handover operation. As described above, the first portion can include resetting the PDCP. The first portion can also include other operations, such as resetting RLC, exchanging security key s, or other operations. The example method 5400 can continue with operation 5408 with the device performing the handover operation to a target cell while refraining from performing at least the first portion. The example method 5400 can further include receiving notification that the source cell and target cell belong to a same gNB. The device can refrain from omitting portions of a handover operation based on the notification.

In certain aspects, a mobile cell can augment connectivity at cell edges. For example, the mobile cell can provide a reliable dual connection through handover (HO) processes. In certain aspects, mobile infrastructure can be used to coordinate movement and improve connectivity and HOs.

In various aspects, a drone-based cell may be deployed to facilitate HOs. Aspects are not limited to drone-based cells and other types of mobile cells can be utilized (e.g., vehicles, robots, etc.). The drone-based cell may provide a reliable "dual connection" through HO processes. The drone's position may be adjusted on-demand, depending on a mobility scenario. An assisting drone may also serve as a relay to facilitate HO in some aspects. In these and other aspects, drone positioning can occur based on distribution and location of UEs, upon signal strengths, upon measurement reports, etc.

In various aspects, drones or other mobile cells can assist with HOs between stationary cells. In these and other aspects, drones may hover above user devices and between the stationary cells to provide connectivity during HO. In at least these aspects, the user devices may therefore be communicating over a plurality of connections (e.g., two connections). The additional connection or connections can be used to improve reliability. The drone can also serve as a relay node in some aspects. The drone may be used in these aspects to help maintain a backhaul connection. As such, according to some aspects, algorithms can be used to maintain ideal or desirable positioning of the drone to balance provisioning of reliable access with maintenance of the backhaul connection.

Different entities can command the drone. The signaling can include collection of data, wherein the collected data can be used against various criteria to decide whether to trigger HO, etc. In various aspects, one or more network entities can use collected data to forecast where drone assistance may be needed. UE measurement information, UE location, mapping location vs. UE location, or combinations thereof can be used to determine that assistance may be needed sooner or later. A network controller or one or more base stations can trigger movement of a drone to assist HO. In certain aspects, the trigger can be based on a forecast as discussed above.

In certain aspects, the network can anchor drones near cell boundaries for quicker deployment. In some aspects, one or more drones can be autonomous but connected to the network in some way. An assisting drone can move and monitor radio conditions to possibly assist a handover. In certain aspects, the assisting drone can establish an assisting link during the handover. In some scenarios, the drone can act as a relay, while in other scenarios, the drone may establish a small cell or provide a dual connected base station.

In some aspects, a drone based cell, may be deployed to facilitate handovers. Such a cell can provide a reliable "dual connection" through the handover process. An assisting drone can be positioned on-demand, depending on the mobility scenario. Drone positioning may be based on distribution and location of UE signal strengths.

Figure 55:
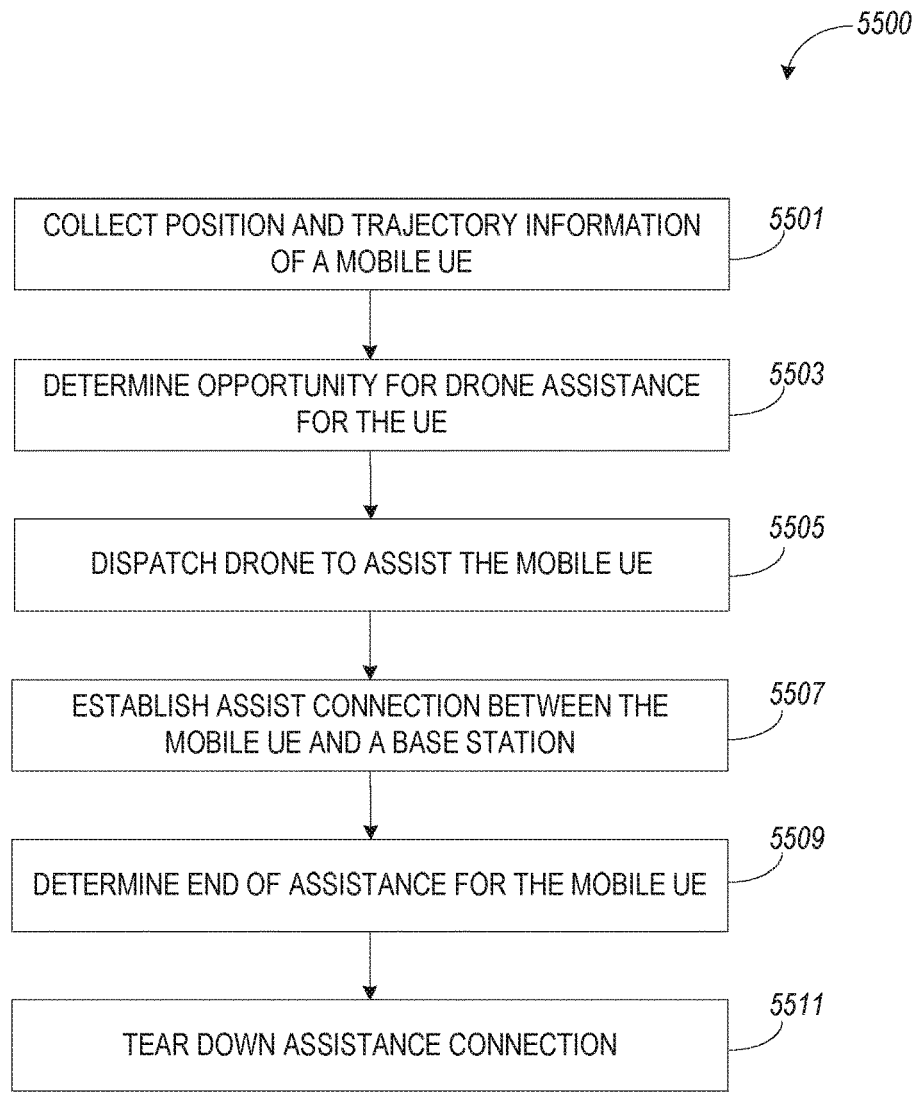
FIG. 55 illustrates generally a flow chart of an example method of using an assistance drone, in accordance with some aspects.

FIG. 55 illustrates generally a flow chart of an example method 5500 of using an assistance drone. At 5501, location and trajectory information can be collected from the UE. At 5503, an opportunity for drone assistance can be determined using the location and trajectory information as well as information about signal coverage in regions anticipated to be about a path of the mobile UE. At 5505, a drone can be dispatched to assist the mobile UE. In some aspects, drones used for assisting mobile UEs can be distributed near regions where unintended connection termination is more probable such as near cell boundaries or areas prone to signal attenuation due to topography, blockage, etc. In some aspects, assisting drones can be dispatched from a central location such that the travel time is deterministic and can be factored into whether assistance can be provided in a timely manner to the mobile UE.

At 5507, an assisting connection, or links, between the UE and one or more base stations can be established via the drone. In some aspects, the one or more base stations can include any serving base stations, any target base stations, and base stations having a connection to the mobile UE, or combinations thereof. The drone can maintain the assisting connections until one of the UE, the network, the serving base station, or the drone, at 5509, determines conditions have been met to terminate using the drone for assistance to the mobile UE. Such conditions can include, but are not limited to, completion of a particular task such as a handover, a probability of dropping a connection has fallen below a threshold, a higher priority task has been identified for the drone, the power supply of the drone needs to be recharged or can no longer support the assistance task, or combinations thereof. At 5511, the assisting connection or assisting links can be torn down in a ordered manner.

Figure 56:
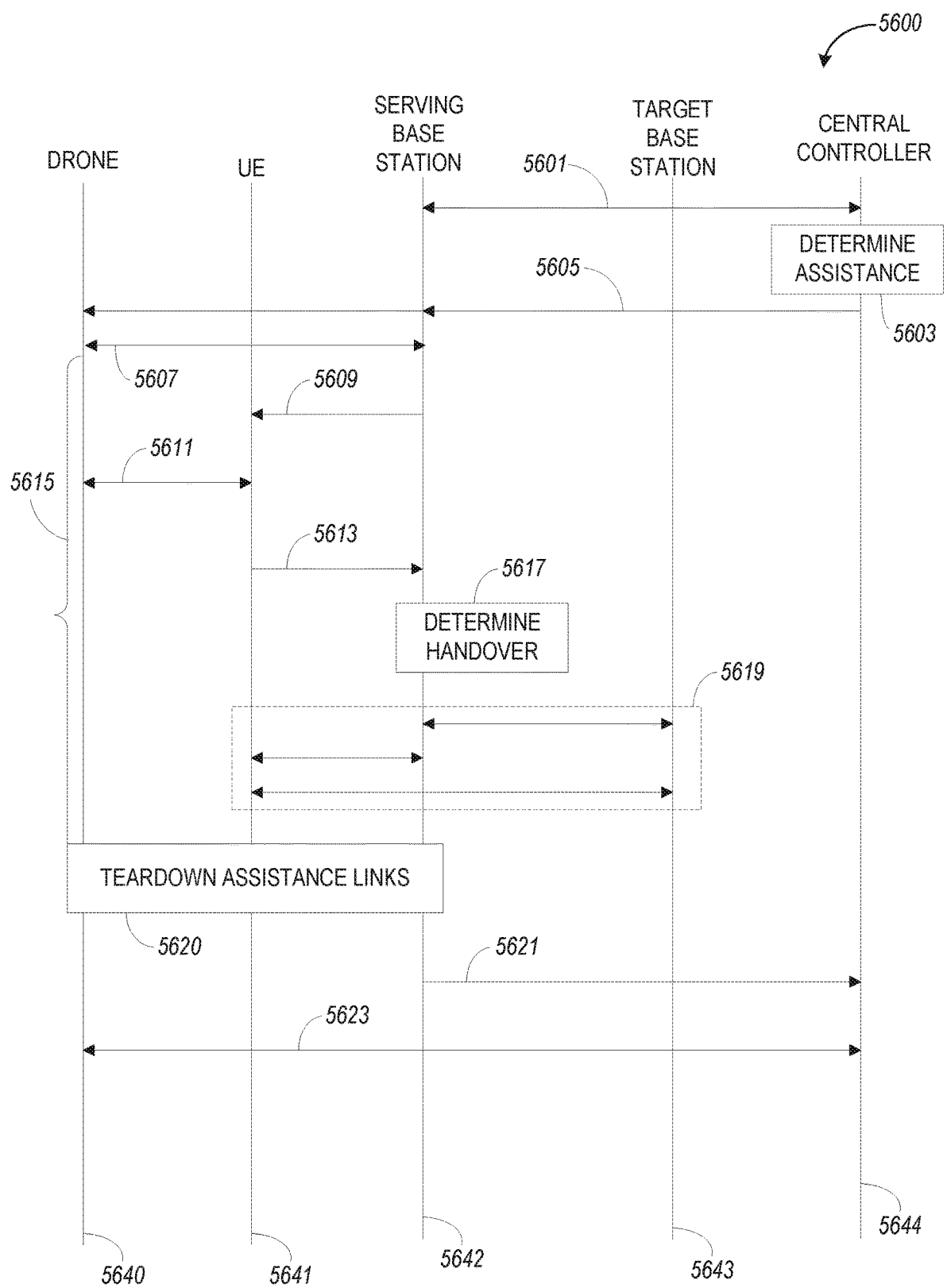
FIG. 56 illustrates generally a signaling flowchart of an example method of signaling using a drone to assist handover of a mobile UE, in accordance with some aspects.

FIG. 56 illustrates generally a signaling flowchart of an example method of signaling using a drone 5640 to assist handover of a mobile UE 5641. At 5601, position and trajectory information of the drone 5640 can be collected. In some aspects, the information can be collected by a central controller 5644 of the wireless network. In other aspects, the position and trajectory information can be collected by some other network entity such as one of the base stations 5642, 5643, for example. In some aspects, the position and trajectory information can be collected from a current or former serving base station of the UE 5641. In some aspects, the position and trajectory information can be collected from a target base station of the UE 5641. In some aspects, the position and trajectory information can be collected from GPS information provided by the UE 5641.

At 5603, the entity that collects the position and trajectory information of the UE 5641 can analyze the information to determine if employing an assistance drone can ensure a minimum or desirable level of reliability of connections or links established between the UE 5641 and the network.

If the entity determines that a minimum or desirable level of reliability of the connections or links of the mobile UE 5641 cannot be ensured, at 5605, the network can request or dispatch a drone 5640 to assist with maintaining communications with the network. From a probabilistic perspective, in certain aspects, an assisting drone can often be most useful near cell boundaries, thus, in various aspects, drone ports or drone idle locations can be positioned near cell boundaries for timely dispatching to a UE that can potentially benefit from assistance. However, other locations for positioning idle assisting drones are possible. In certain examples, the network entity requesting an assistance drone can also provide details about the UE 5641 to which assistance is to be provided. Such details can include, but are not limited to, position, trajectory, speed, serving base station, target base station, alternate base stations, or combinations thereof.

In response to the assistance request or command, the assisting drone 5640 can move to and begin to track the UE 5641 at a location that helps ensured or enhance connection reliability. At 5607, the assisting drone 5640 can establish a connection or link with the serving base station 5642 of the UE 5641. At 5609, in response to the link with the assisting drone 5640, the serving base station 5642 can provide an indication to the UE 5641 that the drone 5640 is assisting the UE 5641 with communication to the network. At 5611, once in position and tracking the UE 5641, the assisting drone 5640 can establish a connection or link with the UE 5641. In various aspects, the serving base station 5642 can optionally reconfigure one or more communication aspects of the UE 5641 to make use of the assisting drone 5640 or to fall back on the assisting drone 5640 should the normal connections or links begin to fail.

Once the connections of the assisting drone 5640 are established, use of the assisting drone 5640 can include relaying messages between the UE 5641 and various base stations 5642, 5643, in some aspects, or providing a backup for failed messaging in other aspects. If the drone 5640 is employed for handover assistance, once the assisting connections are established, communications between the UE 5641 and serving base station 5642, such as, for example, measurement reporting at 5613, can proceed. At 5615, the assisting drone (e.g., 5640) can sense signal quality either directly or via information from the network 5644 or base stations 5642, 5643, and maneuver to attempt to maintain maximum or sufficient connection reliability. At 5617, the serving base station 5642, or in some cases as discussed herein, the UE 5641, can use measurement or location triggers to determine or initiate a handover.

At 5619, handover signaling can take place between the UE 5641, the serving base station 5642 and the target base station 5643. As an option, some of the handover signaling can employ the assisting drone 5640 to relay signaling between two or more of the UE 5641, the serving base station 5642, and the target base station 5643. At 5620, optionally at a time just after completion of the handover, the assisting connections or links of the assisting drone 5640 can be torn down to free up resources as well as to free up the assisting drone 5640. At 5621, one of the former serving base station 5642 or the former target base station 5643 can indicate to the network 5644 that the handover of the UE 5641 is complete. At 5623, the network 5644 or the assisting drone 5640 can provide an indication to the other that the assisting of the UE 5641 is complete or that the drone 5640 is exiting the assisting of the UE 5641 to perform some other task, including but not limited to, servicing a different UE, waiting for a next assistance assignment, going offline for service such as to recharge, etc.

Figure 57:
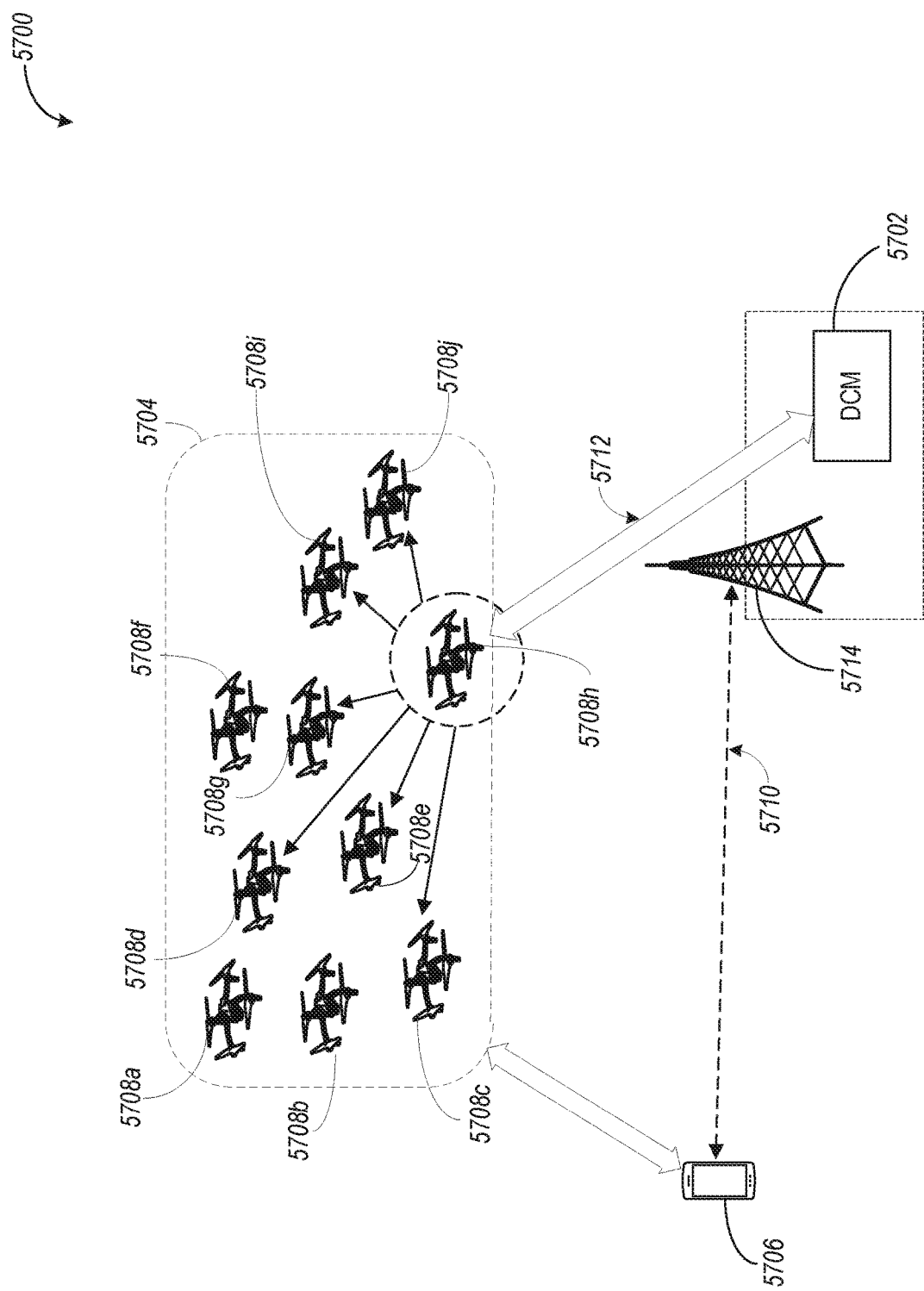
FIG. 57 illustrates an exemplary system architecture for Distributed Cloud Management (DCM) in a wireless network, in accordance with some aspects.

FIG. 57 illustrates an exemplary system architecture for Distributed Cloud Management (DCM) in a wireless network. In some aspects, a DCM system 5700 may include a swarm of Mobile Cloud Units (MCUs) 5704, which may be moving within the wireless network. Each MCU may be a drone (e.g., MCUs 5708a-5708j), in certain aspects, and the swarm of drones may be configured to establish a wireless communication link with a DCM function 5702 through a communication interface 5712. In some aspects, a single MCU (e.g., a drone) 5708h may be configured to communicate over the communication interface 5712 with the DCM function 5702. In this regard, the single drone 5708*h* may interchangeably be referred to as a drone leader, a swarm leader, and/or a capable drone. However, communication over the interface 5712 and/or with the DCM function 5702 is not limited to drone leader 5708*h*, and one or more other MCUs within the swarm 5704 may be configured to communicate over the communication interface 5712 with the DCM function 5702.

The DCM function 5702 may be a service and/or application as part of a network infrastructure (e.g., a core network). According to some aspects, the DCM function 5702 may be a standalone entity, may be deployed at a base station 5714 (e.g., gNB), may reside at an edge of the network (e.g., Mobile Edge Computing device (MEC)), or may reside in a cloud network. In some aspects, the swarm of MCUs 5704 may be under coordination of the DCM function 5702. The communication interface 5712 may be configured for transmission of control signaling and data signaling in some aspects, and may be a backhaul connection to a core network.

In some aspects, any one of the MCUs of the swarm 5704 may be configured to communicate wirelessly to a user equipment (UE) 5706, or a group of UEs. In certain aspects, each MCU in the swarm 5704 may be configured to communicate wirelessly in an uplink or downlink configuration with a separate UE, for example, by operating as an individual mobile AP. In other aspects, all MCUs in the swarm 5704 may be configured to communicate wirelessly in an uplink or downlink configuration as a group to a single UE, for example, by operating as a single mobile AP. The UE 5706 may also be configured to communicate with the base station 5714 (e.g., gNB) over a wireless communication interface 5710. A communication link between the swarm 5704 (e.g., any MCU in the swarm) and a UE, and between a UE and a base station, may include any type of wireless connection, for example, a 3GPP cellular-based wireless connection (e.g., LTE, LTE-A, 5G, mmWave) and/or WLAN-based wireless connection (e.g., WiFi, WiGig).

Any one of the MCUs in the swarm 5704, in some aspects, may be configured to communicate wirelessly to another MCU. For example, the MCUs in the swarm may establish communication links between one another and may synchronize communications over a communication interface that is configured for communications between two or more MCUs of the swarm.

In some aspects, the communication interface between two or more MCUs of the swarm 5704 may also include any type of wireless connection, for example, a 3GPP cellular-based wireless connection (e.g., LTE, LTE-A, 5G, mmWave) and/or WLAN-based wireless connection (e.g., WiFi, WiGig). In some aspects, the MCUs of the swarm may use a device-to-device communication interface (e.g., 3PPG D2D interface) for communicating within a certain proximity of one another.

In certain aspects, one of the MCUs of the swarm may be designated as a swarm leader (e.g., 5708*h*), may communicate directly with the DCM function 5702, may synchronize and/or coordinate communications with one or more other MCUs of the swarm, and may transmit data and/or control signaling received from the DCM function 5702 to the one or more other MCUs in a distributed and/or redundant manner. The swarm leader may use one or more security keys to configure a secure formation of the swarm of MCUs, for example. One or more other MCUs may coordinate communications to avoid or mitigate interference and optimize spectrum re-use according to some aspects. In some aspects, the swarm leader 5708*h* may act as a relay to the other MCUs of the swarm, may provide backhaul connectivity to the other MCUs, and/or may receive transmissions from any one of the other MCUs for transmission to the DCM function 5702. In some aspects, the MCUs of the swarm 5704 may be configured to operate in a distributed antenna mode (e.g., distributed MIMO). In certain aspects, a central controller (e.g., MCU acting as a swarm leader) may distribute data to other MCUs in the swarm, for those MCUs to subsequently transmit the data to one or more UEs.

Figure 58:
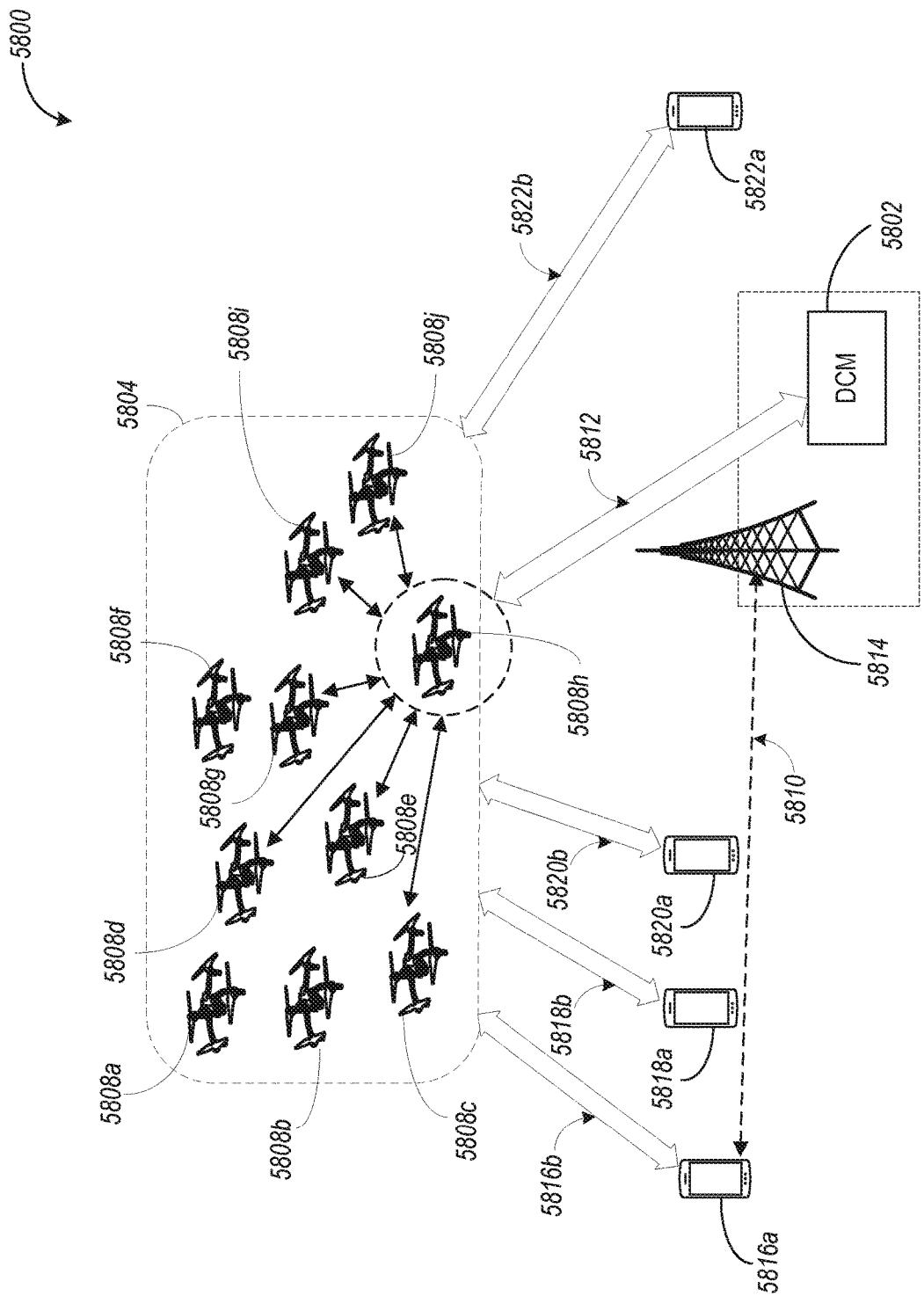
FIG. 58 illustrates an exemplary system architecture for DCM in a wireless network, in accordance with some aspects.

FIG. 58 illustrates an exemplary system architecture for DCM in a wireless network, in accordance with some aspects. References 5802, 5804, 5808*x*, 5810, 5812, and 5814 in FIG. 58 may in some aspects have similar functionality to references 5702, 5704, 5708*x*, 5710, 5712, and 5714, respectively, illustrated in FIG. 57. According to the configuration of DCM system 5800 in FIG. 58, for example, the swarm leader (e.g., 5808*h*) may transmit data signaling in a distributed manner to the other MCUs in the swarm 5804, and each data signaling transmission to the respective MCUs may be different. Each of the MCUs in the swarm may subsequently transmit the data signaling received from the swarm leader to a separate UE (e.g., 5816*a*, 5818*a*, 5820*a*, and 5822*a*), and each data signaling transmission to the separate UEs may be different (e.g., 5816*b*, 5818*b*, 5820*b*, and 5822*b*). For a distributed antenna mode, in some aspects, each of the MCUs in the swarm may include one or more antennas configured for MIMO transmissions.

In some aspects, the MCUs of the swarm 5704 may be configured to operate in a redundant mode. For example, in a redundant mode, each of the MCUs of the swarm 5704 may transmit the same data to a singe UE to improve reliability (e.g. for mission critical data). In certain aspects, a central controller (e.g., MCU acting as a swarm leader) may distribute data to other MCUs in the swarm, for those MCUs to subsequently transmit the data to a single UE (e.g., 5906 in FIG. 59).

Figure 59:
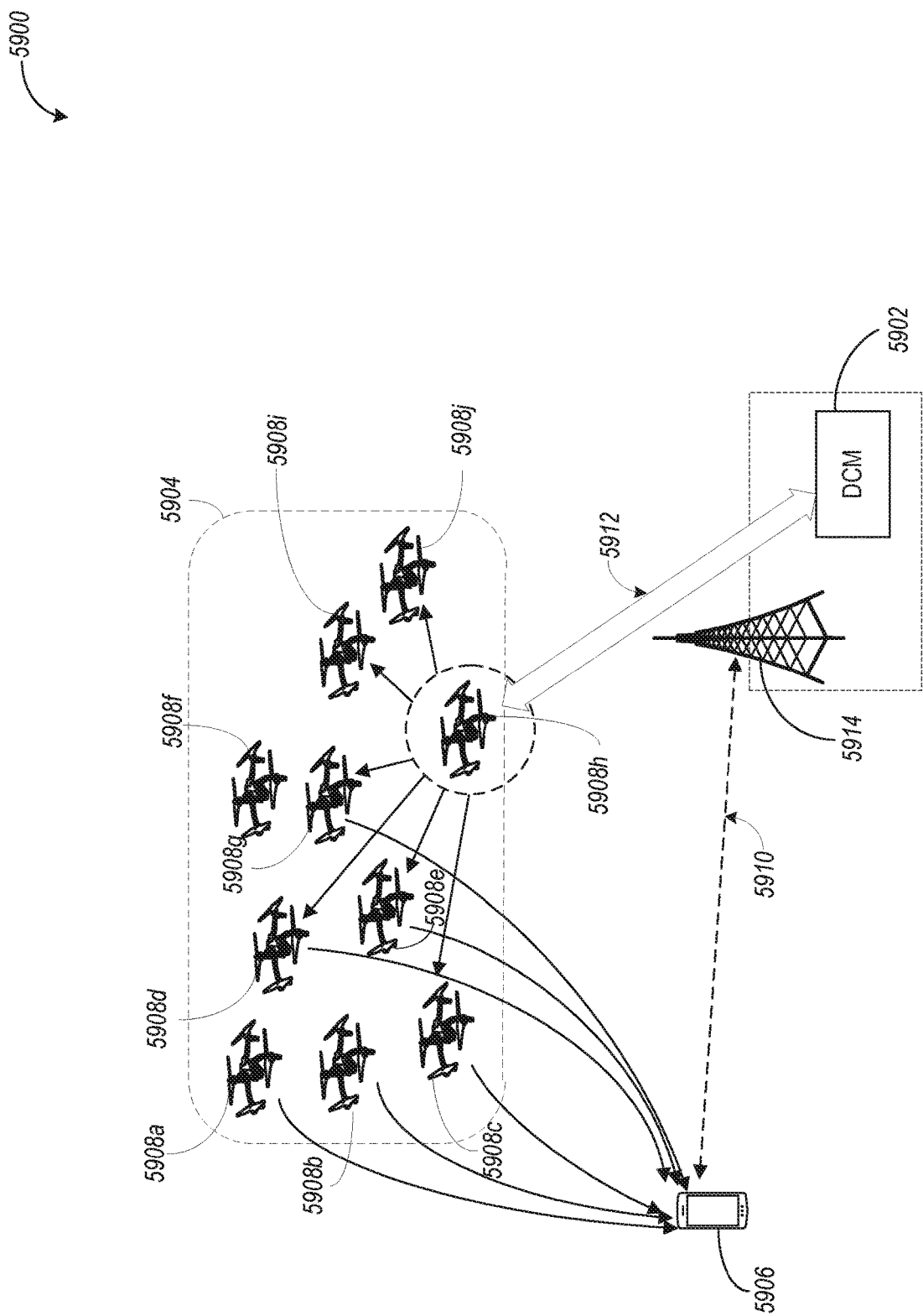
FIG. 59 illustrates an exemplary system architecture for DCM in a wireless network, in accordance with some aspects.

FIG. 59 illustrates an exemplary system architecture for DCM in a wireless network, in accordance with some aspects. References 5902, 5904, 5908*x*, 5910, 5912, and 5914 in FIG. 59 may in some aspects have similar functionality to references 5702, 5704, 5708*x*, 5710, 5712, and 5714, respectively, illustrated in FIG. 57. According to the configuration of DCM system 5900 in FIG. 59, for example, the swarm leader (e.g., 5908*h*) may transmit data signaling to the other MCUs in the swarm 5904, and each data signaling transmission to the respective MCUs may be the same. Each of the MCUs in the swarm may subsequently transmit the data signaling received from the swarm leader to a single UE 5906, and each data signaling transmission to UE 5906 may be the same.

In some aspects, the DCM function 5902 can be configured to receive and decode capability information from one of the MCUs (e.g., 5908*h*), and the capability information may indicate certain capabilities of the MCU to operate in the DCM system. For example, in certain aspects, the capability information may include one or more information elements as part of a frame that is transmitted to the DCM function 5902. In receiving the capability information from the MCU, the DCM function may register the MCU as a capable device and may transmit signaling to the capable device (e.g., MCU), and the signaling may include configuration information for configuring a formation of the swarm of MCUs (e.g., 5904). In certain aspects, the capability information may include one or more security keys to configure a secure formation of the swarm of MCUs and may include information to configure the capable device as a swarm leader. In certain aspects, once the MCU (e.g., MCU 5908*h*) receives the configuration information and is configured as a capable device (e.g., and a swarm leader), the MCU 5908*h* may synchronize with the other MCUs in the swarm. In some aspects, designation of a MCU as a swarm leader may be preconfigured or may be configured by the MCU.

In certain aspects, a triggering event, may initiate the formation of a swarm of MCUs. In some aspect, the DCM function 5902 may transmit the configuration information before, after and/or during the triggering of the formation of the swarm, and the DCM function 5902 may transmit triggering information to initiate the formation of the swarm of MCUs. A triggering event may include, for example, loss of connectivity of a UE and/or a MCU, an emergency event, such as an event when replacement of architecture is requested, additional capacity is needed, or a base station has gone out of service. In some aspects, to form a swarm, a MCU that is configured as the group leader (e.g., 5908*h*) may transmit group advertisement signaling to be broadcast over the wireless communication interface between the MCUs. The group advertisement signaling in certain aspects, may include one or more beacon frames. In other aspects, upon a triggering event (e.g., threshold event), any one of the MCUs may be added or removed from an established swarm.

In addition to handovers among drones of a swarm described above, according to some aspects, systems and methods can perform handovers from a first swarm of drones to a second swarm of drones. A single UE can be handed over to the second swarm of drones, or groups of UEs can be handed over to the second swarm of drones. According to some aspects, the following may be employed: basic signaling for drone swarm handover events, signaling between drones to maintain a distributed drone-based cloud infrastructure that provides radio access to UEs, signaling between drones and an infrastructure DCM function to configure and manage the drone network and wireless backhaul between drones, and signaling between drones and UEs to maintain connectivity when changes occur in the distributed cloud. Such changes can include drones joining or leaving a swarm, among other changes. According to some aspects, consistent and mobile coverage for UEs can be provided through a mobile drone-based cloud infrastructure.

Figure 60:
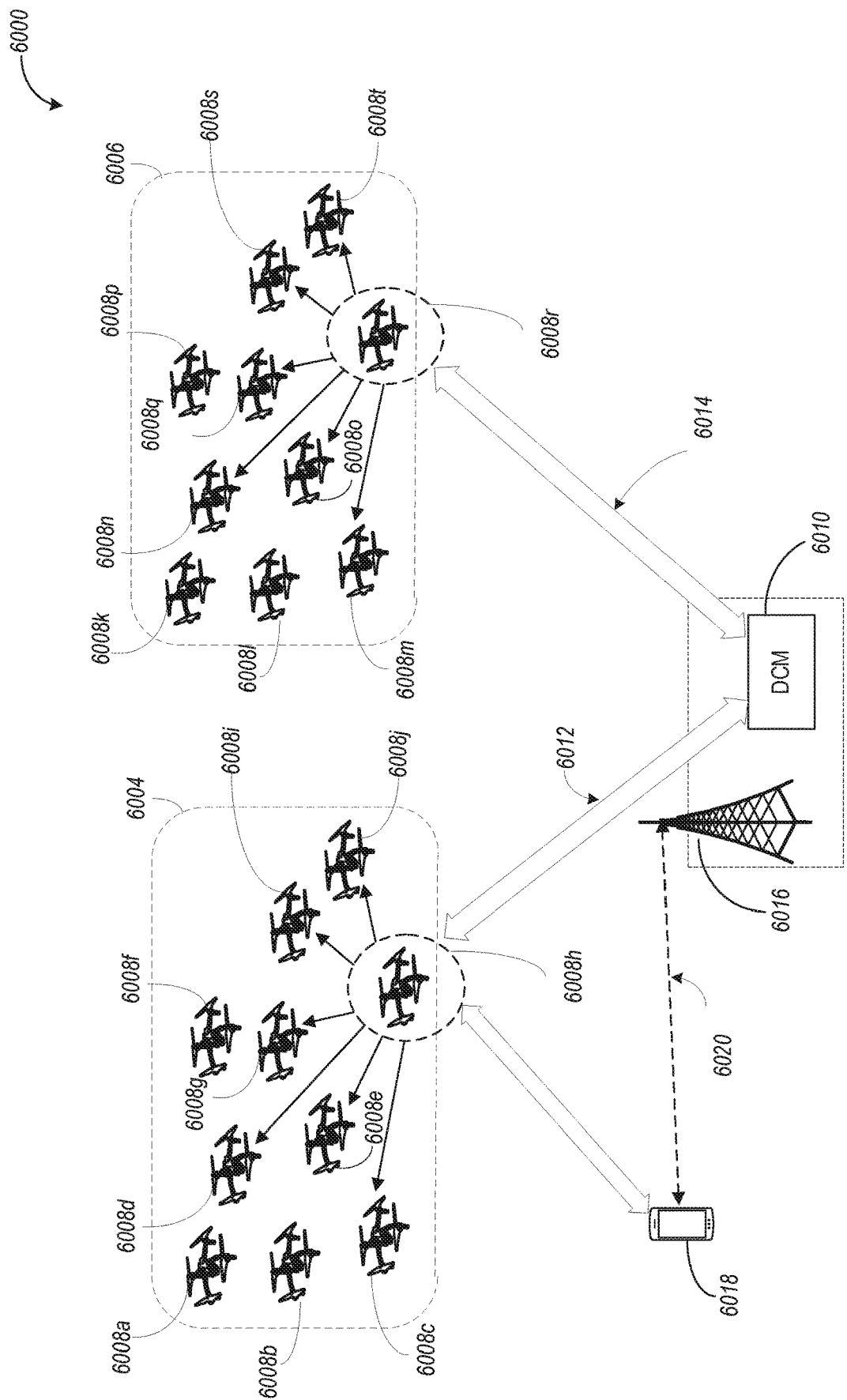
FIG. 60 illustrates an exemplary system architecture for DCM in a wireless network, in accordance with some aspects.

FIG. 60 illustrates an exemplary system architecture for DCM 6000 in a wireless network. In some aspects, a DCM system 6000 may include two or more swarms of MCUs 6004, 6006, which may be moving within the wireless network. Each MCU may be a drone (e.g., MCUs 6008*a*-6008*t*), in certain aspects, and the swarms 6004, 6006 may be configured to establish a wireless communication link with a DCM function 6010 through communication interfaces 6012, 6014. In some aspects, a single MCU (e.g., drone) 6008*h*, 6008*r* from each swarm 6004, 6006 may be configured to communicate over the communication interface 6012, 6014 with the DCM function 6010. However, according to some aspects, one or more other MCUs within swarms 6004, 6006 may be configured to communicate over the communication interface 6012, 6014 with the DCM function 6010.

The DCM function 6010 may be a service and/or application as part of a network infrastructure (e.g., a core network). According to some aspects, the DCM function 6010 may be a standalone entity, may be deployed at a base station 6016 (e.g., gNB), may reside at an edge of the network (e.g., Mobile Edge Computing device (MEC)), or may reside in a cloud network. In some aspects, the swarms 6004, 6006 may be under coordination of the DCM function 6010. The communication interfaces 6012, 6014 may be configured for transmission of control signaling and backhaul signaling in some aspects, and may be a backhaul connection to a core network.

In some aspects, any one of the MCUs of the swarms 6004, 6006 may be configured to communicate wirelessly to a user equipment (UE) 6018, or a group of UEs. In certain aspects, each MCU in the swarms 6004, 6006 may be configured to communicate wirelessly in an uplink or downlink configuration with a separate UE, for example, by operating as an individual mobile AP. In other aspects, all MCUs in the swarms 6004, 6006 may be configured to communicate wirelessly in an uplink or downlink configuration as a group to a single UE during connection of the respective swarm to the single UE, for example, by operating as a single mobile AP. The UE 6018 may also be configured to communicate with the base station 6016 (e.g., gNB) over a wireless communication interface 6020. A communication link between the swarms 6004, 6006 (e.g., any MCU in the swarm) and a UE, and between a UE and a base station, may include any type of wireless connection, for example, a 3GPP cellular-based wireless connection (e.g., LTE, LTE-A, 5G, mmWave) and/or WLAN-based wireless connection (e.g., WiFi, WiGig).

Any one of the MCUs in the swarms 6004, 6006, in some aspects, may be configured to communicate wirelessly to another MCU. For example, the MCUs in the swarm may establish communication links between one another and may synchronize communications over a communication interface that is configured for communications between two or more MCUs of the swarm.

In some aspects, the communication interface between two or more MCUs of the swarms 6004, 6006 may also include any type of wireless connection, for example, a 3GPP cellular-based wireless connection (e.g., LTE, LTE-A, 5G, mmWave) and/or WLAN-based wireless connection (e.g., WiFi, WiGig). In some aspects, the MCUs of the swarms may use a device-to-device communication interface (e.g., 3GPP D2D interface) for communicating within a certain proximity of one another, although aspects are not so limited. In certain aspects, one of the MCUs of the swarms may be designated as a swarm leader (e.g., 6008*h*, 6008*r*), may communicate directly with the DCM function 6010, may synchronize and/or coordinate communications with one or more other MCUs of the swarms, and may transmit data and/or control signaling received from the DCM function 6010 to the one or more other MCUs in a distributed and/or redundant manner. The swarm leaders may use one or more security keys to configure a secure formation of the swarm of MCUs, for example. According to some aspects, one or more other MCUs may coordinate communications to avoid interference and optimize spectrum re-use. In some aspects, the swarm leaders 6008*h*, 6008*r* may act as a relay to the other MCUs of the swarm, may provide backhaul connectivity to the other MCUs, and/or may receive transmissions from any one of the other MCUs for transmission to the DCM function 6010. In some aspects, the MCUs of the swarms 6004, 6006 may be configured to operate in a distributed antenna mode (e.g., distributed MIMO). In certain aspects, a central controller (e.g., MCU acting as a swarm leader) may distribute data to other MCUs in the respective swarm, for those MCUs to subsequently transmit the data to one or more UEs.

Figure 61:
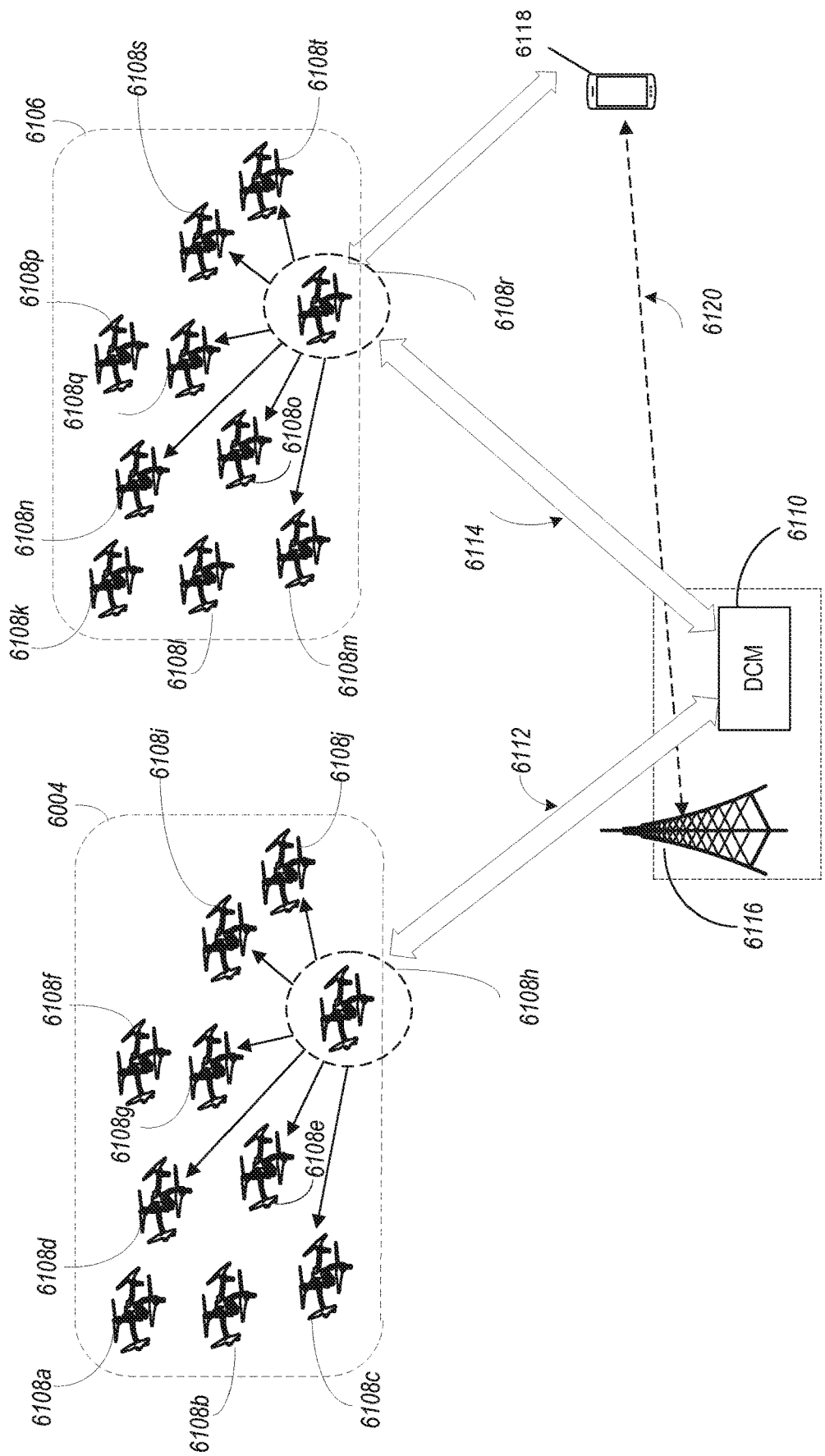
FIG. 61 illustrates a UE that has been handed over to a swarm of wireless devices, in accordance with some aspects.

In aspects, a UE can be handed over from one swarm to another swarm. FIG. 61 illustrates a UE 6118 that has been handed over to swarm 6106. The UE 6118 may handover to swarm 6106 as UE 6118 moves, if swarms 6104, 6106 remain static in position, according to some aspects. In such aspects, UE 6118 can trigger handover in the same way as with fixed BSs, while the MCUs on the edge of their respective swarm 6104, 6106 (e.g., MCU 6108*j*, 6108*k*, 6108*l*, 6108*m*) may in such aspects adjust their movement to enable the transition to another swarm without loss of connectivity for UEs that have active sessions. For instance, once the handover is triggered by the UE, each MCU in two neighboring swarms may move relative to the UE to improve their corresponding link quality with the UE. Once the handover is completed, the edge MCUs (e.g., MCU 6108*j*, 6108*k*, 6108*l*, 6108*m*) may return to their original position or to a new position depending on the coverage needs of the group at the given time, according to some aspects.

In some aspects, handover may occur from a swarm (e.g., swarm 6104) to an MCU that is not part of any swarm (not shown in FIG. 61). In some aspects, swarms may move with a UE or group of UEs to assist handover to a different base station other than base station 6116. In aspects, a swarm 6104 or 6106 may perform handovers with respect to their assisting BS (e.g., base station 6116). This and other handover processes can be handled by the DCM function 6110, to provide a swarm handover procedure that reduces signaling between each drone in the swarm and the fixed infrastructure. In some aspects, a swarm leader (e.g., 6108*h*, 6108*r*), may be the only MCU to take part of handover, but other swarm members may assist by providing measurements (trigger information or new BS discovery information). Once the handover is completed the swarm leader 6108*h*, 6108*r* may re-configure the respective swarm 6104, 6106 to enable connectivity with the new base station (not shown in FIG. 61).

In certain aspects in which a group of UEs are handed over while UE connections are active, a few swarm members may be selected to maintain connectivity with the infrastructure to continue the UE data sessions. The selection may be based on, for example, the location and requirements of the UEs and the drones in the swarm. A dedicated handover data channel may be established to enable data forwarding to the network infrastructure while MCUs are in transition between cells. The dedicated channel may provide longer coverage range to enable a select MCU to keep connectivity during handover but with reduced capacity such that only select UEs are assisted during group handover, according to such aspects.

Figure 62:
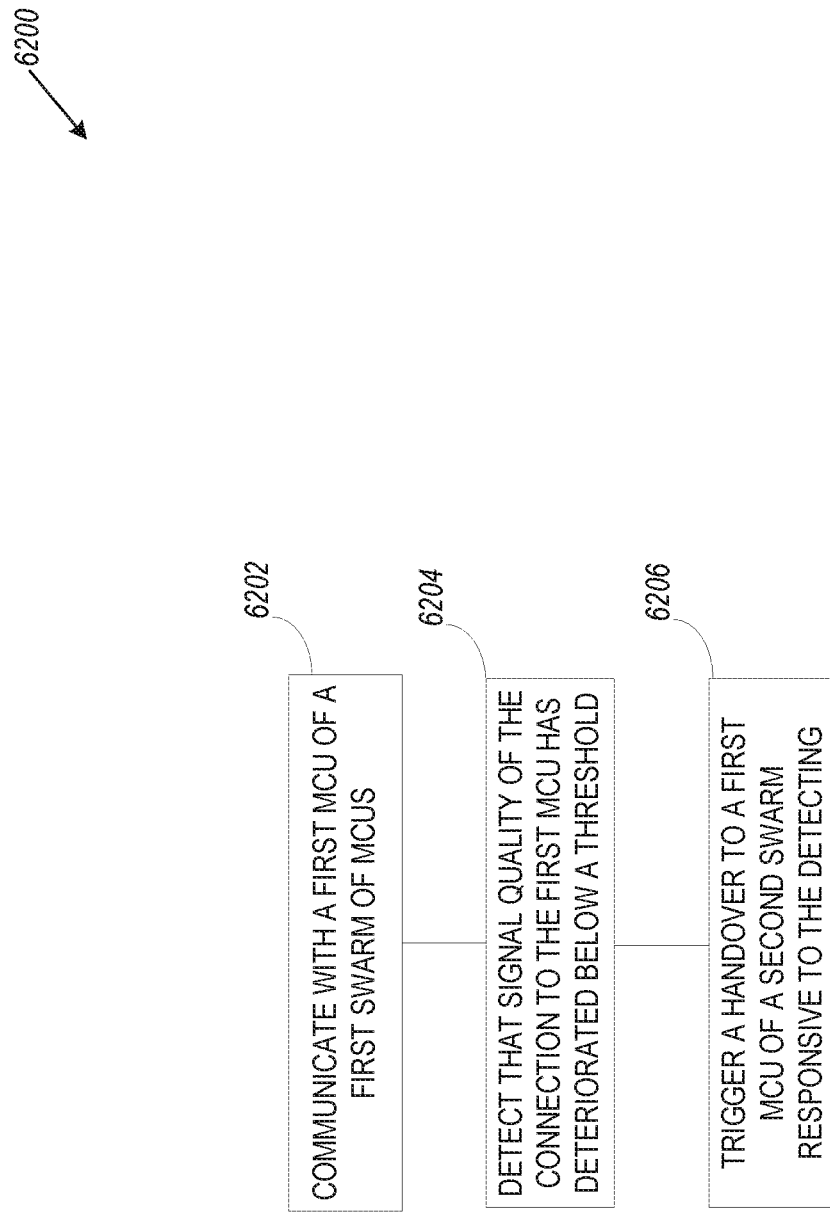
FIG. 62 illustrates an example method for performing a handover, in accordance with some aspects.

FIG. 62 illustrates an example method 6200 for performing a handover. The example method 6200 may begin with operation 6202 with a UE communicating with a first MCU (e.g., MCU 6008*h*, FIG. 60) of a first swarm (e.g., swarm 6004, FIG. 60). The example method 6200 may continue with operation 6204, when the signal quality of the connection to the first MCU can be detected as deteriorated below a threshold (e.g., the detecting can be performed by the base station 6016, the DCM 6010 or one or more of the drones within the swarm 6004 in FIG. 60). The example method 6200 may continue with operation 6206, when a handover can be triggered to a first MCU of a second swarm (e.g., MCU 6008*m*, FIG. 60) in response to the detecting.

One of the gals of networking technologies to date has been to provide users with a quality mobile broadband experience that allows for low-latency streaming of large amounts of data. More recently, other communication types have become increasingly utilized. Accordingly, core network elements and base stations can, in some instances, benefit from intelligence and flexibility to handle various communication types, which can be beneficial especially in handover-related scenarios.

In addition to mobile broadband, 5G communications can include Massive Internet of Things (IoT) and Ultra-Reliable Low Latency Communication (URLLC) communication types. Machine-to-Machine (M2M) and Device-to-Device (D2D) communications (which often include sensor data), may make use of the 5G wireless networking infrastructure by creating small ad hoc networks that, taken together, have implications in the core and edge network. Data characteristics and latency requirements may vary among the communication types, resulting in different requirements. Such differences can include different modulation and encoding/decoding mechanisms, different mechanisms for charging and data encapsulation and forwarding differences. Some communication types may use reduced control overhead because of smaller payload data transfer. Additionally, some communication types can benefit from different ways to separate the control signaling path from the data path, for example because data paths may be shorter for some communication types relative to other communication types. Core network elements and base stations can, in some instances, benefit from improved intelligence and flexibility in order to handle 5G traffic types.

According to some aspects, systems, methods and apparatuses can provide intelligent classification of traffic, attachment of metadata with the traffic to identify processing expectations of the traffic, and intelligent processing of the traffic based on the classification. In some aspects, certain types of processing can be bypassed based on intelligent interpretation of the metadata. According to some aspects, end-to-end (E2E) latency, timing synchronization and guaranteeing of services can be addressed. As the platform adapts, according to certain aspects, machine learning algorithms for more efficient selection of modulation schemes, channel estimations and MIMO algorithms and schemes can be employed.

Figure 63:
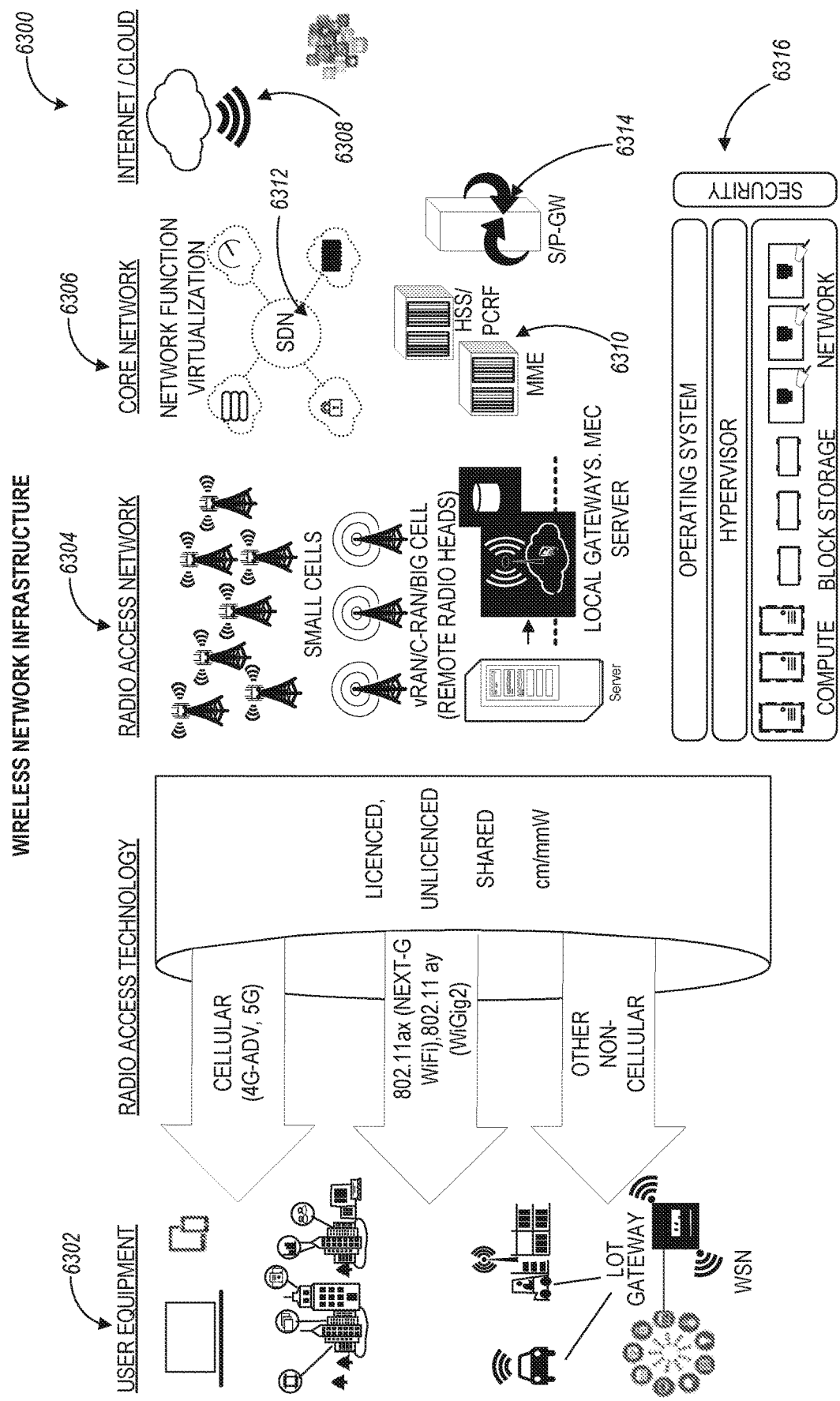
FIG. 63 illustrates a wireless network infrastructure, in accordance with some aspects.

FIG. 63 illustrates a wireless network infrastructure 6300. As illustrated on the left side of FIG. 63, various UEs 6302 access network services in various ways. When calls or other access requests (e.g., application data requests) are made by a UE 6302, the request enters a radio access network (RAN) 6304 that includes various network elements, referred to as base stations, access points, cells, evolved Node-Bs (eNBs), next generation Node-Bs (gNBs), etc. Decoding and other processes may be controlled based on specifications (e.g., 3GPP, WiFi, etc.). The requests can then be transferred to the core network 6306, which may control access to the data network 6308 (e.g., the Internet). Some core network 6306 elements can include MME 6310, software defined network (SDN) elements 6312, and various gateway (GW) elements 6314, for example. Operating systems and other elements 6316 can execute on any component in core network 6306, RAN 6304, and data network 6308, according to some aspects.

Consumers have been favoring access to increasingly data-hungry applications, such as data-streaming applications and other broadband applications. On the other hand, there is also increasing demand for URLLC, as often observed in the context of industrial machines. Unlike broadband communications, less data is transmitted in URLLC communications although latency specifications may be even more rigorous than with broadband applications. In some traffic types, referred to herein as Massive IoT, many millions of sensors may provide data according to some aspects. Even though each sensor may transmit very limited data, the total amount of data transmitted may place a large burden on networks. Still further, the data being transmitted back and forth is typically processed. For example, in smart city applications, sensor data can be processed and used for traffic monitoring security, etc.

Figure 64:
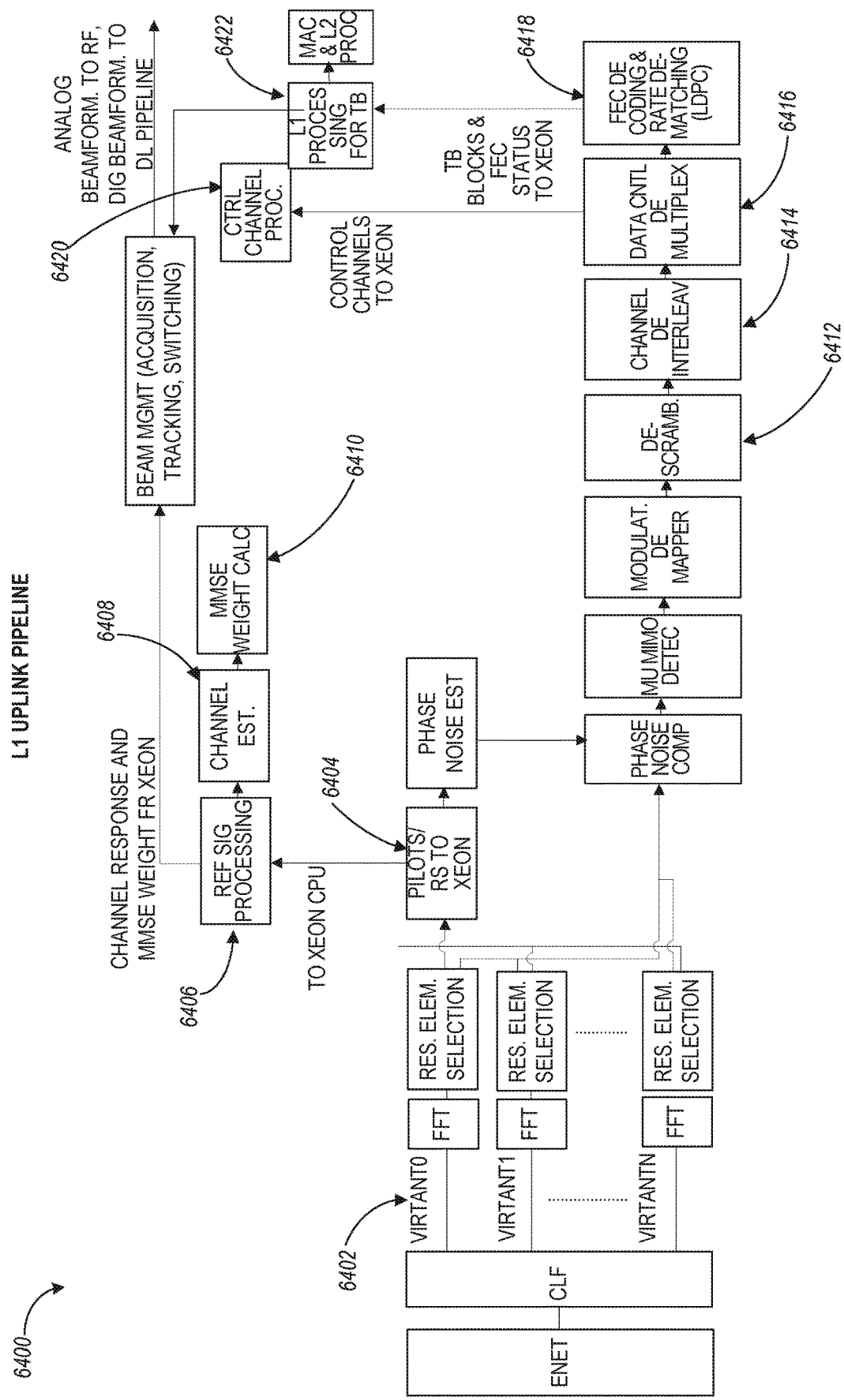
FIG. 64 illustrates 5G operations for data processing on the uplink, in accordance with some aspects.
Figure 65:
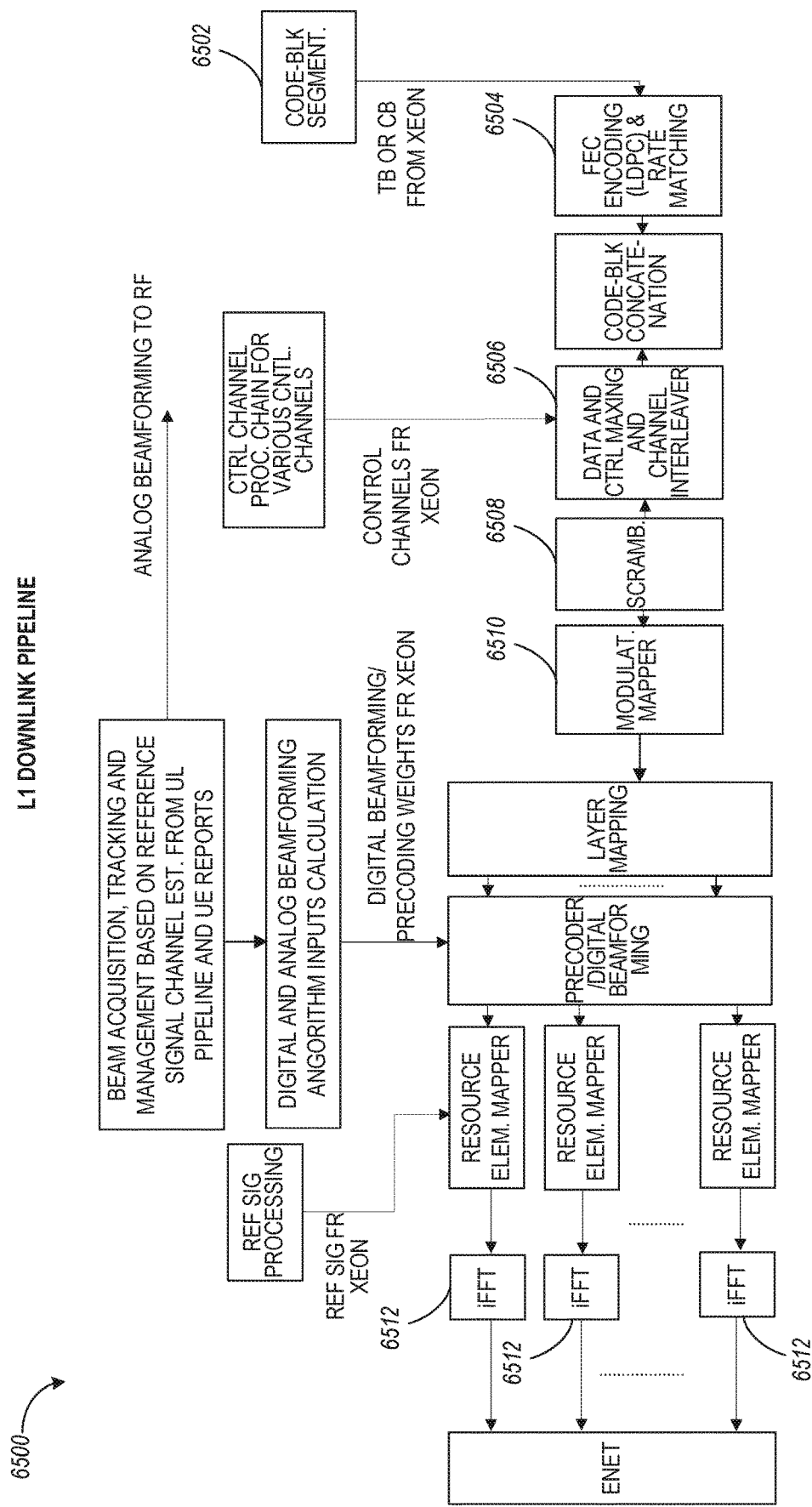
FIG. 65 illustrates 5G operations for data processing on the downlink, in accordance with some aspects.

FIG. 64 illustrates 5G operations for data processing on the uplink and FIG. 65 illustrates 5G operations for data processing on the downlink. FIG. 64 illustrates an uplink pipeline 6400 as may be currently implemented in 5G systems. The example pipeline 6400 may operate for multiple carriers according to some aspects, with up to 'N' streams each at a given transmission time interval (TTI) with scalability to some finite number of component carriers (CCs). Starting from the left of FIG. 64, data can be brought in from multiple antennas 6402, and resource element mapping MIMO detection and modulation de-mapping can be performed. Pilots and/or reference signals (RSs) 6404 may be provided to processing circuitry 6406 for reference signal processing channel estimation 6408, and minimum mean-square error (MMSE) 6410 calculation. The channel response and MMSE weights can then be provided for beam management, and also for further processing including descramblers 6412, channel deinterleavers 6414, data control demultiplexers 6416, and forward error correction (FEC) decoding and rate dematching algorithms 6418. Other suitable functionality may be included. Outputs of the demultiplexing operations can be provided for control channel processing 6420. Outputs of the FEC decoding and rate dematching algorithms can be provided for layer 1 (L1) processing 6422 of transport blocks (TBs). Final output is provided for MAC and L2 layer processing according to some aspects.

FIG. 65 illustrates a downlink pipeline 6500 as may be currently implemented in 5G systems, according to some aspects. On the right-hand side of FIG. 65, a transport block 6502 is divided into smaller size code blocks, which is referred to as code block segmentation, before being applied to the FEC encoding (LPDC) and rate matching circuitry 6504. Next, rate matched outputted code blocks are concatenated back together. Control channel information 6506 is received and interleaved with data channel information. The interleaved data can then be fed to a scrambler 6508 and a modulation mapper 6510, and digital beamforming or precoding weights can be received to map data into resource elements at each UE antenna 6512.

In addition to providing packet processing for video streaming and voice, operators can be called upon to provide processing and support for various types of data usages with different levels of latency and throughput requirements. One way to separate traffic is to provide different radio bearers. According to some aspects, a more dynamic traffic handling and recognition mechanism, referred to herein as network slicing can be implemented at base stations and UEs themselves. A network slice can be understood based on which network elements are used and what computing resources (e.g., processors, memory, files, hardware accelerations, PGAs, and the like) are used, according to some aspects. Metadata can be attached to the traffic to define which network elements and computing resources can be used for that traffic.

Figure 66:
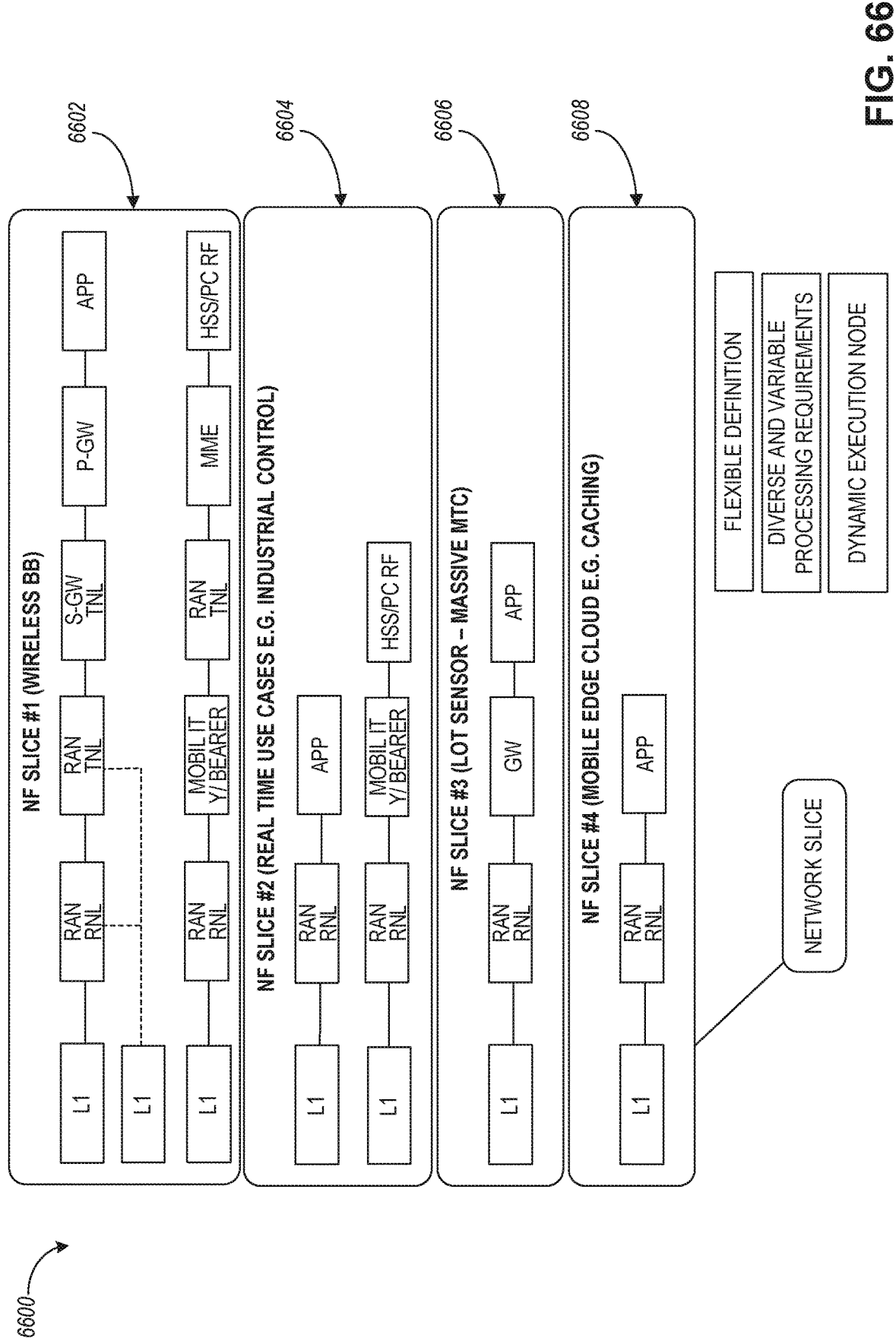
FIG. 66 illustrates network slices, in accordance with some aspects.

FIG. 66 illustrates network slices according to aspects. By way of example, according to some aspects, a frequency pool from which component carriers (CCs) or other types of allocation can be allocated for carrying traffic of different traffic types, can be employed. The network may have different slices to address different types of traffic. For example, in certain aspects, network slice 1 of FIG. 66 (element 6602) may be dedicated to wireless broadband, network slice 2 (element 6604) may be dedicated to real time traffic types (e.g., industrial control), network slice 3 (element 6606) may be dedicated to IoT sensors (e.g., Massive IoT), and network slice 4 (element 6608) may be dedicated to mobile edge cloud (e.g., caching). Any number of network slices may be provided, and communication types are not limited to the types described in FIG. 66. Network slices can be flexibly defined (e.g., by a base station controller) to handle diverse and variable processing requirements, according to some aspects.

Different types of processing may be employed for each network slice, according to some aspects. For example, network slice 1 6602 may include digital streaming traffic and may employ decoding and some kind of modulation and packet processing including encryption/decryption and TCP/IP processing In this way, network slice 1 6602 can make use of a RAN Transport Network Layer (TNL), Serving Gateway (S-GW) TNL, and Packet Data Network (PDN) Gateway (P-GW). Additionally, because mobile broadband can be supported for traffic for network slice 1 6602, mobility services (e.g., MME and mobility bearers) can be provided. According to aspects, other components can be provided for traffic for network slice 1 6602 instead of and/or in addition to the processing elements and services described herein. Not all of these services and operations for network slice 1 6602 may be employed for traffic using network slice 2 6604, network slice 3 6606 or network slice 6608, and therefore in some aspects such processing is not performed in network slice 2 6604, network slice 3 6606 or network slice 6608. Similarly, in some aspects, mobility management may not be employed for traffic using network slice 3 6606 or network slice 6608 (e.g., because equipment is fixed rather than mobile) and accordingly that traffic can be configured, in some aspects, to not make use of mobility bearers or an MME. As a further example, transport network layer (TNL) processing for encryption/decryption may not be employed for certain traffic types. As yet another example, Home Subscriber Server (HSS) and/or Policy and Charging Enforcement Function (PCRF) may not be employed for network slice 3 6606 or network slice 4 6608, for example, because the corresponding traffic types are prepaid or not part of a subscription.

Figure 67:
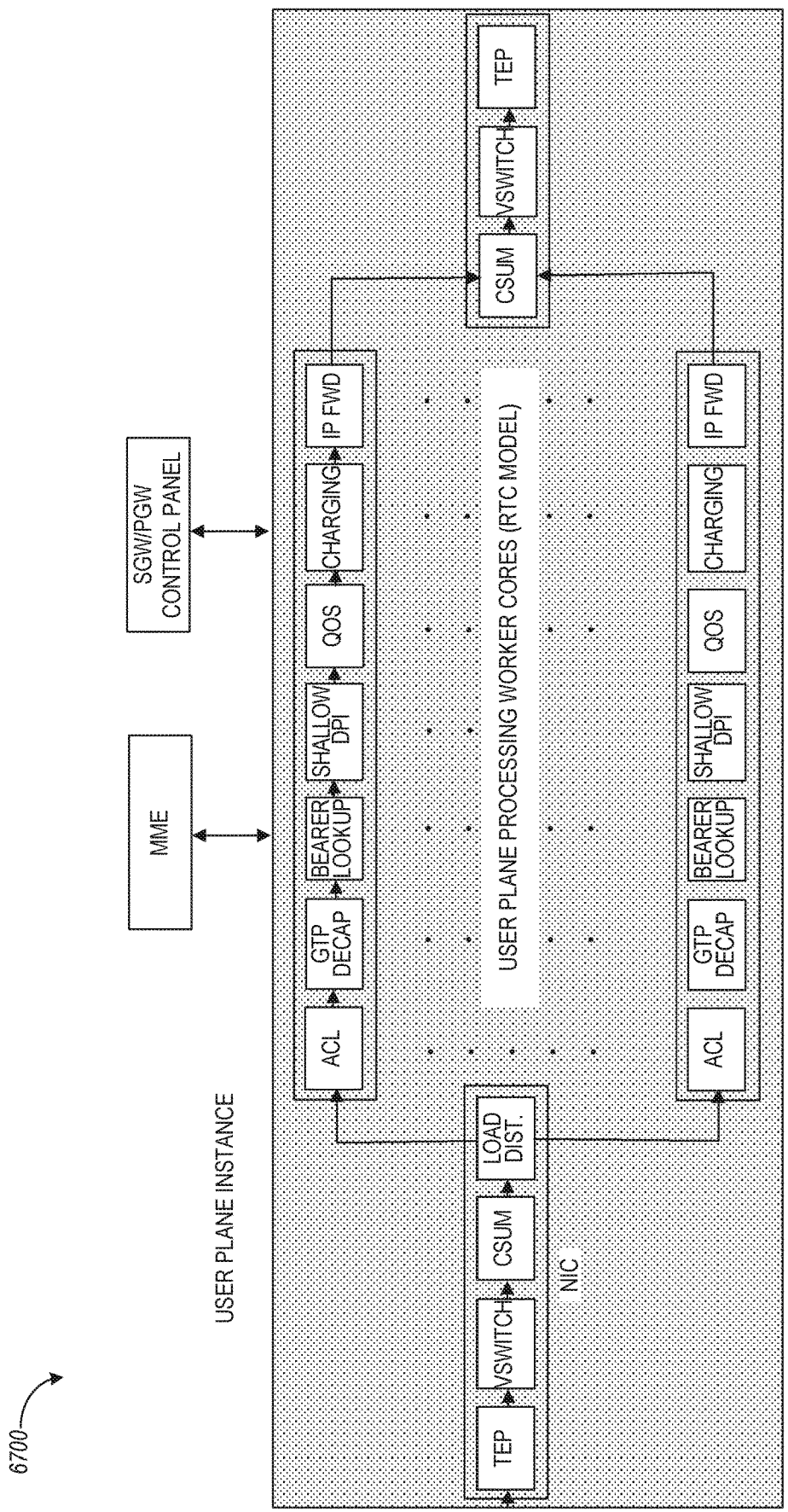
FIG. 67 illustrates a user plane pipeline for Evolved Packet Core (EPC), in accordance with some aspects.

Similarly, the user plane pipeline for Evolved Packet Core (EPC) shown in FIG. 67 has multiple stages of processing according to some aspects. It is possible that based on the nature of deployment, certain stages may or may not be employed (e.g., encapsulation can be deactivated or bypassed in scenarios in which base station and packet core are co-located, or deep packet inspection (DPI) functionalities may be deactivated or by passed for IoT traffic or other traffic). These and other processing decisions can be made more intelligently, according to aspects, based on metadata attached to the packets of incoming traffic.

Figure 68:
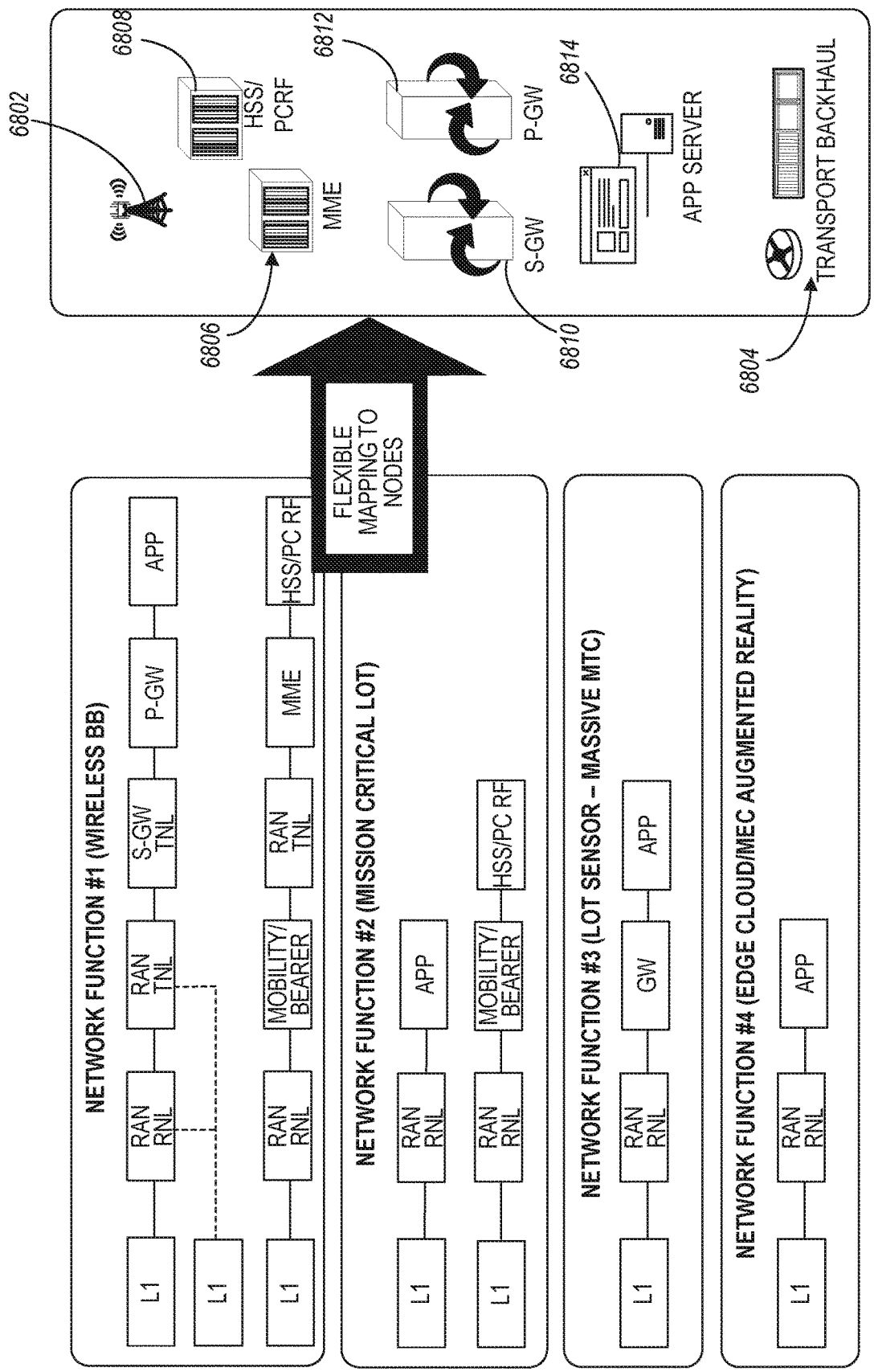
FIG. 68 illustrates various network functions, in accordance with some aspects.

More than one, or all, of the traffic types described herein may be processed in the same base station and core network, according to some aspects. Current systems for processing the different types of traffic often lack dynamic configurability and accordingly various network elements can remain unused during processing of traffic of some traffic types. In contrast, according to some aspects, a way to identify the type of traffic and to create a dynamic network that includes a selected set of elements employed by that traffic can be used. For example, with reference to FIG. 68, such elements according to some aspects can include base stations 6802 and backhaul 6804 (used by all or most traffic in some aspects), MME 6806, HSS or PCRF 6808, S-GW 6810, Packet Data Network (PDN) Gateway (P-GW) 6812, and application servers 6814.

Figure 69A:
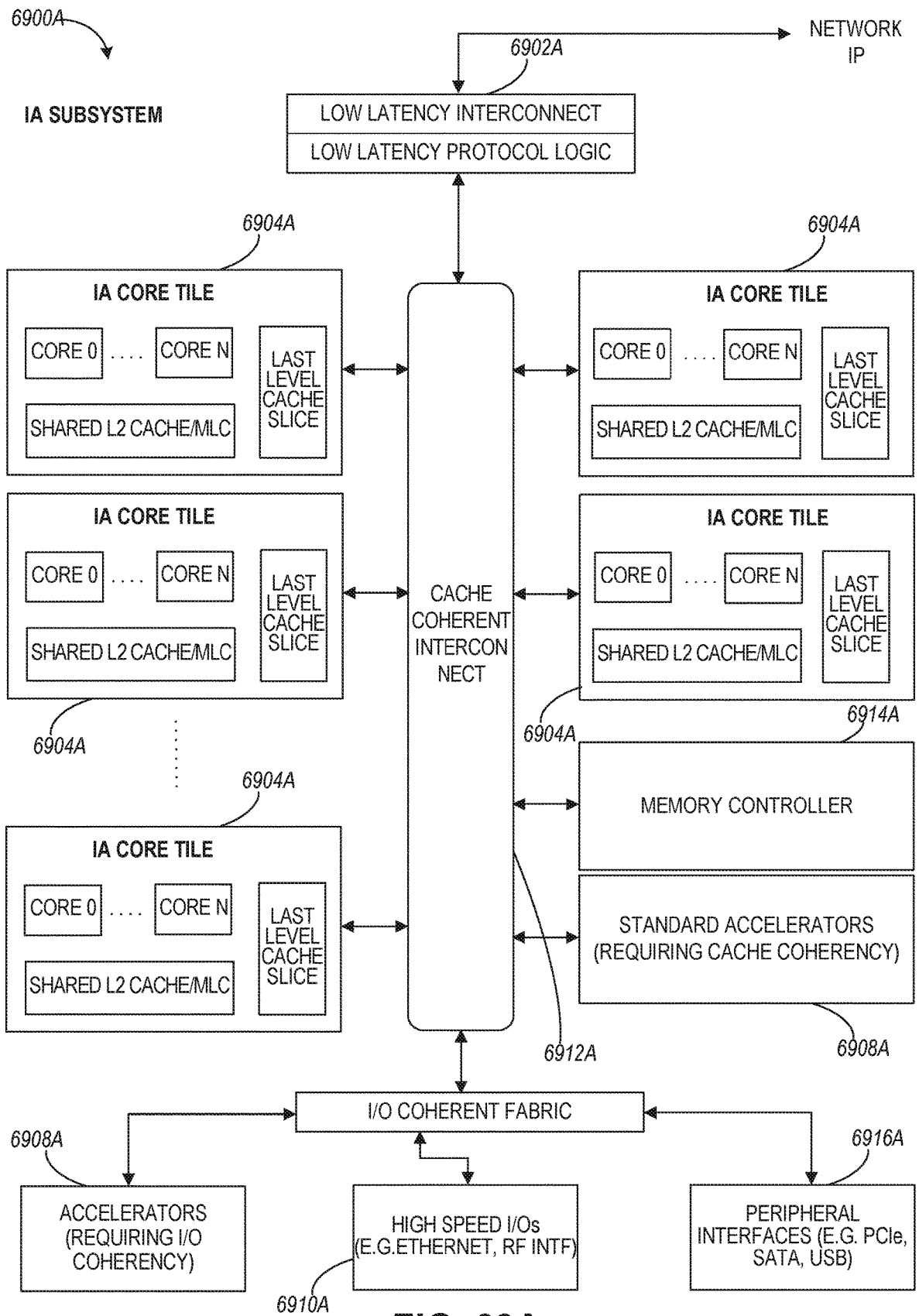
FIG. 69A, FIG. 69B, and FIG. 70 illustrate systems for implementing methods, in accordance with some aspects.
Figure 69B:
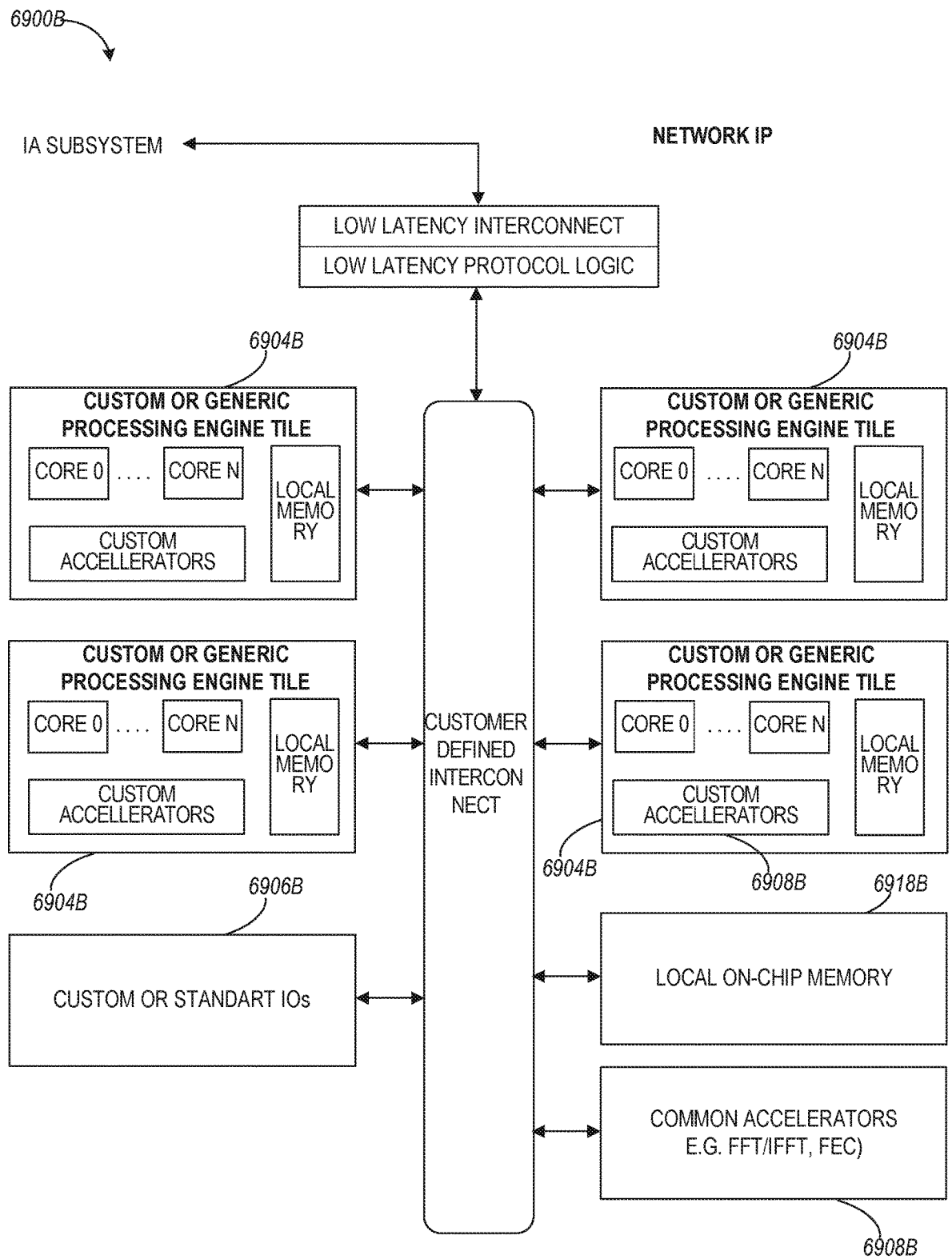
Figure 70:
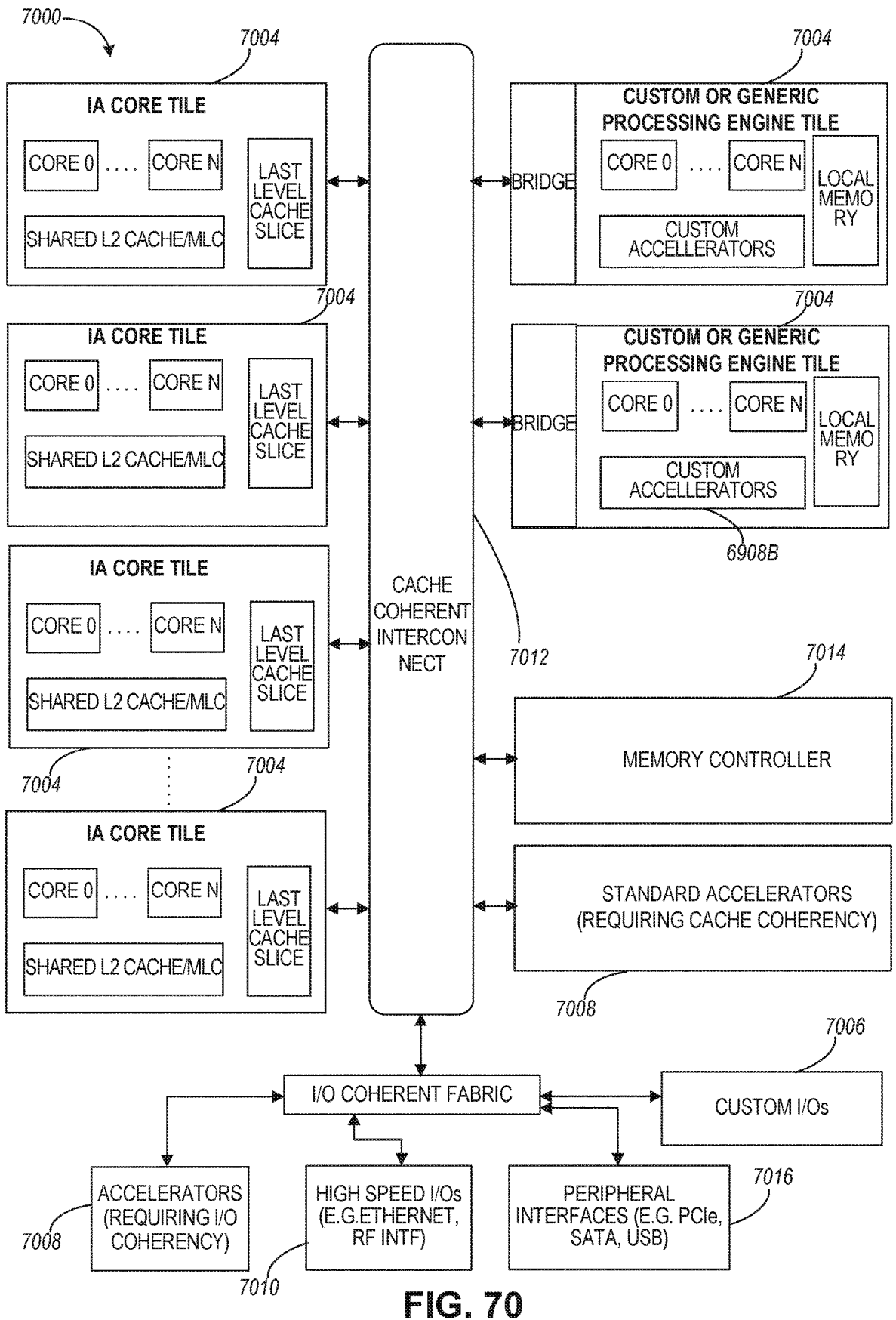

FIGS. 69A and 69B and FIG. 70 illustrate two systems 6900 (including subsystems 6900A and 6900B) and 7000 for implementing methods according to aspects. In some aspects, system 6900 and system 7000 can perform intelligent classification on traffic to determine traffic type. For example, as described above, some traffic may be streaming video, while other traffic may employ URLLC. Once the traffic type is identified, metadata can be added to the data so that network elements can more easily identify the processing to be performed on the traffic. In some aspects, traffic may be processed by a programmable gate array (PGA) for faster processing In some aspects, a high-quality radio (not shown in FIGS. 69A, 69B and 70) may be used for some traffic whereas a lower-quality radio may be used for other traffic for which a high-quality radio would not be as beneficial. Different modulation and coding schemes can be used for different traffic types, according to some aspects.

In aspects, systems 6900 and 7000 can learn and adapt algorithms based upon observation of traffic and of network performance. Algorithms can be implemented, streams can be classified, and stream processing parameters can be intelligently adapted, by a network interface card (NIC), FPGA, or other component shown in FIGS. 69A and 69B and FIG. 70 within a base station or a core network element.

According to some aspects, systems can also use identification information of a UE to determine traffic type. For example, if the system detects that a UE is a smart meter, the system 6900 or 7000 can determine that traffic should be processed in a network slice specific to Massive IoT.

Learning algorithms implemented in elements depicted in FIGS. 69A, 69B, and 70 can examine packet types actually received by such a smart meter to determine and adapt efficacy of classification algorithms, according to some aspects. Learning algorithms can also be used to predict next subsequent traffic types and configure the modules that handle such traffic before those modules are actually brought into use. Further, if the UE type(s) detected are of the type IoT (e.g. smart meter), elements of systems 6900 and 7000 may be able to determine a priori that these devices are stationary (e.g., "non-mobile") devices. As such, the channel conditions of those devices can be known by elements of systems 6900 and 7000 and, in some aspects, do not change randomly or rapidly. Accordingly, elements of systems 6900 and 7000 can apply knowledge of channel conditions to decode relevant data. If the decoded data results in checksum failures, then a full channel estimate can be done, and learning thereof applied in accordance with machine learning algorithms to improve accuracy of decoding. Similarly, based on metadata, the processing of packet(s) in the core network can be performed more intelligently to either process all stages, or intelligently skip certain stages of processing according to some aspects. Some stages that may be skipped according to some aspects include charging stages for IoT (e.g., because such devices are typically prepaid), or encapsulation or decapsulation for converged and/or collapsed base station or packet core deployments.

Furthermore, in centralized RAN type architectures in which baseband processing is performed in a central location, and in hierarchical deployments that combine mmWave spectrum channels with sub-6 GHz channels, machine learning algorithms can improve throughput for regular coverage as well as cell edge coverage scenarios, according to some aspects. In other scenarios, the meta data can be intelligently used to determine the breadth and depth of processing to be done in the base station as well as the packet core (e.g., ciphering can be deactivated or bypassed on the air interface for certain types of UEs, and charging and/or QoS enforcement can be deactivated or bypassed for other types of UEs). Such policies can be intelligently determined with metadata of traffic packets when packets are received, according to some aspects.

In some aspects, different slices can cooperate with each other. Systems can also implement a concept similar to information centric networking (ICN). According to this concept, rather than examining IP addresses or headers of the information to determine which nodes will be employed to process a given data stream, data can be routed based on content name. For example, based on content name, different functions can be performed on the data stream.

In FIGS. 69A and 69B, an Intel Architecture (IA) based system 6900 (including subsystems 6900A and 6900B) can be extended and/or enhanced via on-package or off-package Network IP (NIP) logic and interfaced by high-speed and low-latency interconnect 6902A. In FIG. 70, similar functionality can be integrated in system 7000 natively on-die for a complete system on a chip (SOC) implementation, according to some aspects. NIP logic provides specialized processing capabilities for a variety of network infrastructural workloads, ranging from LTE, 5G baseband (i.e. layer-1), layer-2 (RLC, PDCP), layer-3 (GTP, IP, IP-Sec), according to some aspects. NIP logic provides, for example, intelligent classification of data so that traffic can be steered towards appropriate processing blocks in the chip or platform; network workloads targeted machine learning specific training and inference algorithms. Some portions of NIP functionality can be hardware-accelerated, in certain aspects.

The Network IP logic that is integrated (e.g., on tiles 6904A/6904B, tiles 7004 (custom or generic), custom or standard I/O 6906B, 7006, accelerator logic 6908A/6908B) can be used to target 5G base stations, core network gateway implementations, or wireline gateways, for example. Custom or generic processing tiles 6904A/6904B, 7004 can potentially comprise of cluster of "very-wide vector" cores, DSPs or fixed function logic, coupled with local SRAM/memory and potentially application specific acceleration that assists with efficient processing of baseband stages of 5G base stations, or processing packets intelligently, or execution of training and inference algorithms for machine learning purposes, according to some aspects.

Systems 6900A/6900B, 7000 can provide logic when data (e.g. URLLC) coming in from RF interface 6910A, 7010 into, for example, a base station, can be intelligently steered towards specific part of the logic and processed in these blocks that includes L1, L2, L3 layers to enable ultra-low latency characteristics while other types of data (e.g. mobile broadband) with different level of QoS (in metadata) is steered to different area or towards IA core tiles 6904A/6904B, according to some aspects. This intelligent steering of data to different parts of the system (independent of physical integration on-die, or on-package, or off-package) can be achieved by intelligent classification of incoming data at the IO interfaces (e.g., high-speed I/Os, custom or standard IO block in FIGS. 69A, 69B and 70), in which meta data can also attach to the data such that the data can be sent to different blocks within the overall platform and processed accordingly. Common accelerator blocks implement most widely used algorithms that employ fixed-function acceleration (e.g. FFT, forward error correction, encoding/decoding IP-Sec, or any kind of HW assists for ML training/inference algorithms). On-die interconnects can enable high-bandwidth, low-latency connectivity between different blocks of the system/SOC, enabling data movement between interconnected blocks, according to some aspects.

Systems 6900A/6900B, 7000 can include a cache coherent interconnect 6912A, 7012 to provide cache coherence between different processing units (e.g., tiles 6904, 7004), according to some aspects. Other elements such as a memory controller 6914A, 7014, peripherals 6916A, 7016, and local on-chip memory 6918B can be employed according to some aspects.

Figure 71:
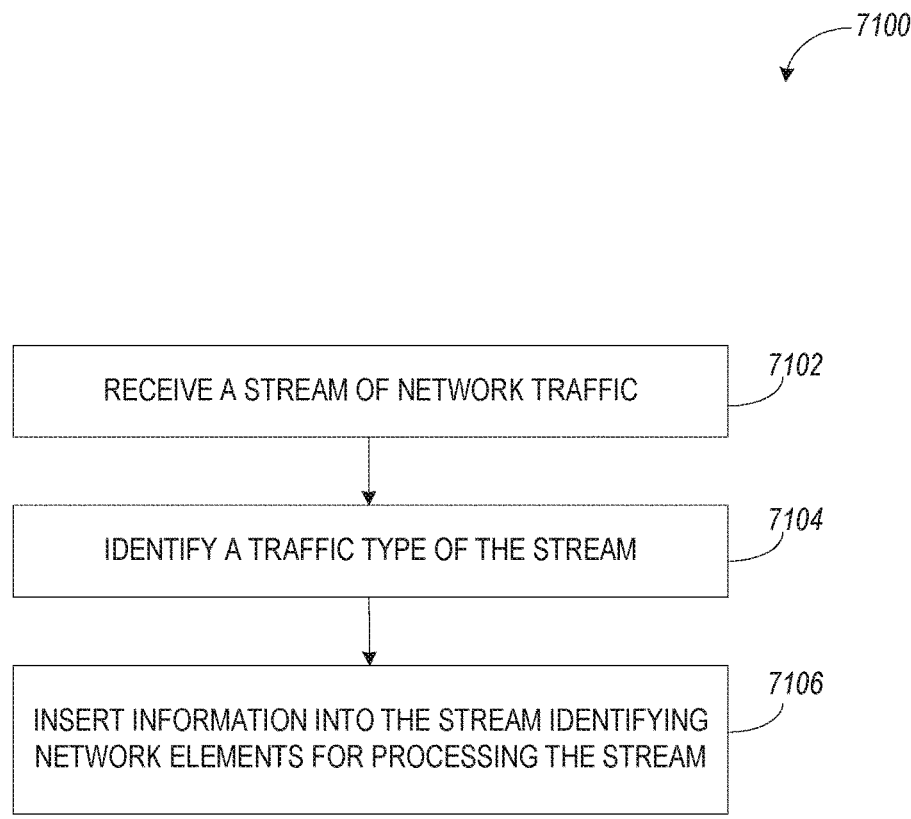
FIG. 71 is a flowchart of an example method, in accordance with some aspects.

FIG. 71 is a flowchart of an example method 7100 in accordance with some aspects. The example method 7100 can begin with operation 7102 with a device (e.g., elements of systems 6900, 7000) receiving a stream of network traffic. The example method 7100 can continue with operation 7104 with the device identifying a traffic type of the stream. The example method 7100 can continue with operation 7106 with the device inserting information into the stream to identify network elements for processing the stream. The method can further include adapting a modulation and coding scheme (MCS) based on the traffic type.

Figure 72:
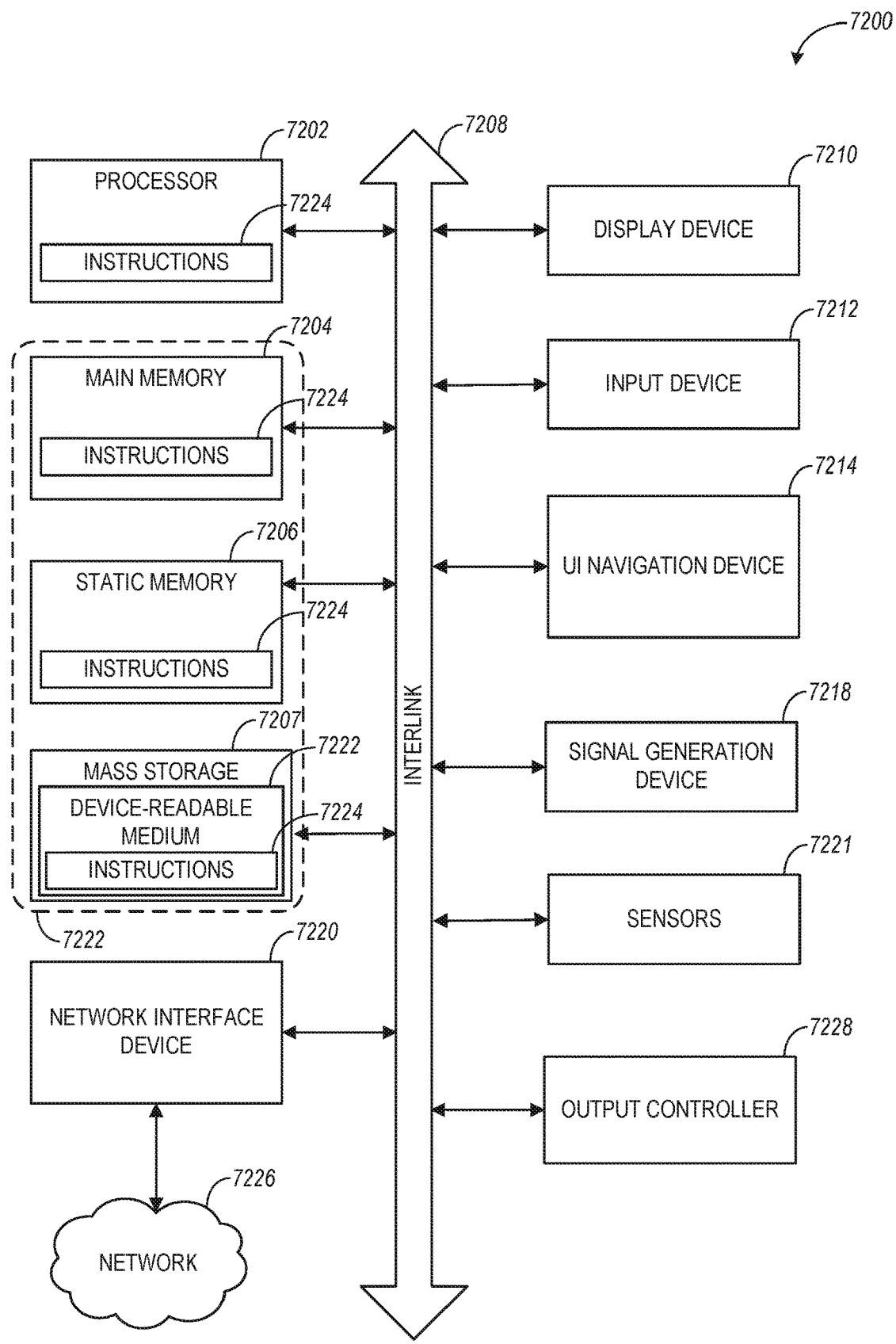
FIG. 72 illustrates a block diagram of a communication device such as an evolved Node-B (eNB), a new generation Node-B (gNB), an access point (AP), a wireless station (STA), or a user equipment (UE), in accordance with some aspects.

FIG. 72 illustrates a block diagram of a communication device such as an evolved Node-B (eNB), a new generation Node-B (gNB), an access point (AP), a wireless station (STA), or a user equipment (UE), in accordance with some aspects. In alternative aspects, the communication device 7200 may operate as a standalone device or may be connected (e.g., networked) to other communication devices.

Circuitry (e.g., processing circuitry) is a collection of circuits implemented in tangible entities of the device 7200 that include hardware (e.g., simple circuits, gates, logic, etc.). Circuitry membership may be flexible over time. Circuitries include members that may, alone or in combination, perform specified operations when operating In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 7200 follow.

In some aspects, the device 7200 may operate as a standalone device or may be connected (e.g., networked) to other devices. In a networked deployment, the communication device 7200 may operate in the capacity of a server communication device, a client communication device, or both in server-client network environments. In an example, the communication device 7200 may act as a peer communication device in peer-to-peer (P2P) (or other distributed) network environment. The communication device 7200 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 7200 may include a hardware processor 7202 (e.g., a central processing unit (CPU), a graphics processing unit (GPU), a hardware processor core, or any combination thereof), a main memory 7204, a static memory 7206, and mass storage 7216 (e.g., hard drive, tape drive, flash storage, or other block or storage devices), some or all of which may communicate with each other via an interlink (e.g., bus) 7208.

The communication device 7200 may further include a display unit 7210, an alphanumeric input device 7212 (e.g., a keyboard), and a user interface (UI) navigation device 7214 (e.g., a mouse). In an example, the display unit 7210, input device 7212 and UI navigation device 7214 may be a touch screen display. The communication device 7200 may additionally include a signal generation device 7218 (e.g., a speaker), a network interface device 7220, and one or more sensors 7221, such as a global positioning system (GPS) sensor, compass, accelerometer, or other sensors. The communication device 7200 may include an output controller 7228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 7216 may include a communication device-readable medium 7222, on which is stored one or more sets of data structures or instructions 7224 (e.g., software) embodying or utilized by any one or more of the techniques or functions described herein. In some aspects, registers of the processor 7202, the main memory 7204, the static memory 7206, and/or the mass storage 7216 may be, or include (completely or at least partially), the device-readable medium 7222, on which is stored the one or more sets of data structures or instructions 7224, embodying or utilized by any one or more of the techniques or functions described herein. In an example, one or any combination of the hardware processor 7202, the main memory 7204, the static memory 7206, or the mass storage 7216 may constitute the device-readable medium 7222.

As used herein, the term "device-readable medium" is interchangeable with "computer-readable medium" or "machine-readable medium". While the communication device-readable medium 7222 is illustrated as a single medium, the term "communication device-readable medium" may include a single medium or multiple media (e.g., a centralized or distributed database, and/or associated caches and servers) configured to store the one or more instructions 7224.

The term "communication device-readable medium" may include any medium that is capable of storing encoding or carrying instructions for execution by the communication device 7200 and that cause the communication device 7200 to perform any one or more of the techniques of the present disclosure, or that is capable of storing encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 7224 may further be transmitted or received over a communications network 7226 using a transmission medium via the network interface device 7220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UM TS) family of standards, peer-to-peer (P2P) networks, among others. In an example, the network interface device 7220 may include one or more physical jacks (e.g., Ethernet, coaxial, or phonejacks) or one or more antennas to connect to the communications network 7226. In an example, the network interface device 7220 may include a plurality of antennas to wirelessly communicate using at least one of single-input multiple-output (SIMO), MIMO, or multiple-input single-output (MISO) techniques. In some examples, the network interface device 7220 may wirelessly communicate using MultipleUser MIMO techniques.

The term "transmission medium" shall be taken to include any intangible medium that is capable of storing encoding or carrying instructions for execution by the communication device 7200, and includes digital or analog communications signals or other intangible medium to facilitate communication of such software. In this regard, a transmission medium in the context of this disclosure is a device-readable medium.

ADDITIONAL NOTES AND EXAMPLES

Example 1 is a method for handover of a plurality of mobile devices moving from coverage of a first cell to a second cell, the method comprising detecting the second cell at a first edge mobile device of the plurality of mobile devices; measuring one or more parameters of the second cell at the first mobile device; and communicating the one or more parameters from the first mobile device to other mobile devices of a device swarm.

In Example 2, the subject matter of Example 1 includes, wherein the plurality of mobile devices are located at a physical extent of the swarm.

In Example 3, the subject matter of Example 2 includes, wherein the communicating the one or more parameters includes communicating the one or more parameters from the first mobile device to other mobile devices of the swarm using a device-to-device (D2D) protocol.

In Example 4, the subject matter of Example 3 includes, wherein the D2D protocol includes a first wireless protocol configured to support connections to the plurality of mobile devices within the first cell.

In Example 5, the subject matter of Example 4 includes, wherein the first wireless protocol operated according to an IEEE 802.11 or 802.15 family of standards.

In Example 6, the subject matter of Examples 4-5 includes, wherein the first wireless protocol is operated according to low-energy, personal area network protocol.

In Example 7, the subject matter of Examples 1-6 includes, wherein the communicating the one or more parameters includes communicating the one or more parameters from the first mobile device to other mobile devices of the swarm while a connection of the first mobile device is serviced by the first cell.

In Example 8, the subject matter of Example 7 includes, wherein the communicating the one or more parameters includes communicating the one or more parameters from the first mobile device to other mobile devices of the swarm using a base station of the first cell.

In Example 9, the subject matter of Examples 1-8 includes, communicating the one or more parameters from the first mobile device to a controller of the first cell.

In Example 10, the subject matter of Examples 1-9 includes, wherein the device swarm includes at least one central mobile device within a boundary of the swarm, the boundary of the swarm defined by the plurality of mobile devices; and wherein the at least one central UE refrains from conducting handover measurements.

Example 11 is an apparatus of a mobile device, the apparatus comprising memory; and processing circuitry coupled to the memory, the processing circuitry to: when associated with moving with a plurality of mobile devices from coverage of a first cell to a second cell, detect the second cell; measure one or more parameters of the second cell; and communicate the one or more parameters to one or more other mobile devices of the plurality of mobile devices.

In Example 12, the subject matter of Example 11 includes, wherein the processing circuitry is configured to: detect the second cell while moving with the plurality of mobile devices from coverage of the first cell to the second cell.

In Example 13, the subject matter of Examples 11-12 includes, wherein the processing circuitry is further to: communicate the one or more parameters using a device-to-device (D2D) protocol.

In Example 14, the subject matter of Example 13 includes, wherein the D2D protocol includes a wireless protocol operated according to an IEEE 802.11 or 802.15 family of standards.

In Example 15, the subject matter of Examples 11-14 includes, wherein the processing circuitry is further to: communicate the one or more parameters while a connection of the first mobile device is serviced by the first cell.

Example 16 is a method at a mobile device within a swarm of a plurality of mobile devices, the method comprising transmitting a handover request to a serving cell; determining if the handover request is received at the serving cell; and sending the handover request to a second mobile device within the swarm of a plurality of mobile devices for forwarding to the serving cell, responsive to determining that no handover request is received at the serving cell.

In Example 17, the subject matter of Example 16 includes, wherein the detecting comprises detecting that no acknowledgment (ACK) is received in response to transmitting the handover request.

In Example 18, the subject matter of Examples 16-17 includes, transmitting location information, using device-to-device (D2D) communication to other mobile devices within the swarm of mobile devices, after receiving an acknowledgment (ACK) in response to transmitting the handover request.

In Example 19, the subject matter of Example 18 includes, receiving a request from a different mobile device within the swarm to forward a different handover request to the serving cell.

In Example 20, the subject matter of Examples 16-19 includes, detecting that a signal strength measurement of a signal received from the serving cell deteriorates below a threshold, after transmitting the handover request; and transmitting a notification to at least one other mobile device within the swarm of UEs mobile devices responsive to the detecting that a handover command is expected from the serving cell.

In Example 21, the subject matter of Examples 16-20 includes, detecting a position of a handover point at which the mobile device is within range of at least two cells; and broadcasting the position of the handover point to the swarm of mobile devices.

Example 22 is an apparatus of a mobile device, the apparatus comprising memory; and processing circuitry coupled to the memory, the processing circuitry to: transmit a handover request to a serving cell; determine if the handover request is received at the serving cell; and send the handover request to a second mobile device within the swarm of mobile devices for forwarding to the serving cell, responsive to determining that no handover request is received at the serving cell.

In Example 23, the subject matter of Example 22 includes, wherein the processing circuitry is further to: detect that an acknowledgment (ACK) was not received in response to transmitting the handover request.

In Example 24, the subject matter of Examples 22-23 includes, wherein the processing circuitry is further to: encode location information for transmission using device-to-device (D2D) communication to other mobile devices within the swarm of mobile devices, after decoding an acknowledgment (ACK) received in response to transmitting the handover request.

In Example 25, the subject matter of Example 24 includes, wherein the processing circuitry is further to: decode a request received from a different mobile device within the swarm to forward a different handover request to the serving cell.

In Example 26, the subject matter of Examples 22-25 includes, wherein the processing circuitry is further to: detect that a signal strength measurement of a signal received from the serving cell deteriorates below a threshold, after transmitting the handover request; and encode a notification for transmission to at least one other mobile device within the swarm of UEs mobile devices responsive to the detecting that a handover command is expected from the serving cell.

Example 27 is a method for operating a base station of a first cell of a cellular network, the method comprising identifying a swarm of mobile devices wirelessly connected to the base station via the first cell, wherein the plurality of mobile devices of the swarm are adjacent to one or more other mobile devices of the swarm; assigning an identifier to each of the mobile devices of the swarm at the base station; and assigning a swarm identifier to the swarm at the base station.

In Example 28, the subject matter of Example 27 includes, wherein each mobile device of the swarm is moving in the same direction as each other and each with an average speed within a threshold.

In Example 29, the subject matter of Examples 27-28 includes, wherein a first mobile device of the swarm is adjacent to a second mobile device of the swarm when a pre-determined number of hops is used to propagate swarm communication in range of a peer-to-peer communication protocol.

In Example 30, the subject matter of Examples 27-29 includes, receiving first information from a first mobile device of the swarm at the base station, wherein the first information includes the swarm identifier and an indication the first mobile device measured a second cell.

In Example 31, the subject matter of Example 30 includes, receiving second information from the first mobile device at the base station, wherein the second information includes the swarm identifier and a handover request for handover of the swarm to the second cell.

In Example 32, the subject matter of Examples 30-31 includes, wherein the first information includes measurement information from a second mobile device of the swarm.

In Example 33, the subject matter of Examples 30-32 includes, wherein the first information includes measurement information from a plurality of mobile devices of the swarm.

In Example 34, the subject matter of Example 33 includes, wherein the plurality of mobile devices of the swarm comprises a non-center mobile device of the swarm.

In Example 35, the subject matter of Examples 31-34 includes, determining a point of handover for each mobile device of the swarm in response to the handover request.

In Example 36, the subject matter of Example 35 includes, transmitting handover information to the swarm, wherein the handover information includes the swarm identifier and specific handover information for multiple mobile devices of the swarm.

Example 37 is an apparatus of a base station, the apparatus comprising memory; and processing circuitry coupled to the memory, the processing circuitry to: identify a swarm of mobile devices wirelessly connected to the base station via a first cell, wherein the plurality of mobile devices of the swarm are adjacent to one or more other mobile devices of the swarm; assign an identifier to each of the mobile devices of the swarm; and assign a swarm identifier to the swarm.

In Example 38, the subject matter of Example 37 includes, wherein each mobile device of the swarm is moving in the same direction as each other and each with an average speed within a threshold.

In Example 39, the subject matter of Examples 37-38 includes, wherein the processing circuitry is to: receive first information from a first mobile device of the swarm, wherein the first information includes the swarm identifier and an indication the first mobile device measured a second cell.

In Example 40, the subject matter of Example 39 includes, wherein the processing circuitry is to: receive second information from the first mobile device, wherein the second information includes the swarm identifier and a handover request for handover of the swarm to the second cell.

In Example 41, the subject matter of Examples 39-40 includes, wherein the first information includes measurement information from a second mobile device of the swarm.

In Example 42, the subject matter of Examples 39-41 includes, wherein the first information includes measurement information from a plurality of mobile devices of the swarm.

In Example 43, the subject matter of Example 42 includes, wherein the plurality of mobile devices of the swarm comprises a non-center mobile device of the swarm.

In Example 44, the subject matter of Examples 40-43 includes, wherein the processing circuitry is to: determine a point of handover for each mobile device of the swarm in response to the handover request.

In Example 45, the subject matter of Example 44 includes, wherein the processing circuitry is to: transmit handover information to the swarm, wherein the handover information includes the swarm identifier and specific handover information for multiple mobile devices of the swarm.

Example 46 is a wireless communication device, comprising an antenna; a transceiver coupled to the antenna; and a baseband processor to: aggregate first information for reporting to a wireless network; initiate sending of the first information to a datalink layer for transmission via the transceiver to the wireless network; aggregate second information for reporting to the wireless network that is higher priority than the first information; initiate sending of the second information to a datalink layer for transmission via the transceiver to the wireless network; and if first information is transmitted, instruct the datalink layer to discard the first information.

Example 47 is a computer-readable storage medium that stores instructions for execution by one or more processors of a wireless communication device, the one or more processors to configure wireless communication device to: aggregate first information for reporting to a wireless network; initiate sending of the first information to a datalink layer for transmission to the wireless network; aggregate second information for reporting to the wireless network that is higher priority than the first information; detect the second information is higher priority than the first information; initiate sending of the second information to a datalink layer for transmission to the wireless network; and if the first information is transmitted, instruct the datalink layer to discard the first information.

Example 48 is a method of operating a wireless communication device, the method comprising aggregating first information for reporting to a wireless network; sending the first information to a datalink layer for transmission to the wireless network; aggregating second information for reporting to the wireless network; detecting the second information is higher priority than the first information; sending second information to a datalink layer for transmission to the wireless network; and if the first information is not transmitted, instruct the datalink layer to discard the first information.

In Example 49, the subject matter of Example 48 includes, wherein the aggregating first information includes measuring one or more other cells in addition to a first cell serving the wireless communication device.

In Example 50, the subject matter of Examples 48-49 includes, wherein the detecting the second information is higher priority than the first information includes detecting the first information being inaccurate.

In Example 51, the subject matter of Examples 48-50 includes, wherein the detecting the second information is higher priority than the first information includes detecting measurement information of the first information is changed.

In Example 52, the subject matter of Examples 48-51 includes, wherein the first information includes measurement information for a second cell providing a better signal than the first cell; and wherein the second information includes measurement information for a third cell providing a better signal than the second cell.

In Example 53, the subject matter of Examples 48-52 includes, receiving an out-of-sync condition after sending the first information to the datalink layer.

Example 54 is a wireless communication device, the device comprising means for aggregating first information for reporting to a wireless network; means for sending the first information to a datalink layer for transmission to the wireless network; means for aggregating second information for reporting to the wireless network; means for detecting the second information is higher priority than the first information; means for sending the second information to a datalink layer for transmission to the wireless network; and means for discarding the first information in the datalink layer, when the first information is not transmitted.

Example 55 is a method for performing a handover from a first millimeter-Wave (mmWave) connection to a second mmWave connection, the method comprising establishing the first mmWave connection between a first device and a second device by exchanging antenna information, using other than mmWave communication, between the first device and the second device, and calculating a beam direction for the first mmWave connection based on the antenna information; detecting that the first mmWave connection deteriorates below a quality threshold based on information received using other than mmWave communication; and switching to the second mmWave connection responsive to the detecting.

In Example 56, the subject matter of Example 55 includes, wherein the first mmWave connection is established by exchanging beam information using WiFi.

In Example 57, the subject matter of Examples 55-56 includes, wherein the first mmWave connection is established by exchanging beam information using cellular communication.

In Example 58, the subject matter of Examples 55-57 includes, wherein the beam information includes antenna information for the first device and the second device.

In Example 59, the subject matter of Example 58 includes, wherein the antenna information includes antenna orientation information.

In Example 60, the subject matter of Example 59 includes, wherein the antenna orientation information is obtained based on an input from a position sensor.

In Example 61, the subject matter of Examples 55-60 includes, providing beam search pattern information using other than mmWave communication, prior to establishment of the first mmWave connection.

In Example 62, the subject matter of Examples 55-61 includes, storing a list that includes identification information for beams that are eligible to be used for mmWave connections between the first device and the second device.

In Example 63, the subject matter of Example 62 includes, wherein the list is sorted based on signal quality measurements for the beams.

In Example 64, the subject matter of Example 63 includes, updating a sort order of the list responsive to receiving signal quality measurements.

In Example 65, the subject matter of Example 64 includes, wherein the signal quality measurements are received over a connection other than a mmWave connection.

In Example 66, the subject matter of Examples 64-65 includes, wherein the signal quality measurements are received over a mmWave connection.

Example 67 is a wireless communication device, comprising processing circuitry configured to: perform a listen-before-talk (LBT) procedure to determine spectrum usage information within a wireless network; aggregate the spectrum usage information for transmission to a base station of the wireless network; decode spectrum assignment information from the base station, in response to the spectrum usage information; and configure a transceiver sub-system of the wireless communication device to operate in one or more frequency bands based on the spectrum assignment information; and memory coupled to the processing circuitry, the memory configured to store the spectrum assignment information.

In Example 68, the subject matter of Example 67 includes, wherein the wireless communication device is a drone within a drone swarm moving within the wireless network.

In Example 69, the subject matter of Examples 67-68 includes, wherein to determine the spectrum usage information, the processing circuitry is configured to: scan a plurality of communication bands of a wireless communication protocol; and detect a plurality of signals transmitted within the wireless network in one or more of the plurality of communication bands.

In Example 70, the subject matter of Example 69 includes, wherein the spectrum usage information includes one or both of signal strength level and frequency band associated with the detected plurality of signals.

In Example 71, the subject matter of Examples 69-70 includes, wherein the wireless communication protocol operated according to an IEEE 802.11 family of standards.

In Example 72, the subject matter of Examples 69-71 includes, wherein the wireless communication protocol operated according to an IEEE 802.15 family of standards.

In Example 73, the subject matter of Examples 69-72 includes, wherein the wireless communication protocol operated according to a low-energy, personal area network (PAN) protocol.

In Example 74, the subject matter of Examples 67-73 includes, wherein the spectrum usage information is associated with a first geographic location of the wireless communication device.

In Example 75, the subject matter of Example 74 includes, wherein the processing circuitry is configured to, upon detecting movement of the wireless communication device from the first geographic location to a second geographic location: sense spectrum usage information at the second geographic location, for transmission to the base station; decode second spectrum assignment information from the base station, in response to the spectrum usage information sensed at the second geographic location; and configure the transceiver sub-system to operate in one or more frequency bands indicated by the second spectrum assignment information.

Example 76 is a method of operating a base station of a wireless network, the method comprising identifying a swarm of mobile devices wirelessly connected to the base station; encoding for transmission to a first mobile device of the swarm of mobile devices, a frequency map, wherein the frequency map is indicative of occupied spectrum and available spectrum within the wireless network; receiving from the first mobile device, a request for spectrum allocation indicating one or more frequency bands from the available spectrum; and reserving the one or more indicated frequency bands for the swarm of mobile devices.

In Example 77, the subject matter of Example 76 includes, receiving a spectrum information request from the first mobile device of the swarm of mobile devices, wherein the first mobile device is a swarm leader device; and transmitting the frequency map to the swarm leader device in response to the spectrum information request.

In Example 78, the subject matter of Examples 76-77 includes, updating the frequency map based on the received spectrum allocation request.

In Example 79, the subject matter of Examples 76-78 includes, receiving a second request for spectrum allocation from at least a second mobile device outside of the swarm; and updating the frequency map based on the received second spectrum allocation request.

In Example 80, the subject matter of Example 79 includes, encoding for transmission to the first mobile device, a spectrum allocation update to the one or more frequency bands reserved for the swarm, based on the second request for spectrum allocation.

Example 81 is a method for operating a serving base station of a cellular network, the method comprising receiving training data from a plurality of user equipments (UEs) within a cell of the serving base station, the training data comprising UE locations and corresponding cell beam data; generating a map of the UE locations and the corresponding cell beam data based on the training data; encoding configuration information for transmission to a UE of the plurality of UEs, the configuration information including one or more location-based handover triggers; evaluating a measurement report received in response to the configuration information; and encode a handover command for transmission to the UE, when the measurement report satisfies a handover threshold associated with the one or more location-based triggers.

In Example 82, the subject matter of Example 81 includes, wherein the one or more location-based triggers are based on historical handover locations within the cell of the serving base station.

In Example 83, the subject matter of Examples 81-82 includes, evaluating the measurement report against the one or more location-based handover triggers and the generated map to determine whether to perform handover from the serving base station to a target base station.

Example 84 is a method for operating a serving base station of a cellular network, the method comprising receiving training data from a plurality of user equipments (UEs) within a cell of the serving base station, the training data comprising UE locations and corresponding cell beam data; generating a map of the UE locations and the corresponding cell beam data based on the training data; encoding configuration information for transmission to a UE of the plurality of UEs, the configuration information including one or more location-based handover triggers; and decoding a handover command from the UE, the handover command based on the location-based triggers and a current location of the UE.

Example 85 is a network node, comprising memory storing identification information associated with at least a first moving cell and a second moving cell of a wireless base station; and processing circuitry coupled to the memory, the processing circuitry configured to: establish signaling connection with at least the first moving cell and at least the second moving cell; receive one or more signal measurements associated with the first moving cell and the second moving cell; determine a first coarse trajectory for the first moving cell and a second coarse trajectory for the second moving cell based on the one or more signal measurements; and encode the first coarse trajectory and the second coarse trajectory for transmission to the first moving cell and the second moving cell respectively.

In Example 86, the subject matter of Example 85 includes, wherein the first cell comprises one or more backhaul moving cells, and the second cell comprises one or more outer moving cells.

In Example 87, the subject matter of Example 86 includes, wherein the processing circuitry is configured to: encode the first coarse trajectory for transmission to a first mobile device within the one or more backhaul moving cells, the first mobile device performing a backhaul task.

In Example 88, the subject matter of Example 87 includes, wherein the backhaul task comprises sending data to a radio access network.

In Example 89, the subject matter of Examples 86-88 includes, wherein the processing circuitry is configured to: encode the second coarse trajectory for transmission to a second mobile device within the one or more outer moving cells, the second mobile device performing an outer task.

In Example 90, the subject matter of Example 89 includes, wherein the outer task comprises sending data to the one or more backhaul moving cells for transmission to a radio access network.

In Example 91, the subject matter of Examples 85-90 includes, wherein the one or more signal measurements comprise a radio environment map (REM) indicating channel conditions within the first and second moving cells.

Example 92 is a method for beam switching the method comprising measuring at a user device, a number of candidate beams, wherein the number of candidate beams includes, at least a first beam and a second beam; communicating with a base station using the first beam; detecting that a quality of communications using the first beam has deteriorated below a threshold; and performing a beam switching process to the second beam responsive to the detecting.

In Example 93, the subject matter of Example 92 includes, wherein the beam switching process includes performing a sector level sweep (SLS).

In Example 94, the subject matter of Examples 92-93 includes, wherein the beam switching process includes performing a binary search.

In Example 95, the subject matter of Examples 92-94 includes, storing identification information for the number of stable beams at the base station.

In Example 96, the subject matter of Examples 92-95 includes, wherein performing the beam switching process includes exchanging antenna information.

Example 97 is a method for performing a handover, the method comprising measuring at a user device, a number of candidate beams at a base station (BS), using a new radio synchronization signal (NRSS); selecting a predetermined number of beams of the BS based on the measuring detecting that a quality of communications using a first beam of the BS has deteriorated below a threshold; and performing a beam switching process to a beam of the predetermined number of beams responsive to the detecting.

In Example 98, the subject matter of Example 97 includes, wherein the handover includes performing a sector level sweep (SLS).

In Example 99, the subject matter of Examples 97-98 includes, wherein the handover process includes performing a binary search.

In Example 100, the subject matter of Examples 97-99 includes, storing identification information for the number of stable beams at the gNB.

In Example 101, the subject matter of Examples 97-100 includes, wherein performing the beam switching process includes exchanging antenna information.

In Example 102, the subject matter of Examples 97-101 includes, accessing the beam using a dedicated random access channel (RACH).

Example 103 is a method for performing a handover, the method comprising communicating using a source cell of a base station (BS); detecting that a quality of communications using the source cell deteriorates below a threshold; receiving notification, subsequent to the detecting to pause performing at least a first portion of a handover operation; and performing the handover operation to a target cell while pausing performing at least the first portion of the handover operation.

In Example 104, the subject matter of Example 103 includes, receiving another notification that the source cell and the target cell belong to the BS.

In Example 105, the subject matter of Example 104 includes, wherein the another notification is received from a mobility management entity (MME).

In Example 106, the subject matter of Examples 103-105 includes, wherein the notification is received in Radio Resource Control (RRC) signaling.

In Example 107, the subject matter of Example 106 includes, wherein the first portion of the handover operation includes resetting the packet data convergence protocol (PDCP).

In Example 108, the subject matter of Examples 105-107 includes, wherein the first portion of the handover operation includes exchanging at least one security key.

Example 109 is a method of assisting a first mobile device with a handover within a wireless network, the method comprising receiving a dispatch information from a network controller of the wireless network at a first mobile device; moving to assist a second mobile device with a handover in response to the dispatch information; and assisting the second mobile device with the handover.

In Example 110, the subject matter of Example 109 includes, wherein the dispatch information includes position and trajectory information of the second mobile device.

In Example 111, the subject matter of Examples 109-110 includes, tracking movement of the second mobile device to maintain connections of the second mobile device with one or more base stations of the wireless network.

In Example 112, the subject matter of Examples 109-111 includes, wherein assisting the second mobile device with the handover includes relaying messages between the second mobile device and one or more base stations.

In Example 113, the subject matter of Example 112 includes, wherein the one or more base stations include a serving base station of the second mobile device and a target base station of the second mobile device.

Example 114 is a wireless communication device, configured to operate as a mobile cloud unit (MCU), comprising processing circuitry to: establish a wireless communication link with a Distributed Cloud Management function (DCM) through a first communication interface; encode capability information, for transmission to the DCM function, to register a capability of the wireless communication device for operation as a mobile cloud unit (MCU); and decode configuration information, received in signaling from the DCM function, the configuration information to configure a formation of a swarm of MCUs, wherein the swarm of MCUs includes, the wireless communication device and one or more additional wireless communication devices, wherein each of the one or more additional wireless communication devices is configured as an additional MCU; and memory configured to store the capability information.

In Example 115, the subject matter of Example 114 includes, wherein the processing circuitry is to: decode trigger information, received in signaling from the DCM function, the trigger information to initiate the formation of the swarm of MCUs according to the configuration information; encode group advertisement signaling for broadcasting over a second communication interface, the group advertisement signaling to advertise for establishing a communication link over the second communication interface between the wireless communication device and one or more of the additional MCUs; and exchange synchronization signaling over the second communication interface, with the one or more additional MCUs, the synchronization signaling to synchronize communications between the wireless communication device and the one or more additional MCUs.

In Example 116, the subject matter of Example 115 includes, wherein the swarm of MCUs is a swarm of drones moving within a wireless network, wherein the wireless communication device is a drone, and wherein each of the one or more additional MCUs is an additional drone.

In Example 117, the subject matter of Examples 115-116 includes, wherein the first communication interface is configured for transmission of control signaling and backhaul signaling.

In Example 118, the subject matter of Examples 115-117 includes, wherein the second communication interface is configured for communications between two or more MCUs of the swarm.

In Example 119, the subject matter of Examples 115-118 includes, wherein the processing circuitry is configured to configure the wireless communication device to wirelessly communicate with a user equipment (UE).

In Example 120, the subject matter of Examples 115-119 includes, wherein each of the MCUs of the swarm is configured to wirelessly communicate with a separate user equipment (UE) of a plurality of UE.

In Example 121, the subject matter of Examples 115-120 includes, wherein all of the MCUs of the swarm are configured to wirelessly communicate with a single user equipment (UE).

Example 122 is a method for performing a handover, the method comprising communicating by a user equipment (UE), with a first mobile cloud unit (MCU), the first MCU being a member of a first swarm of MCUs; detecting that signal quality of a connection to the first MCU has deteriorated below a threshold; and triggering a handover to a first MCU of a second swarm comprised of a plurality of MCUs responsive to the detecting.

In Example 123, the subject matter of Example 122 includes, wherein at least one MCU of the first swarm maintains communication with the UE during execution of a handover process to the second swarm.

In Example 124, the subject matter of Example 123 includes, wherein at least one MCU of each of the first swarm and the second swarm adjusts geographical position during execution of the handover process.

In Example 125, the subject matter of Examples 122-124 includes, wherein the communicating is performed by a group of two or more user equipments (UEs) and wherein the handover is executed for a plurality of UEs of the group.

In Example 126, the subject matter of Examples 122-125 includes, detecting that communication with a first base station has deteriorated below a threshold; and triggering an MCU-assisted handover to a second base station responsive to the detecting.

Example 127 is a method for communicating in a wireless network, the method comprising receiving a stream of network traffic; identifying a traffic type of the stream; and inserting information into the stream to identify network elements for processing the stream.

In Example 128, the subject matter of Example 127 includes, adapting a modulation and coding scheme (MCS) based on the traffic type.

In Example 129, the subject matter of Examples 127-128 includes, wherein network elements include one or more of a mobility management entity (MME), a transport network layer (TNL) element.

In Example 130, the subject matter of Examples 127-129 includes, wherein identifying the traffic type of the stream includes executing a traffic type identification machine learning algorithm.

In Example 131, the subject matter of Example 130 includes, wherein the traffic type identification machine learning algorithm has as an input at least one of location information, account information, direction of movement, historical information, and identification information of a user device.

Example 132 is at least one machine-readable medium including instructions that, when executed by processing circuitry, cause the processing circuitry to perform operations to implement of any of Examples 1-131.

Example 133 is an apparatus comprising means to implement of any of Examples 1-131.

Example 134 is a system to implement of any of Examples 1-131.

Example 135 is a method to implement of any of Examples 1-131.

Although an aspect has been described with reference to specific example aspects, it will be evident that various modifications and changes may be made to these aspects without departing from the broader scope of the present disclosure. Accordingly, the specification and drawing are to be regarded in an illustrative rather than a restrictive sense. The accompanying drawing that form a part hereof show, by way of illustration, and not of limitation, specific aspects in which the subject matter may be practiced. The aspects illustrated are described in sufficient detail to enable those skilled in the art to practice the teaching disclosed herein. Other aspects may be utilized and derived therefrom, such that structural and logical substitutions and changes may be made without departing from the scope of this disclosure. This Detailed Description, therefore, not to be taken in a limiting sense, and the scope of various aspects is defined only by the appended claims, along with the full rang of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain aspects of the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. An apparatus of a base station, the apparatus comprising: memory; and processing circuitry coupled to the memory, the processing circuitry to:
   identify a swarm of mobile devices wirelessly connected to the base station via a first cell, wherein a plurality of mobile devices of the swarm are adjacent to one or more other mobile devices of the swarm;
   assign an identifier to each of the mobile devices of the swarm;
   assign a swarm identifier to the swarm; and
   initiate a handover of the plurality of mobile devices of the swarm, based on a handover request received from one of the mobile devices of the swarm, the handover request including the swarm identifier.

2. The apparatus of claim 1, wherein each mobile device of the swarm is moving in the same direction as each other and each with an average speed within a threshold.

3. The apparatus of claim 1, wherein the processing circuitry is to:
   receive first information from a first mobile device of the swarm, wherein the first information includes the swarm identifier and an indication the first mobile device measured a second cell.

4. The apparatus of claim 3, wherein the processing circuitry is to:
   receive second information from the first mobile device, wherein the second information includes the swarm identifier and the handover request for handover of the swarm to the second cell.

5. The apparatus of claim 3, wherein the first information includes measurement information from a second mobile device of the swarm.

6. The apparatus of claim 3, wherein the first information includes measurement information from a plurality of mobile devices of the swarm.

7. The apparatus of claim 6, wherein the plurality of mobile devices of the swarm comprises a non-center mobile device of the swarm.

8. The apparatus of claim 4, wherein the processing circuitry is to:
   determine a point of handover for each mobile device of the swarm in response to the handover request.

9. The apparatus of claim 8, wherein the processing circuitry is to:
   transmit handover information to the swarm, wherein the handover information includes the swarm identifier and specific handover information for multiple mobile devices of the swarm.

10. A non-transitory computer-readable storage medium that stores instructions for execution by one or more processors of a base station, the instructions to configure the base station to perform operations comprising:
    identifying a swarm of mobile devices wirelessly connected to the base station via a first cell, wherein a plurality of mobile devices of the swarm are adjacent to one or more other mobile devices of the swarm;
    assigning an identifier to each of the mobile devices of the swarm;
    assigning a swami identifier to the swarm; and
    initiating a handover of the plurality of mobile devices of the swarm, based on a handover request received from one of the mobile devices of the swarm, the handover request including the swarm identifier.

11. The non-transitory computer-readable storage medium of claim 10, wherein each mobile device of the swarm is moving in the same direction as each other and each with an average speed within a threshold.

12. The non-transitory computer-readable storage medium of claim 10, wherein the operations further comprise: receiving first information from a first mobile device of the swarm, wherein the first information includes the swarm identifier and an indication the first mobile device measured a second cell.

13. The non-transitory computer-readable storage medium of claim 12, wherein the operations further comprise: receiving second information from the first mobile device, wherein the second information includes the swarm identifier and the handover request for handover of the swarm to the second cell.

14. The non-transitory computer-readable storage medium of claim 12, wherein the first information includes measurement information from a second mobile device of the swarm.

15. The non-transitory computer-readable storage medium of claim 12, wherein the first information includes measurement information from a plurality of mobile devices of the swarm.

16. The non-transitory computer-readable storage medium of claim 15, wherein the plurality of mobile devices of the swarm comprises a non-center mobile device of the swarm.

17. The non-transitory computer-readable storage medium of claim 13, wherein the operations further comprise: determining a point of handover for each mobile device of the swarm in response to the handover request.

18. The non-transitory computer-readable storage medium of claim 17, wherein the operations further comprise: transmitting handover information to the swarm, wherein the handover information includes the swarm identifier and specific handover information for multiple mobile devices of the swarm.

\* \* \* \* \*

UNITED STATES PATENT AND TRADEMARK OFFICE
CERTIFICATE OF CORRECTION

PATENT NO. : 11,290,923 B2
APPLICATION NO. : 16/648756
DATED : March 29, 2022
INVENTOR(S) : Akdeniz et al.

It is certified that error appears in the above-identified patent and that said Letters Patent is hereby corrected as shown below:

On the Title Page

Column 2, item [56], Line 15, delete ""Discusssion" and insert --"Discussion-- therefor In the Claims Column 98, Line 47, in Claim 10, delete "swami" and insert --swarm-- therefor Column 98, Lines 57-58, in Claim 12, after "comprises:", insert a linebreak Column 98, Lines 63-64, in Claim 13, after "comprises:", insert a linebreak Column 99, Lines 14-15, in Claim 17, after "comprises:", insert a linebreak Column 99, Lines 18-19, in Claim 18, after "comprises:", insert a linebreak Signed and Sealed this
Fourteenth Day of June, 2022

Katherine Kelly Vidal
*Director of the United States Patent and Trademark Office*